(12) United States Patent
Singh et al.

(10) Patent No.: US 12,498,578 B2
(45) Date of Patent: Dec. 16, 2025

(54) WAVEGUIDES WITH HIGH INDEX MATERIALS AND METHODS OF FABRICATION THEREOF

(71) Applicant: Magic Leap, Inc., Plantation, FL (US)

(72) Inventors: Vikramjit Singh, Pflugerville, TX (US); Kang Luo, Austin, TX (US); Michal Beau Dennison Vaughn, Round Rock, TX (US); Samarth Bhargava, Saratoga, CA (US); Shuqiang Yang, Austin, TX (US); Michael Nevin Miller, Austin, TX (US); Frank Y. Xu, Austin, TX (US); Michael Anthony Klug, Austin, TX (US); Kevin Messer, Mountain View, CA (US); Robert D. Tekolste, Fort Lauderdale, FL (US); Xiaopei Deng, Cedar Park, TX (US); Xiao Li, Cooper City, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/622,925

(22) Filed: Mar. 30, 2024

(65) Prior Publication Data
US 2024/0255763 A1 Aug. 1, 2024

Related U.S. Application Data

(63) Continuation of application No. 17/437,722, filed as application No. PCT/US2020/022175 on Mar. 11, 2020, now Pat. No. 11,982,813.
(Continued)

(51) Int. Cl.
*G02B 27/01* (2006.01)
*F21V 8/00* (2006.01)
*G02B 6/34* (2006.01)

(52) U.S. Cl.
CPC ....... *G02B 27/0172* (2013.01); *G02B 6/0016* (2013.01); *G02B 6/0036* (2013.01);
(Continued)

(58) Field of Classification Search
CPC ..... G02B 6/34; G02B 27/017; G02B 27/0172
See application file for complete search history.

(56) References Cited

U.S. PATENT DOCUMENTS 4,227,769 A 10/1980 Phillips et al.
4,946,240 A 8/1990 Yamamoto et al.
(Continued)

FOREIGN PATENT DOCUMENTS

CN 111965761 A 11/2020
CN 113534342 A 10/2021
(Continued)

OTHER PUBLICATIONS

English translation of Notice of Reasons for Refusal in Japanese patent application 2024-075769, dated Mar. 17, 2025. (Year: 2025).*
(Continued)

*Primary Examiner* — Michael Stahl
(74) *Attorney, Agent, or Firm* — Zi Y. Wong; Via LLP

(57) ABSTRACT

Waveguides comprising materials with refractive index greater than or equal to 1.8 and methods of patterning waveguides are disclosed. Patterned waveguides comprising materials with refractive index greater than or equal to 1.8 can be incorporated in display devices, such as, for example wearable display devices to project virtual images to a viewer. A waveguide may be transparent and may comprise a substrate comprising a first material having a first refractive index greater than about 2.0. Diffractive features may be formed, on the substrate, of a second material having a second refractive index that is lower than the first refractive index. A third material may be disposed over the diffractive
(Continued)

features and may have a third refractive index that is higher than the second refractive index.

17 Claims, 56 Drawing Sheets

Related U.S. Application Data

(60) Provisional application No. 62/902,348, filed on Sep. 18, 2019, provisional application No. 62/899,648, filed on Sep. 12, 2019, provisional application No. 62/899,116, filed on Sep. 11, 2019, provisional application No. 62/858,952, filed on Jun. 7, 2019, provisional application No. 62/817,411, filed on Mar. 12, 2019.

(52) U.S. Cl.
CPC ............. *G02B 6/0076* (2013.01); *G02B 6/34* (2013.01); *G02B 2027/0118* (2013.01); *G02B 2027/0125* (2013.01)

(56) References Cited

U.S. PATENT DOCUMENTS

| | | | |
|---|---|---|---|
| 5,029,988 | A | 7/1991 | Urino |
| 5,071,248 | A | 12/1991 | Tiefenthaler et al. |
| 5,101,459 | A | 3/1992 | Sunagawa |
| 5,234,537 | A | 8/1993 | Nagano et al. |
| 5,619,369 | A * | 4/1997 | Yamamoto ............ G02F 1/3558 359/332 |
| 5,883,741 | A | 3/1999 | Ono et al. |
| 6,218,194 | B1 | 4/2001 | Lyndin et al. |
| 6,850,221 | B1 | 2/2005 | Tickle |
| 10,527,851 | B2 | 1/2020 | Lin et al. |
| 11,982,813 | B2 | 5/2024 | Singh |
| 2003/0091284 | A1 | 5/2003 | Maisenholder et al. |
| 2006/0028436 | A1 | 2/2006 | Armstrong |
| 2007/0081123 | A1 | 4/2007 | Lewis |
| 2010/0014073 | A1 | 1/2010 | Hashiguchi et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0169739 | A1 | 6/2014 | Huang |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2015/0016777 | A1 | 1/2015 | Abovitz et al. |
| 2015/0062715 | A1 | 3/2015 | Yamada et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0274281 | A1* | 9/2016 | Lutolf ...................... G02B 6/34 |
| 2016/0363728 | A1 | 12/2016 | Wang et al. |
| 2017/0059879 | A1* | 3/2017 | Vallius ............... G02B 27/4205 |
| 2017/0131460 | A1 | 5/2017 | Lin et al. |
| 2017/0307886 | A1 | 10/2017 | Stenberg et al. |
| 2017/0322418 | A1 | 11/2017 | Lin et al. |
| 2018/0074457 | A1 | 3/2018 | Jolly et al. |
| 2018/0231702 | A1 | 8/2018 | Lin et al. |
| 2018/0299607 | A1 | 10/2018 | Menezes et al. |
| 2019/0114484 | A1 | 4/2019 | Keech et al. |
| 2019/0288473 | A1 | 9/2019 | Niwa et al. |
| 2021/0294103 | A1 | 9/2021 | Klug et al. |
| 2022/0075118 | A1 | 3/2022 | Deng et al. |
| 2022/0128817 | A1 | 4/2022 | Singh |

FOREIGN PATENT DOCUMENTS

| | | | |
|---|---|---|---|
| JP | 61-286807 | A | 12/1986 |
| JP | 06-347630 | A | 12/1994 |
| JP | 2003-521684 | A | 7/2003 |
| JP | 2005-121938 | A | 5/2005 |
| JP | 2010-085722 | A | 4/2010 |
| JP | 2015-049278 | A | 3/2015 |
| JP | 2015-102613 | A | 6/2015 |
| JP | 2018-538582 | A | 12/2018 |
| KR | 10-2018-0081211 | A | 7/2018 |
| WO | 2004/034108 | A1 | 4/2004 |
| WO | 2018/039273 | A1 | 3/2018 |
| WO | 2018/140502 | A1 | 8/2018 |
| WO | 2019/075192 | A1 | 4/2019 |
| WO | 2020/185954 | A1 | 9/2020 |

OTHER PUBLICATIONS

A. Kar et al. Realization of alignment-tolerant grating couplers for z-cut thin-film lithium niobate. Optics Express, 27: 11: 15856-15867, May 27, 2019 (https://doi.org/10.1364/OE.27.015856) (Year: 2019).
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/?azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/?raskar/book/BimberRaskarAugmentedRealityBook.pdf.
International Preliminary Report on Patentability for PCT Application No. PCT/US2020/022175, dated Sep. 23, 2021.
International Search Report and Written Opinion for PCT Application No. PCT/US2020/022175, dated Jun. 11, 2020.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
JP2021-553831 Office Action mailed Feb. 9, 2024.
M. Mahmoud et al. Lithium niobate on insulator (LNOI) grating couplers. CLEO 2015, OSA Technical Digest (online) (Optica Publishing Group, 2015), paper SW4I.7, May 2015. (https://doi.org/10.1364/CLEO_SI.2015.SW4I.7) (Year: 2015).
Office Action received for European Application No. 20770481.8, mailed on Apr. 26, 2024, 8 pages.
Supplementary European Search Report and Search Opinion received for EP Application No. 20770481.8, mailed on Oct. 21, 2022, 11 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Z. Chen et al. Grating coupler on lithium niobate thin film waveguide with a metal bottom reflector. Optical Materials Express, 7: 11: 4010-4017, Nov. 1, 2017. (https://doi.org/10.1364/OME.7.004010) (Year: 2017).

* cited by examiner

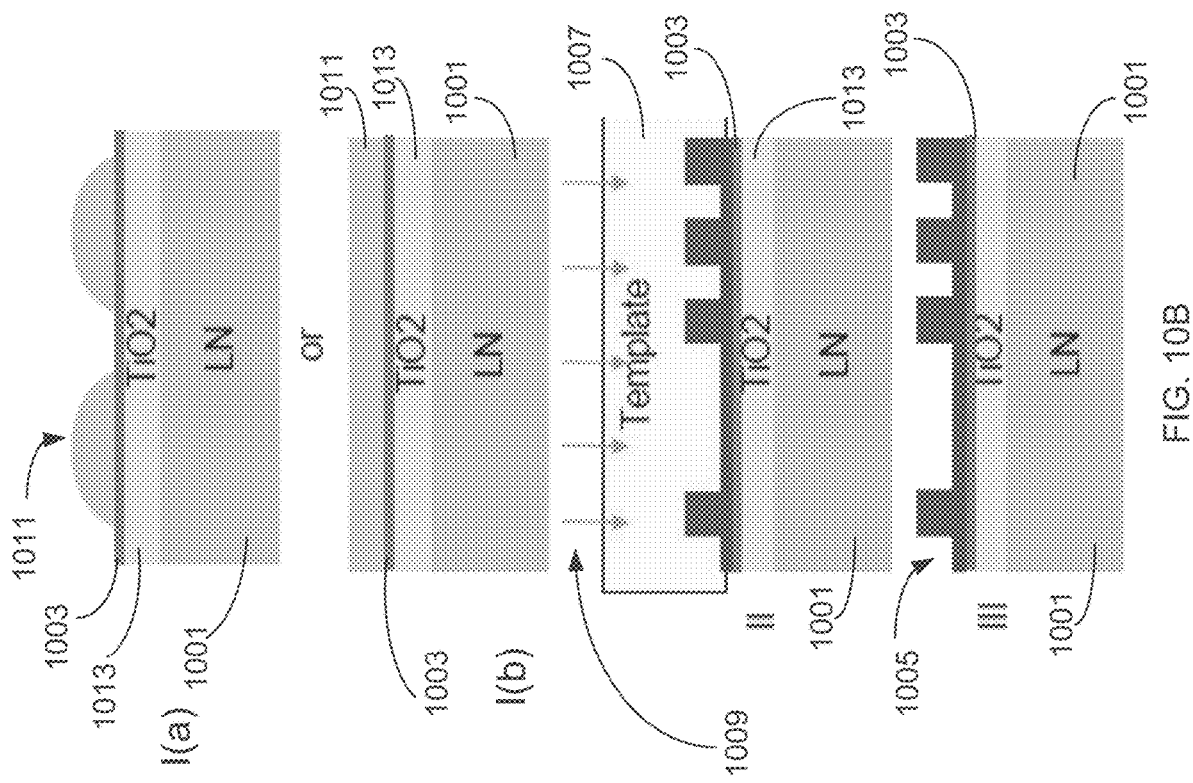
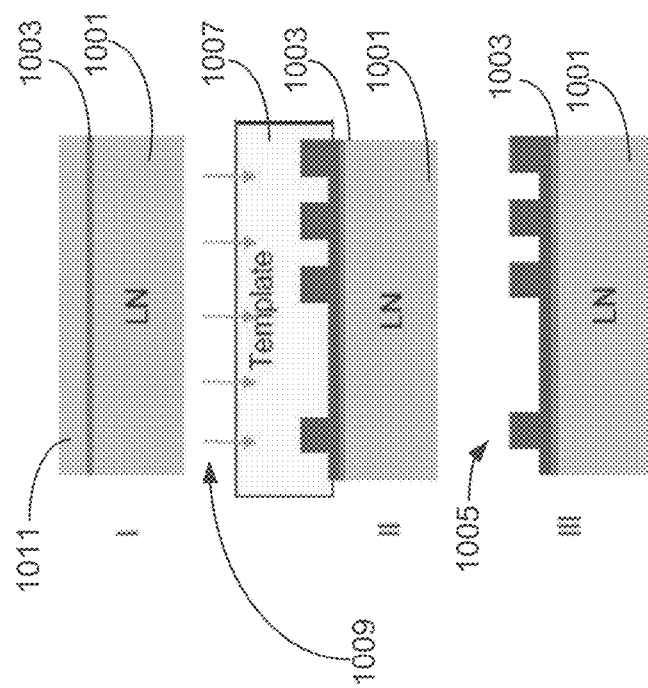
FIG. 10A
FIG. 10B

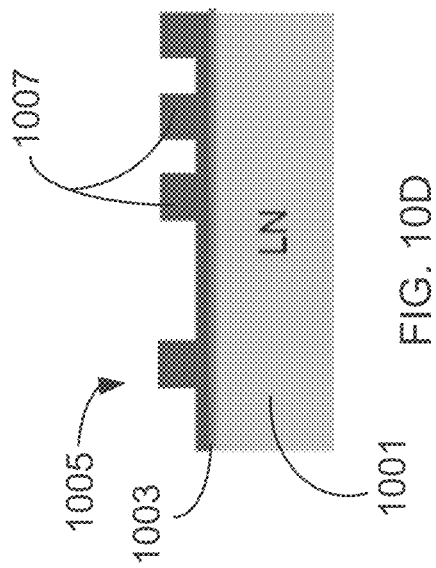
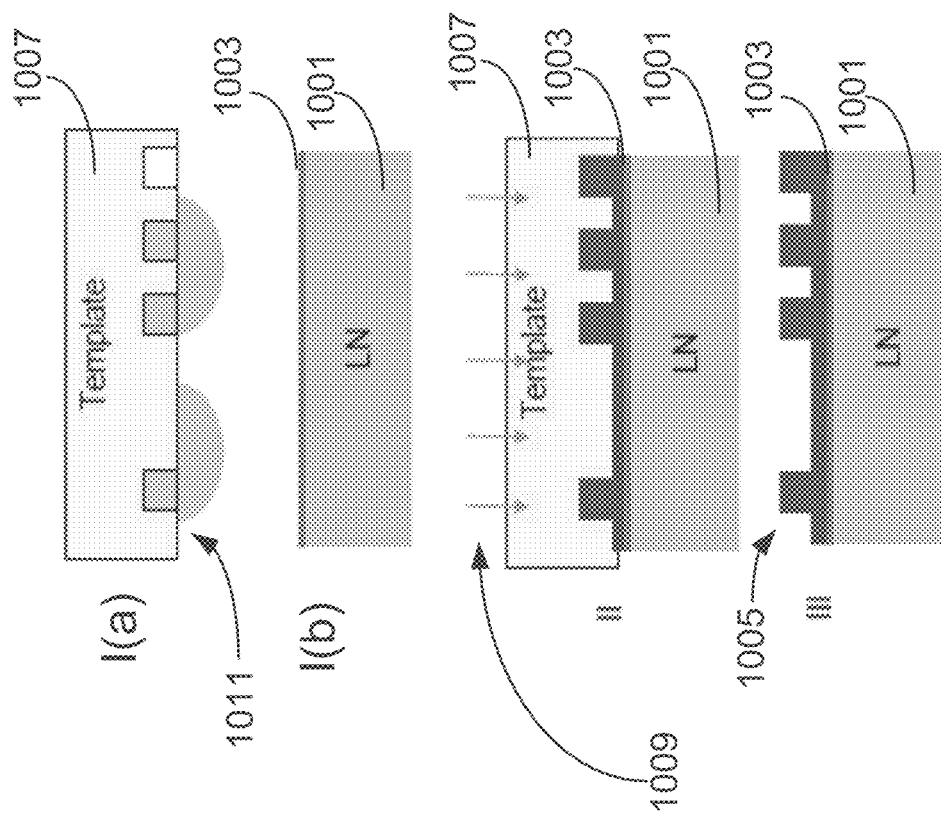
FIG. 10C
FIG. 10D

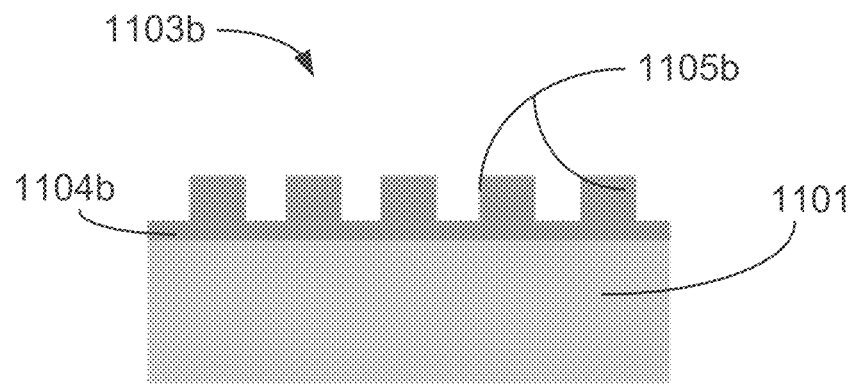
-F, -CH, Ar, -O
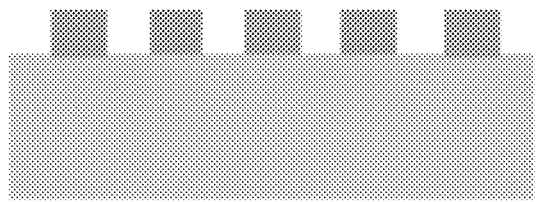
-F, -Br, Ar, -CH
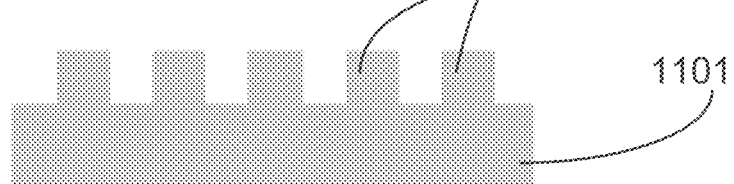
FIG. 11B

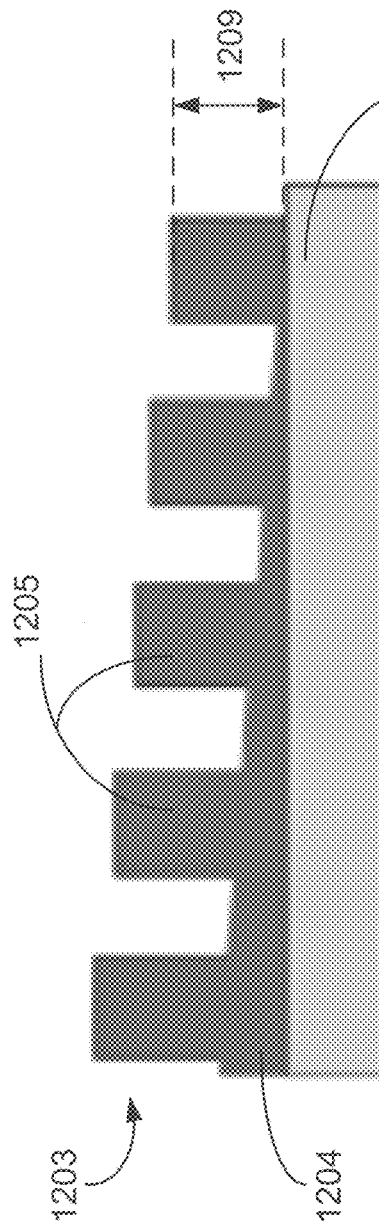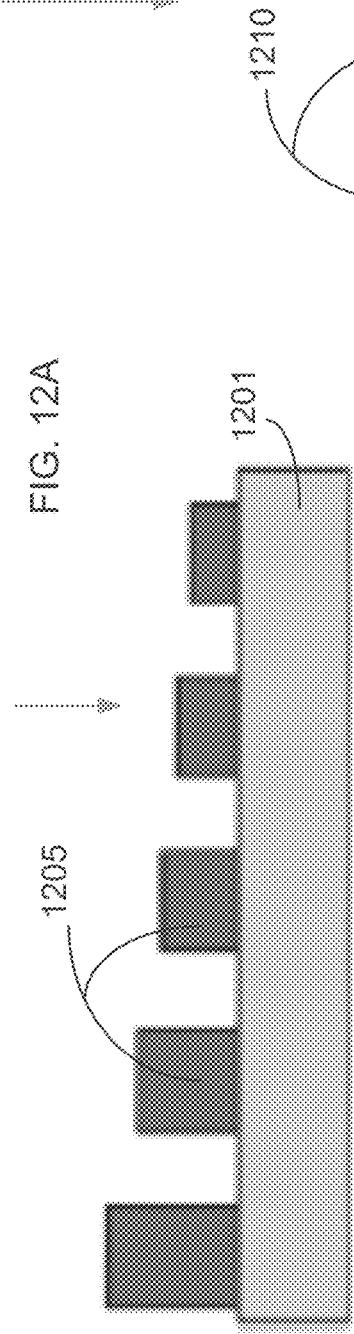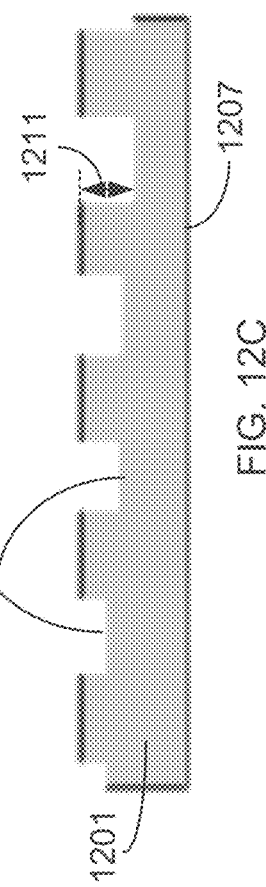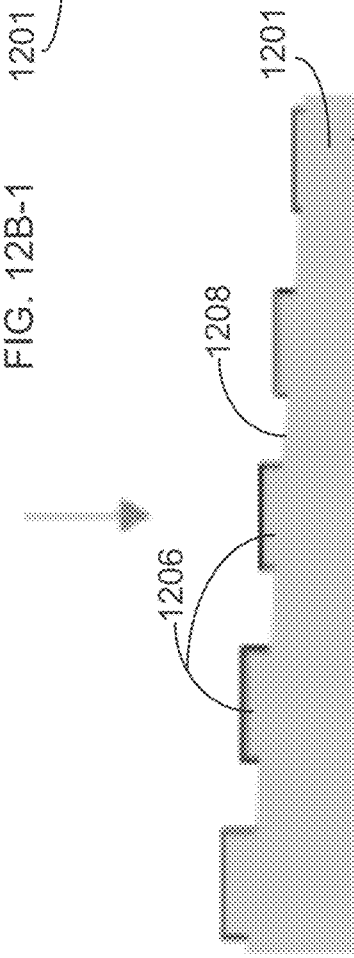
FIG. 12A
FIG. 12B-1
FIG. 12B-2
FIG. 12C

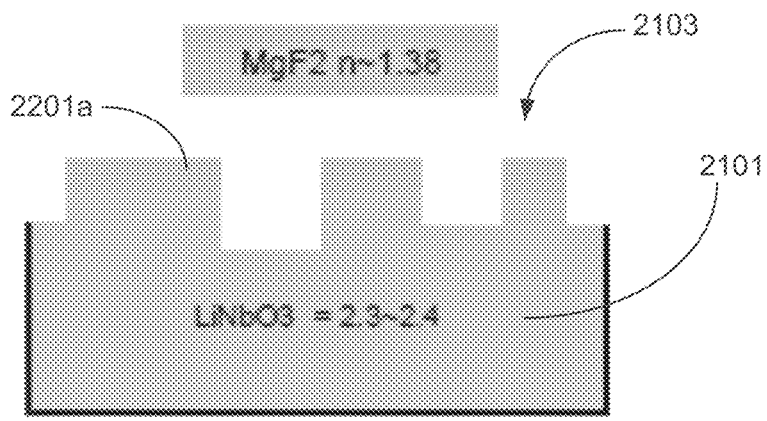
FIG. 22A
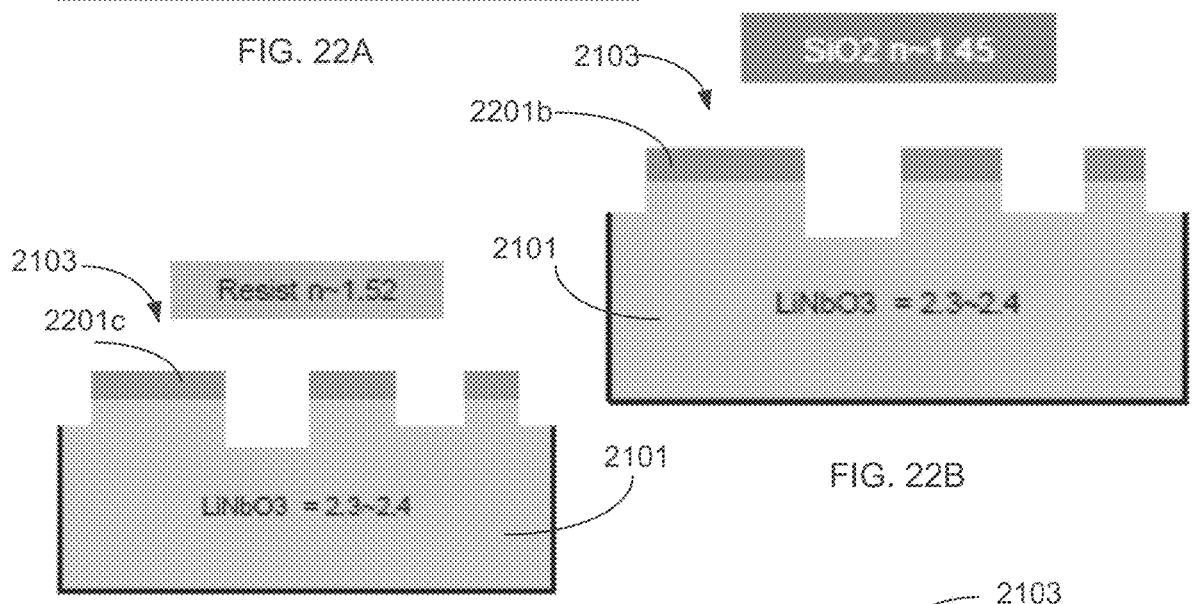
FIG. 22B
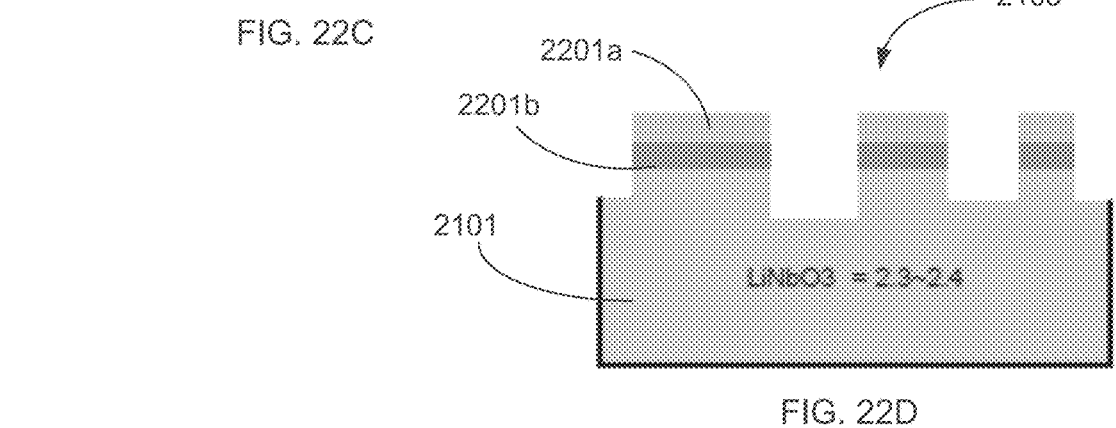
FIG. 22C
FIG. 22D

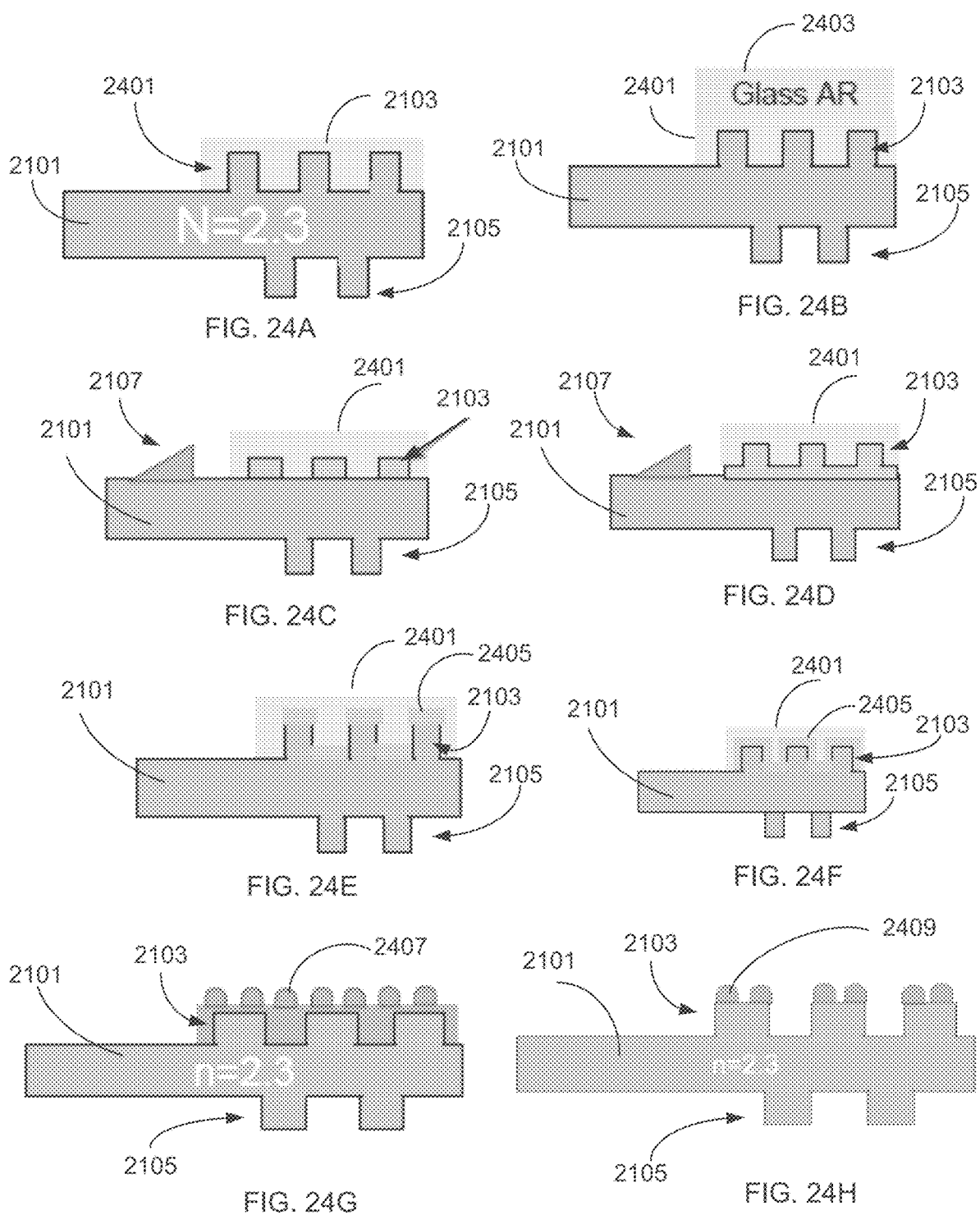

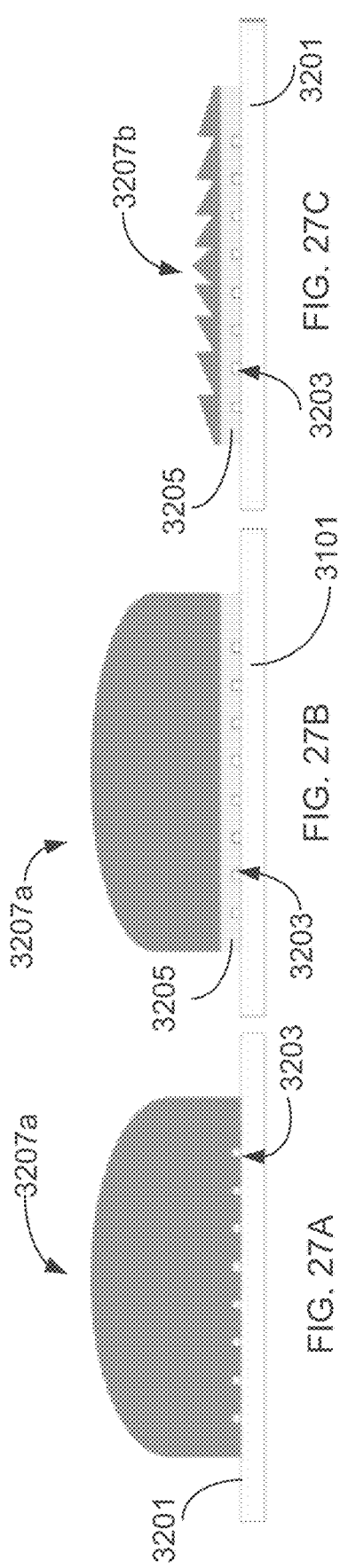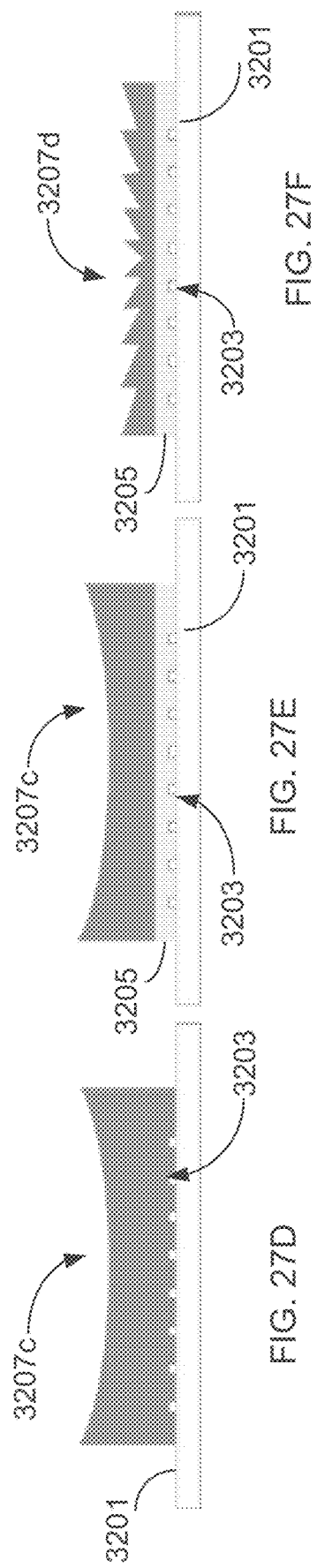

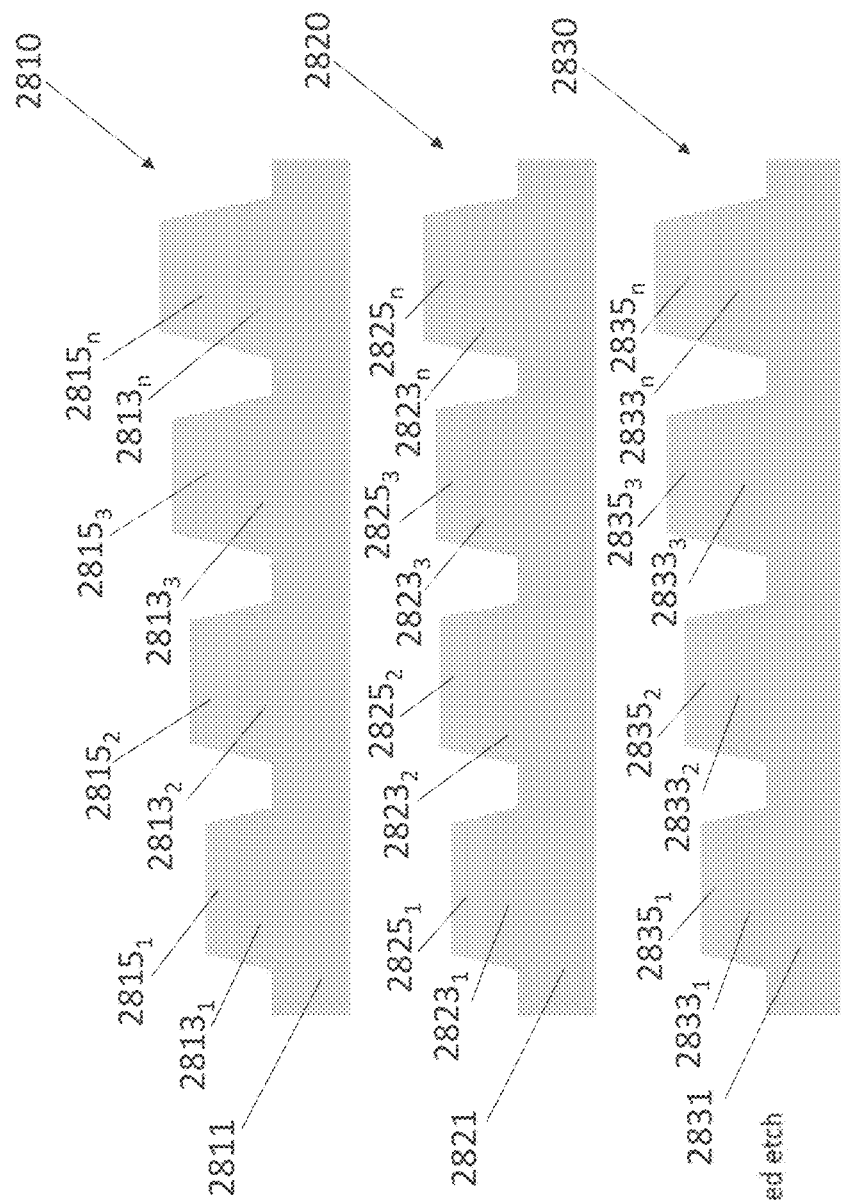

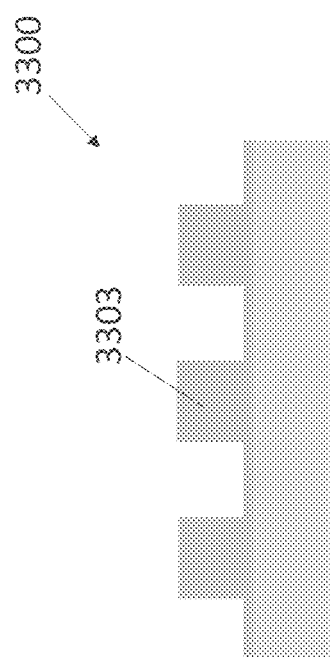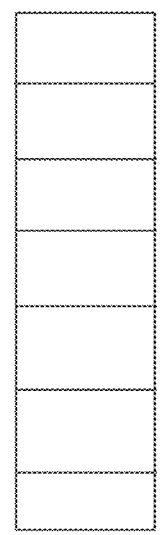
FIG. 33A
FIG. 33B

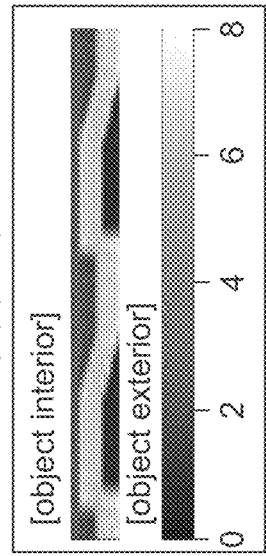
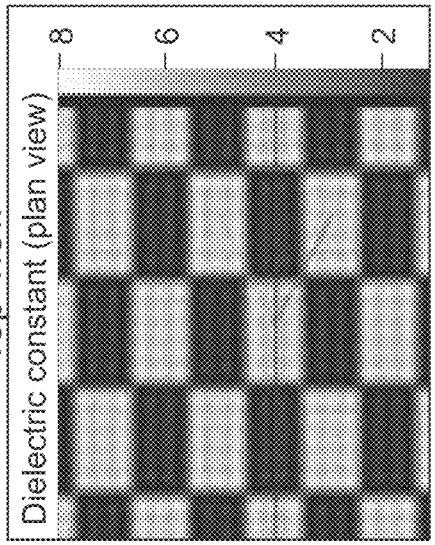
FIG. 36A
FIG. 36B

WAVEGUIDES WITH HIGH INDEX MATERIALS AND METHODS OF FABRICATION THEREOF

PRIORITY CLAIM

This application is a continuation of U.S. application Ser. No. 17/437,722 filed on Sep. 9, 2021, which is a national stage entry of International Application No. PCT/US2020/022175 filed on Mar. 11, 2020, which claims priority from U.S. Provisional Application No. 62/817,411 filed on Mar. 12, 2019, U.S. Provisional Application No. 62/858,952 filed on Jun. 7, 2019, U.S. Provisional Application No. 62/899,116 filed on Sep. 11, 2019, U.S. Provisional Application No. 62/899,648 filed on Sep. 12, 2019, and U.S. Provisional Application No. 62/902,348 filed on Sep. 18, 2019. The entire contents of each of the above-listed applications are incorporated by reference into this application.

BACKGROUND

Field

The present disclosure relates to optical systems, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

A head mounted display system may be configured to project light to an eye of a user to display augmented reality image content in a vision field of the user. The head-mounted display system may include a frame that is configured to be supported on a head of the user. The head-mounted display system may also include an eyepiece disposed on the frame. At least a portion of the eyepiece may be transparent and/or disposed at a location in front of the user's eye when the user wears the head-mounted display such that the transparent portion transmits light from the environment in front of the user to the user's eye to provide a view of that environment in front of the user. The eyepiece may include one or more waveguides disposed to direct light into the user's eye to form augmented reality image content.

Various embodiments of the head mounted display system comprise a projector having at least one pupil or sub-pupil that outputs light (e.g., image light) having a plurality of colors or ranges of wavelengths (e.g., two or three colors or ranges of wavelengths) within the at least one pupil or sub-pupil. Different colors or wavelengths in the plurality of ranges of wavelengths may include one or more colors or wavelengths. In some embodiments, the head mounted display system comprises a waveguide assembly comprising a plurality of waveguides stacked over each other and configured to receive light having a plurality of colors or ranges of wavelengths outputted from at least one pupil of the projector. Different waveguides in the plurality of waveguides may comprise an in-coupling optical element configured to in-couple light of one of the colors or plurality of ranges of wavelengths from the light outputted from the pupil of the projector. One or more waveguides comprising materials with relatively high refractive index (e.g., refractive index greater than refractive index of glass and/or refractive index greater than or equal to about 1.8) can advantageously enlarge the field of view as compared to waveguides comprising glass and/or materials with refractive index less than about 1.8. Additionally, in various embodiments of display devices, different colors or wavelengths of light (e.g., red, green and/or blue wavelengths of light) can be in-coupled into a single waveguide comprising materials with relatively high refractive index (e.g., refractive index greater than refractive index of glass and/or refractive index greater than or equal to about 1.8). In one or more embodiments, two or more colors (e.g., two or three colors) can be coupled into and propagate within a single waveguide comprising materials with relatively high refractive index and maintain a high field of view (e.g., refractive index greater than or equal to about 1.8). Accordingly, various embodiments of display devices contemplated in this application include one or more waveguides comprising materials with refractive index greater than refractive index of glass. For example, one or more waveguides in various embodiments of display devices contemplated in this application can comprise Lithium Niobate (LiNbO$_3$), Lithium Tantalate (LiTaO$_3$), Diamond, Silicon Carbide (SiC), and other similar materials having refractive index greater than or equal to about 1.8 and absorption coefficient less than 0.001. In various embodiments, one or more waveguides in various embodiments of display devices contemplated in this application can comprise materials that are transparent to visible light and have a refractive index greater than refractive index of glass. This application also describes systems and methods of fabricating gratings on one or more surfaces of a waveguide comprising a material that are transparent to visible light and have a refractive index greater than refractive index of glass, such as, for example Lithium Niobate (LiNbO$_3$), Silicon Carbide (SiC), Diamond, and other similar materials. Waveguides comprising materials such as Diamond and SiC having a hardness factor (e.g., approximately 9-10 Mohs) can have additional advantages of being scratch resistant and/or harder to break. In some implementations, the waveguide and grating formed therein comprises x-cut lithium niobate.

The systems, methods and devices disclosed herein each have several innovative aspects, no single one of which is solely responsible for the desirable attributes disclosed herein. A variety of example systems and methods are provided below.

Part I

Example 1: A method of manufacturing a diffractive optical element, the method comprising: providing a substrate comprising material having a refractive index greater than 2.0 that is transparent to visible light; disposing a patternable layer over a surface of the substrate; forming a pattern on the patternable layer, the pattern comprising a plurality of surface relief features with different heights; and etching the surface of the substrate through the patternable layer to fabricate structures on the surface of the substrate, wherein said structure comprise diffractive features configured to diffract visible light.

Example 2: The method of Example 1, wherein the transparent material comprises at least one of $LiNbO_3$, $LiTaO_3$, or $BaTiO_3$.

Example 3: The method of Example 2, wherein the transparent material comprises an X-cut $LiNbO_3$ wafer.

Example 4: The method of any of the Examples above, further comprising disposing over the substrate a layer between the substrate and the patternable layer.

Example 5: The method of Example 4, wherein the layer between the substrate and the patternable layer comprises a dielectric layer.

Example 6: The method of Example 4, wherein the layer between the substrate and the patternable layer comprises a conducting layer.

Example 7: The method of Examples 4, 5 or 6, wherein the layer between the substrate and the patternable layer comprises a transparent oxide.

Example 8: The method of Examples 4 or 6, wherein the layer between the substrate and the patternable layer comprises a conductive oxide.

Example 9: The method of Example 4, wherein the layer between the substrate and the patternable layer comprises at least one of SiC, $TiO_2$, $ZrO_2$, $Si_3N_4$, or $SiO_2$.

Example 10: The method of any of Examples 4 to 9, wherein the layer between the substrate and the patternable layer comprises a material having a refractive index between 1.45 and 3.5.

Example 11: The method of any of Examples 4 to 9, wherein the layer between the substrate and the patternable layer comprises a material having a refractive index greater than or equal to 2.0.

Example 12: The method of any of Examples 4, 6, 8, 10, or 11, wherein the layer between the substrate and the patternable layer comprises a material configured to dissipate static charge.

Example 13: The method of any of the Examples above, further comprising disposing an adhesion promoter layer over the substrate prior to disposing the patternable layer.

Example 14: The method of Example 13, wherein the adhesion promoter layer has a thickness less than or equal to 10 nm.

Example 15: The method of Examples 13 or 14, wherein the adhesion promoter layer is configured to covalently bond with the patternable layer.

Example 16: The method of Examples 13 or 14, wherein the adhesion promoter layer is configured to cross-link with the substrate.

Example 17: The method of any of the Examples above, wherein the patternable layer has a refractive index less than 2.0.

Example 18: The method of any of the Examples above, further comprising exposing the surface of the substrate to an ionizer prior to disposing the patternable layer.

Example 19: The method of Example 18, wherein the ionizer comprises bipolar clean air ionization.

Example 20: The method of Example 18, wherein the ionizer comprises positive or negative ions.

Example 21: The method of any of the Examples above, further comprising bringing a charged surface close to or in contact with the surface of the substrate thereby dissipating surface charges.

Example 22: The method of any of the Examples above, further comprising mounting the substrate on an electrically grounded mount thereby dissipating surface charges.

Example 23: The method of any of the Examples above, further comprising depositing a metal layer over the substrate thereby dissipating surface charges.

Example 24: The method of Example 23, wherein the metal layer comprises iridium, chromium or nickel.

Example 25: The method of any of the Examples above, wherein depositing the patternable layer comprises jet depositing the patternable layer over the surface.

Example 26: The method of any of the Examples above, wherein the patternable layer is deposited non-uniformly across the surface, regions of surface where the patternable layer is thicker producing higher surface relief features than regions of surface where the patternable layer is thinner.

Example 27: The method of any of the Examples above, wherein etching the surface of the substrate comprises: exposing the patternable layer to a first etchant that is configured to etch the patternable layer.

Example 28: The method of Example 27, further comprising exposing the surface of the substrate to a second etchant, the second etchant configured to etch the substrate.

Example 29: The method of Example 27, further comprising exposing a layer of dielectric material disposed on the substrate to the second etchant configured to etch a layer of dielectric material.

Example 30: The method of Example 29, further comprising exposing the surface of the substrate to a third etchant configured to etch the material of the substrate.

Example 31: The method of any of the Examples above, wherein said forming a pattern on said patternable layer comprises imprinting a pattern in said patternable layer.

Example 32: The method of Example 31, wherein imprinting a pattern on the patternable layer comprises contacting the patternable layer with a patterned template.

Example 33: The method of any of the Examples above, wherein said forming a pattern on said patternable layer comprises patterning using photolithography.

Example 34: The method of any of the Examples above, wherein said substrate comprises a dielectric.

Example 35: The method of any of the Examples above, wherein said patternable layer comprise polymer.

Example 36: The method of any of the Examples above, wherein said patternable layer comprise resist.

Example 37: The method of Example 36, wherein said patternable layer comprise photoresist.

Example 38: The method of any of the Examples above, further comprising integrating the diffractive optical element in a head mounted display.

Example 39: A method of manufacturing a diffractive optical element, the method comprising: providing a substrate comprising a material having a refractive index greater than 2.0 that is transparent to visible light; disposing different amounts of a patternable material over different regions on a surface of the substrate; and etching the surface of the substrate through the patternable material to fabricate structures having different heights on the surface of the substrate thereby forming diffractive features.

Example 40: The method of Example 39, wherein regions of surface having more patternable material produce higher surface relief features than regions of surface having less patternable material.

Example 41: A method of manufacturing a diffractive optical element, the method comprising: providing a substrate comprising a material having a refractive index greater than 2.0 that is transparent to visible light; disposing different compositions of a patternable material over different laterally spaced regions on a surface of the substrate, the different compositions of the patternable material having different etch rates to an etchant; and etching the surface of the substrate through the patternable material with the etchant to fabricate structures having different heights on the surface of the substrate thereby forming diffractive features.

Example 42: A display device comprising: a waveguide stack comprising a plurality of waveguides, at least one of the plurality of waveguides comprising a material having a refractive index greater than 2.0 that is that is transparent to visible light, wherein said at least one of the plurality of waveguides comprises a first major surface, a second major surface, and a plurality of thinner edges, wherein the first major surface comprises a plurality of diffractive features having different heights.

Example 43: The display device of Example 42, wherein the second major surface comprises a plurality of diffractive features offset from the plurality of diffractive features of the first major surface.

Example 44: The display device of Examples 42 or 43, wherein the transparent material comprises one or more of $LiNbO_3$, $LiTaO_3$, SiC, or $TiO_2$.

Example 45: The display device of any of Examples 42 to 44, further comprising: a frame configured to be supported on the head of the user; and an eyepiece comprising the waveguide stack disposed on the frame.

Example 46: The display device comprises a head mounted display.

Example 47: A method of manufacturing a diffractive optical element, the method comprising: providing a substrate comprising material having a refractive index greater than 1.79 that is transparent to visible light; disposing a patternable layer over a surface of the substrate; patterning the patternable layer, the pattern comprising a plurality of features; and etching the surface of the substrate through the patternable layer to fabricate structures on the surface of the substrate, wherein the structures comprise diffractive features configured to diffract visible light.

Example 48: The method of Example 47, wherein the transparent material comprises $LiNbO_3$ or silicon carbide.

Example 49: The method of Examples 47 or 48, wherein patterning the patternable layer comprises imprinting the patternable layer with an imprint template comprising a plurality of features.

Example 50: The method of any of Examples 47-49, further comprising curing the patterned patternable layer.

Example 51: The method of any of Examples 47-50, wherein disposing the patternable layer over the surface of the substrate comprises jet-depositing the patternable layer over the surface of the substrate.

Example 52: The method of any of Examples 47-51, wherein the surface of the substrate is discharged prior to disposing the patternable layer by at least one of (i) exposing the surface to a plasma; (ii) using an ionizer; (iii) bringing a secondary charged surface or a grounded surface near the surface; or (iv) providing a transparent metal or other conductive coating.

Example 53: The method of any of Examples 47-52, wherein the patternable layer comprises a resist or a polymer.

Example 54: The method of any of Examples 47-53, further comprising disposing an adhesion promoter layer over the surface of the substrate prior to disposing the patternable layer.

Example 55: The method of any of Examples 47-54, further comprising disposing a layer of a high refractive index material having a refractive index greater than 1.79 over the surface of the substrate prior to disposing the patternable layer, the layer of the high refractive index material comprising a material different from the material of the substrate.

Example 56: The method of Example 55, wherein the layer of the high refractive index material comprises at least one of titanium dioxide, zirconium dioxide, silicon nitride or silicon carbide.

Example 57: The method of any of Examples 47-56, wherein etching the surface of the substrate comprises: etching the patterned patternable layer using a first etch process to expose the surface of the substrate between the plurality of features of the patternable layer; and etching the plurality of the features and the exposed surface of the substrate using a second etch process to fabricate a plurality of features on the surface of the substrate.

Example 58: The method of Example 57, wherein the first etch process comprises etching in the presence of at least one of Argon, Oxygen and Helium, and wherein the second etch process comprises etching in the presence of at least one of Fluorine, Bromine, Argon or Methane.

Example 59: The method of any of Example 47-58, wherein disposing the patternable layer over the surface of the substrate comprises disposing a plurality of droplets of a patternable material over the substrate.

Example 60: The method of Example 59, wherein the volume of the plurality of droplets of the patternable material varies across the surface of the substrate.

Example 61: The method of Example 60, wherein the plurality of features of the patterned patternable layer have different heights.

Example 62: The method of Example 60, wherein a base of the cured patterned patternable layer is sloped.

Example 63: The method of Example 60, wherein a spacing between the plurality of features of the patterned patternable layer varies across the surface of the substrate.

Example 64: The method of any of Examples 59-63, wherein the plurality of structures formed on the surface of the substrate have different heights.

Example 65: The method of Example 59, wherein the volume of the plurality of droplets of the patternable material is constant.

Example 66: The method of Example 65, wherein the plurality of features of the cured patternable layer have approximately a same height.

Example 67: The method of any of Examples 65-66, wherein the plurality of structures formed on the surface of the substrate have approximately a constant height.

Example 68: A method of manufacturing a diffractive optical element, the method comprising: providing a substrate comprising material having a refractive index greater than 1.79 that is transparent to visible light; disposing a patternable layer over a surface of the substrate; and patterning the patternable layer to form a pattern comprising a plurality of features, wherein the plurality of features of the patterned patternable layer comprise diffractive features configured to diffract visible light into the substrate to be guided therein or to diffract visible light guided within the substrate out of the substrate.

Example 69: The method of Example 68, wherein the transparent material comprises $LiNbO_3$ or silicon carbide.

Example 70: The method of Examples 68 or 69, wherein patterning the patternable layer comprises imprinting the patternable layer with an imprint template comprising a plurality of features.

Example 71: The method of any of Examples 68-71, further comprising curing the patterned patternable layer.

Example 72: The method of any of Examples 68-71, wherein disposing the patternable layer over the surface of the substrate comprises jet-depositing the patternable layer over the surface of the substrate.

Example 73: The method of any of Examples 68-72, wherein the surface of the substrate is discharged prior to disposing the patternable layer using at least one of (i) exposing the surface a plasma; (ii) an ionizer; (iii) bringing a secondary charged surface or a grounded surface near the surface; or (iv) providing a transparent metal or other conductive coating.

Example 74: The method of any of Examples 68-73, wherein the patternable layer comprises a resist or a polymer.

Example 75: The method of any of Examples 68-74, further comprising disposing an adhesion promoter layer over the surface of the substrate prior to disposing the patternable layer.

Example 76: The method of any of Examples 68-75, further comprising disposing a layer of a high refractive index material having a refractive index greater than 1.79 over the surface of the substrate prior to disposing the patternable layer, the layer of the high refractive index material comprising a material different from the material of the substrate.

Example 77: The method of Example 76, wherein the layer of the high refractive index material comprises at least one of titanium dioxide, zirconium dioxide, silicon nitride or silicon carbide.

Example 78: The method of any of Example 68-75, wherein the disposing the patternable layer over the surface of the substrate comprises disposing a plurality of droplets of a patternable material over the substrate.

Example 79: The method of Example 78, wherein the volume of the plurality of droplets of the patternable material varies across the surface of the substrate.

Example 80: The method of Example 79, wherein the plurality of features of the patterned patternable layer have different heights.

Example 81: The method of Example 80, wherein the base of the patterned patternable layer is sloped.

Example 82: The method of Example 80, wherein a spacing between the plurality of features of the patterned patternable layer varies across the surface of the substrate.

Example 83: The method of Example 78, wherein the volume of the plurality of droplets of the patternable material is constant.

Example 84: The method of Example 83, wherein the plurality of features of the patterned patternable layer have approximately a same height.

Example 85: A method of manufacturing a diffractive optical element, the method comprising: providing a substrate comprising material having a refractive index greater than 1.79 that is transparent to visible light; jet-depositing the patternable layer over a surface of the substrate; and patterning the patternable layer to form a pattern comprising a plurality of features.

Example 86: The method of Example 85, wherein the transparent material comprises $LiNbO_3$ or silicon carbide.

Example 87: The method of Examples 85 or 86, wherein patterning the patternable layer comprises using imprinting the patternable layer with an imprint template comprising a plurality of features.

Example 88: The method of any of Examples 85-87, further comprising curing the patterned patternable layer.

Example 89: The method of Examples 85 or 88, wherein the surface of the substrate is discharged prior to disposing the patternable layer using at least one of (i) exposing the surface a plasma; (ii) an ionizer; (iii) bringing a secondary charged surface or a grounded surface near the surface; or (iv) providing a transparent metal or other conductive coating.

Example 90: The method of any of Examples 85-89, wherein the patternable layer comprises a resist or a polymer.

Example 91: The method of any of Examples 85-90, further comprising disposing an adhesion promoter layer over the substrate prior to disposing the patternable layer.

Example 92: The method of any of Examples 85-91, further comprising disposing a layer of a high refractive index material having a refractive index greater than 1.79 over the surface of the substrate prior to disposing the patternable layer, the layer of the high refractive index material comprising a material different from the material of the substrate.

Example 93: The method of Example 92, wherein the layer of the high refractive index material comprises at least one of titanium dioxide, zirconium dioxide, silicon nitride or silicon carbide.

Example 94: The method of any of Example 85-93, wherein jet-depositing the patternable layer over the substrate comprises jet-depositing a plurality of droplets of a patternable material over the substrate.

Example 95: The method of Example 94, wherein the volume of the plurality of droplets of the patternable material varies across the surface of the substrate.

Example 96: The method of Example 95, wherein the plurality of features of the patterned patternable layer have different heights.

Example 97: The method of Example 95, wherein the base of the patterned patternable layer is sloped.

Example 98: The method of Example 97, wherein a spacing between the plurality of features of the patterned patternable layer varies across the surface of the substrate.

Example 99: The method of Example 94, wherein the volume of the plurality of droplets of the patternable material is constant.

Example 100: The method of Example 99, wherein the plurality of features of the cured patternable layer have approximately a same height.

Example 101: The method of Example 48, wherein the transparent material comprises $LiNbO_3$.

Example 102: The method of Example 48, wherein the transparent material comprises silicon carbide.

Example 103: The method of Example 52, wherein the surface of the substrate is discharged prior to disposing the patternable layer by exposing the surface to a plasma.

Example 104: The method of Example 52, wherein the surface of the substrate is discharged prior to disposing the patternable layer using an ionizer.

Example 105: The method of Example 52, wherein the surface of the substrate is discharged prior to disposing the patternable layer by bringing a secondary charged surface or a grounded surface near the surface.

Example 106: The method of Example 52, wherein the surface of the substrate is discharged prior to disposing the patternable layer by providing a transparent metal or other conductive coating.

Example 107: The method of Example 57, wherein the first etch process does not etch the substrate.

Example 108: The method of Example 57, wherein the first etch process etches the substrate at a lower etch rate than the second etch process.

Example 109: The method of any of Examples 1-41 and 47-108, further including an optical component over said diffractive optical element.

Example 110: The method of Example 109, wherein said optical component is in contact with said diffractive features.

Example 111: The method of Example 109, further including a planarization layer between said optical component and said diffractive features.

Example 112: The method of Example 109, further including a structural stability providing layer between said optical component and said substrate.

Example 113: The method of Example 109, further including a planarization layer between said optical component and said substrate.

Example 114: The method of any of Example 109 to 113, wherein said optical component is at least 1 centimeter (cm) in spatial extent.

Example 115: The method of any of Example 109 to 113, wherein said optical component is at least a plurality of centimeters in spatial extent.

Example 116: The method of any of Example 109 to 115, wherein said optical component comprises a refractive optical component.

Example 117: The method of any of Example 109 to 115, wherein said optical component comprises a diffractive optical component.

Example 118: The method of any of Example 109 to 117, wherein said optical component comprises a lens.

Example 119: The method of Example 118, wherein said lens is at least 1 centimeter (cm) in spatial extent.

Example 120: The method of Example 118, wherein said lens is at least a plurality of centimeters in spatial extent.

Example 121: The method of any of Example 118 to 120, wherein said lens comprises a convex lens.

Example 122: The method of any of Example 118 to 120, wherein said lens comprises a concave lens.

Example 123: The method of any of Example 118 to 122, wherein said lens comprises a Fresnel lens.

Example 124: The method of any of Examples 1-41 and 47-108, further including disposing a first layer over the surface of the substrate prior to disposing the patternable layer, the first layer comprising a material different from the material of the substrate.

Example 125: The method of any of Example 124, wherein said first layer comprises a dielectric layer.

Example 126: The method of any of Examples 124 or 125, wherein said first layer comprises a high refractive index material having a refractive index greater than 1.79.

Example 127: The method of any of Examples 124 to 126, wherein the first layer comprises at least one of titanium dioxide, zirconium dioxide, silicon nitride or silicon carbide.

Example 128: The method of any of Examples 124 to 126, wherein the first layer comprises a layer of titanium dioxide.

Example 129: The method of any of Examples 124 to 128, further including an adhesion promotor layer between said first layer and said patternable layer.

Example 130: The method of any of Examples 124 to 129, wherein said first layer reduces reflection from the substrate.

Example 131: The method of any of Examples 124 to 130, further including a second layer between the first layer and the patternable material.

Example 132: The method of Example 131, wherein said second layer comprises dielectric material.

Example 133: The method of Examples 131 or 132, wherein the first layer has an index of refraction between that of the substrate and the said second layer.

Example 134: The method of any of Examples 131 to 133, further including a third layer between the second layer and the patternable material.

Example 135: The method of Example 134, wherein said third layer between the second layer and the patternable material comprises dielectric material.

Example 136: The method of Examples 134 or 135, wherein the second layer has an index of refraction between that of the first layer and the third layer.

Example 137: The method of any of Examples 131 to 136, wherein the first layer comprises titanium dioxide.

Example 138: The method of any of Examples 131 to 137, wherein the second layer comprises silicon nitride.

Example 139: The method of any of Examples 134 to 138, wherein the third layer comprises silicon dioxide.

Example 140: The method of any of Examples 131 to 139, wherein the first layer and the second layer reduce reflection from the substrate.

Example 141: The method of any of Examples 133 to 139, wherein the first layer, the second layer and the second layer reduce reflection from the substrate.

Example 142: The method of any of Examples 124 to 141, further comprising removing said patternable material and retaining said the first layer as a least part of diffractive features.

Example 143: The method of any of Examples 131 to 141, further comprising removing said patternable material and retaining said the first layer and said second layer as a least part of diffractive features.

Example 144: The method of any of Examples 134 to 141, further comprising removing said patternable material and retaining said the first layer, said second layer, and said third layer as a least part of diffractive features.

Example 145: The method of any of Examples 124 to 141, further comprising removing said patternable material and retaining said the first layer as diffractive features on said substrate, said substrate not including corresponding diffractive features etched therein.

Example 146: The method of any of Examples 131 to 141, further comprising removing said patternable material and retaining said the first layer and the second layer as diffractive features on said substrate, said substrate not including corresponding diffractive features etched therein.

Example 147: The method of any of Examples 134 to 141, further comprising removing said patternable material and retaining said the first layer, said second layer, and said third layer as diffractive features on said substrate, said substrate not including corresponding diffractive features etched therein.

Example 148: The method of any of the Examples above, wherein said diffractive features have the same height with respect to the substrate.

Example 149: The method of any of the Examples above, wherein said different of said diffractive features have the different heights with respect to the substrate.

Example 150: The method of Example 149, wherein said different of said diffractive features have different height with respect to the substrate such that the height increases progressively with lateral position along said substrate.

Example 151: The method of any of Examples 1-41 and 47-108, further including a plurality of layers over the surface of the substrate prior to disposing the patternable layer, the plurality of layers comprising a material different from the material of the substrate.

Example 152: The method of Example 151, wherein said plurality of layers comprise dielectric material.

Example 152: The method of Example 151, wherein said plurality of layers comprise at least one layer of titanium dioxide.

Example 153: The method of any of Examples 151 to 152, wherein said plurality of layers comprise at least one layer of silicon dioxide.

Example 154: The method of any of Examples 151 to 153, wherein said plurality of layers comprise at least one layer of magnesium fluoride.

Example 155: The method of any of Examples 151 to 154, wherein said plurality of layers comprise a plurality of layers of titanium dioxide.

Example 156: The method of any of Examples 151 to 155, wherein said plurality of layers comprise a plurality of layers of silicon dioxide.

Example 157: The method of any of Examples 151 to 156, wherein said plurality of layers comprise a plurality of layers of magnesium fluoride.

Example 158: The method of any of Examples 151 to 157, wherein said plurality of layers comprise alternating layers of material.

Example 159: The method of any of Examples 151 to 158, wherein said plurality of layers comprise repeating layers of material.

Example 160: The method of any of Examples 151 to 159, wherein said plurality of layers reduce reflection from said substrate.

Example 161: The method of any of Examples 151 to 160, further comprising removing said patternable material and retaining said plurality of layers as a least part of diffractive features.

Example 162: The method of any of Examples 150 to 159, further comprising removing said patternable material and retaining said plurality of layers as diffractive features on said substrate, said substrate not including corresponding diffractive features etched therein.

Example 163: The method of Example 161 or 162, wherein said diffractive features have the same height with respect to the substrate.

Example 164: The method of Example 161 or 162, wherein said different of said diffractive features have the different heights with respect to the substrate.

Example 165: The method of Example 164, wherein said different of said diffractive features have different heights with respect to the substrate such that the height increases progressively with lateral position along said substrate.

Example 166: The method of any of Examples 1-41 and 47-108, further including a first layer comprising material having a refractive index less than 1.8 over the substrate.

Example 167: The method of Example 166, wherein said first layer comprises resist.

Example 168: The method of Example 166 or 167, further including a second layer comprising material having a refractive index at least 1.8 over the first layer.

Example 169: The method of Example 168, wherein said second layer comprises $TiO_2$.

Example 170: The method of Example 168, wherein said second layer comprises $ZrO_2$.

Example 171: The method of Example 168, wherein said second layer comprises $Si_3N_4$.

Example 172: The method of Example 168, wherein said second layer comprises SiC.

Example 173: The method of any of Example 168 to 172, wherein said second layer is deposited using glancing angle deposition.

Example 174: The method of any of Example 168 to 173, wherein said second layer is primarily over surfaces parallel to said substrate.

Example 175: The method of any of Example 168 to 173, wherein the material of said second layer on sidewalls of said first layer is negligible.

Example 176: The method of any of Example 168 to 172, wherein said material of said second layer is on both horizontal and vertical surfaces.

Example 175: The method of any of Example 168 to 173, wherein the material of said second layer is more on a first side of features of the first layer than on a second side of features of the first layer.

Example 176: The method of any of Examples 1-41 and 47-108, further including one or more reflection mitigating layers over the diffractive optical element.

Example 177: The method of Example 176, wherein the one or more reflection mitigating layers comprises material having a refractive index less than the refractive index of the material of the waveguide.

Example 178: The method of Example 176, wherein the one or more reflection mitigating layers comprises material having a refractive index between 1.2 and 1.7.

Example 179: The method of Example 176, wherein the one or more reflection mitigating layers comprises magnesium fluoride.

Example 180: The method of Example 176 or 179, wherein the one or more reflection mitigating layers comprises silicon dioxide.

Example 181: The method of any of Example 176, 179, or 180, wherein the one or more reflection mitigating layers comprises resist.

Example 182: The method of any of Examples 176 to 181, wherein a plurality of reflection mitigating layers are disposed over the diffractive optical element.

Example 183: The method of Example 182, wherein one of the reflection mitigating layers farther away from the substrate has lower refractive index than one of the reflection mitigation layers closer to the substrate.

Example 184: The method of Example 182, wherein a reflection mitigating layer farthest from the substrate has a lower index of refraction than a reflection mitigating layer closest to the waveguide and one or more reflection mitigating layers between the reflection mitigating layer farthest from the substrate and the reflection mitigating layer closest to the substrate has an index of refraction between that of the reflection mitigating layer farthest from the substrate and the reflection mitigating layer closest to the substrate.

Example 185: The method of any of Examples 176 to 184, wherein the one or more reflection mitigating layers is deposited using glazing angle deposition.

Example 186: The method of any of Examples 176 to 185, wherein sidewalls and trenches of the diffractive optical element comprise negligible amounts of material of the one or more reflection mitigating layer.

Example 187: The method of any of Examples 176 to 184, wherein material of the reflection mitigating layer is deposited on top surfaces of the plurality of diffractive features of the diffractive optical element that are parallel to the surface of the substrate and the surfaces of trenches of the diffractive optical element, and wherein sidewalls of the diffractive optical element comprise negligible amounts of material of the reflection mitigating layers.

Example 188: The method of any of Examples 176 to 184, wherein material of the reflection mitigating layer is deposited both on horizontal and vertical exposed surfaces of the plurality of features of the optical element.

Example 189: The method of any of Examples 176 to 188, wherein the reflection mitigating layer on the diffractive optical element is planarized.

Example 190: The method of any of Examples 176 to 189, further including a structural stability providing layer disposed over the one or more reflection mitigating layer to increase structural stability.

Example 191: The method of Example 190, wherein the structural stability providing layer comprises glass.

Example 192: The method of Example 190, wherein the structural stability providing layer comprises glass having an anti-reflective coating thereon.

Example 193: The method of Example 192, wherein the anti-reflective coating on the glass comprises alternating layers.

Example 194: The method of Example 193, wherein anti-reflective coating on the glass comprises alternating layers of $TiO_2$ and $SiO_2$.

Example 195: The method of any of Examples 176 to 194, further including an additional layer between the reflection mitigating layer and the diffractive features of the diffractive optical element.

Example 196: The method of any of Examples 1-41 and 47-108, further including an anti-reflective structure disposed over the diffractive optical element, the anti-reflective structure comprising nano-structure configured to reduce reflection.

Example 197: The method of Example 196, wherein the nano-structure is directly on the diffractive optical element.

Example 198: The method of Example 196, wherein the nano-structure is formed in a coating disposed over the diffractive optical element.

Example 199: The method of Examples 198, wherein the coating has a refractive index lower than that of the substrate.

Example 200: The method of Example 198 or 199, wherein the coating comprises photoresist.

Example 201: The method of any of Examples 1-41 and 47-108, further including reflective gratings disposed at an edge of the substrate to receive light propagating to the edge of the substrate by total internal reflection within the substrate.

Example 202: The method of Example 201, wherein the reflective gratings are configured to redirect light back away from the edge.

Example 203: The method of Example 201 or 202, wherein the reflective gratings are configured to direct light back toward an exit pupil expander configured to couple light out of the substrate to a user.

Example 204: The method of Example 203, wherein the exit pupil expander comprises a diffractive optical element having a pitch and the reflective gratings have a pitch that is about half the pitch of the exit pupil expander.

Example 205: The method of any of Examples 201-204, wherein the reflective gratings are metalized.

Example 206: The method of any of Examples 1-41 and 47-108, further including light extracting features disposed at an edge of the substrate to receive light propagating to the edge of the substrate by total internal reflection within the substrate.

Example 207: The method of Example 206, wherein the light extracting features are configured to extract light out from the edge.

Example 208: The method of Example 206 or 207, wherein the light extracting features comprise diffractive features.

Example 209: The method of any of Examples 206 to 208, further including an absorbing element disposed about said edge to receive light extracted by said light extracting features.

Example 210: The method of Example 209, wherein said absorbing element comprises a cuff, collar, cup, or sleeve.

Example 211: The method of Example 209 or 210, wherein said absorbing element comprises carbon black.

Example 212: The method of any of Example 206 to 208, further comprising comprise an absorbing coating on said light extracting features.

Example 213: The method of any of Examples 1-41 and 47-108, further including at least one structural support layer with said substrate to provide increased structural strength.

Example 214: The method of Examples 213, wherein said at least one structural support layer comprises material having a refractive index of less than or equal to 1.7.

Example 215: The method of Examples 213 or 214, wherein at least one said structural support layer comprises glass.

Example 216: The method of Examples 215, wherein at least one said structural support layer comprises glass having an anti-reflective coating thereon.

Example 217: The method of any of Examples 213 to 216, wherein the at least said structural support layer is directly adjacent the substrate.

Example 218: The method of any of Examples 213 to 217, wherein the at least one said structural support layer fills in spaces between the plurality of diffractive features of the diffractive optical element.

Example 219: The method of any of Examples 213 to 216, further including air between said at least one structural support layer and said substrate.

Example 220: The method of any of Examples 213 to 216 and 219, further including air between said at least one structural support layer and said plurality of diffractive features.

Example 221: The method any of Examples 213 to 216 and 219 and 220, further including spacers between said at least one structural support layer and said substrate to provide air gaps between said at least one structural support layer and said substrate.

Example 222: The method of any of Examples 213 to 216 and 219 to 221, further including forming air gaps comprises evaporating a polymer layer.

Example 223: The method of any of Examples 213 to 222, wherein at least one said structural support layer provides anti-scratch functionality.

Example 224: The method of any of Examples 213 to 223, wherein at least one said structural support layer comprises a low index coating.

Example 225: The method of any of Examples 213 to 224, wherein at least one said structural support layer comprises an anti-reflective glass.

Example 226: The method of any of Examples 213 to 225, wherein at least one said structural support layer is disposed on one side of said substrate.

Example 227: The method of any of Examples 213 to 226, wherein said structural support layers comprises at least two structural support layers.

Example 228: The method of Examples 227, wherein said at least two structural support layers are disposed on opposite sides of said substrate.

Example 229: The method of any of Examples above, wherein said diffractive features are between 10 and 50 nm in height.

Example 230: The method of any of Examples above, wherein said diffractive features comprise material having an index of at least 1.8, said material being different from the material of said substrate.

Example 231: The method of any of Examples above, further including a planarization layer over said diffractive features.

Example 232: The method of Examples 231, wherein the planarization layer has an index of refraction less than 1.6.

Example 233: The method of any of Examples above, further including an anti-reflective coating on the opposite side of the substrate as the diffractive optical element.

Example 234: The method of any of Examples above, wherein said substrate is tinted.

Example 235: The method of any of Examples above, wherein first and second diffractive optical elements are disposed on first and second opposite faces of the waveguide.

Example 236: The method of Example 235, wherein the plurality of diffractive features of the first diffractive optical element are offset from the plurality of diffractive features of the second diffractive optical element.

Example 237: The method of any of Examples above, wherein said diffractive features have varying height.

Example 238: The method of any of Examples above, wherein said diffractive features have height that varies progressively with lateral position across said substrate.

Example 239: The method of any of Examples above, wherein said substrate comprises a waveguide.

Example 240: The method of Example 239, wherein said waveguide in included in an eyepiece for a head mounted display.

Example 241: The method of Example 239, wherein said waveguide in included in a stack of waveguides in an eyepiece for a head mounted display.

Example 242: The method of Example 240 or 241, wherein said eyepiece is transparent to provide the user a view of the environment in front of the user and the head mounted display.

Example 243: The method of Example 240, 241 or 242, wherein said eyepiece is configured to receive light from an image projector and to direct at least a portion of said light to an eye of the user to direct image content to said eye of the user.

Example 244: The method of Example 240,241,242 or 243, wherein said eyepiece is mounted on a frame configured to be worn on the head of a user.

Example 245: A device formed by any of the methods in any of Examples above.

Example 246: A device of Example 245, wherein the plurality of diffractive features or features form a diffraction grating and said diffracting grating is a blazed grating.

Example 247: The optical device of any of the Examples above, wherein the plurality of diffractive features or features are asymmetrical so as to provide for a blazed grating.

Example 248: The optical device of any of the Examples above, wherein the plurality of diffractive features or features have material asymmetrically deposited thereon so as to provide for a blazed grating.

Example 249: The optical device of any of the Examples above, wherein said substrate includes first and second sides and only said first side of said substrate includes a diffraction grating.

Example 250: The optical device of any of the Examples above, wherein the diffractive features or features are arranged in a 1D array.

Example 251: The optical device of any of the Examples above, wherein the diffractive features or features are arranged in a 2D array.

Example 252: The optical device of Example 251, wherein the 2D array comprises a square array.

Example 253: The optical device of any of the Examples above, wherein said at least part of an etching mask remains on said diffractive features.

Example 254: The optical device of any of the Examples above, wherein said polymer remains on said diffractive features thereby increasing the height of said diffractive features.

Example 255: The optical device of any of the Examples above, wherein resist remains on said diffractive features.

Example 256: The method of any of the Examples above, further comprising leaving at least a portion of the patternable material on said diffractive features.

Example 257: The method of any of the Examples above, further comprising leaving at least part of an etching mask on said diffractive features.

Example 258: The method of any of the Examples above, further comprising leaving polymer on said diffractive features thereby increasing the height of the diffractive features.

Example 259: The method of any of the Examples above, further comprising leaving resist on said diffractive features thereby increasing the height of the diffractive features.

Example 260: The method of any of the Examples above, wherein the diffractive features are formed in a 1D array.

Example 261: The method of any of the Examples above, wherein the diffractive features are formed in a 2D array.

Example 262: The optical device of Example 261, wherein the 2D array comprises a square array.

Example 263: The method of any of the Examples above, wherein the diffractive features form a 1D diffraction grating.

Example 264: The method of any of the Examples above, wherein the diffractive features are formed in a 2D diffraction grating.

Example 265: The method of any of the Examples above, wherein the diffractive features are blazed.

Example 266: The method of any of the Examples above, wherein the diffractive features are asymmetrical so as to provide for a blazed grating.

Example 267: The method of any of the Examples above, wherein the plurality of diffractive features have material asymmetrically deposited thereon so as to provide for a blazed grating.

Example 268: The optical device of any of the Examples above, wherein said substrate includes first and second sides and only said first side of said substrate includes a diffraction grating.

Example 269: The optical device of any of the Examples above, wherein said plurality of diffractive features are included in an in-coupling optical element disposed so as to receive light from an image source and couple said light into said substrate to be guided therein.

Example 270: The optical device of any of the Examples above, wherein said plurality of diffractive features are included in a light distributing optical element disposed so as to receive light from an image source that is guided in said substrate and direct said light to an out-coupling optical elements to be coupled out of said substrate.

Example 271: The optical device of any of the Examples above, wherein said plurality of diffractive features are included in a light distributing optical element disposed so as to receive light from an image source that is guided in said substrate and spread said light within said waveguide out to increase beam size or eye box size.

Example 272: The optical device of any of the Examples above, wherein said plurality of diffractive features are included in an out-coupling optical element disposed so as to receive light from an image source that is guided in said substrate and couple said light out of said substrate.

Example 273: The optical device of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 274: The optical device of any of the Examples above, wherein said plurality of diffractive features are included in a combined pupil expander-extractor disposed so as to receive light from an image source that is guided in said substrate, spread said light out and couple said light out of said substrate.

Example 275: The optical device of any of the Examples above, wherein said plurality of diffractive features comprise a blazed diffraction grating configured to direct light preferentially in at least two directions.

Example 276: The optical device of any of the Examples above, wherein said plurality of diffractive features comprise a blazed diffraction grating blazed in two directions.

Example 277: The method of any of the Examples above, wherein said plurality of diffractive features are included in an in-coupling optical element disposed so as to receive light from an image source and couple said light into said substrate to be guided therein.

Example 278: The method of any of the Examples above, wherein said plurality of diffractive features are included in a light distributing optical element disposed so as to receive light from an image source that is guided in said substrate and direct said light to an out-coupling optical elements to be coupled out of said substrate.

Example 279: The method of any of the Examples above, wherein said plurality of diffractive features are included in a light distributing optical element disposed so as to receive light from an image source that is guided in said substrate and spread said light within said waveguide out to increase beam size or eye box size.

Example 280: The method of any of the Examples above, wherein said plurality of diffractive features are included in an out-coupling optical element disposed so as to receive light from an image source that is guided in said substrate and couple said light out of said substrate.

Example 281: The method of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 282: The method of any of the Examples above, wherein said plurality of diffractive features are included in a combined pupil expander-extractor disposed so as to receive light from an image source that is guided in said substrate, spread said light out and couple said light out of said substrate.

Example 283: The method of any of the Examples above, wherein said plurality of diffractive features comprise a blazed diffraction grating configured to direct light preferentially in at least two directions.

Example 284: The method of any of the Examples above, wherein said plurality of diffractive features comprise a blazed diffraction grating blazed in two directions.

Part II

Example 1: An optical device comprising: a substrate comprising a material having a refractive index greater than 2.0 that is a transparent to visible light, said substrate comprising a waveguide; a plurality of diffractive features formed in said substrate; and a layer of material disposed over said diffractive features.

Example 2: The optical device of Example 1, wherein said substrate material comprises lithium niobate or silicon carbide.

Example 3: The optical device of any of the Examples above, wherein said substrate material has an index of refraction that is at least 2.1.

Example 4: The optical device of any of the Examples above, wherein said substrate material has an index of refraction that is at least 2.2.

Example 5: The optical device of any of the Examples above, wherein said substrate material has an index of refraction that is at least 2.3.

Example 6: The optical device of any of the Examples above, wherein said layer of material has an index of refraction that is less than 1.8.

Example 7: The optical device of any of the Examples above, wherein said layer of material comprises photoresist.

Example 8: The optical device of any of the Examples above, wherein said diffractive features are separated by spaces and said spaces comprise exposed regions of said substrate material.

Example 9: The optical device of any of the Examples above, wherein said diffractive features are separated by spaces and said spaces between said diffractive features not covered by said layer of material.

Example 10: The optical device of any of the Examples above, wherein said diffractive features are separated by spaces and said spaces between said diffractive features comprise exposed regions of said substrate material.

Example 11: The optical device of any of the Examples above, wherein said plurality of diffractive features comprise first, second, and third diffractive features laterally displaced with respect to each other, said second diffractive feature disposed between the first and the third diffractive features.

Example 12: The optical device of Example 11, wherein said layer of material has a different thickness over each of said first, second, and third diffractive features.

Example 13: The optical device of Example 11 or 12, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 14: The optical device of Example 11, wherein said layer of material has the same thickness over said first, second, and third diffractive features.

Example 15: The optical device of any of the Examples 11-14, wherein the height of the of said third diffractive feature is higher than the height of said second diffractive feature, and the height of said second diffractive feature is higher than the height of said first diffractive feature.

Example 16: The optical device of any of the Examples above, wherein the height of the diffractive features progressively increases with lateral position.

Example 17: The optical device of any of the Examples above, wherein said layer of material has a thickness that progressively increases with lateral position.

Example 18: The optical device of any of the Examples above, wherein the thickness of said substrate is graded.

Example 19: The optical device of any of the Examples above, wherein the thickness of said layer of material is graded.

Example 20: The optical device of any of the Examples above, wherein the thickness of said substrate progressively increases with lateral position.

Example 21: The optical device of any of the Examples above, wherein the height of the diffractive features is substantially constant with lateral position.

Example 22: The optical device of any of the Examples above, wherein the height of said first, second, and third diffractive feature are the same.

Example 23: The optical device of any of the Examples above, wherein said layer of material has a thickness that is substantially constant with lateral position.

Example 24: The optical device of any of the Examples above, wherein said layer of material has the same thickness over said first, second, and third diffractive features.

Example 25: The optical device of any of the Examples above, wherein at least some of the diffractive features have sloping sidewalls.

Example 26: The optical device of any of the Examples above, wherein at least some of the diffractive features have a trapezoidal cross-section.

Example 27: The optical device of any of the Examples above, wherein said waveguide in included in an eyepiece for a head mounted display.

Example 28: The optical device of any of the Examples above, wherein said waveguide in included in a stack of waveguides in an eyepiece for a head mounted display.

Example 29: The optical device of Example 27 or 28, wherein said eyepiece is transparent to provide the user a view of the environment in front of the user and the head mounted display.

Example 30: The optical device of any of Examples 27-29, wherein said eyepiece is configured to receive light from an image projector and to direct at least a portion of said light to an eye of the user to direct image content to said eye of the user.

Example 31: The optical device of any of Examples 27-30, wherein said eyepiece is mounted on a frame configured to be worn on the head of a user.

Example 32: The optical device of any of the Examples above, wherein said plurality of diffractive features are included in an in-coupling optical element disposed so as to receive light from an image source and couple said light into said substrate to be guided therein.

Example 33: The optical device of any of the Examples above, wherein said plurality of diffractive features are included in an out-coupling optical element disposed so as to receive light from an image source that is guided in said substrate and couple said light out of said substrate to an eye of a user wearing said head mounted display.

Example 34: The optical device of any of Examples 27-33, wherein said plurality of diffractive features comprise first, second, and third diffractive features, said second diffractive feature disposed between the first and the third diffractive features.

Example 35: The optical device of Example 35, wherein the height of the of said third diffractive feature is higher than the height of said second diffractive feature, and the height of said second diffractive feature is higher than the height of said first diffractive feature.

Example 36: The optical device of Examples 34 or 35, further comprising a projector disposed with respect to the substrate to direct light into the substrate, said projector positioned closer to said first diffractive features than said second diffractive features.

Example 37: The optical device of any of the Examples above, wherein the height of the diffractive features progressively increases with lateral position.

Example 38: The optical device of Example 37, further comprising a projector disposed with respect to the substrate to direct light into the substrate, said projector positioned closer to said diffractive features with lower heights that to said diffractive features with higher heights.

Example 39: The optical device of any of Examples 34-38, wherein the thickness of said layer of material on said third diffractive feature is higher than the thickness of said layer of material on said second diffractive feature, and the thickness of said layer of material on said second diffractive feature is higher than the thickness of said layer of material on said first diffractive feature.

Example 40: The optical device of Example 39, further comprising a projector disposed with respect to the substrate to direct light into the substrate, said projector positioned closer to said first diffractive features than said second diffractive features.

Example 41: The optical device of any of the Examples above, wherein said layer of material has a thickness that progressively increases with lateral position.

Example 42: The optical device of any of the Examples above, further comprising a projector disposed with respect to the substrate to direct light into the substrate, said projector positioned closer to said diffractive features wherein said layer of material is thinner than to said diffractive features wherein said layer of material is thicker.

Example 43: The optical device of any of the Examples above, wherein said substrate comprises opposite first and second sides.

Example 44: The optical device of Example 43, wherein said optical device is integrated in a head mounted display, and said second side is disposed closer to a wearer's eye when said head mounted display is worn than said first side.

Example 45: The optical device of Example 43 or 44, wherein said plurality of diffractive feature are disposed on said first side of said substrate.

Example 46: The optical device of any of Examples 43-45, further comprising an additional plurality of diffractive features formed in said substrate on the second opposite side of said substrate.

Example 47: The optical device of Example 46, wherein said additional plurality of diffractive features are separated by spaces, said optical device further comprising an additional layer of material disposed over said plurality of additional diffractive features.

Example 48: An optical device comprising: a substrate comprising a material having a refractive index greater than 2.0 that is transparent to visible light, said substrate comprising a waveguide; a plurality of diffractive features formed on said substrate, said diffractive features formed of a different material having an index of refraction less than the material of said substrate; and higher index material disposed over said diffractive features, said higher index material having a higher index than said material forming said diffractive features.

Example 49: The optical device of Example 48, wherein said substrate material comprises lithium niobate or silicon carbide.

Example 50: The optical device of Example 48 or 49, wherein said material comprising said substrate has an index of refraction of at least 2.1.

Example 51: The optical device of any of the Examples 48-50, wherein said material comprising said substrate has an index of refraction of at least 2.2.

Example 52: The optical device of any of the Examples 48-50, wherein said material comprising said substrate has an index of refraction of at least 2.3.

Example 53: The optical device of any of the Examples 48-52, wherein said plurality of diffractive features comprises photoresist.

Example 54: The optical device of any of the Examples 48-53, wherein said plurality of diffractive features have an index of refraction that is less than 1.8.

Example 55: The optical device of any of the Examples 48-54, wherein said plurality of diffractive features have an index of refraction of about 1.5.

Example 56: The optical device of any of the Examples 48-55, wherein said plurality of diffractive features have an index of refraction of between 1.7 and 1.8.

Example 57: The optical device of any of the Examples 48-56, wherein said higher index material disposed over said diffractive features has an index of refraction of at least 2.1.

Example 58: The optical device of any of the Examples 48-57, wherein said higher index material disposed over said diffractive features has an index of refraction of at least 2.2.

Example 59: The optical device of any of the Examples 48-58, wherein said higher index material disposed over said diffractive features has an index of refraction of at least 2.3.

Example 60: The optical device of any of the Examples 48-59, wherein said higher index material disposed over said diffractive features comprises lithium niobate.

Example 61: The optical device of any of the Examples 48-59, wherein said higher index material disposed over said diffractive features comprises silicon carbide.

Example 62: The optical device of any of the Examples 48-61, wherein said plurality of diffractive features comprises a blazed diffractive grating.

Example 63: The optical device of any of the Examples 48-62, wherein said plurality of diffractive features are asymmetrically shaped.

Example 64: The optical device of any of the Examples 48-63, wherein more of said high index material is on a first sidewall of diffractive features than on a second sidewall of the diffractive features.

Example 65: The optical device of any of the Examples 48-64, wherein more of said high index material is on a first side of diffractive features than on a second side of the diffractive features.

Example 66: The optical device of any of the Examples 48-64, wherein at least one of said diffractive features has said high index material on a first side of diffractive features while said second side of the diffractive features are exposed.

Example 67: The optical device of any of the Examples above, wherein the diffractive features are arranged in a 1D array.

Example 68: The optical device of any of the Examples above, wherein the diffractive features are arranged in a 2D array.

Example 69: The optical device any of Examples 1-47, wherein the diffractive features have a top surface and sidewalls disposed about said top surface, and wherein the layer of material is on said top surface of said diffractive features.

Example 70: The optical device of Example 47, wherein said additional plurality of diffractive features have a top surface and sidewalls disposed about said top surface, and wherein said additional layer of material is on said top surface of said plurality of additional diffractive features.

Example 71: The optical device of any of Examples 48-68, wherein said diffractive features have a top surface and sidewalls disposed about said top surface, and wherein said higher index material is on said top surface of said diffractive features.

Example 72: The optical device of any of Examples 48-68, wherein said waveguide is included in an eyepiece for a head mounted display.

Example 73: The optical device of any of Examples 48-68, wherein said waveguide in included in a stack of waveguides in an eyepiece for a head mounted display.

Example 74: The optical device of Example 72 or 73, wherein said eyepiece is transparent to provide the user a view of the environment in front of the user and the head mounted display.

Example 75: The optical device of any of Examples 72-74, wherein said eyepiece is configured to receive light from an image projector and to direct at least a portion of said light to an eye of the user to direct image content to said eye of the user.

Example 76: The optical device of any of Examples 72-75, wherein said eyepiece is mounted on a frame configured to be worn on the head of a user.

Example 77: The optical device of any of the Examples above, wherein said plurality of diffractive features are included in an in-coupling optical element disposed so as to receive light from an image source and couple said light into said substrate to be guided therein.

Example 78: The optical device of any of the Examples above, wherein said plurality of diffractive features are included in an out-coupling optical element disposed so as to receive light from an image source that is guided in said substrate out of said substrate to an eye of a user wearing said head mounted display.

Example 79: The optical device of any of the Examples 1-47, wherein said layer of material comprises polymer.

Example 80: The optical device of any of the Examples 1-47, wherein said layer of material comprises resist.

Example 81: The optical device of any of the Examples 1-47, wherein said layer of material comprises at least part of an etching mask.

Example 82: The optical device of any of the Examples 1-47, wherein said layer of material reduces reflection.

Example 83: The optical device of any of the Examples 1-82, wherein the plurality of diffractive features form a diffraction grating and said diffracting grating is a blazed grating.

Example 84: The optical device of any of the Examples above, wherein the plurality of diffractive features are asymmetrical so as to provide for a blazed grating.

Example 85: The optical device of any of the Examples above, wherein the plurality of diffractive features have material asymmetrically deposited thereon so as to provide for a blazed grating.

Example 86: The optical device of any of the Examples above, wherein said substrate includes first and second sides and only said first side of said substrate includes a diffraction grating.

Example 87: The optical device of any of the Examples 1-86, wherein the diffractive features are arranged in a 1D array.

Example 88: The optical device of any of the Examples 1-86, wherein the diffractive features are arranged in a 2D array.

Example 89: The optical device of Example 88, wherein the 2D array comprises a square array.

Example 90: The optical device of any of the Examples above, wherein said plurality of diffractive features are included in an in-coupling optical element disposed so as to receive light from an image source and couple said light into said substrate to be guided therein.

Example 91: The optical device of any of the Examples above, wherein said plurality of diffractive features are included in a light distributing optical element disposed so as to receive light from an image source that is guided in said substrate and direct said light to an out-coupling optical elements to be coupled out of said substrate.

Example 92: The optical device of any of the Examples above, wherein said plurality of diffractive features are included in a light distributing optical element disposed so as to receive light from an image source that is guided in said substrate and spread said light within said waveguide out to increase beam size or eye box size.

Example 93: The optical device of any of the Examples above, wherein said plurality of diffractive features are included in an out-coupling optical element disposed so as to receive light from an image source that is guided in said substrate and couple said light out of said substrate.

Example 94: The optical device of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 95: The optical device of any of the Examples above, wherein said plurality of diffractive features are included in a combined pupil expander-extractor disposed so as to receive light from an image source that is guided in said substrate, spread said light out and couple said light out of said substrate to an eye of a user wearing said head mounted display.

Example 96: The optical device of any of the Examples above, wherein said plurality of diffractive features comprise a blazed diffraction grating configured to direct light preferentially in at least two directions.

Example 97: The method of any of the Examples above, wherein said plurality of diffractive features comprise a blazed diffraction grating blazed in two directions.

Part III

Example 1: An optical device comprising: a substrate comprising a material having a refractive index greater than 2.0 that is transparent to visible light, said substrate comprising a waveguide; a plurality of diffractive features formed in or on said substrate, wherein said diffraction features are arranged in a 2-dimensional (2D) array to form a 2D diffraction grating.

Example 2: The optical device of Example 1, wherein said substrate material comprises lithium niobate or silicon carbide.

Example 3: The optical device of any of the Examples above, wherein said substrate material has an index of refraction that is at least 2.1.

Example 4: The optical device of any of the Examples above, wherein said substrate material has an index of refraction that is at least 2.2.

Example 5: The optical device of any of the Examples above, wherein said substrate material has an index of refraction that is at least 2.3.

Example 6: The optical device of any of the Examples above, wherein said layer of material has an index of refraction that is less than 1.8.

Example 7: The optical device of any of the Examples above, wherein said diffractive features comprise material different from said substrate.

Example 8: The optical device of any of the Examples above, wherein said diffractive features are separated by spaces and said spaces comprise exposed regions of said substrate material.

Example 9: The optical device of any of the Examples above, wherein said diffractive features are separated by spaces and said spaces between said diffractive features not covered by said layer of material.

Example 10: The optical device of any of the Examples above, wherein said diffractive features are separated by spaces and said spaces between said diffractive features comprise exposed regions of said substrate material.

Example 11: The optical device of any of the Examples above, wherein said plurality of diffractive features comprise first, second, and third diffractive features laterally displaced with respect to each other, said second diffractive feature disposed between the first and the third diffractive features.

Example 12: The optical device of Example 11, wherein said layer of material has a different thickness over each of said first, second, and third diffractive features.

Example 13: The optical device of Example 11 or 12, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 14: The optical device of Example 11, wherein said layer of material has the same thickness over said first, second, and third diffractive features.

Example 15: The optical device of any of the Examples 11-14, wherein the height of the of said third diffractive feature is higher than the height of said second diffractive feature, and the height of said second diffractive feature is higher than the height of said first diffractive feature.

Example 16: The optical device of any of the Examples above, wherein the height of the diffractive features progressively increases with lateral position.

Example 17: The optical device of any of the Examples above, wherein said layer of material has a thickness that progressively increases with lateral position.

Example 18: The optical device of any of the Examples above, wherein the thickness of said substrate is graded.

Example 19: The optical device of any of the Examples above, wherein the thickness of said layer of material is graded.

Example 20: The optical device of any of the Examples above, wherein the thickness of said substrate progressively increases with lateral position.

Example 21: The optical device of any of the Examples above, wherein the height of the diffractive features is substantially constant with lateral position.

Example 22: The optical device of any of the Examples above, wherein the height of said first, second, and third diffractive feature are the same.

Example 23: The optical device of any of the Examples above, wherein said layer of material has a thickness that is substantially constant with lateral position.

Example 24: The optical device of any of the Examples above, wherein said layer of material has the same thickness over said first, second, and third diffractive features.

Example 25: The optical device of any of the Examples above, wherein at least some of the diffractive features have sloping sidewalls.

Example 26: The optical device of any of the Examples above, wherein at least some of the diffractive features have a trapezoidal cross-section.

Example 27: The optical device of any of the Examples above, wherein said waveguide in included in an eyepiece for a head mounted display.

Example 28: The optical device of any of the Examples above, wherein said waveguide in included in a stack of waveguides in an eyepiece for a head mounted display.

Example 29: The optical device of Example 27 or 28, wherein said eyepiece is transparent to provide the user a view of the environment in front of the user and the head mounted display.

Example 30: The optical device of any of Examples 27-29, wherein said eyepiece is configured to receive light from an image projector and to direct at least a portion of said light to an eye of the user to direct image content to said eye of the user.

Example 31: The optical device of any of Examples 27-30, wherein said eyepiece is mounted on a frame configured to be worn on the head of a user.

Example 32: The optical device of any of the Examples above, wherein said plurality of diffractive features are included in an in-coupling optical element disposed so as to receive light from an image source and couple said light into said substrate to be guided therein.

Example 33: The optical device of any of the Examples above, wherein said plurality of diffractive features are included in an out-coupling optical element disposed so as to receive light from an image source that is guided in said substrate and couple said light out of said substrate to an eye of a user wearing said head mounted display.

Example 34: The optical device of any of Examples 27-33, wherein said plurality of diffractive features comprise first, second, and third diffractive features, said second diffractive feature disposed between the first and the third diffractive features.

Example 35: The optical device of Example 35, wherein the height of the of said third diffractive feature is higher than the height of said second diffractive feature, and the height of said second diffractive feature is higher than the height of said first diffractive feature.

Example 36: The optical device of Examples 34 or 35, further comprising a projector disposed with respect to the substrate to direct light into the substrate, said projector positioned closer to said first diffractive features than said second diffractive features.

Example 37: The optical device of any of the Examples above, wherein the height of the diffractive features progressively increases with lateral position.

Example 38: The optical device of Example 37, further comprising a projector disposed with respect to the substrate to direct light into the substrate, said projector positioned closer to said diffractive features with lower heights that to said diffractive features with higher heights.

Example 39: The optical device of any of Examples 34-38, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 40: The optical device of Example 39, further comprising a projector disposed with respect to the substrate to direct light into the substrate, said projector positioned closer to said first diffractive features than said second diffractive features.

Example 41: The optical device of any of the Examples above, wherein said layer of material has a thickness that progressively increases with lateral position.

Example 42: The optical device of any of the Examples above, further comprising a projector disposed with respect to the substrate to direct light into the substrate, said projector positioned closer to said diffractive features wherein said layer of material is thinner than to said diffractive features wherein said layer of material is thicker.

Example 43: The optical device of any of the Examples above, wherein said substrate comprises opposite first and second sides.

Example 44: The optical device of Example 43, wherein said optical device is integrated in a head mounted display, and said second side is disposed closer to a wearer's eye when said head mounted display is worn than said first side.

Example 45: The optical device of Example 43 or 44, wherein said plurality of diffractive feature are disposed on said first side of said substrate.

Example 46: The optical device of any of Examples 43-45, further comprising an additional plurality of diffractive features formed in or on said substrate on the second opposite side of said substrate.

Example 47: The optical device of Examples 46, wherein said additional plurality of diffractive features are separated by spaces, said optical device further comprising an additional layer of material over said plurality of additional diffractive features.

Example 48: The optical device of any of the Examples above, wherein said 2D diffracting grating comprise a blazed grating.

Example 49: The optical device of any of the Examples above, wherein the plurality of diffractive features are asymmetrical so as to provide for a blazed grating.

Example 50: The optical device of any of the Examples above, wherein the plurality of diffractive features have material asymmetrically deposited thereon so as to provide for a blazed grating.

Example 51: The optical device of any of the Examples above, wherein said substrate includes first and second sides and only said first side of said substrate includes a diffraction grating.

Example 52: The optical device of any of the Examples above, wherein the 2D array comprises a square array.

Example 53: The optical device of any of the Examples above, wherein the diffractive features are formed in said substrate.

Example 54: The optical device of any of the Examples above, wherein the diffractive features are formed on said substrate.

Example 55: The optical device of any of the Examples above, wherein said diffractive features comprise material different from said substrate.

Example 56: The optical device of any of the Examples above, wherein said diffractive features comprise resist.

Example 57: The optical device of any of the Examples above, wherein said diffractive features comprise photoresist.

Example 58: The optical device of any of the Examples above, wherein said diffractive features comprise material having an index of refraction less than that of said substrate.

Example 59: The optical device of any of the Examples above, wherein said at least part of an etching mask remains on the diffractive features.

Example 60: The optical device of any of the Examples above, wherein said plurality of diffractive features are included in an in-coupling optical element disposed so as to receive light from an image source and couple said light into said substrate to be guided therein.

Example 61: The optical device of any of the Examples above, wherein said plurality of diffractive features are included in a light distributing optical element disposed so as to receive light from an image source that is guided in said substrate and direct said light to an out-coupling optical elements to be coupled out of said substrate.

Example 62: The optical device of any of the Examples above, wherein said plurality of diffractive features are included in a light distributing optical element disposed so as to receive light from an image source that is guided in said substrate and spread said light within said waveguide out to increase beam size or eye box size.

Example 63: The optical device of any of the Examples above, wherein said plurality of diffractive features are included in an out-coupling optical element disposed so as to receive light from an image source that is guided in said substrate and couple said light out of said substrate.

Example 64: The optical device of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 65: The optical device of any of the Examples above, wherein said plurality of diffractive features are included in a combined pupil expander-extractor disposed so as to receive light from an image source that is guided in said substrate, spread said light out and couple said light out of said substrate.

Example 66: The method of any of the Examples above, wherein said 2D diffraction grating comprises a blazed diffraction grating configured to direct light preferentially in at least two directions.

Example 67: The method of any of the Examples above, wherein said 2D diffraction grating comprises a blazed diffraction grating blazed in two directions.

Part IV

Example 1: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein said diffraction features are arranged in a 2-dimensional (2D) array to form a 2D diffraction grating.

Example 2: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein said diffraction features are blazed.

Example 3: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein plurality of diffractive features are included in a combined light distributing/out-coupling optical element disposed so as to receive light from an image source that is guided in said substrate, spread said light out in at least two directions and couple said light out of said substrate.

Example 4: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein said plurality of diffractive features are included in a combined pupil expander-extractor disposed so as to receive light from an image source that is guided in said substrate, spread said light out and couple said light out of said substrate.

Example 5: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a plurality of diffractive features formed on said substrate, and a layer disposed between said diffractive features and said substrate.

Example 6: The head mounted display of Example 5, wherein the layer comprises a material different from the material of the substrate.

Example 7: The head mounted display of Example 5 or 6, wherein said layer comprises an adhesion promoter layer.

Example 8: The head mounted display of any of Examples 5-7, wherein said layer comprises a high refractive index material having refractive index greater than 1.79, said high refractive index material comprising a material different than the material of the substrate.

Example 9: The head mounted display of any of Examples 5-7, wherein said layer comprises a high refractive index material having refractive index greater than 2.0, said high refractive index material comprising a material different than the material of the substrate.

Example 10: The method of any of Examples 5-9, wherein said layer comprises a dielectric layer.

Example 11: The head mounted display of Example 5, wherein said layer comprises titanium dioxide, zirconium dioxide, silicon nitride or silicon carbide.

Example 12: The head mounted display of Example 5, wherein said layer comprises titanium dioxide.

Example 13: The head mounted display of Example 5, wherein said layer comprises zirconium dioxide.

Example 14: The head mounted display of Example 5, wherein said layer comprises silicon nitride.

Example 15: The head mounted display of Example 5, wherein said layer comprises silicon carbide.

Example 16: The head mounted display of any of Examples 5 to 15, wherein said layer reduces reflection from the substrate.

Example 17: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed on said substrate, wherein said diffractive features comprise a plurality of layers, a first layer and a second layer over said first layer.

Example 18: The head mounted display of Example 17, wherein said first layer comprises dielectric material.

Example 19: The head mounted display of Example 17 or 18, wherein said second layer comprises dielectric material.

Example 20: The head mounted display of any of Examples 17 to 19, wherein the first layer has an index of refraction between that of the substrate and the said second layer.

Example 21: The head mounted display of any of Examples 17 to 20, further including a third layer over the second layer.

Example 22: The head mounted display of Example 21, wherein said third layer comprises dielectric material.

Example 23: The head mounted display of any of Examples 21 to 22, wherein the second layer has an index of refraction between that of the first layer and the third layer.

Example 24: The head mounted display of any of Examples 17 to 23, wherein the first layer comprises titanium dioxide.

Example 25: The head mounted display of any of Examples 17 to 24, wherein the second layer comprises silicon nitride.

Example 26: The head mounted display of any of Examples 21 to 25, wherein the third layer comprises silicon dioxide.

Example 27: The head mounted display of any of Examples 17 to 26, wherein the first layer and the second layer reduce reflection from the substrate.

Example 28: The head mounted display of any of Examples 17 to 27, wherein the first layer, the second layer and the second layer reduce reflection from the substrate.

Example 29: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a plurality of diffractive features formed on or in said substrate; and at least one layer over said plurality of diffractive features.

Example 30: The head mounted display of Example 29, wherein said at least one layer comprises a material different from the material of the substrate.

Example 31: The head mounted display of Example 29 or 30, wherein said at least one layer comprises dielectric material.

Example 32: The head mounted display of any of Examples 29 to 31, wherein said at least one layer comprises at least one layer of titanium dioxide.

Example 33: The head mounted display of any of Examples 29 to 32, wherein said at least one layer comprises at least one layer of silicon dioxide.

Example 34: The head mounted display of any of Examples 29 to 33, wherein said at least one layer comprises at least one layer of magnesium fluoride.

Example 35: The head mounted display of any of Examples 29 to 34, wherein said at least one layer comprises a plurality of layers of titanium dioxide.

Example 36: The head mounted display of any of Examples 29 to 35, wherein said at least one layer comprises a plurality of layers of silicon dioxide.

Example 37: The head mounted display of any of Examples 29 to 36, wherein said at least one layer comprises a plurality of layers of magnesium fluoride.

Example 38: The head mounted display of any of Examples 29 to 37, wherein said at least one layer comprises alternating layers of material.

Example 39: The head mounted display of any of Examples 29 to 38, wherein said at least one layer comprises repeating layers of material.

Example 40: The head mounted display of any of Examples 29 to 39, wherein said at least one layer reduces reflection from said substrate.

Example 41: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed on or in said substrate; and one or more reflection mitigating layers over the diffractive optical element.

Example 42: The head mounted display of Example 41, wherein the one or more reflection mitigating layers comprises material having a refractive index less than the refractive index of the material of the waveguide.

Example 43: The head mounted display of Example 41, wherein the one or more reflection mitigating layers comprises material having a refractive index between 1.2 and 1.7.

Example 44: The head mounted display of Example 41, wherein the one or more reflection mitigating layers comprises magnesium fluoride.

Example 45: The head mounted display of Example 41 or 44, wherein the one or more reflection mitigating layers comprises silicon dioxide.

Example 46: The head mounted display of any of Example 41 to 43, wherein the one or more reflection mitigating layers comprises resist.

Example 47: The head mounted display of any of Examples 41 to 46, wherein a plurality of reflection mitigating layers are disposed over the diffractive optical element.

Example 48: The head mounted display of Example 47, wherein one of the reflection mitigating layers farther away from the substrate has lower refractive index than one of the reflection mitigation layers closer to the substrate.

Example 49: The head mounted display of Example 47, wherein a reflection mitigating layer farthest from the substrate has a lower index of refraction than a reflection mitigating layer closest to the waveguide and one or more reflection mitigating layers between the reflection mitigating layer farthest from the substrate and the reflection mitigating layer closest to the substrate has an index of refraction between that of the reflection mitigating layer farthest from the substrate and the reflection mitigating layer closest to the substrate.

Example 50: The head mounted display of any of Examples 41 to 49, wherein the one or more reflection mitigating layers are disposed more on one side of the diffraction grating than the other.

Example 51: The head mounted display of any of Examples 41 to 49, wherein sidewalls and trenches of the diffractive optical element comprise negligible amounts of material of the one or more reflection mitigating layer.

Example 52: The head mounted display of any of Examples 41 to 49, wherein material of the reflection mitigating layer is deposited on top surfaces of the plurality of diffractive features of the diffractive optical element that are parallel to the surface of the substrate and the surfaces of trenches of the diffractive optical element, and wherein sidewalls of the diffractive optical element comprise negligible amounts of material of the reflection mitigating layers.

Example 53: The head mounted display of any of Examples 41 to 49, wherein material of the reflection mitigating layer is deposited both on horizontal and vertical exposed surfaces of the plurality of features of the optical element.

Example 54: The head mounted display of any of Examples 41 to 53, wherein the reflection mitigating layer on the diffractive optical element is planarized.

Example 55: The head mounted display of any of Examples 41 to 54, further including a structural stability providing layer disposed over the one or more reflection mitigating layer to increase structural stability.

Example 56: The head mounted display of Example 55, wherein the structural stability providing layer comprises glass.

Example 57: The head mounted display of Example 55, wherein the structural stability providing layer comprises glass having an anti-reflective coating thereon.

Example 58: The head mounted display of Example 57, wherein the anti-reflective coating on the glass comprises alternating layers.

Example 59: The head mounted display of Example 58, wherein anti-reflective coating on the glass comprises alternating layers of $TiO_2$ and $SiO_2$.

Example 60: The head mounted display of any of Examples 41 to 59, further including an additional layer between the reflection mitigating layer and the diffractive features of the diffractive optical element.

Example 61: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed on or in said substrate; and an anti-reflective structure disposed over the diffractive optical element, the anti-reflective structure comprising nano-structure configured to reduce reflection.

Example 62: The head mounted display of Example 61, wherein the nano-structure is directly on the diffractive optical element.

Example 63: The head mounted display of Example 61, wherein the nano-structure is formed in a coating disposed over the diffractive optical element.

Example 64: The head mounted display of Example 63, wherein the coating has a refractive index lower than that of the substrate.

Example 65: The head mounted display of Example 63 or 64, wherein the coating comprises photoresist.

Example 66: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed on or in said substrate; and one or more reflective gratings disposed at an edge of the substrate to receive light propagating to the edge of the substrate by total internal reflection within the substrate.

Example 67: The head mounted display of Example 66, wherein the one or more reflective gratings are configured to redirect light back away from the edge.

Example 68: The head mounted display of Example 66 or 67, wherein the one or more reflective gratings are configured to direct light back toward an out-coupling optical element configured to couple light out of the substrate to a user.

Example 69: The head mounted display of Example 68, wherein the out-coupling optical element comprises a diffractive optical element having a pitch and the one or more reflective gratings have a pitch that is about half the pitch of the out-coupling optical element.

Example 70: The head mounted display of any of Examples 66-69, wherein the one or more reflective gratings are metalized.

Example 71: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed on or in said substrate; and light extracting features disposed at an edge of the substrate to receive light propagating to the edge of the substrate by total internal reflection within the substrate.

Example 72: The head mounted display of Example 71, wherein the light extracting features are configured to extract light out from the edge.

Example 73: The head mounted display of Example 71 or 72, wherein the light extracting features comprise diffractive features.

Example 74: The head mounted display of any of Examples 71 to 73, further including an absorbing element disposed about said edge to receive light extracted by said light extracting features.

Example 75: The head mounted display of Example 74, wherein said absorbing element comprises a cuff, collar, cup, or sleeve.

Example 76: The head mounted display of Example 74 or 75, wherein said absorbing element comprises carbon black.

Example 77: The head mounted display of any of Example 71 to 76, further comprising an absorbing coating on said light extracting features.

Example 78: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed on or in said substrate; and at least one structural support layer with said substrate to provide increased structural strength.

Example 79: The head mounted display of Example 78, wherein said at least one structural support layer comprises material having a refractive index of less than or equal to 1.7.

Example 80: The head mounted display of Example 78 or 79, wherein at least one said structural support layer comprises glass.

Example 81: The head mounted display of Example 80, wherein at least one said structural support layer comprises glass having an anti-reflective coating thereon.

Example 82: The head mounted display of any of Examples 78 to 81, wherein the at least said structural support layer is directly adjacent the substrate.

Example 83: The head mounted display of any of Examples 78 to 82, wherein the at least one said structural support layer fills in spaces between the plurality of diffractive features of the diffractive optical element.

Example 84: The head mounted display of any of Examples 78 to 82, further including air between said at least one structural support layer and said substrate.

Example 85: The head mounted display of any of Examples 78 to 82 and 84, further including air between said at least one structural support layer and said plurality of diffractive features.

Example 86: The head mounted display any of Examples 78 to 84 and 84 and 85, further including spacers between said at least one structural support layer and said substrate to provide air gaps between said at least one structural support layer and said substrate.

Example 87: The head mounted display of any of Examples 78 to 82 and 83 to 86, air gaps are provided by a polymer layer.

Example 88: The head mounted display of any of Examples 78 to 86, wherein at least one said structural support layer provides anti-scratch functionality.

Example 89: The head mounted display of any of Examples 78 to 88, wherein at least one said structural support layer comprises a low index coating.

Example 90: The head mounted display of any of Examples 78 to 89, wherein at least one said structural support layer comprises an anti-reflective glass.

Example 91: The head mounted display of any of Examples 78 to 90, wherein at least one said structural support layer is disposed on one side of said substrate.

Example 92: The head mounted display of any of Examples 78 to 91, wherein said structural support layers comprises at least two structural support layers.

Example 93: The head mounted display of Example 92, wherein said at least two structural support layers are disposed on opposite sides of said substrate.

Example 94: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed on or in said substrate; and an optical component over said diffractive optical element.

Example 95: The head mounted display of Example 94, wherein said optical component is in contact with said diffractive features.

Example 96: The head mounted display of Example 94, further including a planarization layer between said optical component and said diffractive features.

Example 97: The head mounted display of Example 94, further including a structural stability providing layer between said optical component and said substrate.

Example 98: The head mounted display of Example 94, further including a planarization layer between said optical component and said substrate.

Example 99: The head mounted display of any of Examples 94 to 98, wherein said optical component is at least 1 centimeter (cm) in spatial extent.

Example 100: The head mounted display of any of Examples 94 to 98, wherein said optical component is at least a plurality of centimeters in spatial extent.

Example 101: The head mounted display of any of Examples 94 to 100, wherein said optical component comprises a refractive optical component.

Example 102: The head mounted display of any of Examples 94 to 100, wherein said optical component comprises a diffractive optical component.

Example 103: The head mounted display of any of Examples 94 to 102, wherein said optical component comprises a lens.

Example 104: The head mounted display of Example 103, wherein said lens is at least 1 centimeter (cm) in spatial extent.

Example 105: The head mounted display of Example 103, wherein said lens is at least a plurality of centimeters in spatial extent.

Example 106: The head mounted display of any of Examples 103 to 105, wherein said lens comprises a convex lens.

Example 107: The head mounted display of any of Examples 103 to 105, wherein said lens comprises a concave lens.

Example 108: The head mounted display of any of Examples 103 to 107, wherein said lens comprises a Fresnel lens.

Example 109: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein the height of the diffractive features, the width of the diffractive features, the shape of the diffractive features, the spacing between the diffractive features, the tilt of sidewalls on the diffractive features or any combination thereof vary across the substrate.

Example 110: The head mounted display of Example 109, wherein the height of the diffractive features, the width of the diffractive features, the shape of the diffractive features, the spacing between the diffractive features, the tilt of sidewalls on the diffractive features or any combination thereof vary progressively with distance across the substrate.

Example 111: The head mounted display of Example 109 or 110, wherein the height of the diffractive features varies with distance across the substrate.

Example 112: The head mounted display of any of Examples 109 to 111, wherein the height of the diffractive features varies progressively with distance across the substrate.

Example 113: The head mounted display of any of Examples 109-112, wherein the width of the diffractive features varies with distance across the substrate.

Example 114: The head mounted display of any of Examples 109-113, wherein the width of the diffractive features varies progressively with distance across the substrate.

Example 115: The head mounted display of any of Examples 109-114, wherein the shape of the diffractive features varies with distance across the substrate.

Example 116: The head mounted display of any of Examples 109-115, wherein the shape of the diffractive features varies progressively with distance across the substrate.

Example 117: The head mounted display of any of Examples 109-116, wherein the spacing between the diffractive features varies with distance across the substrate.

Example 118: The head mounted display of any of Examples 109-117, wherein the spacing between the diffractive features varies progressively with distance across the substrate.

Example 119: The head mounted display of any of Examples 109-118, wherein the tilt of sidewalls on the diffractive features varies with distance across the substrate.

Example 120: The head mounted display of any of Examples 109-119, wherein the tilt of sidewalls on the diffractive features varies progressively with distance across the substrate.

Example 121: The head mounted display of any of Examples 109-120, wherein the tilt of sidewalls on the diffractive features varies progressively with distance across the substrate.

Example 122: The head mounted display of Example 109, wherein the height of the diffractive features, the width of the diffractive features, the shape of the diffractive features, the spacing between the diffractive features, the tilt of sidewalls on the diffractive features or any combination thereof vary progressively in one direction and then vary progressively in opposite direction with distance across the substrate.

Example 123: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein said substrate is tinted.

Example 124: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein said diffractive features are between 10 and 50 nm in height.

Example 125: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed on said substrate, wherein said diffractive features comprise material having an index of at least 1.8, said material being different from the material of said substrate.

Example 126: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a plurality of diffractive features formed in or on said substrate, and a planarization layer over said diffractive features.

Example 127: The head mounted display of Example 126, wherein the planarization layer has an index of refraction less than 1.6.

Example 128: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; a diffractive optical element formed in or on said substrate, and an anti-reflective coating on the opposite side of the substrate as the diffractive optical element.

Example 129: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed in or on said substrate, wherein first and second diffractive optical elements are disposed on first and second opposite faces of the waveguide.

Example 130: The method of Example 129, wherein the plurality of diffractive features of the first diffractive optical element are offset from the plurality of diffractive features of the second diffractive optical element.

Example 131: The head mounted display of any of the Examples above, wherein said diffracting optical element or diffractive grating comprises a blazed grating.

Example 132: The head mounted display of any of the Examples above, wherein the plurality of diffractive features form a diffraction grating and said diffraction grating comprises a blazed grating.

Example 133: The head mounted display of any of the Examples above, wherein the plurality of diffractive features are asymmetrical so as to provide for a blazed grating.

Example 134: The head mounted display of any of the Examples above, wherein the plurality of diffractive have material asymmetrically deposited thereon so as to provide for a blazed grating.

Example 135: The head mounted display of any of the Examples above, wherein said substrate includes first and second sides and only said first side of said substrate includes a diffraction grating.

Example 136: The head mounted display of any of the Examples above, wherein the diffractive features are arranged in a 1D array.

Example 137: The head mounted display of any of the Examples above, wherein the diffractive features are arranged in a 2D array.

Example 138: The head mounted display of Example 137, wherein the 2D array comprises a square array.

Example 139: The head mounted display of any of the Examples above, wherein the diffractive optical element or diffraction grating comprises a 1D array.

Example 140: The head mounted display of any of the Examples above, wherein the diffractive optical element or diffraction grating comprises a 2D array.

Example 141: The head mounted display of Example 140, wherein the 2D array comprises a square array.

Example 142: The head mounted display of any of the Examples above, wherein said substrate material comprises lithium niobate.

Example 143: The head mounted display of any of the Examples above, wherein said substrate material comprises silicon carbide.

Example 144: The head mounted display of any of the Examples above, wherein said substrate material has an index of refraction that is at least 2.1.

Example 145: The head mounted display of any of the Examples above, wherein said substrate material has an index of refraction that is at least 2.2.

Example 146: The head mounted display of any of the Examples above, wherein said substrate material has an index of refraction that is at least 2.3.

Example 147: The head mounted display of any of the Examples above, wherein said diffractive features comprise material different from said substrate.

Example 148: The head mounted display of any of the Examples above, wherein said diffractive features material has an index of refraction that is less than 1.8.

Example 149: The head mounted display of any of the Examples above, wherein said diffractive features are separated by spaces and said spaces comprise exposed regions of said substrate material.

Example 150: The head mounted display of any of the Examples above, wherein said diffractive features are separated by spaces and said spaces between said diffractive features not covered by said layer of material.

Example 151: The head mounted display of any of the Examples above, wherein said diffractive features are separated by spaces and said spaces between said diffractive features comprise exposed regions of said substrate material.

Example 152: The head mounted display of any of the Examples above, wherein at least some of the diffractive features have sloping sidewalls.

Example 153: The head mounted display of any of the Examples above, wherein at least some of the diffractive features have a trapezoidal cross-section.

Example 154: The head mounted display of any of the Examples above, wherein said waveguide in included in a stack of waveguides in an eyepiece for a head mounted display.

Example 155: The head mounted display of any of the Examples above, wherein said plurality of diffractive features are included in an in-coupling optical element disposed so as to receive light from an image source and couple said light into said substrate to be guided therein.

Example 156: The head mounted display of any of the Examples above, wherein said plurality of diffractive features are included in an out-coupling optical element disposed so as to receive light from an image source that is guided in said substrate and couple said light out of said substrate to an eye of a user wearing said head mounted display.

Example 157: The head mounted display of any of the Examples above, wherein said substrate comprises opposite first and second sides.

Example 158: The head mounted display of Example 157, said second side is disposed closer to a wearer's eye when said head mounted display is worn than said first side.

Example 159: The head mounted display of Example 157 or 158, wherein said plurality of diffractive feature are disposed on said first side of said substrate.

Example 160: The head mounted display of any of Examples 157-159, further comprising an additional plurality of diffractive features formed in or on said substrate on the second opposite side of said substrate.

Example 161: The head mounted display of any of the Examples above, wherein said substrate includes first and second sides and only said first side of said substrate includes a diffraction grating.

Example 162: The head mounted display of any of the Examples above, wherein the diffractive features are formed in said substrate.

Example 163: The head mounted display of any of the Examples above, wherein the diffractive features are formed on said substrate.

Example 164: The head mounted display of any of the Examples above, wherein said diffractive features comprise material different from said substrate.

Example 165: The head mounted display of any of the Examples above, wherein said diffractive features comprise polymer.

Example 166: The head mounted display of any of the Examples above, wherein said diffractive features comprise resist.

Example 167: The head mounted display of any of the Examples above, wherein said diffractive features comprise photoresist.

Example 168: The head mounted display of any of the Examples above, wherein said diffractive features comprise material having an index of refraction less than that of said substrate.

Example 169: The head mounted display of any of the Examples above, wherein said plurality of diffractive features are included in an in-coupling optical element disposed so as to receive light from an image source and couple said light into said substrate to be guided therein.

Example 170: The head mounted display of any of the Examples above, wherein said plurality of diffractive features are included in a light distributing optical element disposed so as to receive light from an image source that is guided in said substrate and direct said light to an out-coupling optical elements to be coupled out of said substrate.

Example 171: The head mounted display of any of the Examples above, wherein said plurality of diffractive features are included in a light distributing optical element disposed so as to receive light from an image source that is guided in said substrate and spread said light within said waveguide out to increase beam size or eye box size.

Example 172: The head mounted display of any of the Examples above, wherein said plurality of diffractive features are included in an out-coupling optical element disposed so as to receive light from an image source that is guided in said substrate and couple said light out of said substrate.

Example 173: The head mounted display of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 174: The head mounted display of any of the Examples above, wherein said plurality of diffractive features are included in a combined pupil expander-extractor disposed so as to receive light from an image source that is guided in said substrate, spread said light out and couple said light out of said substrate.

Example 175: The head mounted display of any of the Examples above, wherein said diffractive features or diffraction grating comprises a blazed diffraction grating configured to direct light preferentially in at least two directions.

Example 176: The head mounted display of any of the Examples above, wherein said diffractive features or diffraction grating comprises a blazed diffraction grating blazed in two directions.

Example 177: A head mounted display comprising: a frame configured to be worn on the head of a user; an eyepiece mounted on said frame, said eyepiece being transparent to provide the user a view of the environment in front of the user and the head mounted display, said eyepiece configured to receive light from an image projector and to direct at least a portion of said light to an eye of the user to direct image content to said eye of the user, said eyepiece comprising a waveguide comprising a substrate comprising a material having a refractive index greater than 2.0 that is transparent to visible light; and a plurality of diffractive features formed on said substrate, wherein said diffractive features comprise polymer.

Example 178: The head mounted display of any of the Examples above, wherein said substrate material comprises lithium niobate.

Example 179: The head mounted display of any of the Examples above, wherein said substrate material comprises silicon carbide.

Example 180: The head mounted display of any of the Examples above, wherein said substrate material has an index of refraction that is at least 2.1.

Example 181: The head mounted display of any of the Examples above, wherein said substrate material has an index of refraction that is at least 2.2.

Example 182: The head mounted display of any of the Examples above, wherein said substrate material has an index of refraction that is at least 2.3.

Example 183: The head mounted display of any of the Examples above, wherein said diffractive features comprise material different from said substrate.

Example 184: The head mounted display of any of the Examples above, wherein said diffractive features comprise material that has an index of refraction that is less than 1.8.

Example 185: The head mounted display of any of the Examples above, wherein the diffractive features are arranged in a 1D array.

Example 186: The head mounted display of any of the Examples above, wherein the diffractive features are arranged in a 2D array.

Example 187: The head mounted display of any of the Examples above, wherein the diffractive features are blazed.

Example 188: The head mounted display of any of the Examples above, wherein the diffractive features are blazed in two directions.

BRIEF DESCRIPTION OF THE DRAWINGS

FIG. 10A is an example method of patterning a waveguide including a material with a high refractive index.

FIG. 10B is an example method of fabricating a patterned waveguide including a high refractive index material.

FIG. 10C is an example method of fabricating a patterned waveguide including a high refractive index material.

FIG. 10D is an implementation of a waveguide including a high refractive index material.

FIG. 11B is an example method of directly patterning a waveguide including $LiNbO_3$ using an etch mask.

FIG. 12A is an example of a patterned sloped patternable layer disposed on a surface of a waveguide.

FIGS. 12B-1 and 12B-2 illustrate an example method of fabricating a waveguide including grated features used as a positive mask.

FIG. 12C illustrates an example method of fabricating a waveguide including grated features used as a negative mask.

FIG. 16A-1 is an example waveguide including a multi-layer coating.

FIG. 16A-2 is an example waveguide including a plurality of features.

FIG. 16B-1 illustrates an example etch mask for fabricating a waveguide.

FIGS. 16B-2a and 16B-2b are example waveguides including a plurality of features.

FIG. 16C-1 is an example waveguide which may be etched to form the waveguide illustrated in FIG. 16C-2.

FIG. 16C-2 is an example waveguide including a plurality of features.

FIGS. 22A-22D are various example waveguides including a material having a certain refractive index.

FIGS. 24A-24H illustrate various example coatings or structures that are provided over an optical element.

FIGS. 27A-27F are various example waveguides integrated with various lenses.

FIGS. 28A-28D are various example devices including diffractive features of a diffractive optical element.

FIG. 33A is a cross-sectional side-view of an example device including diffractive features.

FIG. 33B is a top-view of the example device of FIG. 33A.

FIG. 36A is a cross-sectional side-view of an example device including diffractive features.

FIG. 36B is a top-view of the example device of FIG. 36A.

DETAILED DESCRIPTION

Figure 1:
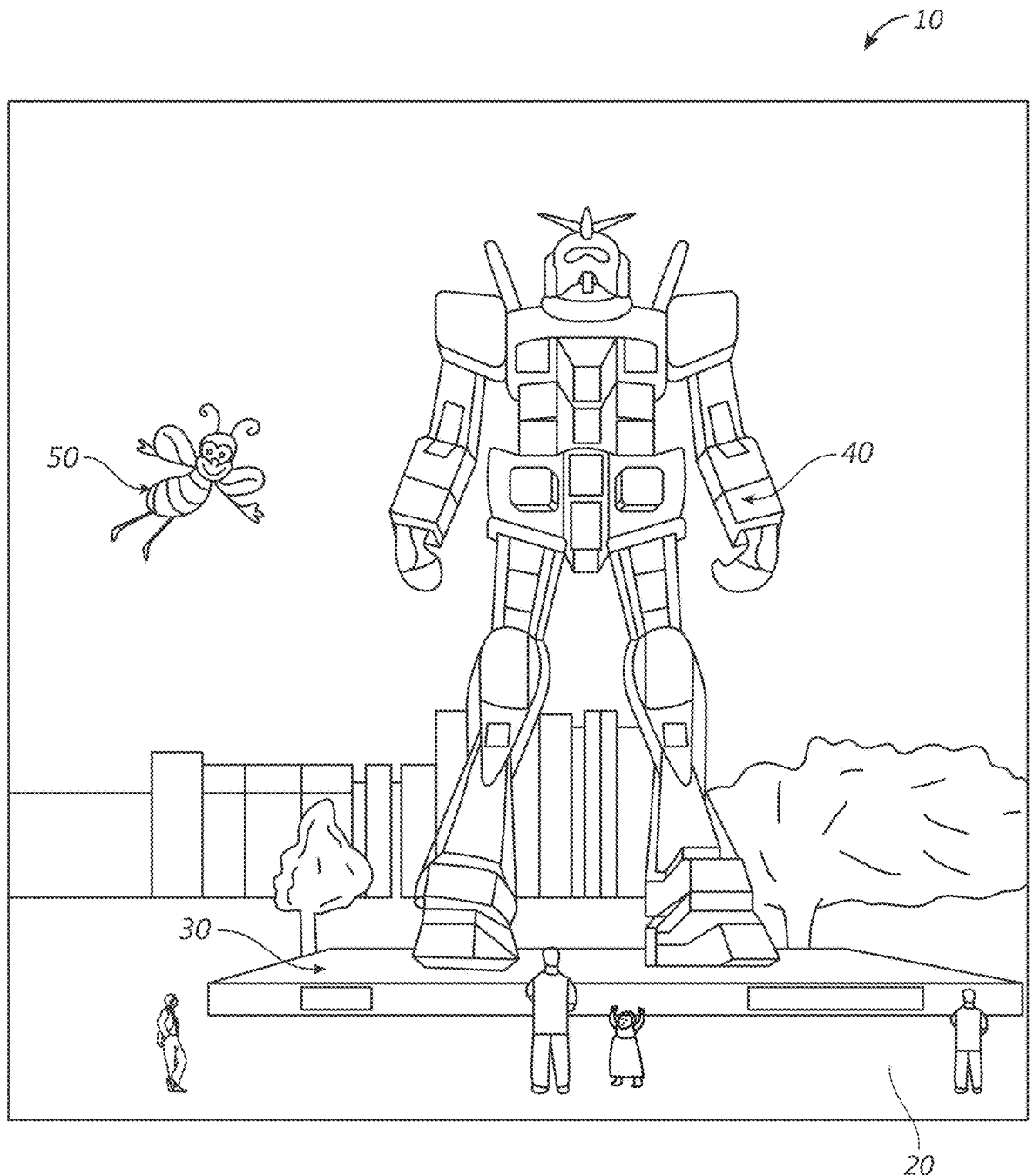
FIG. 1 is an example augmented reality scene.

VR and AR experiences may be provided by display systems having displays in which images corresponding to a plurality of depth planes are provided to a viewer. The images may be different for each depth plane (e.g. provide slightly different presentations of a scene or object) and may be separately focused by the viewer's eyes, thereby helping to provide the user with depth cues based on the accommodation of the eye. The accommodation of the eye may bring into focus different content located on different depth planes in a scene. As discussed herein, such depth cues aid in providing credible perceptions of depth by the viewer.

In some configurations, a full color image may be formed for the various depth planes by overlaying component images that each have a particular component color. For example, red, green, and blue images may each be outputted to form each full color image. As a result, each depth plane may have multiple component color images associated with it. As disclosed herein, the component color images may be outputted using waveguides that in-couple light containing image information, distribute the in-coupled light across the waveguides, and then outcouple light towards a viewer. Light may be in-coupled into the waveguide using in-coupling optical elements, such as diffractive elements (e.g., diffractive gratings), and then outcoupled out of the waveguide using outcoupling optical elements, which may also be diffractive elements such as gratings.

In some implementations, light from one or more waveguides comprising materials with high refractive index materials (e.g., materials with refractive index greater than the refractive index of glass and/or materials with refractive index greater than or equal to about 1.8) can be outcoupled over a wider angular extent as compared to the angular extent of outcoupled light from one or more waveguides comprising materials, such as, for example, glass or other materials with refractive index less than about 1.8. Accordingly, the field of view of display devices comprising one or more waveguides with high refractive index materials (e.g., materials with refractive index greater than the refractive index of glass and/or materials with refractive index greater than or equal to about 1.8) can be greater than the field of view of display devices comprising one or more glass waveguides or one or more waveguides comprising materials having refractive index less than about 1.8.

Additionally, the efficiency with which different wavelengths of incident light are in-coupled into a single waveguide comprising materials with high refractive index materials (e.g., materials with refractive index greater than the refractive index of glass and/or materials with refractive index greater than or equal to about 1.8) may be greater than the efficiency with which different wavelengths of incident light are in-coupled into a single waveguide comprising glass or materials with refractive index less than about 1.8. For example, in various implementations of display device described herein, a single waveguide comprising materials with high refractive index materials (e.g., materials with refractive index greater than the refractive index of glass and/or materials with refractive index greater than or equal to about 1.8) may be able to efficiently in-couple red, green and blue image light emitted from a projector and project red, green and blue images towards a viewer with an increased field of view. In some implementations of display devices, a single waveguide comprising materials with high refractive index materials (e.g., materials with refractive index greater than the refractive index of glass and/or materials with refractive index greater than or equal to about 1.8) may be able to efficiently in-couple two colors, for example, red and green or green and blue image light emitted from a projector and project those images (e.g., red and green or green and blue images) towards a viewer with an increased field of view. In various implementations, a single in-coupling optical element can be used to in-couple light of two or more colors into a single waveguide comprising materials with high refractive index materials (e.g., materials with refractive index greater than the refractive index of glass and/or materials with refractive index greater than or equal to about 1.8). In some implementations, different in-coupling optical elements configured to in-couple different colors of light can be to in-couple light of two or more colors into a single waveguide comprising materials with high refractive index materials (e.g., materials with refractive index greater than the refractive index of glass and/or materials with refractive index greater than or equal to about 1.8). In various embodiments, the in-coupling optical elements can comprise one dimensional, two dimensional or three dimensional gratings. In various implementations, the gratings can have a short axis pitch between about 300 nm and about 450 nm. The long axis pitch of the gratings of the in-coupling optical elements can be between about 300 nm and about 900 nm in some embodiments. The duty cycle/fill factor of the in-coupling optical elements can be between about 10% and about 90% in various embodiments. The height or depth of the gratings of the in-coupling optical elements can be between about 5 nm and about 500 nm in various embodiments. The grating structure of the in-coupling optical element can comprise features having a variety of shapes, such as, for example lines, pillars, slanted lines or pillar, saw-tooth, stair-step, etc. The pillars can have a variety of shapes including but not limited to circular, square, rectangular, ellipsoidal, triangular, polygonal.

Accordingly, display systems comprising one or more waveguides with materials with high refractive index materials (e.g., materials with refractive index greater than the refractive index of glass and/or materials with refractive index greater than or equal to about 1.8) can be attractive. This application describes systems and methods of fabricating grating structures or the diffractive optical elements on one or more surfaces of one or more waveguides comprising materials with high refractive index materials (e.g., materials with refractive index greater than the refractive index of glass and/or materials with refractive index greater than or equal to about 1.8) as well as the resultant devices that may utilize such gratings or diffractive optical elements.

Reference will now be made to the figures, in which like reference numerals refer to like parts throughout.

Figure 2:
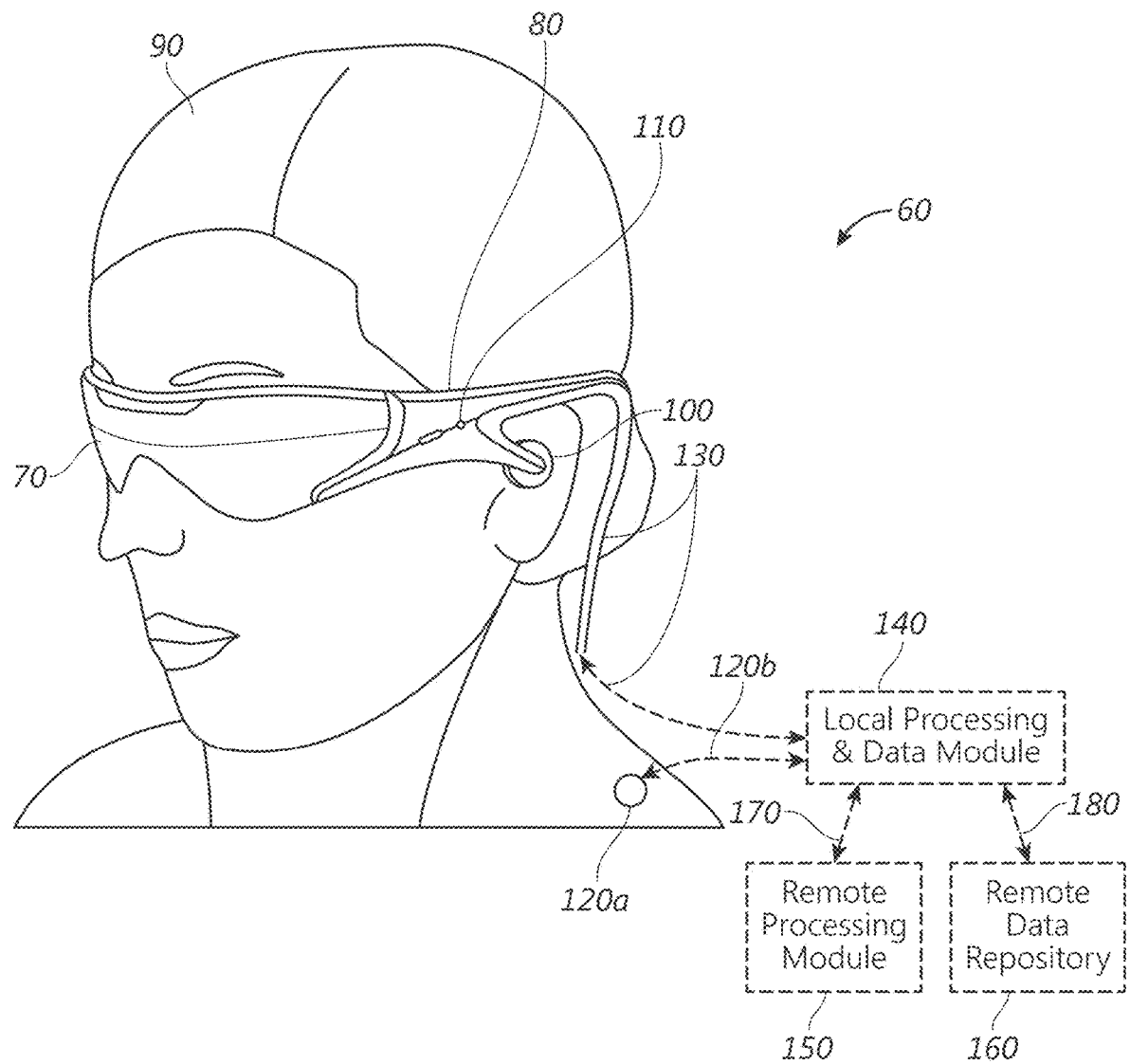
FIG. 2 is an example of a wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data: a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
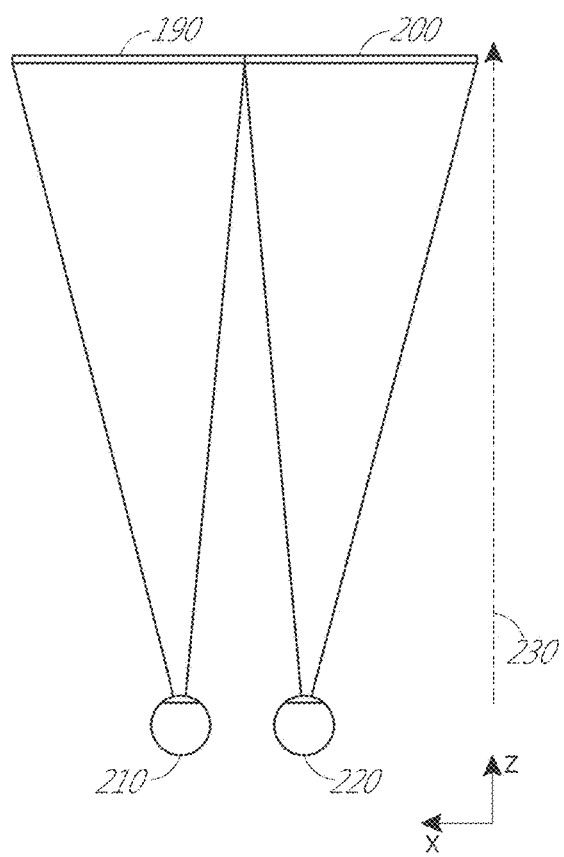
FIG. 3 is a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
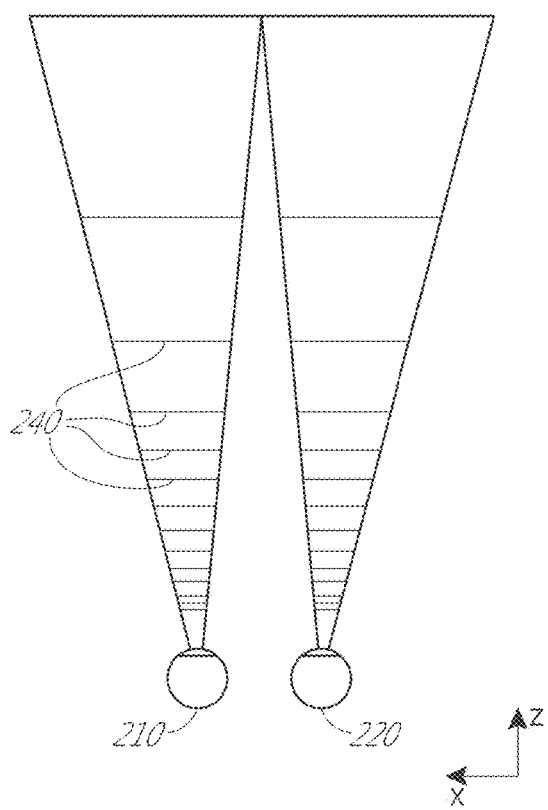
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210,220 on the z-axis are accommodated by the eyes 210,220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
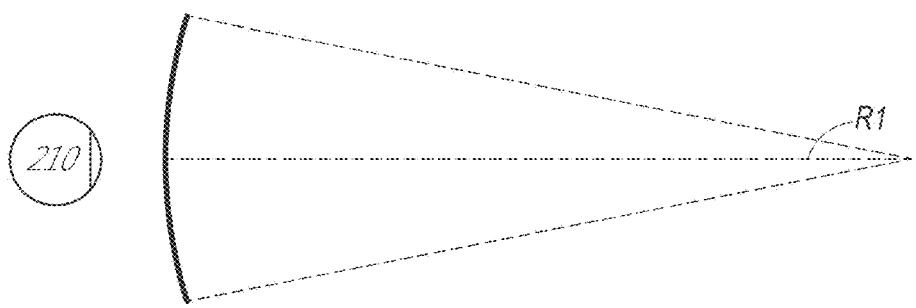
FIGS. 5A-5C illustrate relationships between distance and the divergence of light rays.
Figure 5B:
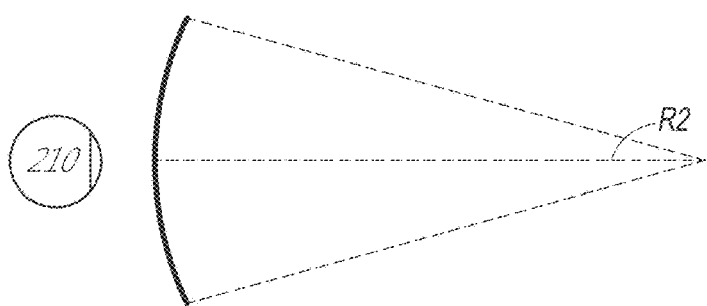
Figure 5C:
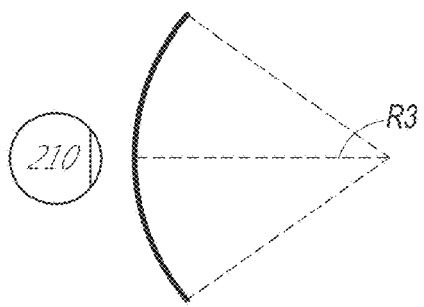

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
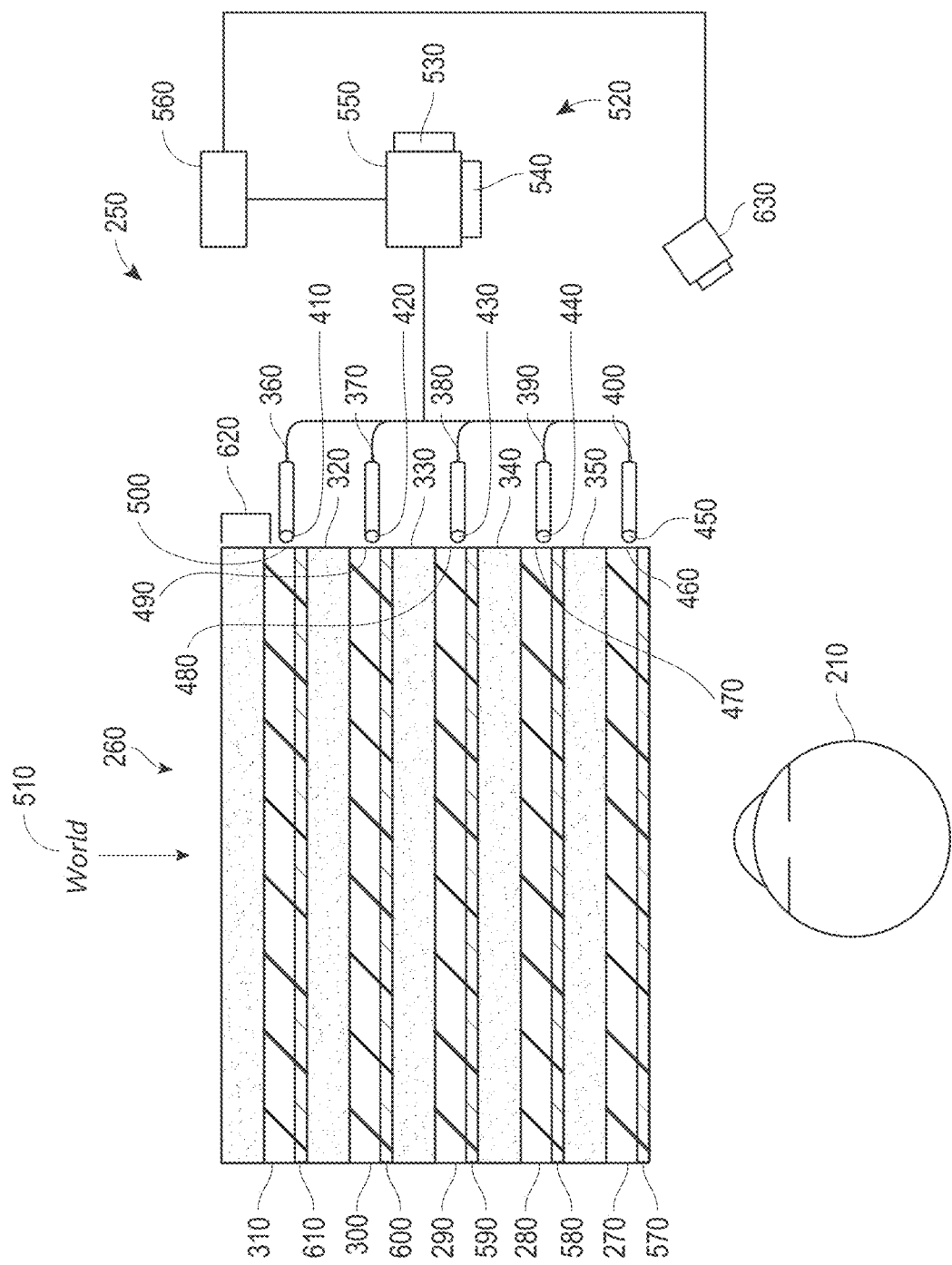
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 540 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320,330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
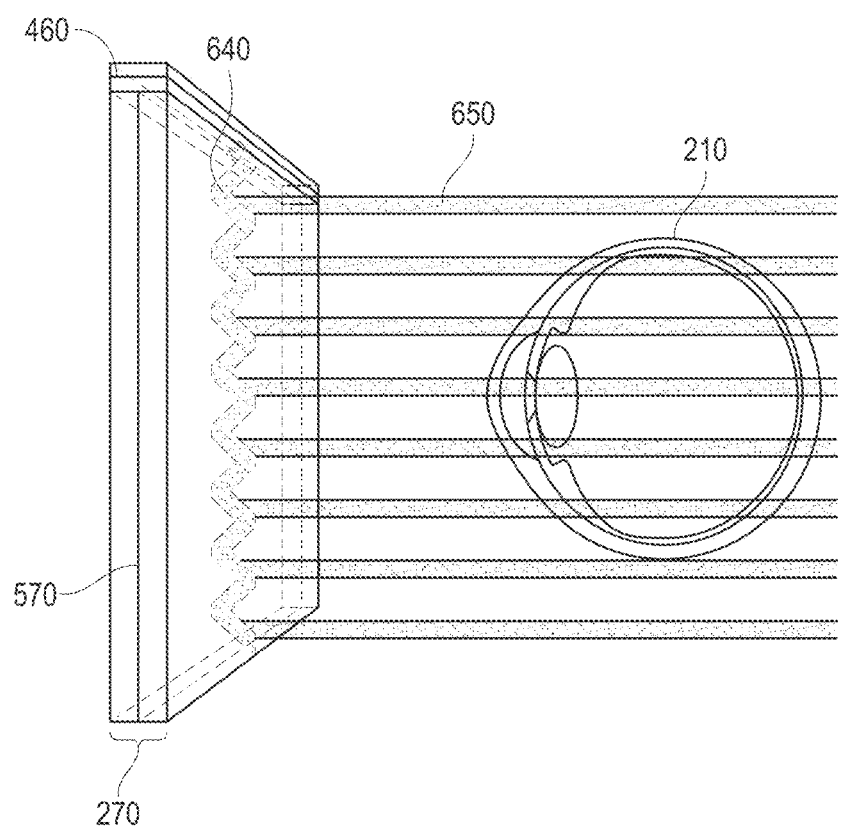
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
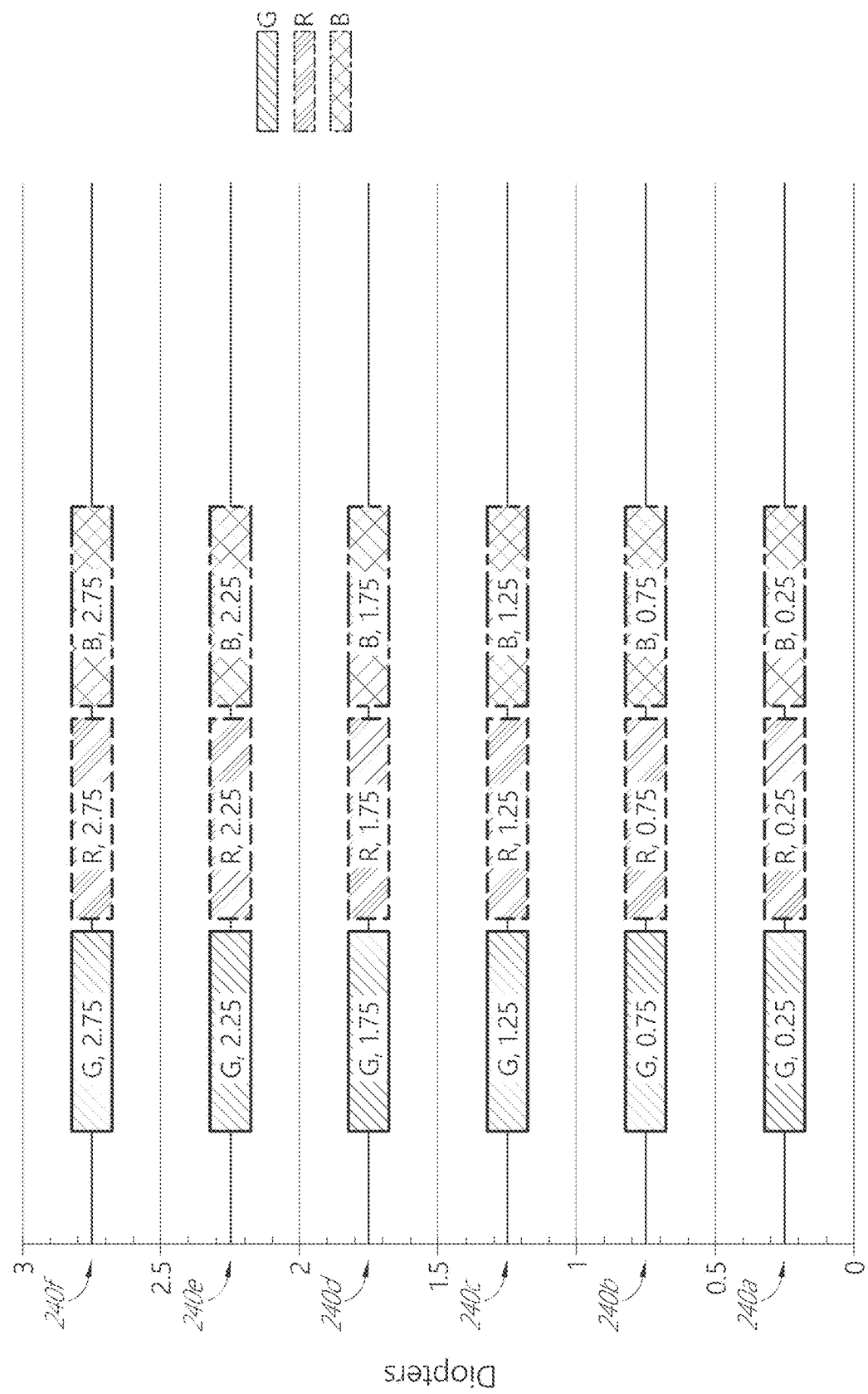
FIG. 8 illustrates an example of a stacked waveguide assembly.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
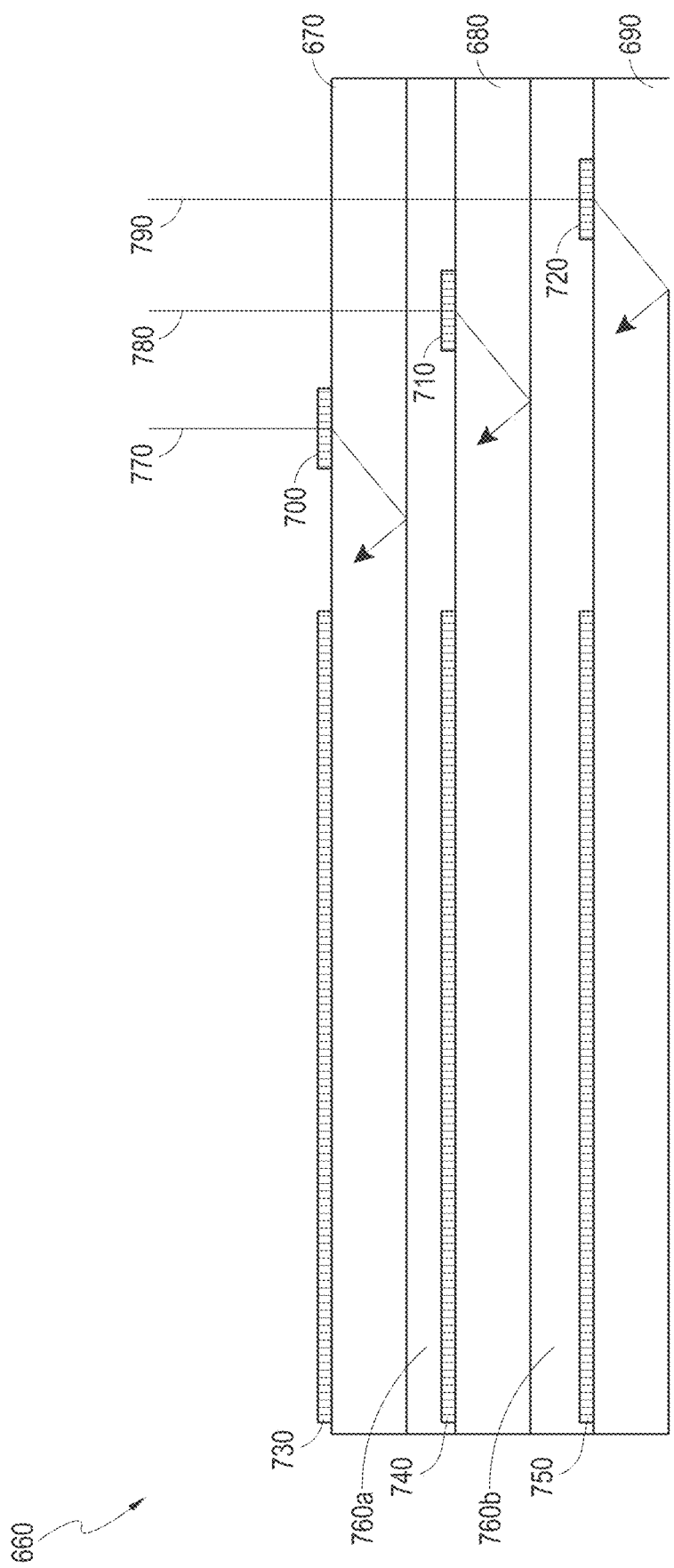
FIG. 9A is a cross-sectional side view of an example of a plurality of stacked waveguides.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. The waveguide 670 is forward of, or closer to a source of image light than the waveguide 680, and the waveguide 690 is rearward of, or farther from the source of image light than the waveguide 680. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6). The light rays 770, 780, 790 may constitute image light, light encoded with image information. For example, the light may have been spatially modulated or otherwise provided with different intensities and/or different wavelengths at different locations to, e.g., form pixels forming an image.

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
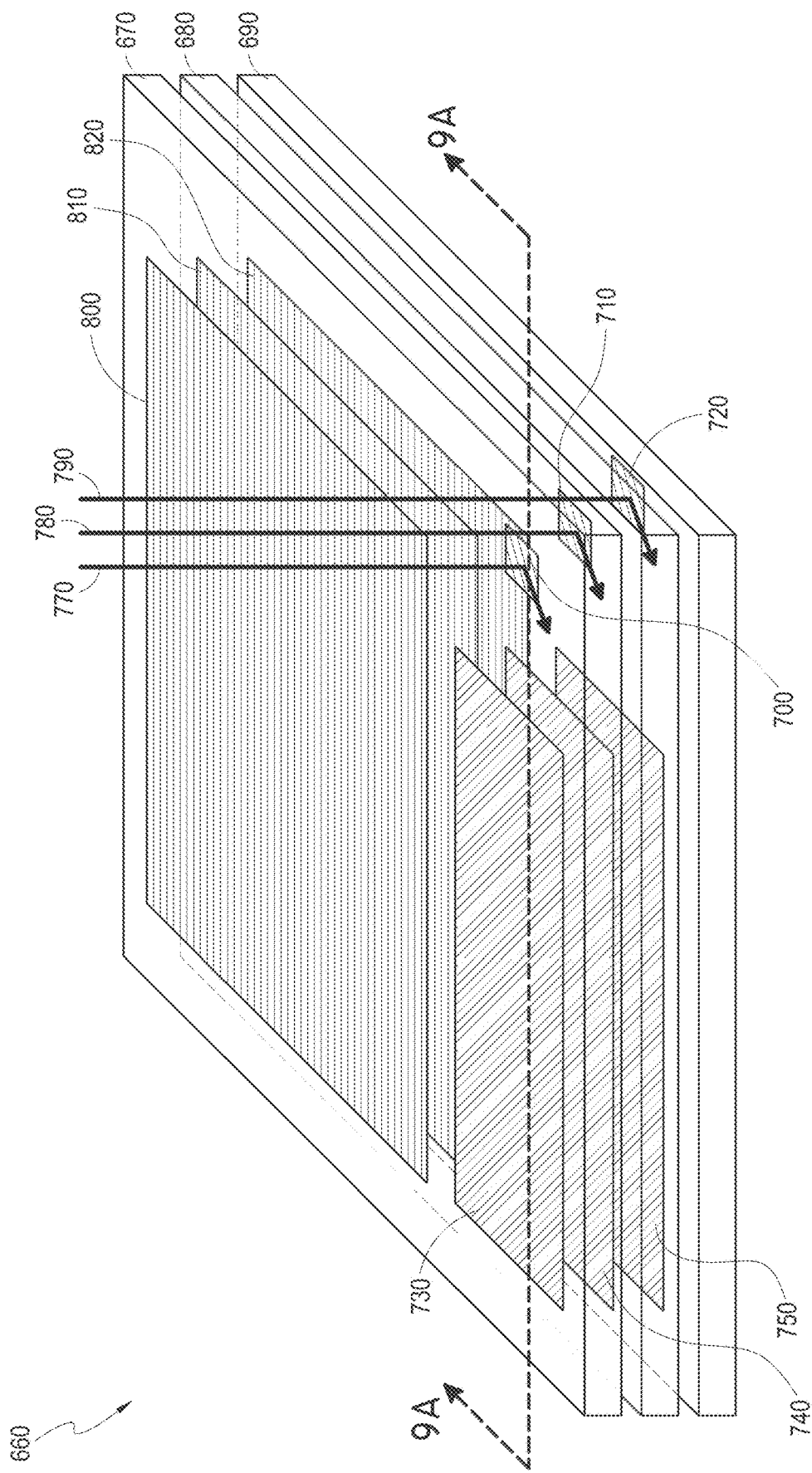
FIG. 9B is a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPEs). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that direct light in a viewer's eye 210 (FIG. 7). It will be appreciated that the OPEs may be configured to increase the dimensions of the eye box in at least one axis and the EPEs may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPs) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPEs) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EPs) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
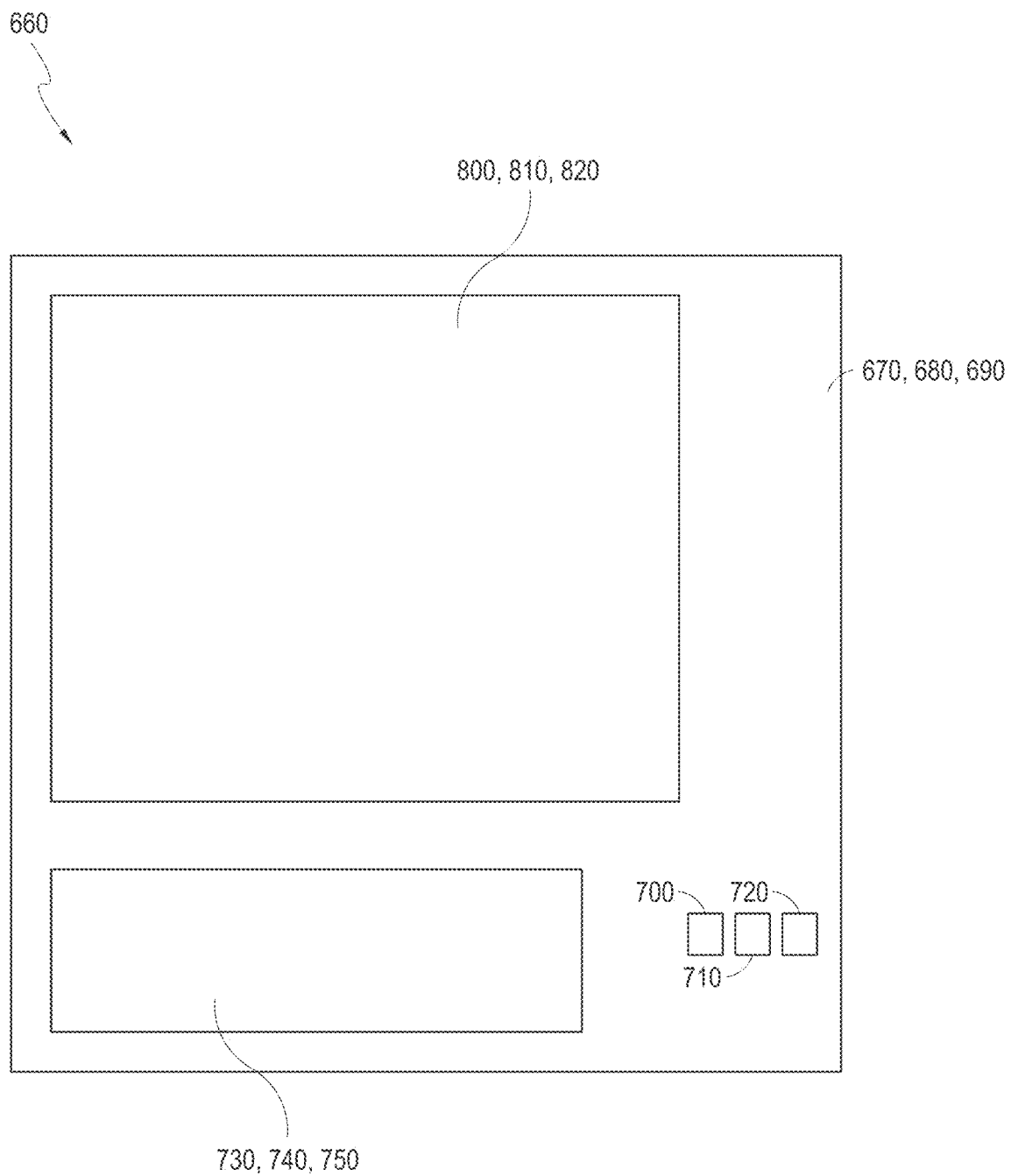
FIG. 9C is a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670,680,690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted or split pupil system, and the in-coupling optical elements within these arrangements may correspond to sub pupils.

As discussed above, various embodiments of the display system 60 or the display system 250 can comprise waveguides with high refractive index materials. For example, various embodiments of the display system 60 or the display system 250 can comprise one or more waveguides with materials having refractive index greater than refractive index of glass. In various embodiments of the display system 60 or the display system 250 can comprise one or more waveguides with materials having refractive index greater than or equal to about 1.8 and less than or equal to about 4.5. For example, various embodiments of the display system 60 or the display system 250 can comprise one or more waveguides with materials having refractive index greater than or equal to 1.8 and less than or equal to 2.1, greater than or equal to 2.1 and less than or equal to 2.2, greater than or equal to 2.2 and less than or equal to 2.3, greater than or equal to 2.3 and less than or equal to 2.4, greater than or equal to 2.4 and less than or equal to 2.5, greater than or equal to 2.5 and less than or equal to 2.6, greater than or equal to 2.6 and less than or equal to 2.7, greater than or equal to 2.7 and less than or equal to 2.8, greater than or equal to 2.8 and less than or equal to 2.9, greater than or equal to 2.9 and less than or equal to 3.0, greater than or equal to 3.0 and less than or equal to 3.1, greater than or equal to 3.1 and less than or equal to 3.2, greater than or equal to 3.2 and less than or equal to 3.3, greater than or equal to 3.3 and less than or equal to 3.4, greater than or equal to 3.4 and less than or equal to 3.5, greater than or equal to 3.5 and less than or equal to 3.6, greater than or equal to 3.6 and less than or equal to 3.7, greater than or equal to 3.7 and less than or equal to 3.8, greater than or equal to 3.8 and less than or equal to 3.9, greater than or equal to 3.9 and less than or equal to 4.0, or any value in any range/sub-range defined by these values. Without any loss of generality, the high refractive index materials contemplated in this application can be transparent to visible light. For example, the high refractive index materials contemplated in this application can be configured to transmit visible light in a spectral range between about 450 nm and about 750 nm with efficiency greater than or equal to about 90%. Fresnel reflection may occur, however, at the interface of the waveguide in certain implementations.

As discussed above, various embodiments of display system 60 or the display system 250 comprising one or more waveguides with high refractive index materials (e.g., with refractive index greater than refractive index of glass and/or with refractive index greater than or equal to about 1.8) can have increased field of view as compared to embodiments of display system 60 or the display system 250 comprising one or more waveguides with glass and/or materials with refractive index less than about 1.8. Furthermore, as discussed above, different colors or wavelengths of light (e.g., two or possibly three colors) can be coupled into a single waveguide comprising a high refractive index material. Accordingly, various embodiments of display system 60 or the display system 250 can comprise different waveguides associated with different depth planes, wherein a waveguide associated with a depth plane can comprise a high refractive index material such that different colors or wavelengths (e.g., red, green and blue wavelengths) of incident light are coupled into that waveguide. Accordingly, the associated waveguide has the ability to project a multicolored image comprising light of different wavelengths (e.g., red, green and blue wavelengths) towards a viewer. The various high refractive index materials contemplated in this application comprise materials such as, for example, lithium niobate (LiNbO$_3$) having a refractive index of about 2.3, silicon carbide (SiC) having a refractive index between about 2.6 and about 3.0, or other similar materials.

As discussed above, one or more waveguides in various implementations of display system 60 or the display system 250 can comprise in-coupling optical elements (e.g., in-coupling optical elements 700, 710, 720) to in-couple light into one or more waveguides and/or out-coupling optical elements (e.g., 570, 580, 590, 800, 810, 820) from the one or more waveguides. In various embodiments of display system 60 or the display system 250, one or more waveguides can comprise light distributing elements (e.g., light distributing elements 730, 740, 750). In various embodiments, the light distributing elements (e.g., light distributing elements 730, 740, 750) can be configured as orthogonal pupil expanders (OPEs) and/or the out-coupling elements (e.g., 800, 810, 820) can be configured as exit pupil expanders (EPEs). Eyepieces may include any one or combination of in-coupling optical elements (ICGs), orthogonal pupil expanders (OPEs), and exit pupil expanders (EPEs). Accordingly, a wide range of configurations are possible. For example, some eyepieces do not include an orthogonal pupil expander (OPEs). The in-coupling optical elements, the out-coupling optical elements and the light distributing elements can comprise diffractive features. The diffractive optical elements can comprise micro-scale and/or nano-scale features. In various embodiments, the diffractive optical elements can have features of varying heights, pitch and/or shape. Without any loss of generality, the in-coupling optical elements, the out-coupling optical elements and/or the light distributing elements can be provided on one or both surfaces of the waveguides in different embodiments of the display system 60 or the display system 250. For example, various embodiments of waveguides described in this application can have diffractive structures disposed on both surfaces of a waveguide.

Waveguides with in-coupling optical elements, out-coupling optical elements and/or light distributing elements can be fabricated using various manufacturing processes, such as, for example, lithography, etching, patterning, physical and/or chemical deposition methods. It may be advantageous, that the manufacturing methods and techniques used to fabricate the in-coupling optical elements, the out-coupling optical elements and/or the light distributing elements are able to accomplish uniform pattern fidelity over large areas to allow efficient in-coupling of light into a waveguide, efficient and/or uniform distribution of light along one or more desired directions within the waveguide efficient and/or uniform out-coupling of light propagating in the waveguide or any combination thereof. Without any loss of generality, pattern fidelity can refer to the fidelity with which the imprinted pattern is transferred from the master to the surface of the substrate. The pattern fidelity is determined based on the following characteristics:

1) Variation of the pattern on the substrate from the pattern on the master. For example, the pattern fidelity can be considered to be high if the variation in a characteristic (e.g., length, width, height, depth, angle, or surface roughness) of a feature (e.g., lines, hole, groove, pillar, side wall) is within a threshold value. For example, the pattern fidelity can be considered to be high if the change in the line width, change in the diameter of a hole or pillar diameter, change in the height or depth of a feature, change in the side wall angle, change in the roughness of a line edge between the pattern on the substrate and the pattern on the master is within about +/−5%.

2) Number of defects per 100 sq. µm or 1 sq. cm. In some embodiments, if the variation of a characteristic of a feature is greater than a threshold value, then it can be considered as a defect. A defect can be assigned to one of defect size bins based on the amount of variation. For example, the different defect size bins can include variations <1 um, <5 um, <20 um, <50 um, <100 um etc. If the number of defects per 100 sq. µm or 1 sq. cm in the pattern on the substrate is less than a threshold value, then the pattern fidelity can be considered to be high.

3) Alignment of pattern over the surface of the substrate and end-to-end within the area of the pattern. For example, a pattern fidelity can be considered to be high if there are not any distortion of one or more alignment marks and/or distortion in edge boundary.

Various embodiments of display device contemplated in this application can comprise a waveguide with diffractive structures disposed on one or both surfaces of the waveguide. The diffractive structures can have varying heights and/or pitch. Such waveguides can be configured to incouple external light, distribute in-coupled light along one or more desired directions and/or out-couple the in-coupled light. In various embodiments of display devices, such waveguides can be configured to mitigate undesirable light artifacts. Different methods of fabricating waveguides with one or more surfaces comprising diffractive features (e.g., diffractive features with varying heights and/or pitch) are described in this application. One or more of the different methods described in this application may be suitable for high volume manufacturing. Some of the methods of fabricating waveguides with one or more surfaces comprising diffractive features (e.g., diffractive features with varying heights and/or pitch) that are described in this application can employ at least two different materials that are etched by an etchant at different rates.

I. Imprint Polymer Patterning

One method of fabricating diffractive structures on one or both surfaces of a waveguide comprises patterning one or both surfaces of the waveguide with a patternable layer. The patternable layer can comprise a polymer. For example, the patternable layer can comprise an ultraviolet (UV) curable polymer. As another example, the patternable layer can comprise a resist (e.g., a polymer resist). The waveguide can comprise materials with high refractive index (e.g., refractive index greater than or equal to 1.8 and/or refractive index greater than refractive index of glass). The patternable layer can have a refractive index less than the refractive index of the material of the waveguide (e.g., refractive index less 1.8). For example, the refractive index of the patternable layer can be between about 1.2 and about 1.8. In various embodiments, the refractive index of the patternable layer can be greater than or equal to about 1.2 and less than or equal to about 1.3, greater than or equal to about 1.3 and less than or equal to about 1.4, greater than or equal to about 1.4 and less than or equal to about 1.5, greater than or equal to about 1.5 and less than or equal to about 1.6, greater than or equal to about 1.6 and less than or equal to about 1.7, greater than or equal to about 1.7 and less than or equal to about 1.8 or any range/sub-range between any of these values.

The patternable layer can be disposed over one or more surfaces of a waveguide using jet deposition technology (e.g., ink-jet deposition). Jet deposition technology employs dispensing a volume of a patternable material (e.g., a polymer, a resist) over the waveguide using an inkjet printer head. For example, the inkjet printer head can dispense drops of the patternable material (e.g., a polymer, a resist) over the waveguide. In various embodiments, the dispensed volume of the patternable material (e.g., a polymer, a resist) can vary across the surface of the waveguide. The accuracy in the placement of the dispensed volume of the patternable material over the waveguide can be high when deposited using jet deposition technology. Additionally, jet deposition technology allows different volumes of the patternable material (e.g., a polymer, a resist) to be deposited in different regions of the surface of the waveguide. As discussed below, this characteristic of jet deposition technology can be advantageous in fabricating features with varying heights and/or pitch. Jet deposition technology can also reduce waste of the patternable material (e.g., a polymer, a resist) as compared to other deposition technologies such as, for example, spin coating. Additionally, depositing the patternable material (e.g., a polymer, a resist) using jet deposition technology can be faster as compared to other deposition technologies such as, for example, spin coating. Accordingly, in some implementations, jet deposition technology can increase throughput. Using jet deposition, the thickness of the patternable layer may be controlled. For example, the patternable layer deposited jet deposition technology may have a thickness between about 10 nm and about 1 micron (e.g., between about 10 nm and about 50 nm, between about 25 nm and about 75 nm, between about 40 nm and about 100 nm, between about 80 nm and about 300 nm, between about 200 nm and about 500 nm, between about 400 nm and about 800 nm, between about 500 nm and about 1 micron, or any value in a range/sub-range defined by any of these values). Controlling the thickness of the deposited patternable layer may be advantageous in fabricating diffractive features with different heights as discussed below. Additionally, different compositions of the patternable layer may be deposited in different portions of the waveguide using jet deposition technology. The different compositions of the patternable layer may etch at different rates when exposed to an etchant. Accordingly, depositing different compositions of the patternable layer in different portions of the waveguide using jet-deposition technology can be advantageous in fabricating diffractive features with different heights and/or pitch as discussed below. In various embodiments of manufacturing, other deposition methods such as coating, spin-coating, spraying, or other pre-metered coating techniques such as slot-die, doctor blade, knife edge, screen, etc. may be employed to deposit the patternable material (e.g., a polymer, a resist).

Certain high refractive index materials, such as, for example, Lithium Niobate (LiNbO$_3$), Lithium Tantalate (LiTaO$_3$), Barium Titanate (BaTiO$_3$), can be piezoelectric, ferroelectric and/or pyroelectric. Waveguides comprising such high refractive index materials, such as LiNbO$_3$ or LiTaO$_3$, can develop substantial surface charge due to their piezoelectric, ferroelectric and/or pyroelectric properties as they are prepared for deposition of the patternable material (e.g., a polymer, a resist). Furthermore, the dispensed volume of the patternable material (e.g., a polymer, a resist) using jet-deposition technology can be charged. Under certain conditions, the charged volume of the patternable material (e.g., a polymer, a resist) when dispensed using jet-deposition technology on a charged surface can spread non-symmetrically. This can result in the dispensed volume to deviate from the desired volume and/or cause undesirable merging of different dispensed volumes. Accordingly, in some embodiments, the patternable material (e.g., a polymer, a resist) can be disposed on a charged surface of a waveguide using other deposition techniques, such as, for example, coating, spin-coating, spraying, or other pre-metered coating techniques such as slot-die, doctor blade, knife edge, screen, etc. A shows an example method of patterning a waveguide 1001 comprising a material with a high refractive index (e.g., refractive index greater than or equal to about 1.8). As shown in block (I), an uncured patternable layer 1011 comprising a patternable material (e.g., a polymer, a resist) having a desired thickness is disposed over a surface of the waveguide 1001. In various embodiments, an adhesion promoter layer 1003 can be disposed over the surface of the waveguide 1001 before deposition of the uncured patternable layer 1011. The uncured patternable layer 1011 can be patterned using an imprint template 1007 comprising a plurality of imprint features and cured by irradiating with light such as ultraviolet (UV) light 1009 as shown in block (II) of FIG. 10A. Alternately, the imprinted patternable layer 1011 can be cured by other ways such as heating. In this implementation, once the patternable layer 1011 is cured, the imprint template 1007 can be removed to obtain a patterned layer 1005 as shown in block (Ill) of FIG. 10A. As discussed above, in some cases, deposition techniques, such as, for example, coating, spin-coating, spraying, or other pre-metered coating techniques such as slot-die, doctor blade, knife edge, screen, etc. may not be able to deposit different volumes of the patternable material (e.g., a polymer, a resist) in different portions of the surface of the waveguide to allow fabrication of diffractive features with varying heights and/or pitch. Moreover, depositing the patternable material (e.g., a polymer, a resist) using deposition techniques, such as, for example, coating, spin-coating, spraying, or other pre-metered coating techniques such as slot-die, doctor blade, knife edge, screen, etc. may result in waste of the patternable material.

Another method of fabricating a patterned waveguide comprising a high refractive index material that exhibits piezoelectric, ferroelectric and/or pyroelectric behavior is illustrated in FIG. 10B. In this method, one or more surfaces of a waveguide 1001 comprising a high refractive index material that exhibits piezoelectric, ferroelectric and/or pyroelectric behavior is provided (e.g., deposited thereon, coated, etc.) with a layer of a dielectric material 1013 that facilitates deposition of the uncured patternable layer 1011 using jet-deposition technology as shown in block I(a) of FIG. 10B. Optionally, the layer of the dielectric material 1013 can be disposed on/over one or more surfaces of the waveguide. In some implementations, the layer of the dielectric material 1013 can have a thickness between about 5 nm and about 200 nm. The dielectric material can be transparent to visible wavelengths of light. In some implementations, the dielectric material can have a refractive index that is substantially similar to the refractive index of the high refractive index material of the waveguide. For example, a difference between the refractive index of the dielectric material and the high refractive index material of the waveguide can be less than or equal to about 20% in some implementations. However, it is also contemplated that the difference between the refractive index of the dielectric material and the high refractive index material of the waveguide can be greater than about 20% in some implementations. In various embodiments, the layer of dielectric material 1013 can comprise silicon carbide (SiC), titanium dioxide ($TiO_2$), Zirconium dioxide ($ZrO_2$), silicon nitride ($Si_3N_4$) or silicon dioxide ($SiO_2$). In some embodiments, the dielectric material can be disposed over the one or more surfaces of a waveguide comprising a high refractive index material that exhibits piezoelectric, ferroelectric and/or pyroelectric behavior using a physical vapor deposition process, such as, for example, sputter or evaporation. In some embodiments, the dielectric material can be disposed over the one or more surfaces of a waveguide comprising a high refractive index material that exhibits piezoelectric, ferroelectric and/or pyroelectric behavior using a chemical vapor deposition (CVD) process, such as, for example, plasma-enhanced chemical vapor deposition (PECVD), atmospheric pressure plasma-enhanced chemical vapor deposition (APPECVD) or atomic layer deposition (ALD). Use of other approaches may be possible.

The layer of dielectric material 1013 can comprise a material that does not exhibit piezoelectric, ferroelectric and/or pyroelectric behavior. Accordingly, the surface of the layer of the dielectric material 1013 may, in various implementations, not build-up charges, for example, as the waveguide 1001 is placed on a chuck of a lithography tool or moved relative to a print-head of a jet-deposition device. Accordingly, the dispensed volume of the patternable material (e.g., a polymer, a resist) that is deposited on the surface of dielectric material using jet-deposition technology may not spread non-symmetrically or merge with adjacent volumes in some implementations as shown in block I(a) of FIG. 10B. For example, the drops can pre-merge instead of staying at the dispensed drop location. Accordingly, a predefined spacing between the dispensed drops required to achieve a controlled thick residual layer thickness (RLT) of the patterned layer may not be maintained. When the dispensed drops pre-merge prior to being imprinted by the template, the thickness of the RLT may be random and uncontrolled. The resulting pattern obtained after imprinting and curing may have variable thickness and/or other non-uniformities. Such variation in the thickness and non-uniformity may not be repeatable and may cause distortions in the virtual image. For example, the sharpness, contrast, uniformity and/or brightness of the virtual image may be reduced in some embodiments. The uncured patternable material can also be deposited using deposition techniques, such as, for example, jet deposition, coating, spin-coating, spraying, or other pre-metered coating techniques such as slot-die, doctor blade, knife edge, screen, etc. as shown in block I(b) of FIG. 10B. The dispensed volume of the patternable material 1011 or the uncured patternable layer 1011 can be patterned by bringing an imprint template 1007 comprising an imprint pattern into contact with the dispensed volume of the patternable material 1011 or the uncured patternable layer 1011 as shown in block II of FIG. 10B. As discussed above, this process of imprinting can be referred to as contact imprint lithography. The imprint template may comprise nano-scale or micro-scale features. The features of the imprint template can have varying heights, depths, pitch, shape, arrangement and/or location of imprint features or any combination thereof. In some other embodiments, the dispensed volume of the patternable material 1011 or the uncured patternable layer 1011 can be patterned by other lithography techniques. The patterned material can be cured, for example, by light 1009 such as from an ultraviolet (UV) source as shown in block II of FIG. 10B and/or by heating. The imprint template can be removed after the patterned material is cured to obtain a waveguide 1001 comprising a patterned layer 1005 as shown in block III of FIG. 10B. Accordingly, the patternable material is patterned forming the patterned layer 1005.

In some embodiments, the patterned layer 1005 can be used as an etch mask to etch the waveguide comprising the high refractive index material. In some embodiments, the etch process can be configured to etch through the layer of the dielectric material 1013 and the surface of the waveguide 1001 comprising the high refractive index material. In various embodiments, the patterned layer of dielectric material can be removed using a different wet or dry etch process after the waveguide 1001 comprising the high refractive index material is etched. However, in some embodiments, the patterned layer of dielectric material can be left such that the patterned surface of the waveguide 1001 includes the patterned layer of dielectric material. In various embodiments, the patterned surface of the waveguide 1001 can be provided with a layer of material, a film of material, a coating of a material, or nano-architectures that are configured to reduce external light and light artifacts in the user's field of view. For example, in some embodiments, anti-reflection (AR) coatings can be used to reduce external light and light artifacts in the user's field of view. In some implementations, coatings comprising titania ($TiO_2$), silica ($SiO_2$), Magnesium fluoride ($MgF_2$) or alternating layers thereof can be used to reduce external light and light artifacts in the user's field of view. In some embodiments, the waveguide 1001 may be tinted to reduce external light and light artifacts in the user's field of view. In some embodiments, optical elements that provide an additional function (e.g., focusing of light, diverging light, collecting light, etc.) can be integrated with the patterned surface of the waveguide. For example, a Fresnel lens or a plano-convex lens may be disposed over the patterned waveguide 1001 as discussed below with reference to FIG. 27.

Another method of fabricating a patterned waveguide comprising a high refractive index material that exhibits piezoelectric, ferroelectric and/or pyroelectric behavior is depicted in FIG. 10C. The method comprises providing an adhesion promoter layer 1003 over one or more surfaces of the waveguide 1001 comprising the high refractive index material that exhibits piezoelectric, ferroelectric and/or pyroelectric behavior as shown in block I(b) of FIG. 10C. In some embodiments, the adhesion promoter layer can comprise 2-[(Trimethylsilyl)oxy]ethyl acrylate. The adhesion promoter layer can be disposed on the surface of the waveguide, for example, using spin-coating or physical or chemical vapor deposition methods. A patterned layer can be disposed over the adhesion promoter layer using a template coating pattern transfer method. The template coating pattern transfer method comprises disposing an uncured patternable material 1011 (e.g., a polymer or a resist) on an imprint template 1007 comprising an imprint pattern as shown in block I(a) of FIG. 10C. The uncured patternable material 1011 (e.g., a polymer or a resist) can be disposed over the patterned surface of the imprint template 1007 using jet-deposition technology or other deposition methods, such as, for example, coating, spin-coating, spraying, or other pre-metered coating techniques such as slot-die, doctor blade, knife edge, screen, etc. The imprint pattern can comprise nano-scale or micro-scale features. When the uncured patternable material 1011 (e.g., a polymer or a resist) is disposed over the patterned surface of the imprint template 1007 using jet-deposition technology, the drop pattern may be designed such that the dispensed drops of the polymer spread across the patterned surface as a result of capillary action as shown in block I(a) of FIG. 10C. The patterned surface of the imprint template 1007 comprising the dispensed uncured patternable material 1011 (e.g., a polymer or a resist) is brought into contact with the surface of the waveguide 1001 coated with the adhesion promoter layer and cured using light such as UV illumination 1009 as shown in block II of FIG. 10C. In some embodiments, the patternable material can be cured using thermal curing. During the curing process, the patternable material 1011 (e.g., a polymer or a resist) is transferred to the adhesion promoter layer 1003 from the template 1007. The template 1007 is removed once the patterned patternable material (e.g., a polymer or a resist) is transferred to the surface of the waveguide 1001 as shown in block III of FIG. 10C to obtain a waveguide 1001 comprising a patterned layer 1005. As discussed above, in some embodiments, the patterned layer 1005 can be used as an etch mask to etch the surface of the waveguide 1001 comprising the high refractive index material. In some embodiments, the etch process can be configured to etch through the adhesion promoter layer 1003 and into the surface of the waveguide 1001 comprising the high refractive index material. In various embodiments, the adhesion promoter layer 1003 can be removed after the waveguide 1001 comprising the high refractive index material is etched. As discussed above, in various embodiments, the patterned surface of the waveguide 1001 can be provided with a layer of material, a film of material, a coating of a material, or nano-architectures that are configured to reduce external light and light artifacts in the user's field of view. For example, in some embodiments, anti-reflection (AR) coatings can be used to reduce external light and light artifacts in the user's field of view. In some implementations, coatings comprising titania ($TiO_2$), silica ($SiO_2$), Magnesium fluoride ($MgF_2$) or alternating layers thereof can be used to reduce external light and light artifacts in the user's field of view. In some embodiments, the waveguide 1001 may be tinted to reduce external light and light artifacts in the user's field of view. In some embodiments, optical elements that provide an additional function (e.g., light focusing, diverging light, collecting light, etc.) can be integrated with the patterned surface of the waveguide.

In some embodiments, it may be desirable to dissipate the surface charges that may develop on various waveguides comprising high refractive index materials that exhibit piezoelectric, ferroelectric and/or pyroelectric behavior. In some embodiments, the charge on one or more surfaces of the waveguide can be reduced or dissipated by using an ionizer, which can neutralize charge on the one or more surfaces of the waveguide with a bipolar clean air ionization or negative or positive ion rich gas, depending on the surface charge generated. Ions, provided for example through ionization, can be directed to the waveguide to reduce charge thereon. In some embodiments, the charge on one or more surfaces of the waveguide can be reduced or dissipated using a plasma. In some embodiments, a secondary charged or grounded surface can be brought in close contact with one or more surfaces of the waveguide to dissipate surface charge generated on the one or more surfaces of the waveguide. In some embodiments, the secondary charged surface can be brought in close contact with the one or more surfaces of the waveguide as the waveguide and/or the print-head of the jet-deposition technology are moved with respect to each other. In some embodiments, the waveguide can be in electrical contact with a grounded chuck, which can help dissipate charge build up on one or more surfaces of the waveguide. In some embodiments, a metal coating (e.g., iridium (Ir), chromium (Cr) or nickel (Ni) coating) or other conductive coating can be disposed over at least a portion of the one or more charged surfaces of the waveguide to dissipate surface charges. Without subscribing to any particular theory, the metal coating can act as a conductive film to dissipate, e.g., uniformly dissipate, surface charge build up. In some embodiments, a conductive oxide (e.g., a transparent conductive oxide, such as, for example, indium tin oxide (ITO)) can be disposed over at least a portion the surface of the waveguide to dissipate surface charges that may build-up on the one or more surfaces of the waveguide. Other conductive films as well as other ways of discharging or charge dissipation may be used.

In some implementations, upon dissipation of the surface charges in the manner discussed above, the patternable material can be dispensed using jet-deposition technology and patterned using an imprint template as discussed above. The patterned patternable material can be cured using UV curing or thermal curing or other curing processes. In some embodiments, the patterned patternable material can be etched to pattern the one or more surfaces of the waveguide comprising the high refractive material. In embodiments of a method of manufacturing that employs disposing a conductive coating such as metal coating over one or more surfaces of the waveguide to dissipate surface charges, the patternable material can be dispensed over the conductive coating or metal coating and patterned using an imprint template as discussed above. In some embodiments, the patterned patternable material and the conductive or metal layer together can be used as an etch mask to etch into the one or more surface of the waveguide.

In some embodiments, to facilitate the deposition of the patternable material on a charged surface of a waveguide comprising a high refractive index material that exhibits piezoelectric, ferroelectric and/or pyroelectric behavior, charge build-up on the surfaces of the waveguide can be reduced before the deposition of the patternable material. For example, the hydro-thermal stress/strain on the waveguide can be reduced during cleaning of the surfaces of the waveguide prior to the deposition of the patternable material and/or other processes that are undertaken to prepare the surfaces of the waveguide for the deposition of the patternable material. In various embodiments, charge dissipation and surface cleaning can be done together by exposing the surface of the $LiNbO_3$ wafer to a plasma. For example, atmospheric pressure plasma can be used to dissipate surface charges as well as clean the surface. In some implementations, the plasma can be at a temperature between about 20-50 degrees Celsius. In this temperature range, the plasma can comprise Argon (Ar) and Oxygen (O) ions and radicals. It is also desirable to avoid large variation in temperature between different processes that are carried during fabrication of grating structures on a waveguide comprising a high refractive index material, such as, for example $LiNbO_3$. For example, if the temperature variation between different processes that are carried during fabrication of grating structures on a waveguide comprising a high refractive index material, such as, for example $LiNbO_3$ is greater than about 30 degrees Celsius, then the risk of cracking of the waveguide substrate (e.g., wafer) increases. Cracking of the waveguide substrate (e.g., wafer) can degrade the surfaces of the waveguide. In some cases, for example, debris from the cracking can contaminate the surface of the waveguide. In some embodiments, it may be desirable to reduce the mechanical stress/strain on the waveguide during the handling and placement of the waveguide on a chuck prior to the deposition of the patternable material. Chuck designs including but not limited to cavity chucks, grounded chucks and/or chucks that are configured to reduce surface charge build-up on the surfaces of the waveguide can be advantageously employed. For example, a non-contact imprint chuck, such as, for example, a cavity chuck can be employed to reduce mechanical stress on the waveguide and/or to reduce or avoid scratching the surface of the waveguide. As another example, a chuck having a compliant chucking design can be used to support the waveguide during the deposition of the polymer. A compliant chuck design can advantageously transfer the load during contact based imprinting from the imprint template towards the chuck system instead of transferring that load to the waveguide. Another example of reducing charge build-up on the surfaces of the waveguide before the deposition of the patternable material can include reducing the mechanical stress generated during curing of the polymer (e.g., UV curing or thermal curing) in contact based imprint lithography. This can be accomplished by releasing mechanical constraint on the waveguide from the chuck (e.g. releasing the vacuum hold on the waveguide) during curing and then reapplying it after the patternable material is cured for other processes, such as, for example, separation of the template. Accordingly, in various implementations, charge build-up may be reduced by releasing mechanical pressure on or applied to the waveguide.

Not all high refractive index material that exhibit piezoelectric, ferroelectric and/or pyroelectric behavior suffer from the problem of surface charge build-up discussed above. For example, volumes of patternable material can be dispensed using jet-deposition technology on a surface of a waveguide comprising Silicon Carbide, Z-cut, X-Cut or Y-cut $LiNbO_3$ without the risk of undesired spreading of the patternable material or merging of adjacent volumes. Accordingly, it may not be necessary to provide the surfaces of such waveguides with additional layers, coatings, films (for example, conductive layer such as metal or conductive oxide, etc.) before dispensing the patternable material using jet-deposition technology. In such waveguides, it may also not be necessary to dissipate the surface charges using the various techniques described above before dispensing the patternable material using jet-deposition technology. Nevertheless, in various implementations, it may be advantageous to dispose an intermediate layer of material on the surface of the waveguide such as an adhesion promoting material to promote adhesion or one or more layers to make the surface scratch resistant and/or less reflective, for example. An intermediate adhesion promoting material can comprise SiC having a refractive index between about 2.6 and 3.0, $TiO_2$ having a refractive index of about 2.3, or silicon dioxide having a refractive index of about 1.45. In some implementations, the intermediate functional layer can be configured to have high surface energy, which can introduce desirable spreading of the material (e.g., polymer) when deposited using jet-deposition technology. In some implementations, the spreading behavior of the dispensed patternable material can be used to enhance rapid controlled pre-spread of the patternable material (e.g. resist solution) for nano-scale patterning. In some embodiments, the patternable material can be configured to not spread over surface of the adhesion promoting layer. This characteristic can be advantageous to avoid or reduce evaporation of the patternable material during the patterning process. Accordingly, for example, in various embodiments, the adhesion promoting material or other intermediate layer can have certain functional groups that make the layer of adhesion promoting material or other intermediate layer hydrophobic such that the dispensed patternable material beads up or hydrophilic such that dispensed patternable material spreads. In this manner, the surface energy of the adhesion promoting layer or other intermediate layer can be tailored to control the amount of drop spreading. The adhesion promoting layer or other intermediate layer can act as a site for bonding to cured polymer and/or un-cured polymers. In some embodiments, the adhesion promoting layer or other intermediate layer can be disposed over the waveguides comprising higher refractive index materials by spin-coating, micro-gravure, dip-coating, or atomization (spraying) followed by a drying step (e.g., heat assisted drying). Other deposition methods can be used. In some embodiments, the adhesion promoting layer or other intermediate layer can be deposited over the waveguide comprising higher refractive index materials by vapor deposition using an inert carrier gas such as nitrogen ($N_2$), argon (Ar), Helium (He), etc. In some embodiments, the vapor deposition can be carried out in the presence of water, which can promote cross-linking between the adhesion promoting layer and the waveguide comprising the high refractive index material. The layer of the adhesion promoting material or other intermediate layer can have a thickness less than or equal to 10 nm in some implementations. For example, the thickness of the layer of the adhesion promoting material or other intermediate layer can be greater than or equal to about 0.5 nm and less than or equal to about 1 nm, greater than or equal to 0.5 nm and less than or equal to 1.5 nm, greater than or equal to 1.0 nm and less than or equal to 3.0 nm, greater than or equal to 1.8 nm and less than or equal to 4.0 nm, greater than or equal to 3.0 nm and less than or equal to 5.0 nm less, greater than or equal to 4.0 nm and less than or equal to 6.0 nm, greater than or equal to 5.0 nm and less than or equal to 7.5 nm, greater than or equal to 7.5 nm and less than or equal to 10.0 nm, greater than or equal to 10 nm and less than or equal to 20.0 nm, greater than or equal to 20 nm and less than or equal to 40.0 nm, or any value in any range/sub-range defined by these values.

Waveguides comprising high refractive index materials (e.g., refractive index greater than about 1.8) comprising patterned surfaces can be used to provide display devices with high field of view as compared to patterned waveguides comprising glass or a material having a refractive index less than 1.8 (e.g., sapphire ($Al_2O_3$) having a refractive index of about 1.76). For example, such waveguides can be included in an eyepiece of a head mounted display to direct light into the eye to form images therein. Moreover, a single patterned waveguide comprising a high refractive index material (e.g., refractive index greater than about 1.8) can be used to in-couple two or more (e.g. two or three) different colors or wavelengths of light (e.g., green light and blue light) output from an optical source (e.g., a projection device) and project the two or more (e.g. two or three) different colors or wavelengths of light towards a viewer.

FIG. 10D shows an implementation of a waveguide 1001 comprising a high refractive index material, such as, for example, $LiNbO_3$ fabricated using the various methods discussed above. A patterned layer 1005 is disposed over a surface of the waveguide 1001. The patterned layer 1005 can comprise a patternable material that can be patterned by contact imprint lithography, optical lithography or other lithographic methods. For example, the patterned layer 1005 can comprise a polymer, such as, for example, a resist or a photoresist. The patterned layer 1005 can comprise a material having a refractive index less than the refractive index of the waveguide 1001. For example, the patterned layer 1005 can have a refractive index less than 1.8 (e.g., a refractive index between about 1.2-1.7). The patterned layer 1005 can comprise a plurality of diffractive features 1007. The thickness of the patterned layer 1005 can be less than 20 nm in some implementations. The plurality of the diffractive features 1007 can be configured to diffract both blue and green light through the waveguide 1001. In some such embodiments, a second waveguide comprising a high refractive index material with a second patterned layer comprising a plurality of diffractive features configured to diffract red light can be used to project a red image out of the second waveguide. In some embodiments, the plurality of the diffractive features 1007 can be configured diffract red, green and blue light such that virtual red, green and blue images of an object can be projected out of the waveguide 1001.

II. Direct Patterning of Waveguides with High Refractive Index Material

Another method of fabricating patterned surfaces on a waveguide comprising high refractive index material (e.g., SiC, $LiNbO_3$ or other optically transparent materials having a refractive index greater than or equal to 1.8) can comprise directly patterning one or more surfaces of the waveguide comprising high refractive index material. Directly patterning the one or more surfaces of the waveguide comprising high refractive index material can be accomplished by using etching technology, such as, for example using dry reactive ion etching (RIE), inductively coupled plasma (ICP) etching, or Ion Beam Etching.

Direct patterning of the one or more surfaces of the waveguide comprising high refractive index material comprises disposing an etch mask having a pattern over the surface of the waveguide to be patterned. The pattern of the etch mask can be a positive pattern that corresponds to the pattern that is desired to be etched on the surface of the waveguide or a negative pattern that corresponds to a pattern that is opposite the pattern that is desired to be etched on the surface of the waveguide. Using an appropriate etching technology and an appropriate etch chemistry, the surface of the waveguide can be etched through the etch mask.

In some embodiments, the patterned polymer disposed over the surface of the waveguide using optical lithography or contact imprint lithography described above can be used as an etch mask. The pattern of the patterned polymer is transferred onto the surface of the waveguide substrate using different etching processes (e.g., dry etching). FIGS. 11A-11D illustrate different methods of directly patterning a surface of a waveguide comprising a high refractive index material using an etch mask as discussed above.

Figure 11A:
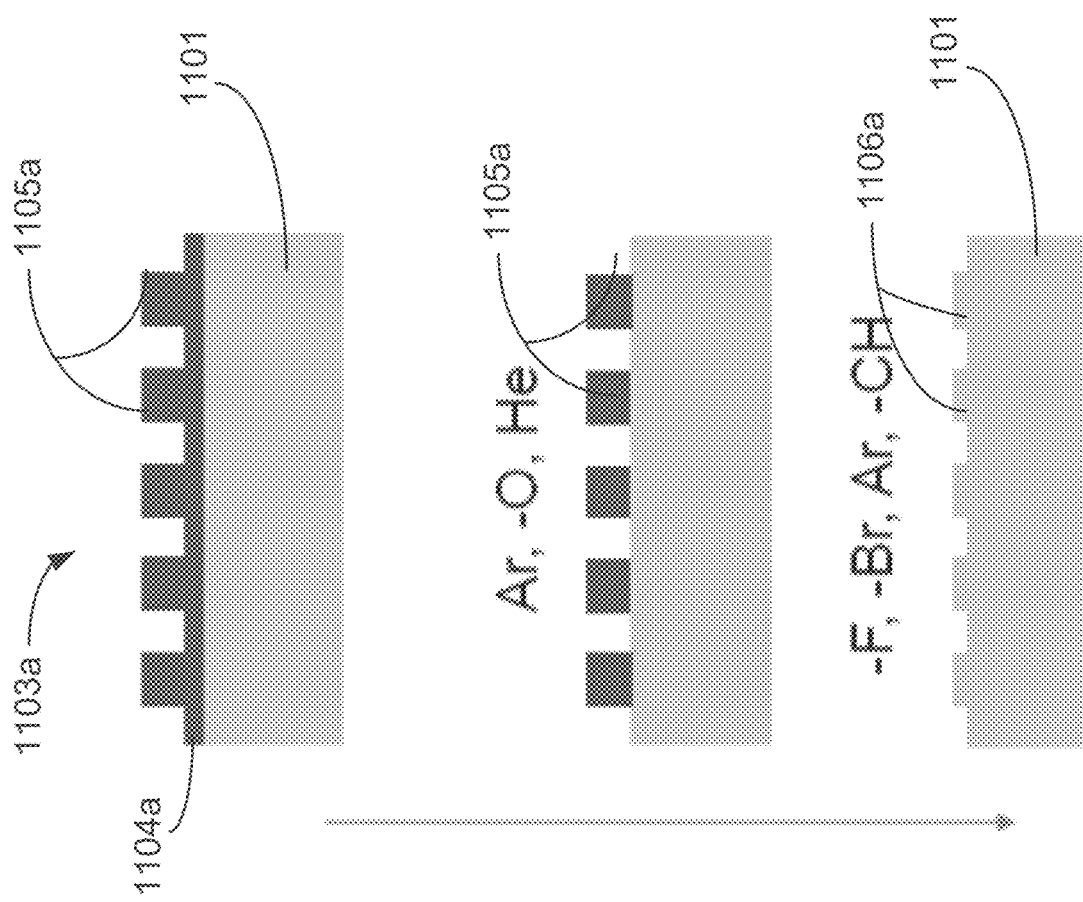
FIG. 11A is an example method of directly patterning a waveguide including $LiNbO_3$ using an etch mask.

FIG. 11A illustrates a method of directly patterning a waveguide 1101 comprising, for example, $LiNbO_3$ using an etch mask 1103a. The etch mask 1103a can comprise a patterned patternable material (e.g., a polymer acrylate based resist). For example, the etch mask 1103a can comprise the patterned layer 1005 described above. In such embodiments, the etch mask 1103a can comprise a polymer or a resist material. For example, the etch mask 1103a can comprise a polymer acrylate based resist. The etch mask 1103a has a base 1104a having a height and a plurality of features 1105a extending above the base 1104a. In various embodiments, the height of the base 1104a can be between about 5 nm~60 nm although different thicknesses outside this range can be used. The waveguide 1101 comprising $LiNbO_3$ and the etch mask 1103a can be etched using a dry etch or ICP using one or more of the following gases: $CBrF_3$, HBr, $CHF_3$, $CF_4$, $C_4F_8$, $CH_4$, $SF_6$, He, $H_2$, Ar, $O_2$. The etching conditions (e.g., etching time and other etching parameters) can be controlled such that the base 1104a of the etch mask is completely etched away exposing portions of the waveguide 1101 comprising $LiNbO_3$. Although, the height of the plurality of features 1105a of the etch mask 1103b from the surface of the waveguide 1101 on which they are disposed is reduced, the plurality of features 1105a are retained. A second etch using a F, Br, Ar, CH chemistry is used to etch through the exposed portions of the waveguide 1101 comprising $LiNbO_3$ and the remaining portions of the plurality of features 1105a. If the remaining portions of the plurality of features 1105a comprise polymer acrylate based resist, then they can be etched at a rate that is about 3 times the rate at which the exposed portions of the waveguide 1101 are etched by the second etch process. Accordingly, the height of the plurality of features 1106a fabricated on the surface of the waveguide 1101 can be small. In embodiments of display devices comprising the waveguide 1101 in which the plurality of features 1106a formed in the waveguide 1101 are configured as in-coupling optical elements, out-coupling optical elements or light distributing elements, the efficiency of light in-coupling, light out-coupling and/or light distribution may be reduced if the height of the plurality of features 1106a is small. To increase the height of the plurality of features 1106a the etch mask can comprise a material having a different composition than 'Polymer Resist: $LiNbO_3$' which can etch at a rate that is comparable to the rate at which the material of waveguide 1101 etches. For example, in some embodiments, the etch mask 1103a can comprise a resist comprising some silicon (Si), such as, for example, between about 1% and about 25% by weight of silicon. Addition of silicon to the resist can decrease the rate of etching of the etch mask 1103a and increase etch selectivity as a result of decreasing the rate of etching. For example, addition of silicon in certain portions of the resist can decrease the rate of etching in those portions of the resist. Accordingly, control of the etch depth can be improved in those portions of the resist. Various physical and chemical components of a RIE etch can be changed to alter the etch rate and increase or decrease etch selectivity in various implementations. Similarly, the etch rate of the etch mask 1103a may depend on the etch chemistry. Etch chemistry that decreased the etch rate of the etch mask in comparison to the waveguide may be used to slow the etch rate of the mask while not slowing the etch rate of the waveguide or not slowing the etch rate of the waveguide as much. In some embodiments, the height of the plurality of features 1106a can depend on the height of the pattern of the etch mask 1103a. Accordingly, in various embodiments, the height of the plurality of features 1106a in the waveguide can be tailored by selecting the height of the pattern of the etch mask 1103a, the composition of the polymer and/or the etch chemistry.

FIG. 11B illustrates a method of directly patterning a waveguide 1101 comprising LiNbO$_3$ using an etch mask 1103b. The etch mask 1103b can comprise an imprint resist comprising an amount of silicon. As discussed above, addition of silicon into the patternable material can reduce the etch rate of the etch mask 1103b and increase etch selectivity. A general class of imprint resists comprising silicon are described in U.S. Pat. No. 7,282,550, which is incorporated by reference herein in its entirety. The composition of the etch mask 1103b can be similar to the compositions 1, 2, 3, 4, 5, 6, 7, 8 described in U.S. Pat. No. 7,282,550 which is incorporated by reference herein in its entirety. The etch mask 1103b has a base 1104b and a plurality of features 1105b extending above the base 1104b. The organo-silicon bonds of the imprint resist comprising silicon can be converted to form an inorganic SiO$_x$ mask when exposed to oxygen in RIE etching process. The waveguide 1101 comprising LiNbO$_3$ and the etch mask 1103b can be etched using a first etch process based on a F, CH, Ar, O chemistry that completely etches the base 1104b of the etch mask 1103b and exposes portions of the waveguide 1101 comprising LiNbO$_3$. Although, the height of the plurality of features 1105b on the etch mask from the surface of the waveguide 1101 on which they are disposed is reduced, the plurality of features 1105b are retained. A second etch using a F, Br, Ar, CH chemistry is used to etch through the exposed portions of the waveguide 1101 comprising LiNbO$_3$ and the remaining portions of the plurality of features 1105b. The etch rate of the patternable material (e.g. resist) comprising silicon is lower than the etch rate of the patternable material (e.g. resist) alone. Similarly, the etch selectivity of the resist comprising silicon is greater than the etch selectivity of the resist alone. Accordingly, the height of the plurality of features 1106b fabricated on the surface of the waveguide 1101 shown in FIG. 11B can be greater than the height of the plurality of features 1106a fabricated on the surface of the waveguide 1101 shown in FIG. 11A. Likewise, by slowing down the etch rate of the patternable material comprising the etch mask 1105b to more closely match the etch rate of the waveguide 1101, the height of the plurality of features 1106b in the waveguide can be increased.

Figure 11C:
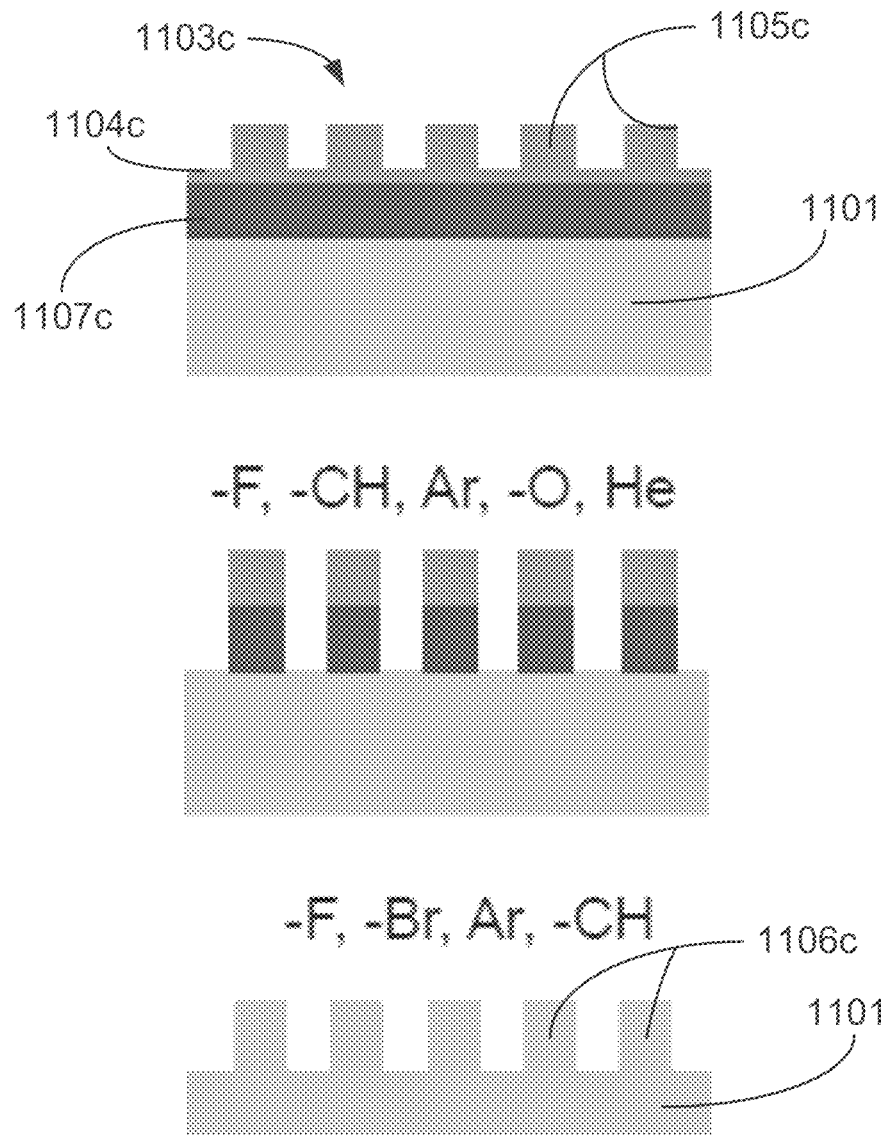
FIG. 11C is an example method of directly patterning a waveguide including $LiNbO_3$ using an etch mask.

FIG. 11C illustrates a method of directly patterning a waveguide 1101 comprising LiNbO$_3$ using an etch mask 1103c. The etch mask 1103c has a base 1104c having a height and a plurality of features 1105c extending above the base 1104c. The etch mask 1103c can be an imprint resist comprising an amount of silicon. The etch mask 1103c is disposed on transfer layer such as an organic transfer layer 1107c. The organic transfer layer 1107c can comprise materials, such as, for example, other acrylate or epoxy based polymers. The transfer layer (e.g., organic transfer layer) 1107c can be deposited over the surface of the waveguide 1101 using a deposition technique including but not limited to coating, spin-coating, spraying, or other pre-metered coating techniques such as slot-die, doctor blade, knife edge, screen, etc. The thickness of the transfer layer 1107c can be of the order of several tens to hundreds of nanometers (nm) in some implementations. The direct patterning process can comprise using fluorine chemistry to de-scum, then switching to Ar/O$_2$ to build a SiO$_x$ mask, then using a F, CH, Ar, O, He chemistry to etch through the etch mask 1103c and the transfer layer (e.g., organic transfer layer) 1107c to expose portions of the waveguide 1101. Portions of the etch mask 1103c and the transfer layer 1107c are still retained. Subsequently, the exposed portions of the waveguide 1101 and the remaining portions of the etch mask 1103c and the transfer layer (e.g., organic transfer layer) 1107c can be etched using a F, Br, Ar, CH chemistry to form the plurality of features 1106c. Without subscribing to any particular theory, there can be limit to the height of the resist layer that can be imprinted with contact imprint lithography without encountering defects such as nano-feature shear, line side-wall tilt, line kiss/merging, etc. In certain implementations, imprinting features having a height greater than a threshold height (also referred to as tall features) through contact based imprinting using an imprint template comprising features of similar or equal height can reduce pattern fidelity. Accordingly, the organic transfer layer 1107c can be used to create an etch mask comprising tall features through contact based imprinting using an imprint template comprising features having a height less than the height of the features of the etch mask. This can be useful to obtain a taller etch mask if required to overcome certain process constraints in imprint patterning.

Figure 11D:
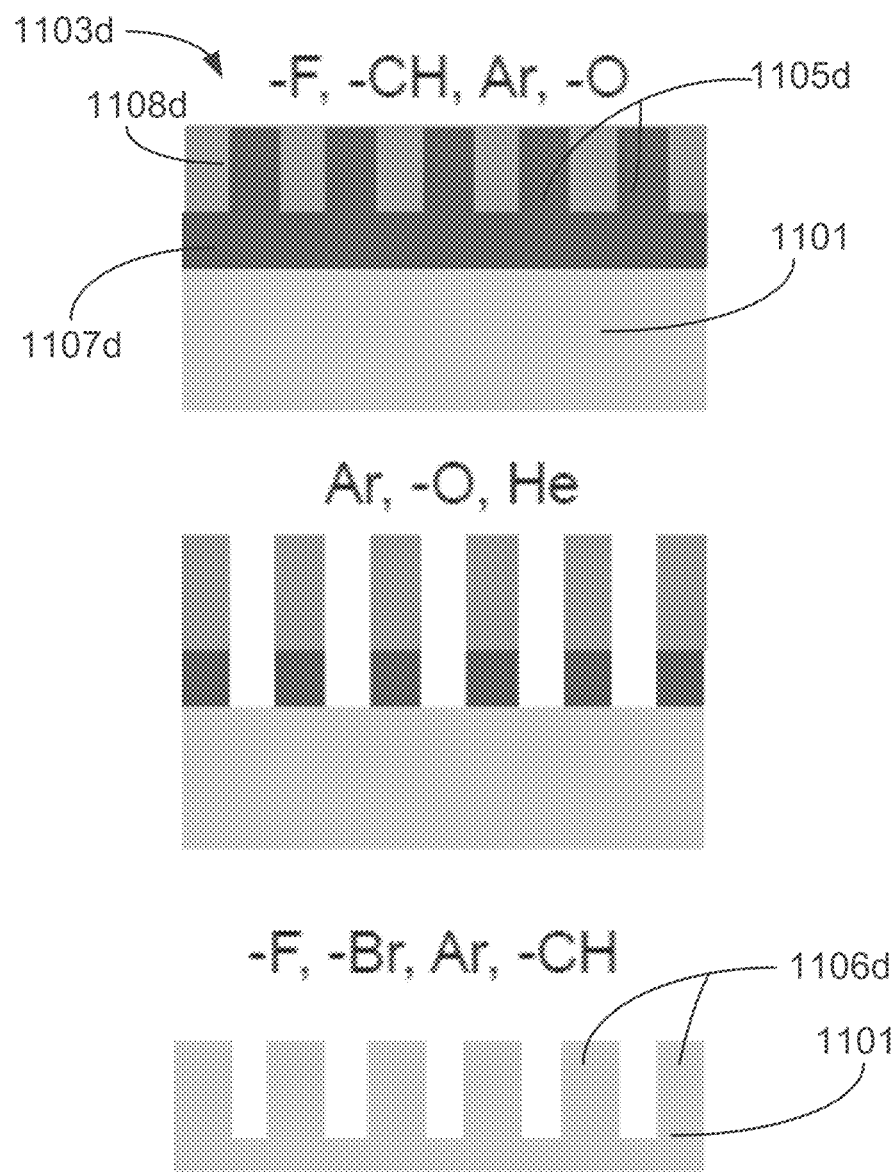
FIG. 11D illustrates a method of directly patterning a waveguide including $LiNbO_3$ using an etch mask.

FIG. 11D illustrates a method of directly patterning a waveguide 1101 comprising LiNbO$_3$ using an etch mask 1103d. The etch mask 1103d is formed by depositing a transfer layer (e.g., an organic transfer layer) 1107d on a surface of the waveguide 1101. As discussed above, the organic transfer layer 1107d can comprise materials, such as, for example, Transpin or BARC. The transfer layer 1107d can be deposited using jet-deposition technology or some other deposition technique including but not limited to coating, spin-coating, spraying, or other pre-metered coating techniques such as slot-die, doctor blade, knife edge, screen, etc. The thickness of the transfer layer 1107d can be of the order of several tens to hundreds of nanometers (nm) in some implementations. The transfer layer 1107d can be structurally and functionally similar to the transfer layer 1107c. The transfer layer 1107d can be patterned using lithography techniques, such as, for example, contact imprint lithography. The patterned transfer layer 1107d can comprise a plurality of features 1105d. An etch layer 1108d may be deposited over the imprinted transfer layer 1107d and planarized using a planarization template. The etch layer 1108d may comprise, for example, silicon, such as, SilSpin. This process can be referred to as Jet and Flash Imprint Lithography Reverse Tone (J-FIL-R). Portions of the layer 1108d that are over the plurality of features 1105d of the patterned transfer layer 1107d can be removed by etching to result in the structure shown at the top of FIG. 11D. For example, a —F, —CH, Ar, —O chemistry can be used to remove portions of the layer 1108d that are over the plurality of features 1105d of the patterned organic transfer layer 1107d. Subsequently, exposed portions of the transfer layer 1107d can be etched down to the waveguide. For example, an Ar/O$_2$ chemistry can be used to remove the transfer layer (e.g., organic transfer layer) while oxidizing the portions of the etch layer 1108d, which may comprise, for example, Si to form a SiO$_x$ etch mask. Subsequently, the exposed portions of the waveguide 1101 and the remaining portions of the oxidized SiO$_x$ mask and the organic transfer layer 1107d can be etched using a —F, —Br, Ar, —CH chemistry to form the plurality of features 1106d in the waveguide. This approach has the advantage of using compositions of organic resist for imprinting. Organic resist can be mechanically stronger than Si resist. Accordingly, defects in the imprinting process can be reduced.

III. Etching into a High Index Coating Disposed Over a Surface of Waveguide with High Refractive Index Material Various embodiments of waveguides comprising high refractive index materials can be patterned by depositing a layer of such a high refractive material (n>1.8) with low absorption coefficient (k<0.001) having a high refractive index over a surface of the waveguide, depositing a patternable layer (e.g., resist layer) over the layer of dielectric material, patterning the patternable layer (e.g. resist layer) and etching the layer of deposited material having a high refractive index to obtain a patterned layer of dielectric material. In various embodiments, the layer of deposited material high refractive index material can comprise SiC, TiO$_2$, ZrO$_2$ or Si$_3$N$_4$. In some embodiments, the refractive index of the deposited material can be substantially similar to the refractive index of the material of the waveguide. For example, in some implementations, a difference between the refractive index of the deposited material and the material of the waveguide can be less than about 20%. However, in some embodiments, the difference between the refractive index of the deposited material and the material of the waveguide can be greater than or equal to about 20%. In some embodiments, the refractive index of the dielectric material can be greater than the refractive index of the material of the waveguide. The deposited material having high index refractive index can be chosen based on the desired height/depth of the features to be etched and the etch chemistry used for etching. For example, a layer of TiO$_2$ etches faster as compared to the LiNbO$_3$ for certain etch chemistries. Thus, if the waveguide comprises LiNbO$_3$, for those etch chemistries that etch TiO$_2$ faster than LiNbO$_3$, the waveguide surface can act as an etch stop while etching the TiO$_2$. The resultant product may be a waveguide with diffractive features comprising dielectric or dielectric part of waveguide material.

IV. Use of Multiple Masking Layers to Etch into the Waveguide

Various embodiments of waveguides comprising high refractive index materials such as, for example, LiNbO$_3$, LiTaO$_3$, or SiC can be patterned by using multiple masks.

One or more of the multiple masks can be etched with an etch chemistry that is different from the etch chemistry for etching the material of the waveguide. An example of a method of patterning a waveguide comprising high refractive index materials such as, for example, LiNbO$_3$, LiTaO$_3$, or SiC comprises disposing a layer of a material that can be etched with an etch chemistry that is different from the etch chemistry that etches the material of the waveguide. For example, if the waveguide comprises TiO$_2$, then a layer comprising Chromium (Cr) or Nickel (Ni) is deposited over the surface of the waveguide that is to be etched. The layer comprising Chromium (Cr) or Nickel (Ni) can be deposited using deposition techniques, such as, for example, sputtering or evaporation. In some embodiments, the layer comprising Chromium (Cr) or Nickel (Ni) can be oxidized under an accelerated oxidation process post deposition of the layer comprising Chromium (Cr) or Nickel (Ni) under low pressure plasma conditions in an oxygen rich environment with or without the use of high temperature. The layer comprising Chromium (Cr), Nickel (Ni) or their oxides Cr$_2$O$_3$, NiO can be etched with Chlorine based chemistry while the waveguide comprising TiO$_2$ can be etched with Fluorine based chemistry. The layer comprising Chromium (Cr), Nickel (Ni) or their oxides Cr$_2$O$_3$, NiO can be patterned to form a first etch mask. The portions of the waveguide comprising TiO$_2$ that are not covered by the first etch mask can be etched using Fluorine based chemistry. After fabricating features in the surface of the waveguide, the first etch mask can be etched away using Chlorine based chemistry.

One method of patterning the layer comprising Chromium (Cr), Nickel (Ni) or their oxides, e.g., Cr$_2$O$_3$, NiO, comprises depositing a layer of silicon dioxide (SiO$_2$) over the layer comprising Chromium (Cr), Nickel (Ni) or their oxides, Cr$_2$O$_3$, NiO. A layer of a polymer (e.g., SiO$_2$: Resist Polymer) layer that can be imprinted is disposed over the layer of SiO$_2$ using various deposition techniques, such as, for example, jet-deposition technology or spin coating. The polymer layer can be imprinted using an imprint template or by photolithography. The SiO$_2$ layer can be etched using —F, —CH, Ar and O chemistry to form the patterned SiO$_2$ layer. The layer comprising Chromium (Cr), Nickel (Ni) or their oxides is then etched with a —Cl, Ar, O chemistry to form the patterned layer comprising Chromium (Cr), Nickel (Ni) or their oxides.

Accordingly, the waveguide can be etched by depositing a first etch mask, which may comprise metal or oxidized metal. A second etch mask may be deposited over the layer of material comprising the first etch mask to pattern the first etch mask out of the layer of material used to form the first etch mask. The second etch mask may comprise an oxide such as SiO$_2$. A third etch mask, comprising possibly polymer, may be used to etch and pattern the second etch mask from a layer of material comprising the material of the second etch mask. Different etch chemistries may be employed to etch the different etch mask layers. More or less layers may also be used.

V. Graded Etch

Graded etching techniques can be useful to fabricate diffractive features with gradation in pitch of the diffractive features and/or height of the diffractive features across the surface of the waveguide. Gradation in pitch of the diffractive features and/or height of the diffractive features across the surface of the waveguide can be advantageous, for example, in increasing the uniformity and intensity of light output from the waveguide. For example, diffractive features in the region of the waveguide with higher light intensity can be made shorter to reduce diffraction efficiency while diffractive features in the region of the waveguide with lower light intensity can be made higher to increase diffraction efficiency. In this manner uniformity of light output from the waveguide can be increased while maintaining the intensity of light output. Several techniques of graded etching are described below.

A. Using a Graded Polymer Layer

One method of fabricating waveguides comprising features with varying height across the surface of the waveguide comprises disposing a sloped or a graded patternable layer comprising a patternable material (e.g., a polymer, a resist) over the surface of the waveguide which is imprinted with an imprint template having features with constant height. The patternable layer is deposited such that it is sloped with respect to the surface of the waveguide. The patternable layer can comprise a resist material that can be imprinted with an imprint template. The slope of the patternable layer can be configured to correspond to the desired gradation in the height of the features. For example, the patternable layer can be sloped such that the height of the patternable layer is greater in portions of the waveguide that is to be etched to a shallower (e.g., less deep) depth. Without any loss of generality, the height of the patternable layer corresponds to a distance from the surface of the waveguide to an exposed surface of the patternable layer opposite the waveguide surface. The sloped patternable layer can be configured to be used as a negative mask or a positive mask as discussed below with reference to FIGS. 12A, 12B-1, 12B-2 and 12C.

Jet-deposition technology implemented by an inkjet printing device can be used to deposit the sloped patternable layer. For example, the volume of the patternable layer dispensed from the print-head of the inkjet printing device can be varied across the surface of the waveguide. In various embodiments, the print-head of the inkjet printing device can be configured to dispense droplets having a size in a range between about 50 microns and about 150 microns. For example, the dispensed droplets can have a size between about 50 microns and about 60 microns, between about 55 microns and about 65 microns, between about 60 microns and about 70 microns, between about 65 microns and about 75 microns, between about 70 microns and about 80 microns, between about 75 microns and about 85 microns, between about 80 microns and about 90 microns, between about 85 microns and about 95 microns, between about 90 microns and about 100 microns, between about 100 microns and about 110 microns, between about 110 microns and about 120 microns, between about 120 microns and about 130 microns, between about 130 microns and about 140 microns, between about 140 microns and about 150 microns or any range between any of these values. The volume of the dispensed droplets can be varied as the print-head of the inkjet printing device is moved across the surface of the waveguide. For example, in some embodiments, the volume of patternable material (e.g., the volume of material in droplets based on the size and/or density of droplets) can be varied as the print-head of the inkjet printing device is moved across the surface of the to be patterned area of the waveguide to deposit or dispense a polymer patternable layer of varying volume. As discussed above, the sloped patternable layer is patterned by contacting with an imprint template having features with constant height. Accordingly, the height of the features of the patterned sloped patternable layer varies across the surface of the waveguide.

Two different methods of fabricating graded diffractive features on the surface of a waveguide using a patterned sloped patternable layer are described below. FIG. 12A illustrates an example embodiment of a patterned sloped patternable layer 1203 disposed on a surface of a waveguide 1201. The waveguide 1201 can comprise a high refractive index material, such as, for example, SiC, LiNbO$_3$, etc. The patterned sloped patternable layer comprises a sloped base 1204 and a plurality of features 1205. The distance between an exposed surface of the plurality of features 1205 and the surface of the waveguide 1201 varies across the surface of the waveguide. The variation in the distance 1209 between an exposed surface of the plurality of features 1205 and the surface of the waveguide 1201 can correspond to the slope of the sloped base 1204.

In the first method of fabricating a waveguide comprising graded features, the patterned patternable layer 1203 is used as a positive mask such that the height variation in the plurality of features 1205 is transferred to the surface of the waveguide 1201. The first method of fabricating a waveguide comprising graded features comprises a first step in which the sloped base layer 1204 is etched to expose the surface of the waveguide 1201 between the plurality of features 1205 as shown in FIG. 12B-1. In various embodiments, an etching process that etches only the material of the polymer layer 1203 without etching the material of the waveguide 1201 can be used to etch the sloped base layer 1204. Although, the height of the plurality of features 1205 shown in FIG. 12B-1 can be reduced during the process of etching the sloped base layer 1204, a portion of the plurality of features 1205 may be retained at least for most features. The first method of fabricating a waveguide comprising graded features comprises a second step in which the retained portion of the plurality of features 1205 as well as the exposed portions of the waveguide 1201 are etched to fabricate a waveguide comprising a plurality of features 1206 as shown in FIG. 12B-2. In this embodiment, the short grating features are formed as a result of over-etching. Over-etching refers to the etching of a grating feature after the etch mask (e.g., patterned patternable layer 1203) is fully etched away during the etch process. This leaves the grating feature over exposed to the etching material. The grating thus loses height and width as the etching process progresses, with increasing rounding of sidewalls and corners. Line width reduction and height reduction that results from over etching is advantageous to fabricate graded grating structures comprising grating features of different heights disposed on a sloped surface as shown in FIG. 12B-2. The patterned waveguide 1201 fabricated using the first method described above has a base 1207 and a sloped surface 1208 opposite the base. The sloped surface 1208 comprises the plurality of features 1206. The distance between the base 1207 and the exposed surface of the plurality of features 1206 varies across the surface of the waveguide as noted from FIG. 12B-2.

In the second method of fabricating a waveguide comprising graded features, the patterned patternable layer 1203 is used as a negative mask to form grooves with varying depth in the surface of the waveguide 1201. The second method comprises etching the sloped base layer 1204 and the plurality of features 1205 using an etching process that etches the material of the patternable layer 1203 and the material of the waveguide 1201 as shown in FIG. 12C. In the second method of fabrication, the depth to which the surface of the waveguide 1201 is etched varies with the variation of the height of the patternable layer 1203. For example, the depth to which the surface of the waveguide 1201 is etched is deeper in portions of the surface of the waveguide 1201 over which the height of the patternable layer is lower as shown in FIG. 12C. The patterned waveguide 1201 depicted in FIG. 12C comprises a base 1207 and a plurality of grooves 1210 wherein the depth 1211 of the plurality of grooves varies across the surface of the waveguide.

Although, the pitch of the plurality of features 1206 and the plurality of grooves 1210 is depicted as being constant or nearly constant in the embodiments of patterned waveguides illustrated in FIGS. 12B-2 and 12C, the pitch, as well as the height and the arrangement, of the diffractive features in the waveguide may vary in various embodiments of waveguides comprising graded patterns depending on the pattern used. The heights and arrangements may be different as well.

B. Using a Graded Imprint Template

Another method of fabricating waveguides comprising features with varying height across the surface of the waveguide comprises disposing a patternable layer having a constant height over the surface of the waveguide and imprinting the patternable layer with the constant height with an imprint template having sloped or graded imprint features. The imprint template with graded imprint features can be fabricated using lithography techniques. The patternable layer can comprise a resist material that can be imprinted with a graded imprint template, such as, for example, the graded imprint template 1320 illustrated in F. The graded imprint template 1320 comprises a plurality of grooves 1330 with varying depth 1330.

Figure 13A:
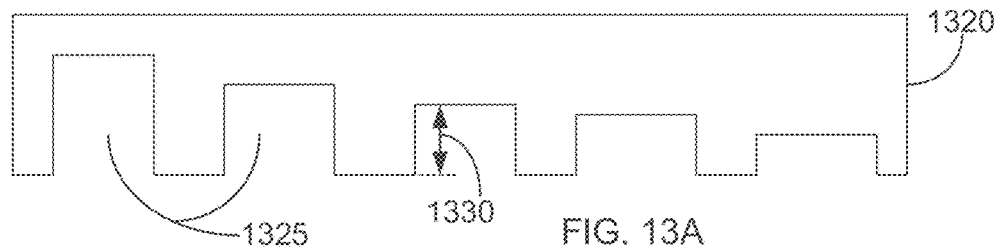
FIG. 13A is a grated imprint template for imprinting a resist material.
Figure 13B:
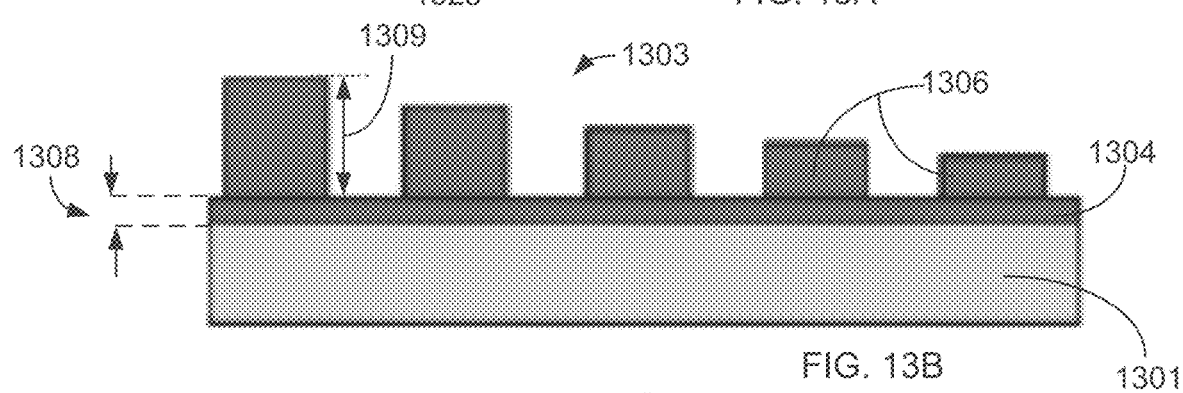
FIGS. 13B-13D illustrate various steps of fabricating a waveguide comprising features with varying heights.
Figure 13C:
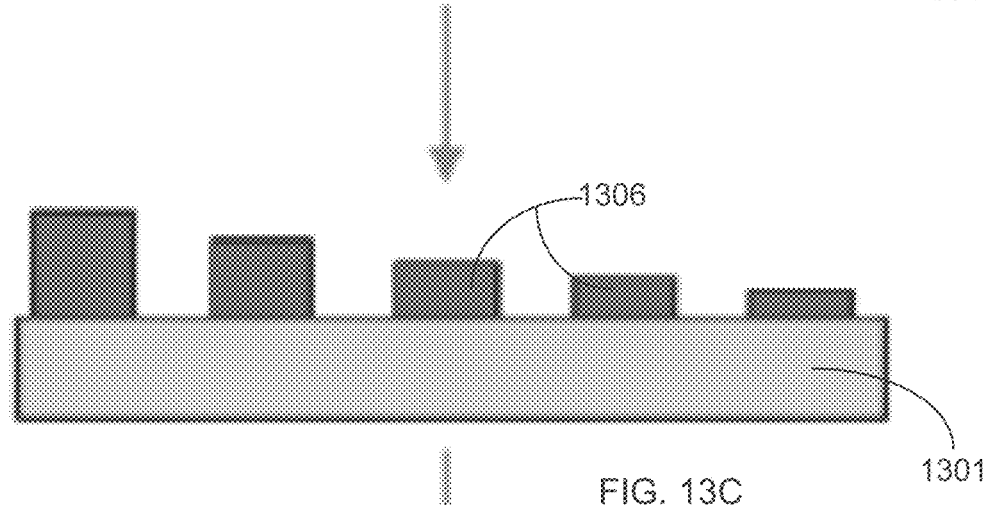
Figure 13D:
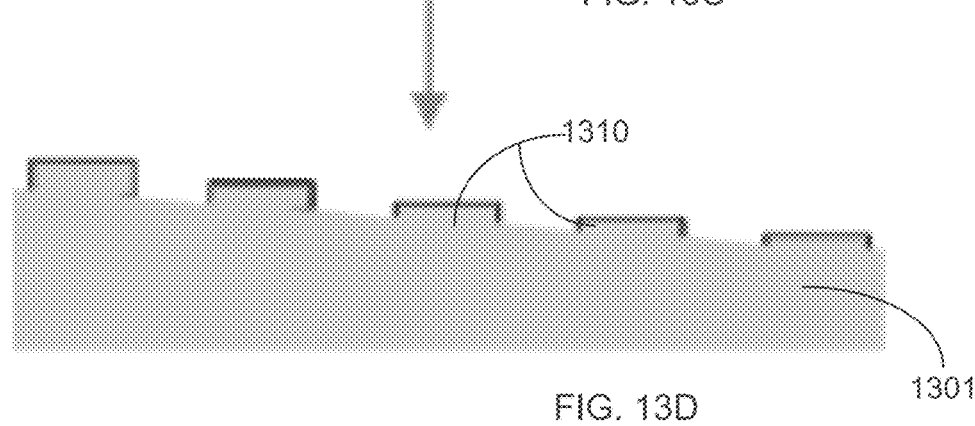

FIGS. 13B-13D depict the various steps of fabricating a waveguide comprising features with varying height. As discussed above, the waveguide 1301 can comprise an optically transmissive material with refractive index greater than 1.8. In some embodiments, the waveguide 1301 can comprise, for example, $SiO_2$, $Si_3N_4$, $ZrO_2$, $TiO_2$, etc. over a substrate comprising $LiTaO_3$, $LiNbO_3$, SiC, etc. The first step can comprise forming a patternable layer 1303 over the surface of a waveguide 1301. The height of the patternable layer 1303 can be constant across the surface of the waveguide 1301. The constant height patternable layer 1303 is imprinted with the graded imprint template 1320. The imprint template 1320 includes a plurality of trenches or grooves having varying depths. In the example shown, the trenches or grooves have progressively reducing depth. The resulting patterned patternable layer 1303 formed by imprinting a layer of patternable material with the imprint template 1320 is shown in FIG. 13B. The patterned patternable layer 1303 comprises a base 1304 and a plurality of features 1306 as a result being imprinted with the imprint template 1320. In the implementation shown in FIGS. 13A and 13B, the trenches or grooves in the imprint template 1320 having varying depth correspond to and produce the features 1306 in the patternable layer having varying height 1309. The height 1308 of the base 1304 from the surface of the waveguide 1301 is constant or nearly constant across the surface of the waveguide 1301. The height 1309 between the exposed surface of the plurality of features 1306 and the exposed surface of the base 1304 varies across the surface of the waveguide 1301.

In a first method the graded height pattern can be transferred to the surface of the waveguide 1301 by etching through the patternable layer 1303 and the surface of the waveguide 1301 to obtain a waveguide having a surface with a plurality of features 1310 with graded heights as shown in FIG. 13D. In some implementations, for example, the graded height pattern can be etched to the surface of the waveguide 1301 using RIE, ICP or Atmospheric Plasma (AP) etching process. In some implementations —F, Ar, O, —CH chemistry can be used to etch through the patternable layer 1303 and the surface of the waveguide 1301. Using this method, the graded height pattern can be transferred to the surface of the waveguide 1301 in a single step.

A second method of transferring the graded height pattern to the surface of the waveguide 1301 includes two steps. The first step includes etching the base 1304 of the patternable layer to expose portions of the surface of the waveguide 1301 as shown in FIG. 13C. In certain implementations, for example, the first step includes using RIE, ICP or Atmospheric Plasma (AP) etching process using Ar, O chemistry to etch the base 1304 of the patternable layer. The height 1309 of the plurality of the features 1306 may be reduced during the process of etching the base 1304. The second step includes etching through the remaining portions of the plurality of features 1306 and the surface of the waveguide 1301. The second step, for example, can include using RIE, ICP or Atmospheric Plasma (AP) etching process using F, Ar, O, CH chemistry to etch through the remaining portions of the plurality of features 1306 and the surface of the waveguide 1301. The etch depth in the surface of the waveguide 1301 can vary depending on the etching chemistry and the height of the feature size. For example, in various embodiments, the etch depth can be directly proportional to the height of the feature, such that the tallest imprint feature can produce the deepest etch depth and the smallest imprint height can produce the smallest etch depth, as shown in the FIG. 13D. The height of the shortest features can be further reduced due to over-etching. Although, the pitch of the plurality of features 1310 is depicted as being constant or nearly constant in the embodiment of patterned waveguide illustrated in FIG. 13D, the pitch, as well as the height, and arrangement of the features in the waveguide may vary in various embodiments of waveguides comprising graded pattern depending on the pattern.

C. Using a Graded Duty Cycle

Figure 14A:
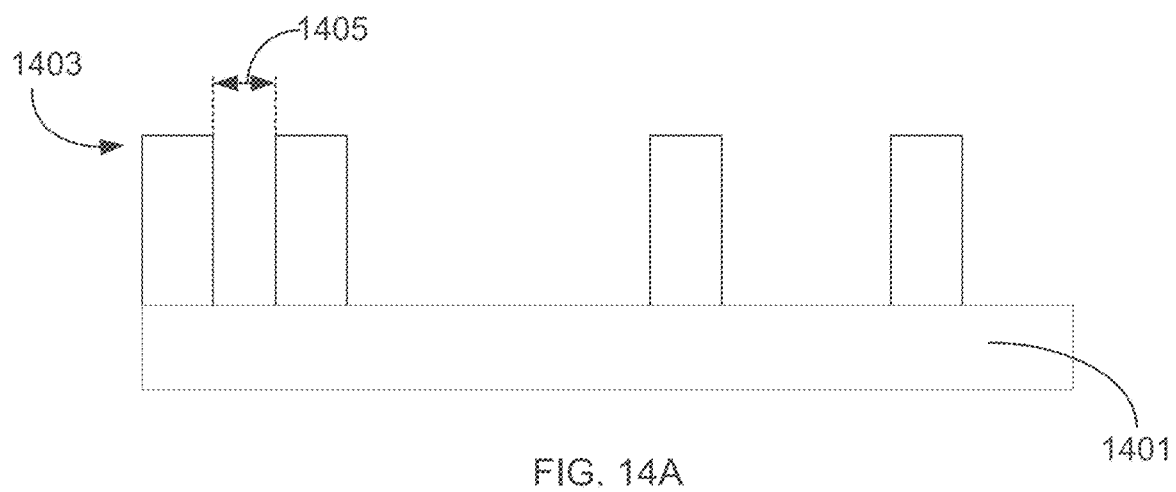
FIGS. 14A and 14B illustrate example polymer layers including features.
Figure 14B:
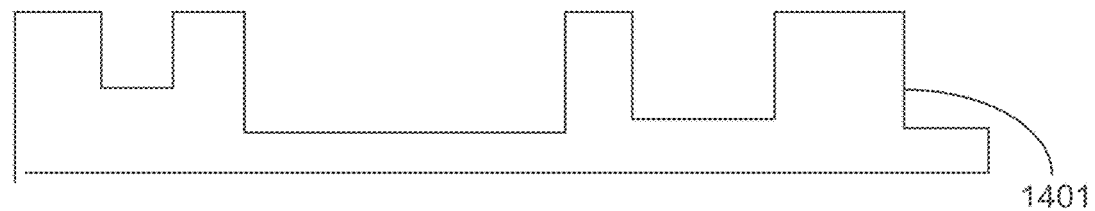

In various methods of etching surfaces of waveguides, the etch depth can depend on the area of the waveguide surface that is exposed to the etchant. Accordingly, a waveguide surface comprising a plurality of features with different heights can be obtained by varying the area of the waveguide surface that is exposed to the etchant. FIG. 14 illustrates a method of fabricating a waveguide with a graded height pattern. The method comprises depositing a patternable layer 1403 over a surface of a waveguide 1401. The waveguide can comprise a material with a refractive index greater than or equal to 1.8. The polymer layer 1403 can comprise a plurality of features with varying pitch such that a gap 1405 between consecutive features of the polymer layer 1403 vary across the surface of the waveguide as shown in FIG. 14A. Due to dependence of etch rate on the exposed surface area of the waveguide 1401, features having different heights will be etched in the surface of the waveguide 1401. For example, the height of the features formed in the portion of the surface of the waveguide 1401 that corresponds to the portion of the patternable layer 1403 with a smaller gap between consecutive features will be less than the height of the features formed in the portion of the surface of the waveguide 1401 that corresponds to the portion of the patternable layer 1403 with a larger gap between consecutive features as shown in FIG. 14B.

D. Using Different Compositions of Resist Material

Another method of fabricating waveguides with graded height patterns includes depositing at least two different compositions of patternable material (e.g., polymer, resist) at different portions of the surface of the waveguide. The at least two different compositions of patternable material have different etch rates when exposed to the same etchant. Accordingly, the different portions of the surface of the waveguide would have features of different sizes depending on the etching rate of the corresponding patternable material (e.g. resist) material. In this manner a waveguide comprising a plurality of features with different heights can be fabricated with a single etch. The jet deposition technology can be advantageous in dispensing different resist compositions over different portions of the substrate.

Figure 15A:
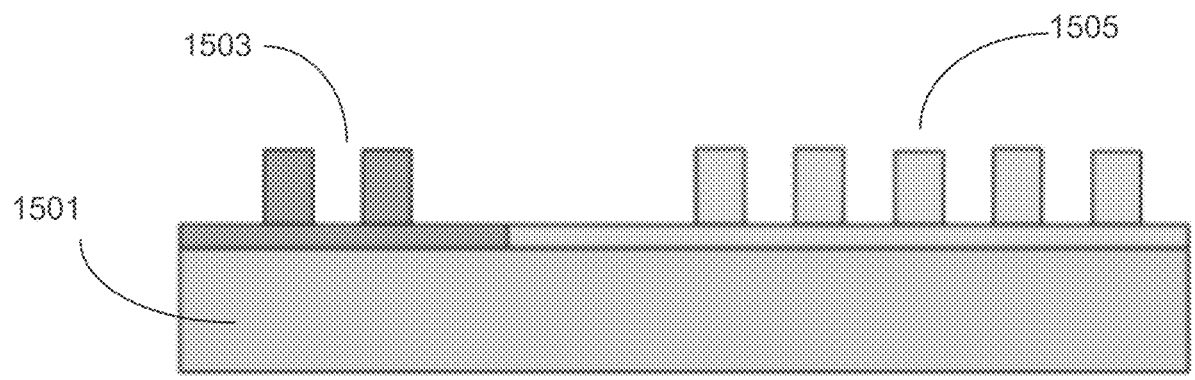
FIGS. 15A and 15B illustrate various steps in manufacturing a waveguide with a grated pattern.
Figure 15B:
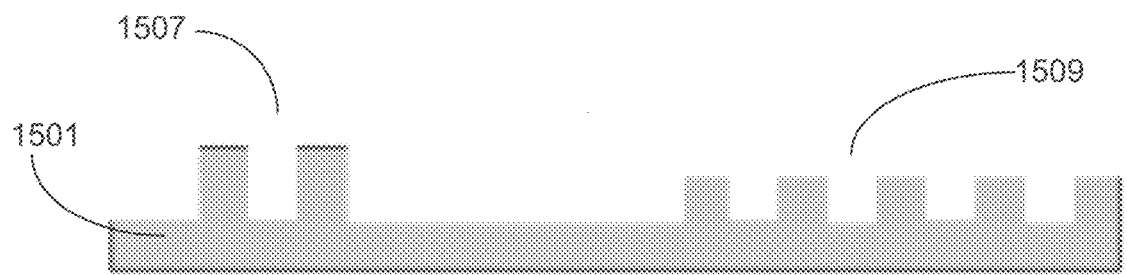

FIGS. 15A and 15B illustrate the various steps m manufacturing a waveguide with a graded pattern by depositing different compositions of patternable material in different regions of the waveguide. The first step includes providing a first patterned layer 1503 comprising a first composition of a patternable material (e.g., a first resist material, or a first polymer) on a first portion of a waveguide 1501 and providing a second patterned layer 1505 comprising a second composition of a patternable material (e.g., a second resist material, or a second polymer) on a second portion of the waveguide 1501 as shown in FIG. 15A. The first patterned layer 1503 can be provided by depositing (e.g., using jet deposition technology) the first composition of a patternable material on the first portion of the waveguide 1501. The second patterned layer 1505 can be provided by depositing (e.g., using jet deposition technology) the second composition of a patternable material on the second portion of the waveguide 1501. The thickness of the deposited layer of the first composition of a patternable material and the deposited layer of the second composition of a patternable material can be the same as shown in FIG. 15A. However, in some embodiments, the height of the deposited layer of the first composition of a patternable material and the deposited layer of the second composition of a patternable material can be different. The deposited layers of the first and the second compositions of a patternable material can be patterned using an imprint template. The imprint template can be configured to imprint the same pattern on the deposited layer of the first composition of a patternable material and the disposed layer of the second composition of a patternable material as shown in FIG. 15A. However, in other embodiments, the imprint template can be configured to imprint different imprint patterns on the deposited layer of the first composition of a patternable material and the deposited layer of the second composition of a patternable material. In various embodiments, the first composition of a patternable material and the second composition of a patternable material can comprise patternable material having different etching rates. The deposited layer of the first composition may etch slower and produce diffractive features in the waveguide 1501 having a greater height as a result while the deposited layer of the first composition may etch faster and produce diffractive features having a shorter height as a result. In various embodiments, the first composition of a patternable material and the second composition of a patternable material can have different percentages of Silicon (Si) by weight such that the etching rates of the first resist material and the second resist material is different in —F, Ar, —CH and O based chemistry. For example, the first composition of a patternable material and the second composition of a patternable material can be selected from a general class of imprint resists comprising silicon that are described in U.S. Pat. No. 7,282,550 which can be used to boost etch selectivity. U.S. Pat. No. 7,282,550 is incorporated by reference herein in its entirety. The composition of the first composition of a patternable material and the second composition of a patternable material can be similar to the compositions 1, 2, 3, 4, 5, 6, 7, 8 described in U.S. Pat. No. 7,282,550 which is incorporated by reference herein in its entirety. Accordingly, in some implementations a waveguide with comprising a graded pattern can be fabricated using a one-step etch recipe as shown in FIG. 15B. Other methods, however, may be employed.

E. Waveguides Comprising Multi-Layer Coatings

Various embodiments of waveguides described herein can be provided with multi-layer coatings that are patterned to have features with different heights, depths and/or pitch using the different etching, possibly graded etching, methods described above. In some implementations, the multi-layer coatings can include at least two layers comprising materials with different refractive indices. Embodiments of such waveguides are shown in FIGS. 16A-2, 16B-2a, 16B-2b, and 16C-2. The multi-layer coatings can advantageously reduce losses due to reflection and/or reduce visual artifacts. In some implementations, features of different heights and/or pitch can be useful in providing amplitude and/or phase modulation of light propagating within the waveguide by total internal reflection. Methods of fabricating such embodiments of waveguides are described below.

Figures 1, 16A:
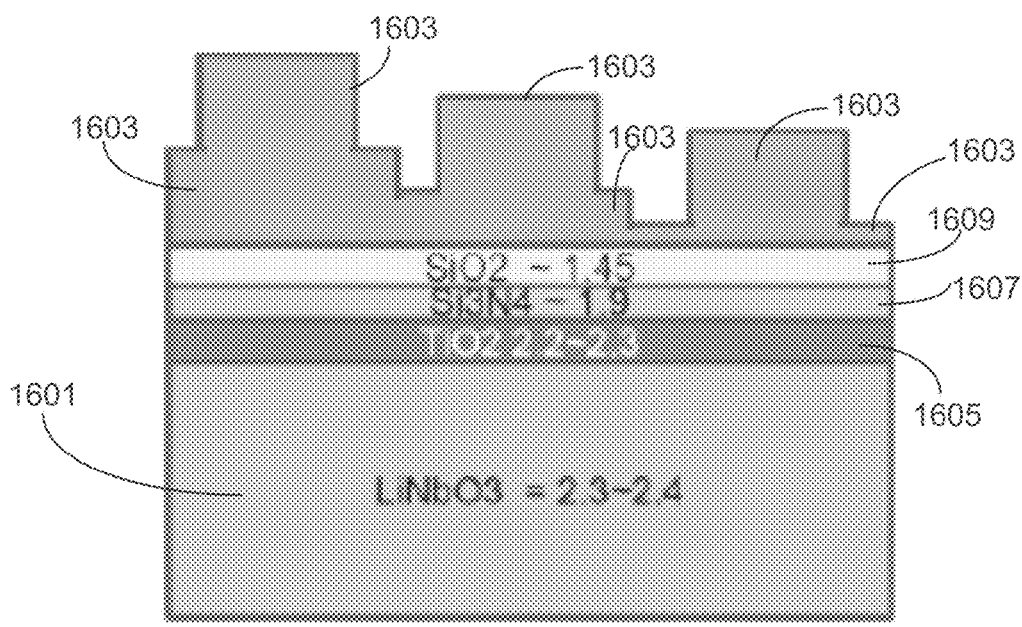
Figures 2, 16A:
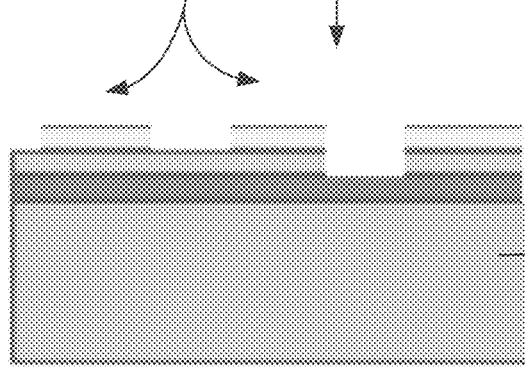

A first embodiment of a waveguide 1601 comprising a plurality of features 1610 is shown in FIG. 16A-2. The plurality of features 1610 comprise multiple layers of materials with different refractive indices. The embodiment shown in FIG. 16A-2 can be manufactured by providing a waveguide 1601 coated with a multi-layer coating and forming a patterned layer 1603 over the multi-layer coating as shown in FIG. 16A-1. The multi-layer coating can comprise a plurality of layers of 1605, 1607 and 1609 having different refractive indices. For example, as shown in FIG. 16A-1, the multi-layer coating can comprise a first layer 1605 closest to the waveguide, e.g., comprising $TiO_2$, having a refractive index between about 2.2 and about 2.3, a second layer 1607 middle layer, comprising, e.g., $Si_3N_4$, having a lower refractive index than the first layer, e.g., having a refractive index of about 1.9 and a third layer 1609 farthest from the waveguide, e.g., comprising $SiO_2$, having a refractive index lower than the second layer, e.g., having a refractive index of about 1.45. Accordingly, the index of refraction can be grades from high to low index values from the layer closest to the waveguide to the layer farthest from the waveguide. Accordingly, in some implementations, such a multi-layer coating can gradually match the refractive index of the waveguide 1601—which can be about 2.3-2.4 for $LiNbO_3$, to the refractive index of the ambient environment (e.g., air) to reduce optical losses for light incident on the waveguide 1601 from the ambient environment such as due to Fresnel reflection and/or for light propagating in the waveguide by total internal reflection. In such embodiments, the amplitude of light propagating via total internal reflection (TIR) can be modulated by the multi-layer coating. Additionally, the amount of world light passing through the waveguide can be increased in such embodiments. Furthermore, an amount of ghost reflections of the virtual light can also be reduced in such embodiments.

The patterned layer 1603 can be obtained by depositing a layer of a patternable material (e.g., polymer or resist) over the multi-layer coating using a variety of deposition techniques including but not limited to jet-deposition technology and patterning the depositing layer of patternable material (e.g. resist) using an imprint template or other lithographic methods. In some implementations, the height of the depositing layer of patternable material can vary across the surface of the multi-layer coating. The disposed layer of patternable material can be patterned with an imprint template comprising features with different heights, depths, pitches and/or arrangements to obtain a patterned layer 1603 comprising features with different heights, depths and/or pitch as shown in FIG. 16A-1. The patterned layer 1603 can be etched using a single-step or a multi-step etch techniques discussed above using, for example, F, Ar, O, CH chemistry. The result is shown in FIG. 16A-2. As illustrated, the tops of diffractive features formed in the waveguide are at the same height although the depths between the diffractive features varies. In this design, for example, the depth progressively increases. This effect results because the etch rate of the material in the top layer 1609 of the multilayer (e.g., $SiO_2$ in this example) has a sufficiently slower etch rate than the etch rate of the patternable material in the etch mask 1603. The patternable material in the etch mask 1603 is etched away prior to the top layer 1609 being etched away. The etch rate of material in one or more of the other layers, such as the lowest layer 1605 (e.g., comprising $TiO_2$) can also have a sufficiently slower etch rate than the etch rate of the patternable material in the etch mask 1603 such that in this cast the lower layer is not etched through to the waveguide which the etch mask 1603 is etched away.

Figures 2A, 16B:
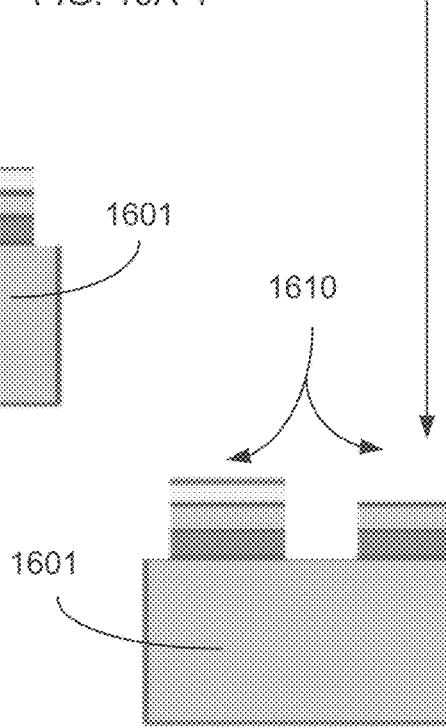
Figures 1, 16B:
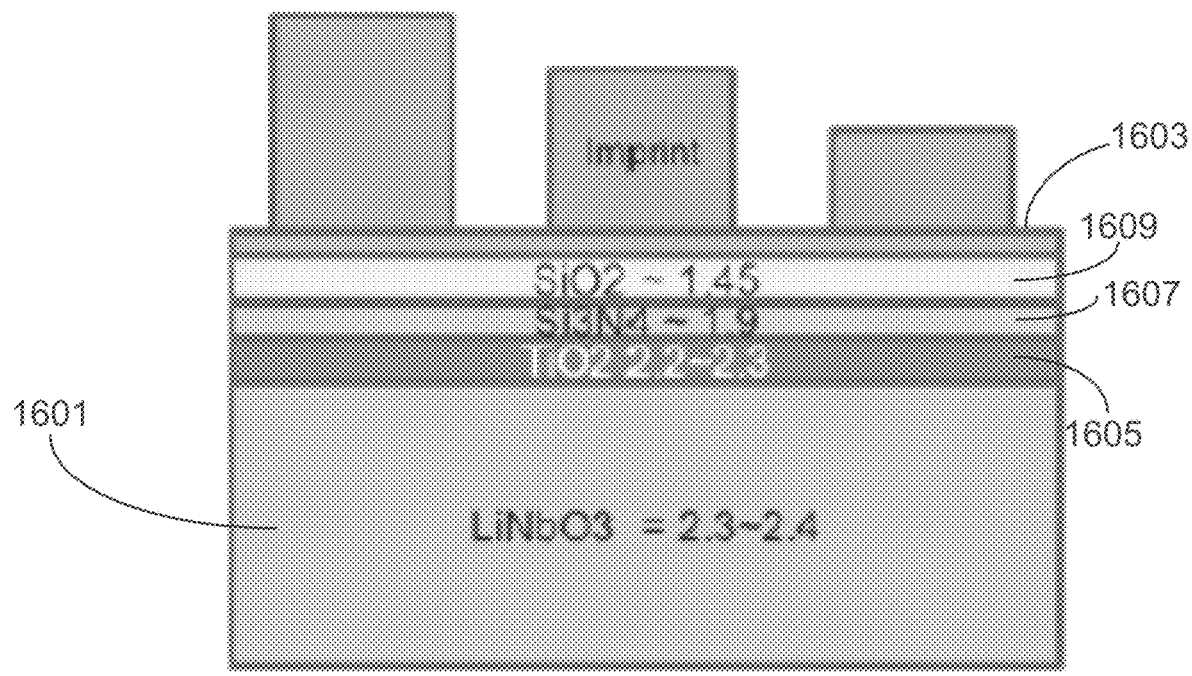
Figures 2, 16B:
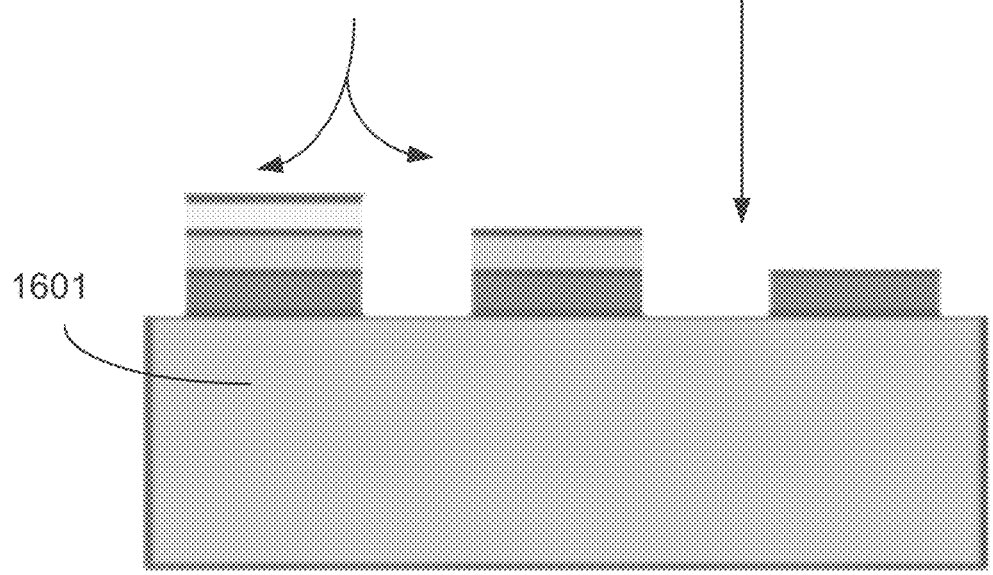

A second example embodiment of a waveguide 1601 comprising a plurality of features 1610 is shown in FIG. 16B-2a. Again, different features of plurality of features 1610 of FIG. 16B-2a have different material compositions. The plurality of diffractive feature 1610 are again formed from the multilayer comprising in this example three layers (lower, middle, and upper) 1605, 1607, 1609. In this design, however, the heights of the plurality of features 1610 of FIG. 16B-2a are different. This effect can be accomplished, for example, by having the etch rate of the patternable material in the etch mask 1603 be similar to the etch rate of the layers in the multilayer, such as for example, the top layer 1609 in the multilayer. As discussed above, Si in the patternable material can be used to provide a slower etch of the etch mask. Other approaches are possible. The waveguide shown in FIG. 16B-2b can also be fabricated by etching the patterned layer 1603 such shown in FIG. 16B-1. The etch mask 1603 shown in FIG. 16B-1 is different from the etch mask shown in FIG. 16A-1 in that the regions separating the features in the etch mask are flat (unlike the regions between the features in the etch mask shown in FIG. 16A-1, which have variation in height (e.g., steps) therein). Additionally, different regions separating the features in the etch mask 1603 shown in FIG. 16B-1 are at the same level. In contrast, for the etch mask 1603 shown in FIG. 16A-1, the regions separating the first and second (leftmost and middle) features are at different heights than the regions separating the second and third (middle and rightmost) features. In various implementations, the etch rate of the etch mask 1603 used for the design/method shown in FIGS. 16B-1 and 16B-2b can be similar to the etch rate of the layers 1605, 1607, 1609 in the multilayer.

Figures 1, 16C:
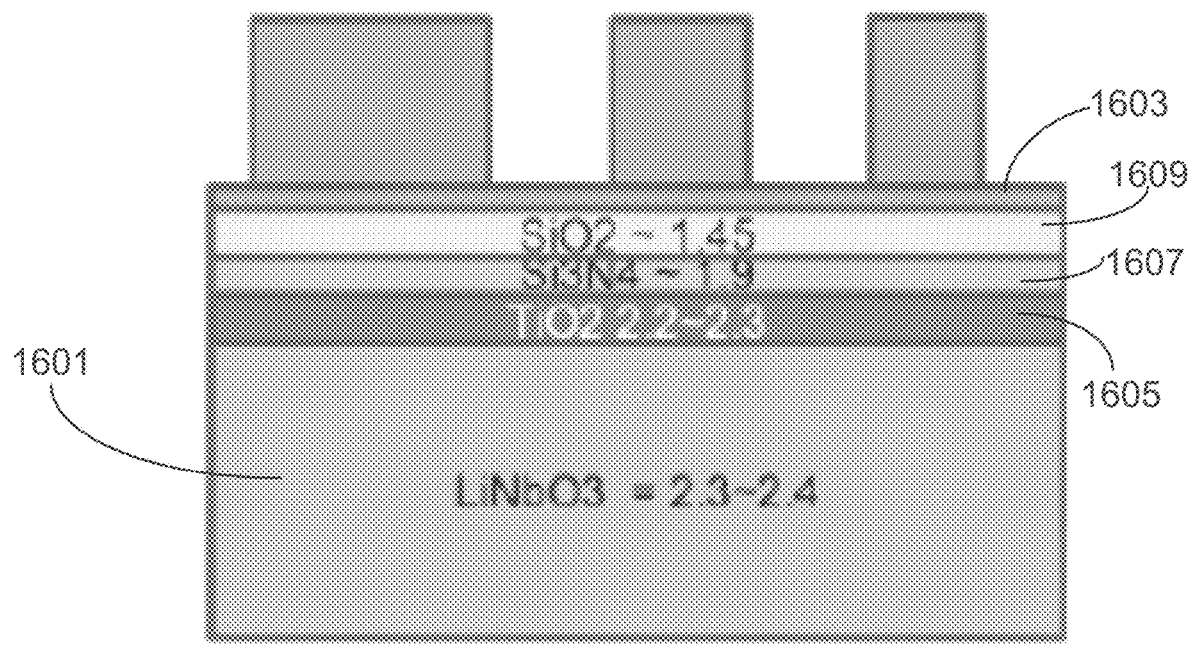
Figures 2, 16C:
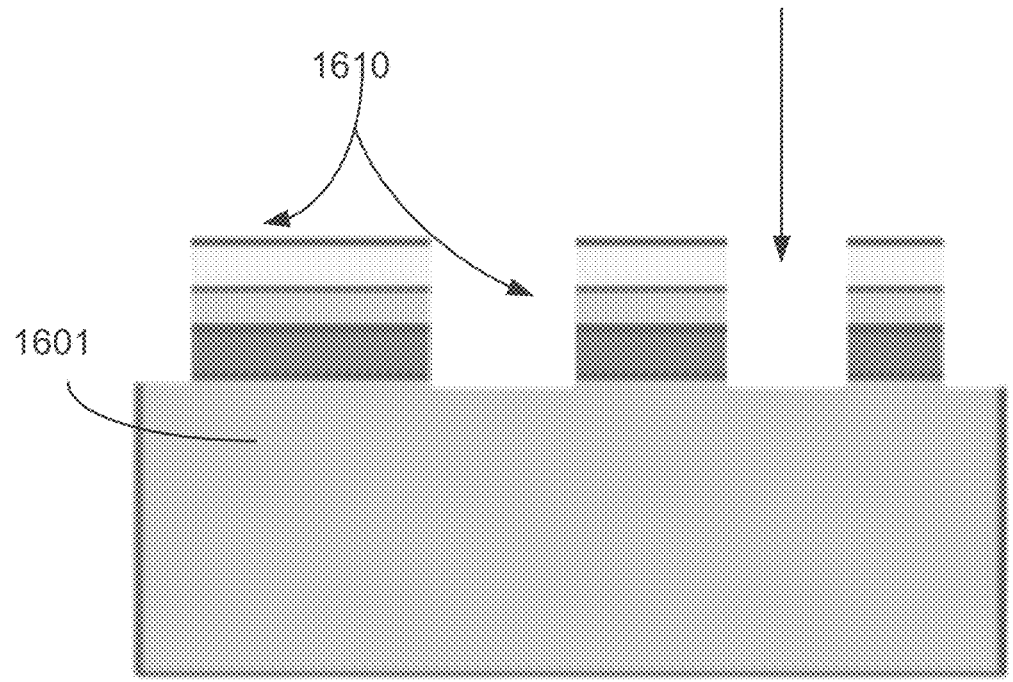

A third example embodiment of a waveguide 1601 comprising a plurality of features 1610 is shown in FIG. 16C-2. Different features of the plurality of features 1610 of FIG. 16C-2 have different widths. The embodiment of the waveguide shown in FIG. 16C-2 can be fabricated by etching the patterned layer 1603 shown in FIG. 16C-1.

Variations are possible. For example, although three layers are included in the multilayer, more or less layers may be employed in other designs. Similarly, different materials can be used.

VI. Depositing High Index Refractive Material Over a Patterned Resist Layer

Various embodiments of patterned layers comprising high refractive index materials a having refractive index greater than or equal to about 1.8, such as, for example, SiN, $ZrO_2$, $TiO_2$, or SiC, etc., can be fabricated by depositing high refractive index materials having a refractive index greater than or equal to about 1.8, such as, for example, $Si_3N_4$, $ZrO_2$, $TiO_2$, or SiC, etc. over a patterned layer having a refractive index less than about 1.8 via, for example, vapor deposition. Vapor deposition techniques can include physical vapor deposition (PVD) techniques and chemical vapor deposition techniques (CVD). Various PVD techniques can include but are not limited to sputtering, evaporation, glancing angle deposition. Various CVD techniques can include but are not limited to APPECVD, Low Pressure (LP) PECVD, High Density Plasma Chemical Vapor Deposition (HDPCVD) or ALD. The patterned layer having a refractive index less than about 1.8 can be obtained by depositing (e.g., using jet deposition technology) a patternable material (e.g., polymer or resist) having a refractive index less than about 1.8 over a substrate (e.g., a substrate comprising a material with refractive index greater than or equal to about 1.8). The deposited patternable material can subsequently be patterned, for example, with contact imprint lithography or other lithography methods. The pattern imprinted on the deposited patternable material can have different heights, and/or pitch as discussed above. Another layer having a higher refractive index, such as a refractive index equal to or greater than 1.8 can be deposited on the patternable material, possibly after the patternable material has been patterned.

Figure 17A:
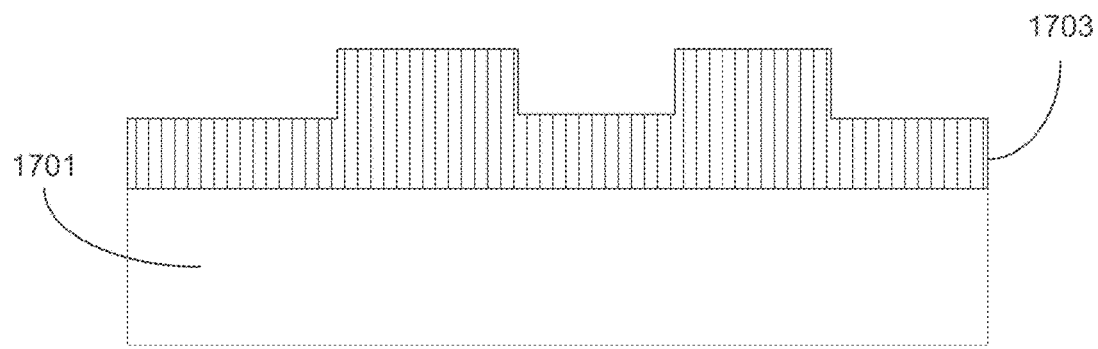
FIGS. 17A-17E illustrate various example methods of depositing a material having a specific refractive index.
Figure 17B:
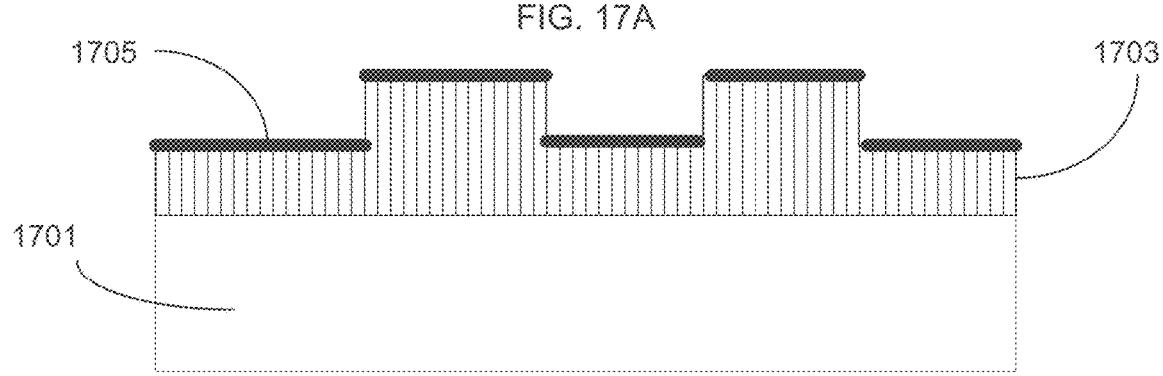
Figure 17C:
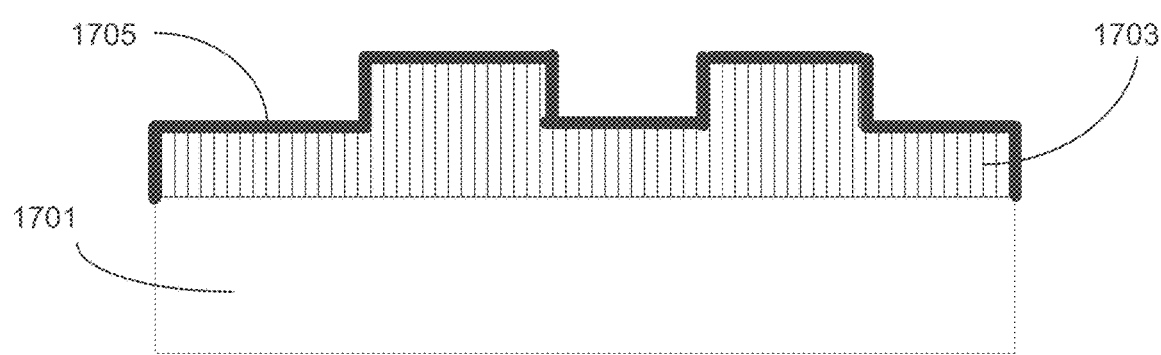

FIGS. 17A and 17B illustrate a method of depositing a material having a refractive index greater than or equal to about 1.8, such as, for example, $Si_3N_4$, $ZrO_2$, $TiO_2$, or SiC, etc., over a patterned layer having a refractive index less than about 1.8. Such deposition may be accomplished using PVD. A patterned layer 1703 having a refractive index less than about 1.8 is deposited over a waveguide 1701. The waveguide can comprise a material with high refractive index, such as, for example, $LiNbO_3$, SiC, $Si_3N_4$, etc. As discussed above, the patterned layer 1703 can be obtained by depositing a layer of patternable material over a surface of the waveguide 1701 (e.g., using jet deposition technology) and patterning the layer of patternable material via contact imprint lithography or other lithography techniques. As discussed above, the patterned layer 1703 can comprise features with uniform height, depth and/or pitch or features with different heights, depths and/or pitch. A layer 1705 comprising high refractive index material (e.g., refractive index greater than or equal to about 1.8), such as, for example, $TiO_2$, $ZrO_2$, can be deposited over the patterned resist layer 1703 as shown in FIG. 17B PVD techniques, such as, for example, evaporation using molecular electron beam, sputtering or glancing angle deposition, may be used for deposition. In various embodiments, the layer 1703 can comprise, for example, a standard green pitch pattern (350 nm~400 nm) or a standard red pitch pattern (400 nm~480 nm). In various embodiments, the layer 1703 can comprise a material having a refractive index lower than the refractive index of the waveguide 1701 and/or the refractive index of the deposited layer 1705. Without relying on any particular theory, PVD processes like electron beam evaporation is a directional process and the layer 1705 of high refractive index material is deposited primarily over the surfaces of the resist layer 1703 that are parallel to the surface of the waveguide 1701. Accordingly, deposition of the high refractive index material on the sidewalls of the plurality of features of the resist layer 1703 can be reduced and/or can be negligible or minimal as shown in FIG. 17B. In some implementations, other less directional deposition techniques may be employed. Sputtering, for example, can be used to deposit the layer 1705 of high refractive index material over all the exposed surfaces of the resist layer 1703 as shown in FIG. 17C. Accordingly, deposition processes that deposit primarily on horizontal surfaces and a negligible amount on vertical surfaces can be employed. For example, in various embodiments, the thickness of the deposited material on the horizontal surface can be between about 5 nm and about 100 nm. Alternatively, deposition processes that deposit non-negligible amounts on both the horizontal surfaces and vertical surfaces can be employed. In such embodiments, the thickness of the deposited material on the vertical and horizontal surface can be between about 5 nm and about 100 nm.

Figure 17D:
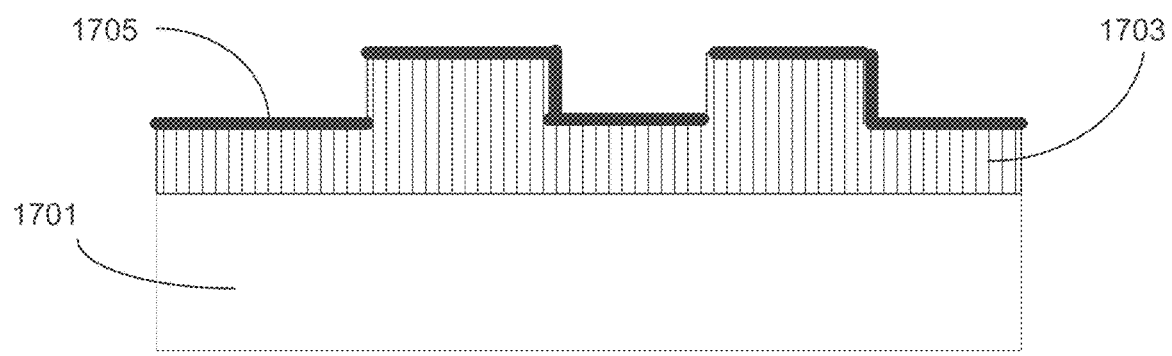
Figure 17E:
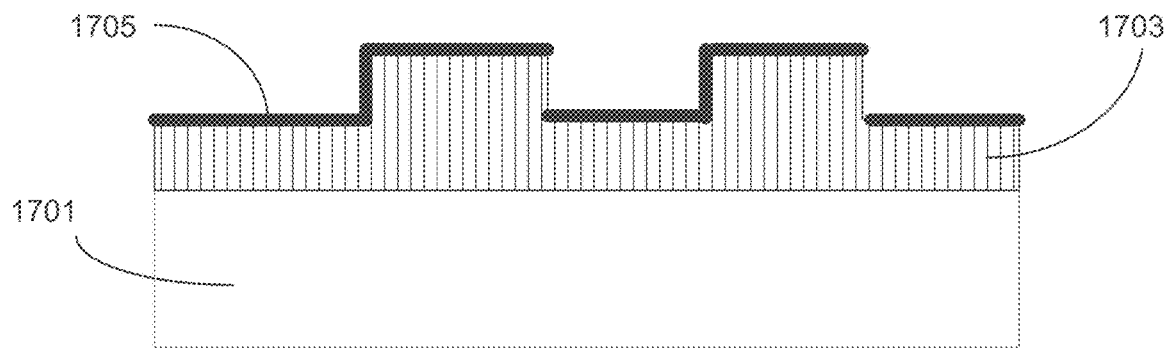

In various embodiments, the layer 1705 of high refractive index material can be deposited using glancing angle deposition. In such embodiments, the layer 1705 of high refractive index material is preferentially deposited on one side of plurality of features of the patterned resist layer 1703 as shown in FIGS. 17D and 17E. For example, the layer 1705 can be deposited more on a sidewall on a first side of the feature than on a sidewall on a second side of the feature opposite the first side. In FIG. 17D, the layer 1705 of high refractive index material is preferentially deposited on the right sidewall of the plurality of features of the patterned layer 1703 while in FIG. 17E, the layer 1705 of high refractive index material is preferentially deposited on the left sidewall of the plurality of features of the patterned resist layer 1703.

Patterned waveguides fabricated using deposition techniques discussed above can be integrated with display systems, such as, for example, the wearable display system 60 discussed above. When integrated with a wearable display system, the waveguides depicted in FIGS. 17B, 17C, 17D and 17E can increase the overall efficiency of light output from the waveguide. The patterned high index material provided over a patterned polymer layer as shown in FIGS. 17B-17E can increase the single bounce diffraction efficiency which in turn can increase the overall efficiency of light output from the waveguide.

Wearable display systems can benefit from waveguides manufactured using glancing angle deposition of high index material over a patterned layer comprising low refractive index material as depicted in FIGS. 17D and 17E. Such diffractive structure on waveguides can potentially output light propagating in the waveguide 1701 either through the surface of the waveguide 1701 comprising the patterned (e.g. resist) layer 1703 or the surface of the waveguide 1701 opposite the patterned (e.g., resist) layer 1703 based on the orientation of deposition. For example, consider an embodiment of the waveguide stack 660 depicted in FIG. 9A in which the optical elements 800, 810 and 820 comprise features fabricated using glancing angle deposition of high index material over a patterned layer (e.g. resist layer) as depicted in FIGS. 17D and 17E. In such embodiments, the amount of light directed towards the viewer can be increased if the orientation of the glancing angle deposition of high index material is such that the sidewalls of the plurality of features that are away from the optical elements from which the light came, such as, e.g., the OPEs 730, 740 and 750, are coated with the high index material.

VII. Artifact Mitigation
A. Mitigation of Rainbow Effect

As discussed above, various embodiments of display devices, such as, for example, wearable display device 60 can comprise one or more waveguides comprising one or more optical elements configured to incouple incident light (e.g., incoupling optical elements 700, 710 and 720), configured to distribute incoupled light (e.g., OPEs 730, 740 and 750) and/or configured to outcouple the incoupled light to the viewer (e.g., EPEs 800, 810 and 820). The one or more optical elements configured to distribute incoupled light (e.g., OPEs 730, 740 and 750) and/or configured to outcouple the incoupled light to the viewer (e.g., EPEs 800, 810 and 820) can also incouple ambient light which can give rise to undesirable optical artifacts (e.g., rainbow effects, ghosting, reduction in amount of light output, etc.) in the viewers field of view. Different methods of reducing/mitigating various optical artifacts are discussed below.

Without relying on any particular theory, the efficiency of incoupling ambient light can depend on the height (or depth) of the features (e.g., grating elements/grooves) included in the one or more optical elements configured to distribute incoupled light (e.g., OPEs 730, 740 and 750) and/or configured to outcouple the incoupled light to the viewer (e.g., EPEs 800, 810 and 820). For example, taller features (e.g., features having a height greater than or equal to about 50 nm) may be more efficient in incoupling ambient light than shorter features (e.g., features having a height less than or equal to about 50 nm). Accordingly, in various embodiments of display devices, the one or more optical elements configured to distribute incoupled light (e.g., OPEs 730, 740 and 750) and/or configured to outcouple the incoupled light to the viewer (e.g., EPEs 800, 810 and 820) can be comprise shorter features (e.g., features having a height less than or equal to about 50 nm). For example, the height of the features included in the one or more optical elements configured to distribute incoupled light (e.g., OPEs 730, 740 and 750) and/or configured to outcouple the incoupled light to the viewer (e.g., EPEs 800, 810 and 820) with respect to the surface of the waveguide 1801 can be greater than or equal to about 10 nm and less than or equal to 50 nm, greater than or equal to about 15 nm and less than or equal to 45 nm, greater than or equal to about 20 nm and less than or equal to 40 nm, greater than or equal to about 10 nm and less than or equal to 25 nm, greater than or equal to about 10 nm and less than or equal to 30 nm, greater than or equal to about 30 nm and less than or equal to 50 nm, or any range/sub-range defined by any of these values. Without any loss of generality, the height or depth of a grating structure to achieve the same single bounce diffraction efficiency is shorter in a material comprising a higher refractive index than a material comprising a lower refractive index if the line width and the pitch of the grating structure remains the same. For example, a 15 nm tall line in a material having a refractive index of about 2.2 can have the same single bounce diffraction efficiency as a 80 nm tall line in a material having a refractive index grating structure in a material having a refractive index of about 1.53 when the line width and pitch are the same.

Figure 18A:
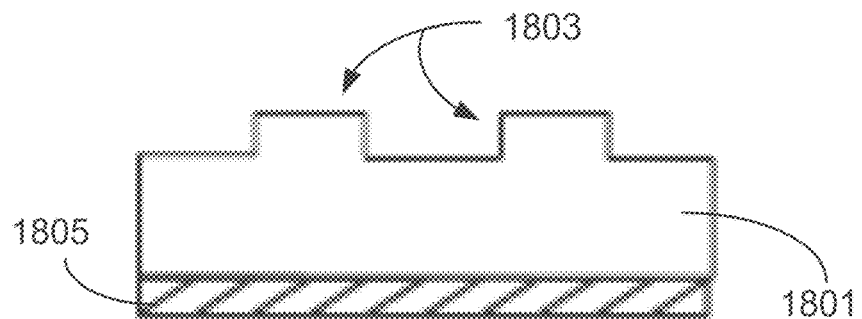
FIGS. 18A-18D are various example waveguides including a plurality of features.
Figure 18B:
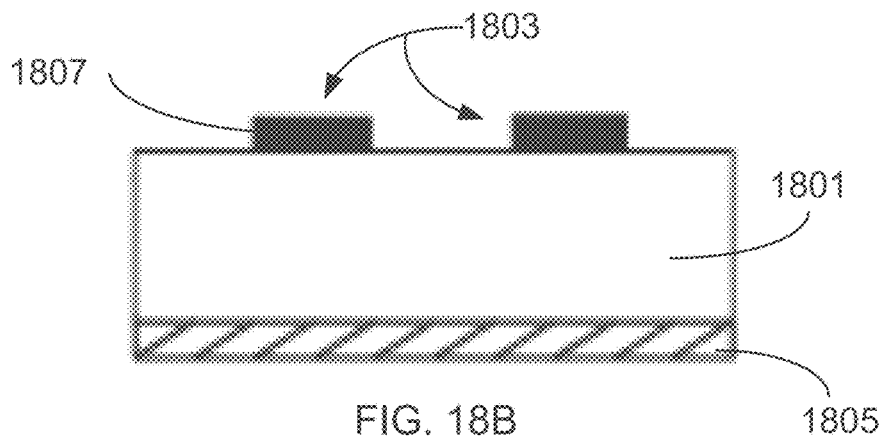
Figure 18C:
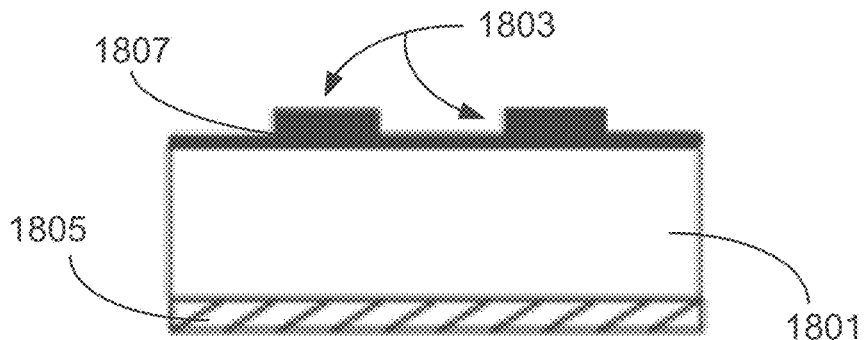

FIGS. 18A-18C depict various embodiments of a waveguide 1801 comprising a plurality features 1803 having a height less than or equal to about 50 nm, such as for example, greater than or equal to about 10 nm and less than or equal to 50 nm, greater than or equal to about 15 nm and less than or equal to 45 nm, greater than or equal to about 20 nm and less than or equal to 40 nm, greater than or equal to about 10 nm and less than or equal to 25 nm, greater than or equal to about 10 nm and less than or equal to 30 nm, greater than or equal to about 30 nm and less than or equal to 50 nm, or any range/sub-range defined by any of these values. The waveguide 1801 can comprise a material having a refractive index greater than or equal to 1.8. For example, the waveguide 1801 can comprise $LiNbO_3$, SiC and/or $TiO_2$.

In some embodiments, the plurality of features 1803 can be formed in a surface of the waveguide 1801 as shown in FIG. 18A using various methods discussed herein. In some embodiments, a layer of high refractive index material 1807 (e.g., material having refractive index greater than or equal to about 1.8) can be disposed over the surface of the waveguide 1801 and portions of the layer of high refractive index material can be etched using various methods discussed herein to form the plurality features 1803 as shown in FIGS. 18B and 18C. The layer of high refractive index material 1807 can comprise a material having a high refractive index, such as, for example refractive index greater than or equal to 1.8 and less than or equal to 4.5, greater than or equal to 2.2 and less than or equal to 4.2, greater than or equal to 2.3 and less than or equal to 4.0, greater than or equal to 2.5 and less than or equal to 3.7 or any value in a range/sub-range defined by these values. Values outside ranges these are also possible. For example, the coating 1807 can comprise SiC or $TiO_2$. In some embodiments, the layer of high refractive index material 1807 can be removed from the portions of the waveguide that are devoid of the plurality of features 1803 (e.g., between features 1803) as shown in FIG. 18B. Alternately, a portion of the layer of high refractive index material 1807 can be retained in the portions of the waveguide 1801 that are devoid of the plurality of features 1803 (e.g. between features 1803) as shown in FIG. 18C. The height of the retained portion of the layer of high refractive index material 1807 from the surface of the waveguide 1801 can be less than the height of the plurality of features 1803. For example, in various embodiments, the height of the retained portion of the layer of high refractive index material 1807 from the surface of the waveguide 1801 can be less than 20 nm (e.g., less than or equal to 15 nm, less than or equal to 12 nm, less than or equal to 10 nm, less than or equal to 5 nm, or any range between any of these values). Values outside ranges these are also possible. Various embodiments of the waveguide 1801 can further comprise an anti-reflecting coating 1805 as shown in FIGS. 18A-18C.

Figure 18D:
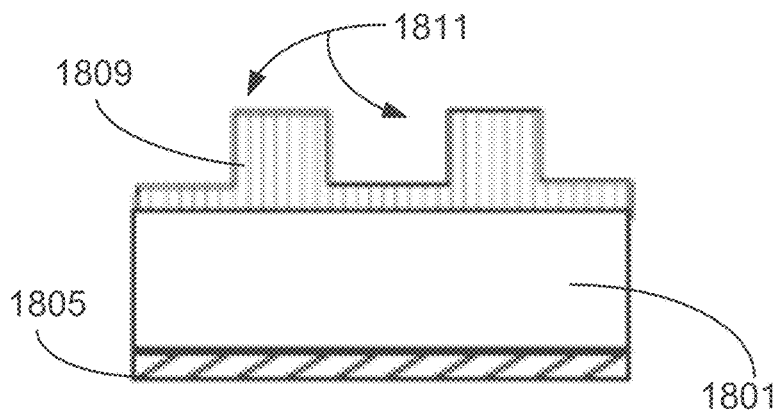

FIG. 18D depicts an embodiment of a waveguide 1801 comprising a plurality of features 1811 that are taller than the plurality of features 1803 shown in FIGS. 18A-18C. The height of the plurality of features 1811 from the surface of the waveguide 1801 can be greater than about 50 nm. For example, the height of the plurality of features 1811 from the surface of the waveguide 1801 can be greater than about 50 nm and less than or equal to about 75 nm, greater than or equal to about 60 nm and less than or equal to about 80 nm, greater than or equal to about 75 nm and less than or equal to about 90 nm, greater than or equal to about 80 nm and less than or equal to about 100 nm, or any range between any of these values. Values outside ranges these are also possible. The plurality of feature 1811 can be formed in a patternable layer 1809 comprising a polymer (e.g., a resist) having a refractive index less than 1.8. For example, the refractive index of the patternable layer 1809 can be between 1.4 and 1.5, between 1.45 and 1.6, between 1.5 and 1.65, between 1.6 and 1.7, between 1.7 and 1.75, between 1.75 and 1.8, between 1.8 and 1.85 or any value in a range/sub-range defined by these values. Values outside these ranges are also possible. In some implementations, the patternable layer 1809 can be retained in the portions of the waveguide 1801 that are devoid of the plurality of features 1811 as shown in FIG. 18D. The height of the retained portion of the patternable layer 1809 can be less than 20 nm in various embodiments. Other ranges are also possible. An anti-reflecting coating 1805 can be provided on the surface of the waveguide 1801 opposite the surface comprising the plurality of features 1811. The optical performance in terms of sharpness, efficiency, uniformity, etc. of the embodiment of the waveguide 1801 shown in FIG. 18D can be similar to the optical performance of the embodiment of the waveguide 1801 shown in FIGS. 18A-18C. However, a display device incorporating the embodiment of the waveguide 1801 shown in FIG. 18D can have more pronounced undesirable diffractive effects (e.g., rainbow effects) in the viewer's field of view because of the taller plurality of features 1811 than a display device incorporating the embodiment of the waveguide 1801 shown in FIGS. 18A-18C which have features that are relatively shorter. The height, however, could be higher or lower.

Figure 19A:
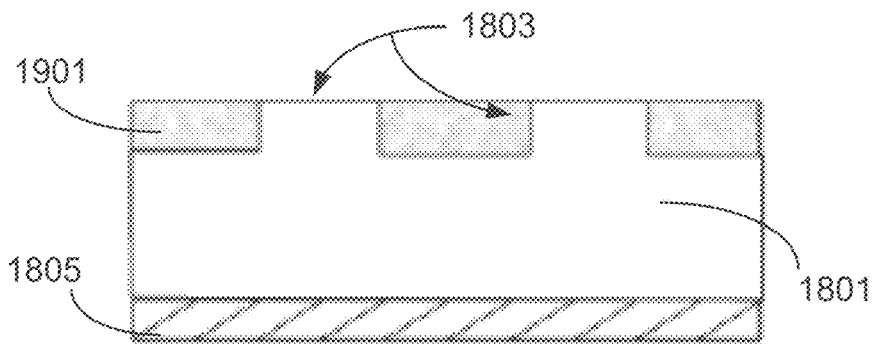
FIGS. 19A-19D are various example waveguides including a planarization layer disposed over a plurality of features.
Figure 19B:
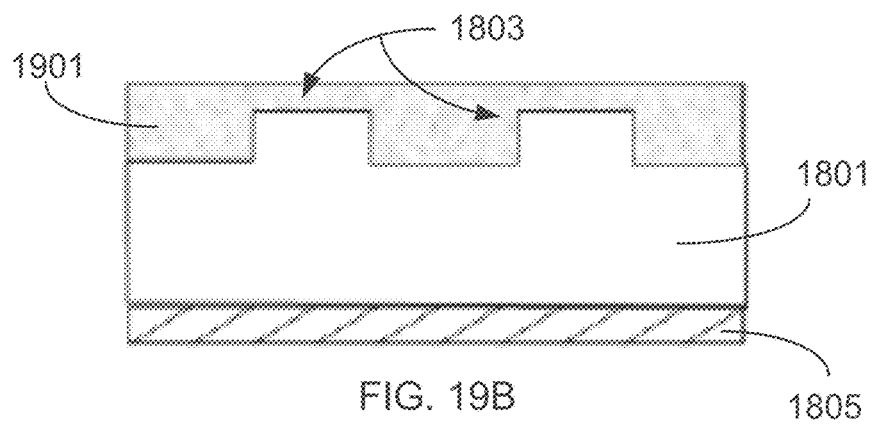
Figure 19C:
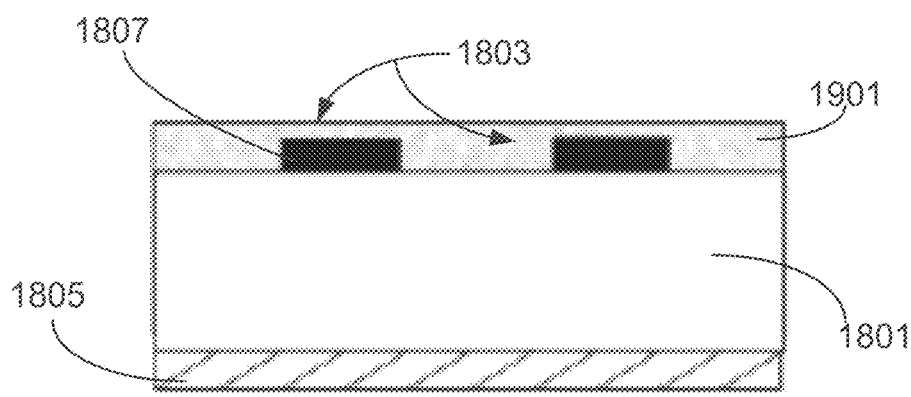
Figure 19D:
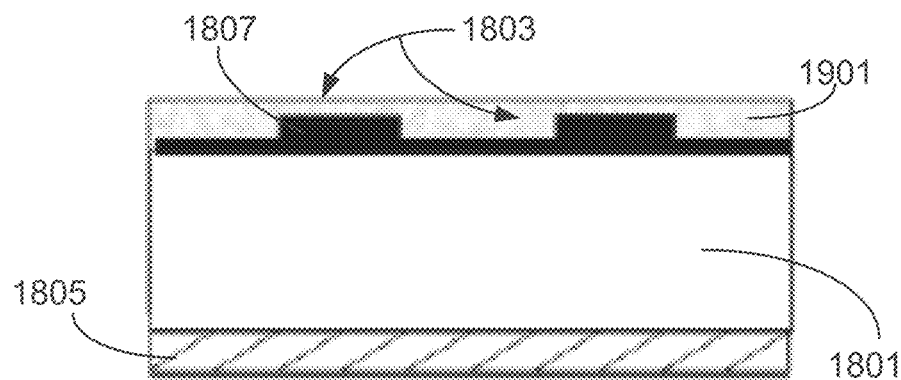

In various embodiments of the waveguides 18A-18C, a planarization layer 1901 comprising a material having a refractive index less than about 1.6 can be disposed over the plurality of features 1803 as shown in FIGS. 19A-19D, for example, to further reduce undesirable visual artifacts which can enter into a viewer's FOV through external light coupling in through the EPE of the waveguide. The planarization layer 1901 can comprise a material having a refractive index between about 1.3 and about 1.4, between about 1.4 and about 1.5, between about 1.5 and about 1.6, or any value in a range/sub-range defined by these values. Values outside these ranges are also possible. The planarization layer 1901 can also advantageously reduce reflection losses and/or facilitate stacking of multiple waveguides. The planarization layer 1901 can be obtained by depositing a material having a refractive index less than or equal to about 1.6 using jet-deposition technology or other deposition methods described herein including PVD and CVD and contacting the deposited material with a planarization template. In some embodiments, the planarization layer 1901 may only be disposed over the portions of the waveguide that are exposed to the ambient and devoid of the plurality of features 1803 as shown in FIG. 19A. Alternately, the planarization layer 1901 can be disposed over the plurality of features 1803 as shown in FIGS. 19B-19D. In various embodiments, the top coating 1901 can have a thickness between about 50 nm and about 150 nm. Planarization can be used in a wide variety of designs. FIGS. 19A-19B show planarization employed with features 1803 formed in the waveguide 1801 while FIGS. 19C-19D show planarization employed with features 1803 formed in a layer 1807 on the waveguide 1801.

Figure 20A:
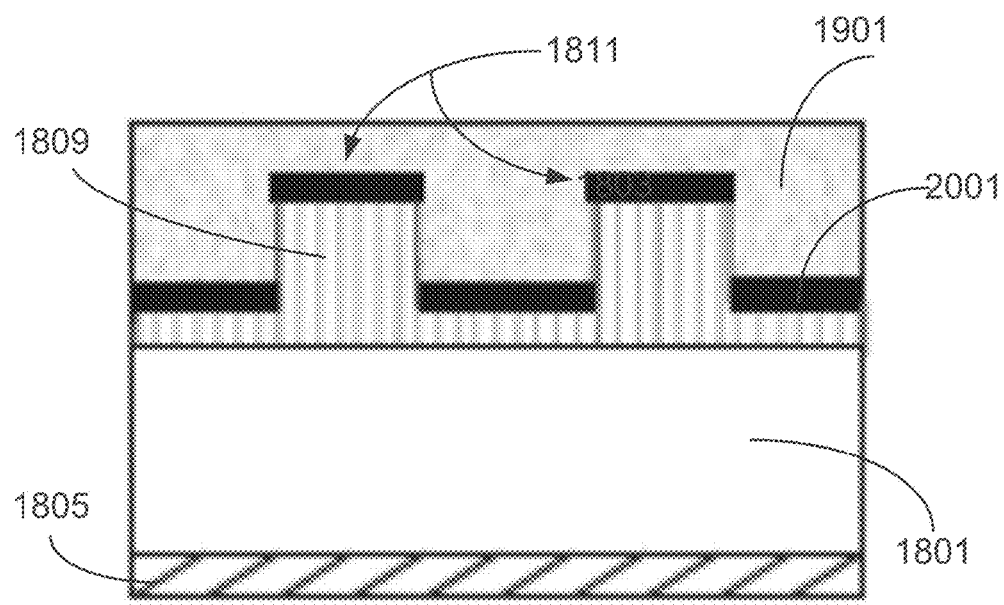
FIGS. 20A and 20B are various example waveguides including a high refractive index material between a planarization layer and a plurality of features.
Figure 20B:
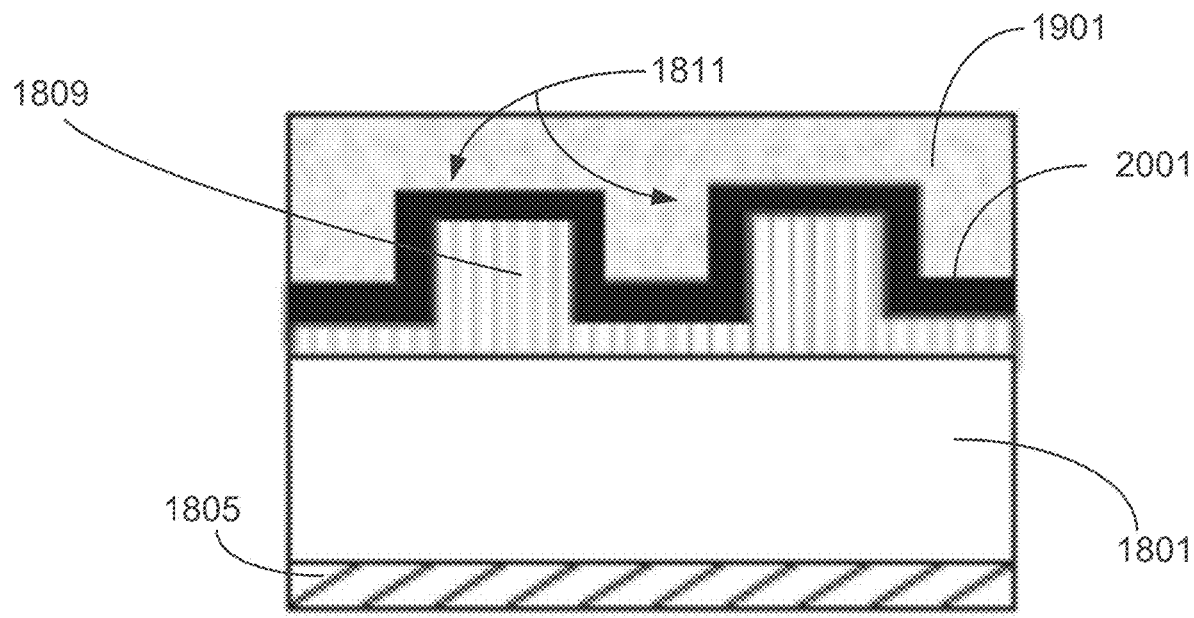

The layer of high refractive index material 2001 can comprise a material different from the material of the waveguide 1801. The layer of high refractive index material 2001 can be deposited, for example, using PVD or CVD techniques discussed above. For example, the layer of high refractive index material 2001 can be deposited using evaporation with molecular electron beam as discussed above. When the layer of high refractive index material 2001 is deposited using evaporation with a molecular electron beam, the high refractive index material may be deposited over the surfaces of the plurality of features 1811 that are parallel to the surface of the waveguide as shown in FIG. 20A but with a negligible, lower, or reduced amount on the sidewalls. As another example, the layer of high refractive index material 2001 can be deposited using sputtering as discussed above. When the layer of high refractive index material 2001 is deposited using sputtering, non-negligible amounts of the high refractive index material may be formed over the surfaces of the plurality of features 1811 that are parallel to the planar bottom or top surfaces of the waveguide as well as the sidewalls as shown in FIG. 20B. Accordingly, the layer of high refractive index material 2001 may be included on over the surfaces of the plurality of features 1811 that are parallel to the surface of the waveguide as shown in FIG. 20A but with a negligible, lower, or reduced amount on the sidewalls or the over the surfaces of the plurality of features 1811 that are parallel to the surface of the waveguide as shown in FIG. 20A as well as with non-negligible amounts on the sidewalls. In various such embodiments, a planarization layer 1901 can be further formed over the plurality of features 1811 as shown in FIGS. 20A and 20B. As discussed above, in some implementations the planarization layer 1901 can comprise a material having a refractive index between about 1.3 and about 1.4, between about 1.4 and about 1.5, between about 1.5 and about 1.6, or any value in a range/sub-range defined by these values. In some cases, the designs of the waveguide 1801 depicted in FIGS. 20A and 20B when incorporated in a display device (e.g., a wearable display device) can show significant reduction in undesirable diffractive artifacts as compared to a display device comprising the design of the waveguide 1801 depicted in FIG. 18D.

B. Mitigation of Reflection Losses

As discussed above, various embodiments of display devices, such as, for example, wearable display device 60 can comprise one or more waveguides comprising one or more optical elements configured to incouple incident light (e.g., incoupling optical elements 700, 710 and 720), configured to distribute incoupled light (e.g., OPEs 730, 740 and 750) and/or configured to outcouple the incoupled light to the viewer (e.g., EPEs 800, 810 and 820). However, the optical performance of the various embodiments of display devices, such as, for example, wearable display device 60, can be compromised due to reflection losses at the one or more optical elements configured to incouple incident light (e.g., incoupling optical elements 700, 710 and 720), one or more optical elements configured to distribute incoupled light (e.g., OPEs 730, 740 and 750) and/or the one or more optical elements configured to outcouple the incoupled light to the viewer (e.g., EPEs 800, 810 and 820). Accordingly, it would be advantageous if the one or more optical elements configured to incouple incident light (e.g., incoupling optical elements 700, 710 and 720), one or more optical elements configured to distribute incoupled light (e.g., OPEs 730, 740 and 750) and/or the one or more optical elements configured to outcouple the incoupled light to the viewer (e.g., EPEs 800, 810 and 820) are configured to reduce reflection losses. Various optical elements and methods of reducing reflection losses are described below. The embodiments described below can also have additional advantages such as small form factor and/or reduced ghosting.

In various embodiments of display devices, such as, for example a wearable display device 60, anti-reflection (AR) coatings or structures can be disposed with respect to the one or more optical elements configured to incouple incident light (e.g., incoupling optical elements 700, 710 and 720), one or more optical elements configured to distribute incoupled light (e.g., OPEs 730, 740 and 750) and/or the one or more optical elements configured to outcouple the light guided within the waveguide to the viewer (e.g., EPEs 800, 810 and 820).

Figure 21:
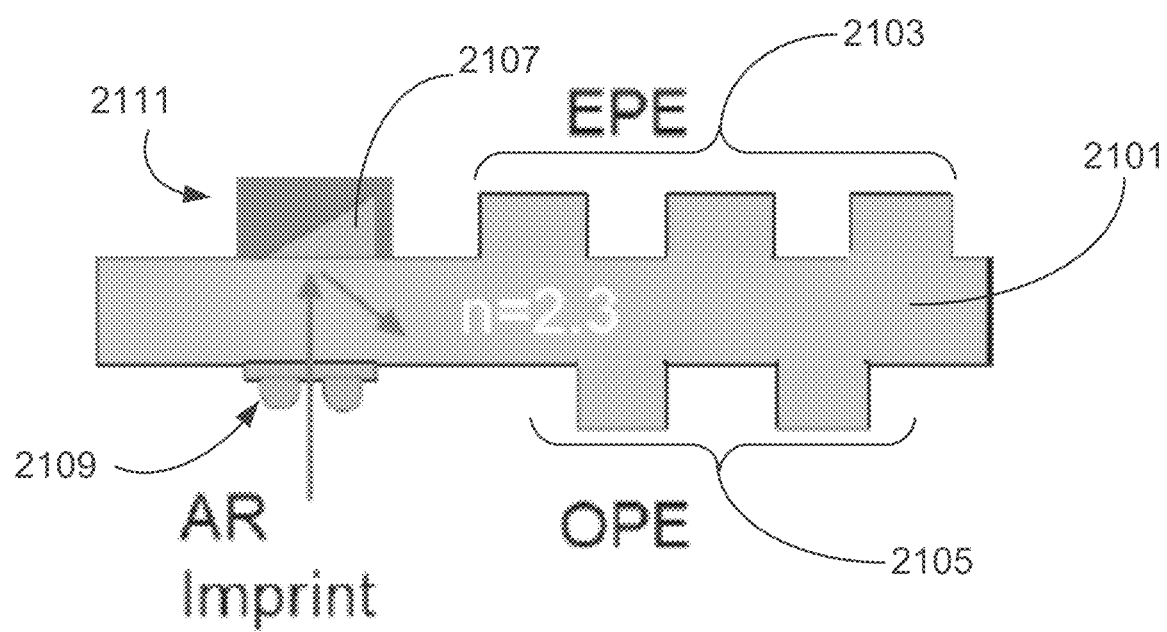
FIG. 21 is an example waveguide including an optical element.

FIG. 21 illustrates an embodiment of a waveguide 2101 comprising an optical element 2107 (e.g., an incoupling grating (ICG)) configured to incouple incident light, an optical element 2105 (e.g., an OPE) configured to distribute incoupled light and/or an optical element 2103 (e.g., EPE) configured to outcouple the incoupled light to the viewer. The waveguide 2101 can comprise a material with high refractive index (e.g., refractive index greater than or equal to 1.8). For example, the waveguide 2101 can comprise a material with a refractive index greater than or equal to 2.2 and/or less than or equal to 2.3. The optical element 2107, the optical element 2105 and/or the optical element 2103 can comprise a plurality of features configured to diffract/refract light. For example, the optical element 2107, the optical element 2105 and/or the optical element 2103 can comprise diffraction gratings. The optical element 2107, the optical element 2105 and/or the optical element 2103 comprising a plurality of features can be disposed in or over one or more surfaces of the waveguide 2101 using one or more methods of fabricating the plurality of features discussed herein.

A metal coating 2111 can be disposed over the optical element 2107 (e.g., an incoupling grating (ICG)) configured to incouple incident light as shown in FIG. 21 to prevent/reduce reflection of incoupled light.

In some embodiments, an anti-reflecting coating/structure 2109 can be disposed on a surface of the waveguide 2101 opposite the surface of the waveguide 2101 on which the optical element 2107 is disposed as shown in FIG. 21. The anti-reflecting coating/structure 2109 can be formed using vacuum based coating methods or non-vacuum based approaches discussed above. As discussed above, the anti-reflecting coating/structure 2109 can comprise a geometric pattern, such as, for example, lines, holes, grooves, pillars and/or bumps. In various embodiments, the geometric pattern, such as, for example, lines, holes, grooves, pillars and/or bumps can be nano-structures having a dimension (e.g., length, height, depth and/or pitch) less than about 150 nm. For example, in various embodiments, the geometric pattern, such as, for example, lines, holes, grooves, pillars and/or bumps can be nano-structures can have a dimension (e.g., length, height, depth and/or pitch) can be between about 1 nm and about 150 nm, between about 10 nm and about 140 nm, between about 20 nm and about 130 nm, between about 30 nm and about 120 nm, between about 40 nm and about 100 nm, between about 50 nm and about 75 nm, or any value in a range/sub-range defined by any of these values.

The anti-reflecting coating/structure 2109 comprising a geometric pattern can be fabricated by depositing a material having a refractive index less than the refractive index of the material of the waveguide 2101 using vacuum based coating methods or non-vacuum based approaches discussed above and imprinting the geometric pattern using an imprint template. The anti-reflecting coating/structure 2109. Additionally, the anti-reflecting coating/structure 2109 can also reduce ghost images that may result from incoupling of light that is reflected from the surfaces of the waveguides and/or components of the projector (e.g., lens of the projector). The incorporation of the anti-reflecting coating/structure 2109 with the waveguide 2101 can reduce reflection from the opposite surface of the waveguide 2101 to less than about 1.5%. In contrast, without the anti-reflecting coating/structure 2109, the reflection from the opposite surface of the waveguide 2101 can be greater than about 15%.

As illustrated in FIG. 21, in various embodiments of first and second diffractive optical elements can be disposed on first and second opposite sides of the waveguides. For example, the optical element 2105 (e.g., an OPE) can be provided on the surface of the waveguide 2101 that is opposite the surface on which the optical element 2103 (e.g., EPE) is provided. Likewise, the incoupling optical element 2107 can be on the same or opposite side of the waveguide as the outcoupling optical element 2103. Such designs and structures can have reduced form factor. In some embodiments, the optical element 2105 and the optical element 2103 can comprise a plurality of diffractive features as shown in FIG. 21. In some such embodiments, the plurality of the features of the optical element 2105 can be offset from the plurality of features of the optical element 2103. In display devices, such as, for example, wearable display device 60, comprising a stack of a plurality of waveguides similar to the waveguide 2101, the plurality of the features of the optical element 2105 of one waveguide in the stack can be offset from the plurality of the features of the optical element 2103 of an adjacent waveguide in the stack. Such a configuration can advantageously reduce or mitigate ghosting. Accordingly, in various implementations, first and second diffractive optical elements can be offset from each one on the same or different waveguides.

The optical element 2103 (e.g., EPE) configured to outcouple the light guided within the waveguide to the viewer can be configured to be less reflective by disposing one or more reflection mitigating layers comprising materials over the optical element having a refractive index less than the refractive index of the material of the waveguide 2101. For example, the one or more reflection mitigating layers disposed over the optical element 2103 can comprise materials having a refractive index between about 1.2 and 1.7. FIGS. 22A-22D illustrate various embodiments of a waveguide 2101 comprising an optical element 2103 disposed over a surface of the waveguide 2101. The optical element 2103 can comprise a plurality of features (e.g., diffractive features). The plurality of features can be fabricated in the surface of the waveguide 2101 using one or more methods discussed herein. In some embodiments, the plurality of the features of the optical element 2103 can be fabricated in a layer comprising high refractive index material or a low refractive index material disposed on a surface of the waveguide 2101 using one or more of the methods discussed herein. In the embodiments illustrated in FIGS. 22A-22D, the waveguide 2101 can comprise a material having a refractive index greater than or equal to 1.8. For example, the waveguide 2101 can comprise a material, such as, for example, $LiNbO_3$, having a refractive index between about 2.3 and 2.4. In some embodiments such as shown in FIG. 22A, a reflection mitigating layer 2201a comprising magnesium fluoride ($MgF_2$) having a refractive index of about 1.38 is disposed over the plurality of features. In some embodiments such as shown in FIG. 22B, a reflection mitigating layer 2201b comprising silicon dioxide ($SiO_2$) having a refractive index of about 1.45 is disposed over the plurality of features. In some embodiments such as shown in FIG. 22C, a reflection mitigating layer 2201c comprising a polymer (e.g., a resist) having a refractive index of about 1.52 is disposed over the plurality of features. In some embodiments, a plurality of reflection mitigating layers comprising different materials can be disposed over the plurality of diffractive features. In some implementations, the different materials have different refractive indices. The different materials may have different refractive indices than the refractive index of the material comprising the waveguide. In some implementations, the refractive index of the different materials comprising the plurality of reflection mitigating layers is less than the refractive index of the material comprising the waveguide. In some implementations, the refractive index of one of the plurality of reflection mitigating layers farther from the waveguide is lower than the refractive index of one of the plurality of reflection mitigating layers closer to the waveguide. For example, as shown in FIG. 22D, a first reflection mitigating layer 2201a comprising magnesium fluoride ($MgF_2$) having a refractive index of about 1.38 and a second reflection mitigating layer 2201b comprising silicon dioxide ($SiO_2$) having a refractive index of about 1.45 is disposed over the plurality of features. As illustrated, the second reflection mitigating layer 2201b has a higher refractive index than the first reflection mitigating layer 2201a. Both reflection mitigating layers 2201a, 2201b have refractive indices less than the waveguide. Other designs are possible. For example, three or more layers of reflection mitigating layer may be included in the plurality of reflection mitigating layers. In some implementations, the reflection mitigating layer farthest from the waveguide (outermost reflection mitigating layer) has a lower index than the reflection mitigating layer closest to the waveguide (innermost reflection mitigating layer). In some implementations, the one or more reflection mitigating layers between the farthest (outermost) reflection mitigating layer and the closest (innermost) reflection mitigating layer can have an index between that of the farthest (outermost) reflection mitigating layer and the closest (innermost) reflection mitigating layer. Other designs are possible.

Without the reflection mitigating layers 2201a-2201d, reflection losses from the patterned surface of a waveguide 2101 having a refractive index of about 2.3-2.4, reflection of light incident at an angle of about 0 degrees can be about 14%. However, the reflection losses can be less than about 8% when one or more reflection mitigating layers 2201a-2201d are formed over the patterned surface of the waveguide 2101 having a refractive index of about 2.3-2.4. In some embodiments, the reflection mitigating layers 2201a-2201d can be a part of coating, deposited pre imprint or a part of the imprint resist.

Figure 23A:
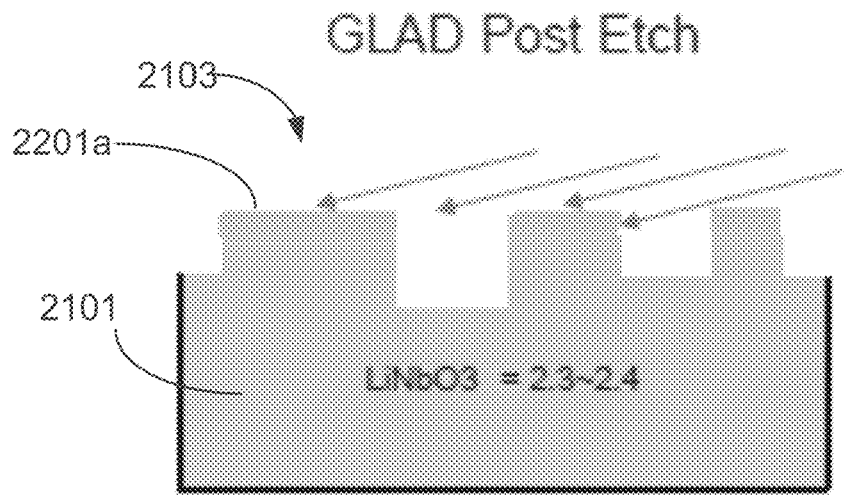
FIGS. 23A-23C illustrate various example deposition techniques for depositing a reflection mitigation layer on a plurality of features.
Figure 23B:
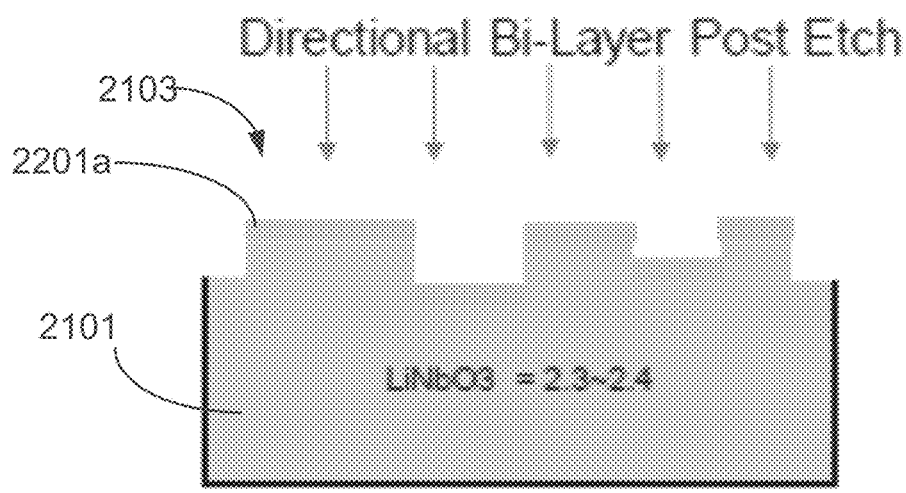
Figure 23C:
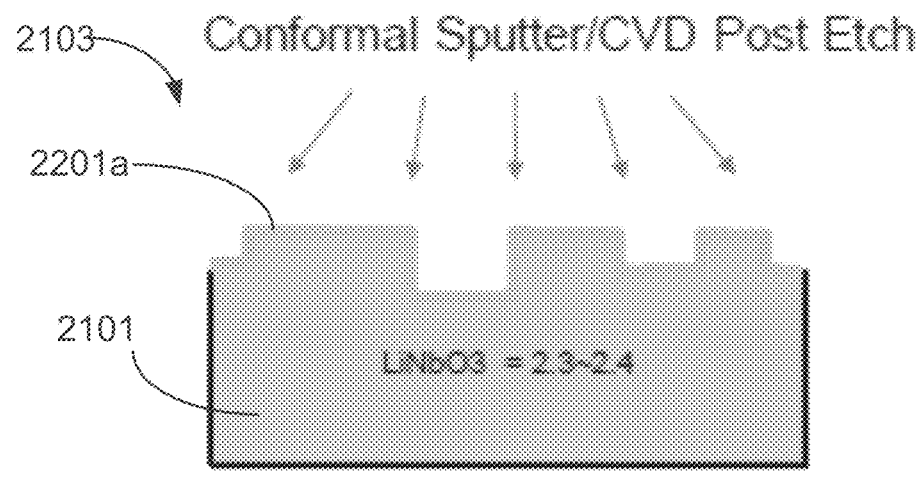

In some embodiments, the reflection mitigating layers 2201a-2201d can be deposited on the plurality of features of the optical element 2103 as shown in FIGS. 23A-23C using different techniques that result in different characteristics of the reflection mitigating layers, such as how conformal the deposited layers and on what surfaces are covered by the reflection mitigating layers. For example, the reflection mitigating layers 2201a-2201d can be deposited using Glancing angle deposition (GLAD) approach as shown in FIG. 23A. In some implementations, when the reflection mitigating layers 2201a-2201d are deposited on the plurality of features of the optical element 2103 using GLAD approach, only the top surfaces of the plurality of features of the optical element 2103 that are parallel to the surface of the waveguide 2101 comprise the material of the reflection mitigating layers (e.g., low refractive index material or material having a refractive index lower than the waveguide). The deposition of the reflection mitigating layers 2201a-2201d using Glancing angle deposition (GLAD) approach can be configured such that the sidewalls of the plurality of features of the optical element 2103 and the surfaces of the trenches of the optical element 2103 comprise less or no more than negligible amounts of material of the reflection mitigating layers (e.g., low refractive index material or material having a refractive index lower than the waveguide) as shown in FIG. 23A.

As another example, the reflection mitigating layers 2201a-2201d can be deposited using a method (e.g., directional bi-layer deposition) that deposits the material of the reflection mitigating layers (e.g., low refractive index material or material having a refractive index lower than the waveguide) on the top surfaces of the plurality of features of the optical element 2103 that are parallel to the surface of the waveguide 2101 and the surfaces of the trenches of the optical element 2103 while the sidewalls of the plurality of features of the optical element 2103 comprise less or no more than negligible amounts of material of the reflection mitigating layers (e.g., low refractive index material or material having a refractive index lower than the waveguide) as shown in FIG. 23B.

As yet another example, the reflection mitigating layers 2201a-2201d can be deposited using a method, such as, for example, conformal sputter or CVD such that both horizontal and vertical exposed surface of the plurality of features of the optical element 2103 including the sidewalls and the bottom or bottom surfaces of the trenches comprise the material of the reflection mitigating layers (e.g., low refractive index material or material having a refractive index lower than the waveguide) as shown in FIG. 23C.

FIGS. 24A-24H illustrate various coatings/structures that are provided over the optical element 2103 (e.g., EPE) configured to output light propagating in the waveguide 2101 towards a viewer to reduce losses due to reflection. For example, a reflection mitigating layer 2401 comprising a material with refractive index less than the refractive index of the material of the waveguide 2101 can be disposed over the optical element 2103 as shown in FIGS. 24A-24F. The reflection mitigating layer 2401 can be deposited using deposition techniques, such as, for example, spin coating, ink-jetting, slot-die, knife-edge, etc. The reflection mitigating layer 2401 can be planarized in various embodiments. In some embodiments, the waveguide 2101 can comprise a material having a refractive index greater than about 1.8. For example, the waveguide 2101 can comprise a material having a refractive index between about 2.2 and 2.3. In some such embodiments, the reflection mitigating layer 2401 can comprise a material having a refractive index less than about 1.6. For example, the reflection mitigating layer 2401 can comprise a Teflon based polymer material with a refractive index between about 1.2 and 1.35. As another example, the reflection mitigating layer 2401 can comprise a material having a refractive index between about 1.3 and about 1.6. Reflection mitigating layer 2401 having indices outside these values can also be used. In some embodiments, a structural stability providing layer 2403 can be disposed over the reflection mitigating layer 2401 to improve structural stability of the waveguide 2101 as shown in FIG. 24B. In various embodiments, the structural stability providing layer 2403 can comprise glass, such as for example AR Glass. Without any loss of generality, AR Glass is a glass substrate having refractive index between about 1.45 and 1.8 with anti-reflective (AR) coating on one or both sides. The anti-reflective (AR) coating can reduce the surface reflection of each side to <1%. The AR coatings on glass can comprise alternate layers of high index and low index coatings such as $TiO_2$ (n=2.3) and $SiO_2$ (n=1.45).

In some embodiments, the optical element 2103 can include a plurality of diffractive features comprising another material having a refractive index greater than or equal to about 1.8 different from the material of the waveguide 2101 as shown in FIGS. 24C-24F. FIG. 24C shows a waveguide 2101 including an incoupling optical element 2107 comprising an inclined reflective surface. A reflection mitigating layer 2401 is disposed over the plurality of diffractive features comprising an optical element 2103 included on the waveguide 2101. FIG. 24D shows a waveguide 2101 including a diffractive optical element 2103 comprising plurality of diffractive features also having reflection mitigating layer 2401 is disposed over the plurality of diffractive features. A layer is also shown between the waveguide and the plurality of diffractive features. FIGS. 24E and 24F show designs where a layer of material 2405 is included between the reflection mitigating layer 2401 and the plurality of diffractive features comprising an optical element 2103 included on the waveguide 2101. In FIG. 24E, this layer 2405 is formed on the top of the diffractive features with no or negligible amounts on the sidewalls. In FIG. 24F, this layer 2405 is conformally applied to both the top and sidewalls of the diffractive features. Without any loss of generality, in some embodiments, the refractive index of layer 2401 should be low or as low as possible and the refractive index of the optical element 2103 should be high or as high as possible. A difference in the refractive index of the optical element 2103 and the layer 2401 can be greater than or equal to 0.8 and less than or equal to 3.0 in some embodiments. For example, a difference in the refractive index of the optical element 2103 and the layer 2401 can be greater than or equal to 1.0 in some embodiments. In such embodiments, the plurality of diffractive features of the optical element 2103 can comprise a material having a refractive index greater than 1.8, such as, for example refractive index between about 1.3 and 2.7.

In some embodiments, an anti-reflection structure 2407 comprising a plurality of nano-structure can be disposed over the plurality of diffractive features of the optical element 2103 as shown in FIGS. 24G and 24H. The nano-structure may have nano scale feature size such as, for example, widths and/lengths.

The nano-structures 2409 can comprise a plurality of features with pitch less than about 150 nm, such as, for example between about 1 nm and about 150 nm, between about 10 nm and about 140 nm, between about 20 nm and about 130 nm, between about 30 nm and about 120 nm, between about 40 nm and about 100 nm, between about 50 nm and about 75 nm, or any value in a range/sub-range defined by any of these values. In various embodiments, the nano-structures 2409 can have a size (e.g., feature diameter, depth, height, etc.) between about 10 nm and about 80 nm. For example, the size of the nano-structures 2409 can be between about 10 nm and about 80 nm, between about 15 nm and about 75 nm, between about 20 nm and about 70 nm, between about 30 nm and about 60 nm, between about 40 nm and about 50 nm, or any value in a range/sub-range defined by any of these values. The nano-structures 2409 can include a plurality of lines, holes or pillars formed over the plurality of features of the optical element 2103. Without any loss of generality, the nano-structures 2409 provide an alternate surface index based on the nano-scale geometry, density and/or pitch. This can change the Fresnel loss on the surface of where the nano-structures 2409 are present for the light passing through that surface. In some embodiments, the nano-structures 2409 can be formed in a coating disposed over the plurality of features of the optical element 2103 such as shown in FIG. 24G. In some embodiments, the nano-structures 2409 can be formed (e.g. etched) directly on the plurality of features of the optical element 2103 such as shown in FIG. 24H. Accordingly, in some implementations such as the design shown in FIG. 24G, the nano-structures are disposed between the diffractive features of the optical element 2103. In other implementations, such as the design shown in FIG. 24H, the nano-structures are not disposed between the diffractive features of the optical element 2103. In some embodiments, the coating can comprise a material having a refractive index less than the refractive index of the waveguide 2101. For example, the coating can comprise a patternable polymer (e.g., a resist).

C. Edge Blocking of Light

In various embodiments, of display devices, such as, for example wearable display devices 60, it is advantageous if the light from an optical source (e.g., light projector system 520) that is in-coupled into the waveguide and propagates to the edge of the waveguide by total internal reflection (TIR) gets absorbed and/or exits out of the waveguide and gets absorbed. Light that gets recycled after striking the edge of the waveguide can cause undesirable visual artifacts and degrade contrast ratio of light output from the waveguide to the viewer unless the recycled light is directed properly. In some embodiments, reflective gratings can be provided at the edges of the waveguide to direct the recycled light along the proper direction. In various embodiments, the reflective gratings can comprise metal to increase the reflectivity. For example, in some implementations, gratings having a pitch that is about half of the pitch of the gratings that form the EPE can be used to redirect light back into the EPE region so as to increase intensity of light output towards the user. In such implementations, the gratings having a pitch that is about half of the pitch of the gratings that form the EPE can have a height between about 20 nm and about 40 nm. In various such implementations, the gratings having a pitch that is about half of the pitch of the gratings that form the EPE can be metalized to increase reflectivity.

Figure 25A:
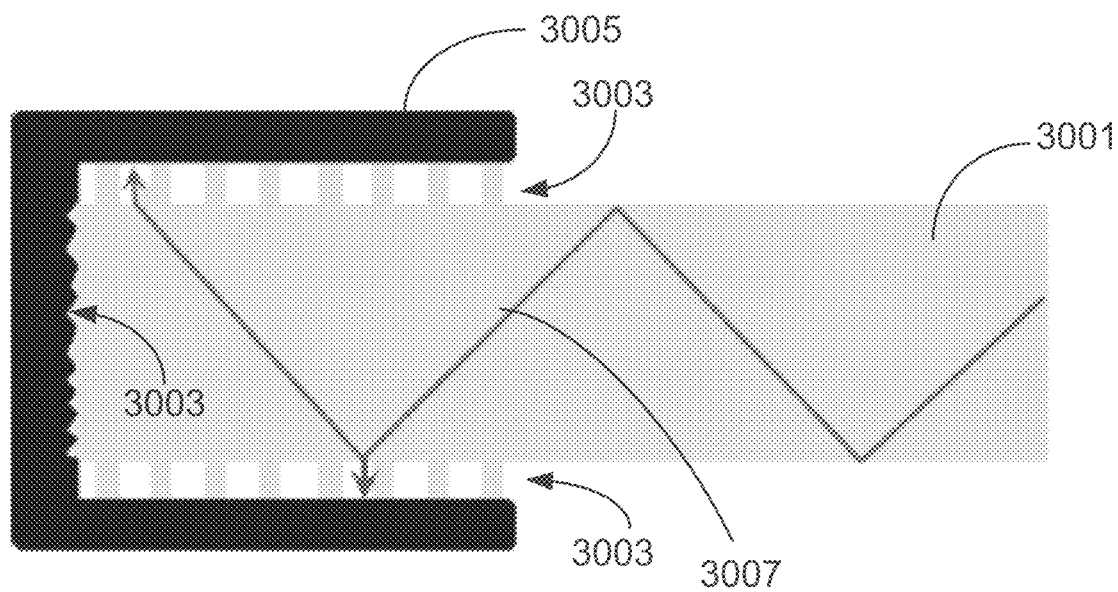
FIGS. 25A and 25B are various example waveguides that are configured to eliminate or reduce light.
Figure 25B:
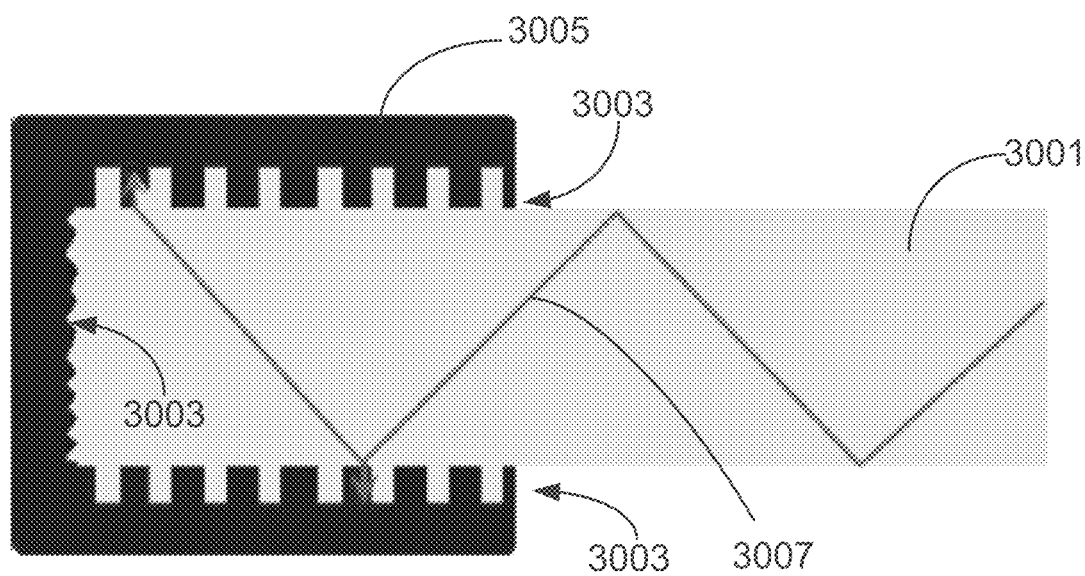

However, in some embodiments, the waveguides can be configured to eliminate or reduce the amount of light that is otherwise recycled. For example, in some embodiments, the edges of the waveguide can be configured to output any light that reaches the edges of the waveguide. The light output from the edges of the waveguide can be absorbed by absorbers disposed around the edges of the waveguide. FIGS. 25A and 25B illustrate different embodiments of a waveguide 3001 that are configured to eliminate or reduce the amount of light that is otherwise recycled. A plurality of light extracting features 3003 are provided at the edges of the waveguide 3001 depicted in FIGS. 25A and 25B. The plurality of light extracting features 3003 are configured to output light 3007 that is propagating in the waveguide 3001 via total internal reflection and reaches the edges of the waveguide 3001. The plurality of light extracting features 3003 can comprise, for example, refractive features, diffractive features and/or turning features. The light extracted from the edges of the waveguide is absorbed by a light absorbing element 3005 disposed externally around the edges of the waveguide 3001. In some embodiments, the light absorbing element 3005 can comprise a structure comprising a light absorptive material. In various embodiments, the structure can comprise a cuff, a collar, a cup, or a sleeve, etc., that is configured to be disposed externally around the edge of the waveguide 3001. In some embodiments, the light absorptive material can comprise a low or a high index polymer resin with 1%-50% by weight of carbon black. For example, the polymer resin can comprise between about 1%-10% by weight of carbon black, between about 5%-20% by weight of carbon black, between about 15%-30% by weight, between about 20%-40% by weight of carbon black, between about 25%-50% by weight of carbon black, or any amount in any range/sub-range defined by these values. In some embodiments, the external surfaces near the edges of the waveguide 3001 as well as the external surfaces of the plurality of light extracting features 3003 can be coated with a coating comprising the light absorptive material as shown in FIG. 25B. As illustrated in FIG. 25B, light absorbing material is disposed between individual ones of the plurality of light extracting features 3003. In various embodiments, the coating can comprise a low or a high index polymer resin with 1%-50% by weight of carbon black. For example, the polymer resin can comprise between about 1%-10% by weight of carbon black, between about 5%-20% by weight of carbon black, between about 15%-30% by weight, between about 20%-40% by weight of carbon black, between about 25%-50% by weight of carbon black, or any amount in any range/sub-range defined by these values.

VIII. Stacking and Lamination High Refractive Index Waveguides

A. Improving Structural Stability of Waveguides

Waveguides comprising high refractive index material, such as, for example, $LiNbO_3$ can be fragile, brittle, and/or prone to fracture with impact such as dropping the display device, e.g., head mounted display. Accordingly, it would be advantageous to provide one or more structural stability layers that improve mechanical reliability of display devices (e.g., wearable display device 60) comprising one or more $LiNbO_3$ waveguides in drop tests and/or daily use. In various implementations, the one or more structural stability layers can additionally be configured to improve thermal-chemical reliability of display devices (e.g., wearable display device 60) comprising one or more $LiNbO_3$ waveguides. For example, the one or more structural stability layers can make display devices (e.g., wearable display device 60) comprising one or more $LiNbO_3$ waveguides more resilient to thermal shock and/or day-to-day changes in environmental conditions. The one or more structural stability layers can have optical characteristics that do not reduce the optical performance (e.g., image sharpness, contrast) of the waveguides. For example, the one or more structural stability layers can be highly transmissive and transparent to light in a broad spectral range (e.g., visible light between about 450 nm and about 700 nm can be transmitted through the one or more structural stability layers with negligible or no attenuation). As another example, the one or more structural stability layers can have negligible or no optical power. As yet another example, the one or more structural stability layers can be configured to have reduced reflection. For example, the one or more structural stability layers can comprise low index optically clear polymers, such as, for example, fluorinated polymers such as Teflon. As another example, the one or more structural stability layers can comprise optical transmissive materials (e.g., transmissive to visible light between about 450 nm and about 700 nm) having a refractive index less than or equal to about 1.7 (e.g., between about 1.3-1.7). As another example, the one or more structural stability layers can comprise glass (e.g., AR Glass). The one or more structural stability layers can also be configured to facilitate stacking additional waveguides and/or other optical elements over the waveguide.

FIGS. 26A-26G show different embodiments of waveguides provided with one or more structural stability layers. The different embodiments illustrated in FIGS. 26A-26G include a waveguide 3101 comprising a high refractive index material (e.g., refractive index greater than or equal to about 1.8). The waveguide 3101 can comprise a material that is fragile, brittle, and/or prone to fracture with impact such as dropping the display device, e.g., head mounted display. For example, the waveguide 3101 can comprise $LiNbO_3$. The waveguide 3101 can comprise a plurality of diffractive features 3102 on one or more surfaces of the waveguide 3101.

Some of the plurality of features 3102 can be configured to output light propagating through the waveguide 3101 out of the waveguide 3101 (e.g., towards a viewer). To improve one or more of mechanical, structural, thermal, chemical stability and/or reliability of the waveguide 3101, structural stability layers (e.g., structural stability layers 3103, 3105, 3107 and 3109) are provided on one or both sides of the waveguide 3101 as shown in FIGS. 26A-26G. The one or more structural stability layers (e.g., structural stability layers 3013, 3105, 3107 and 3109) can be provided using deposition techniques, such as, for example, spin coating, or other pre-metered coating techniques such as slot-die, doctor blade, knife-edge, screen-printing, gravure, material atomization (spray), etc.

Figure 26C:
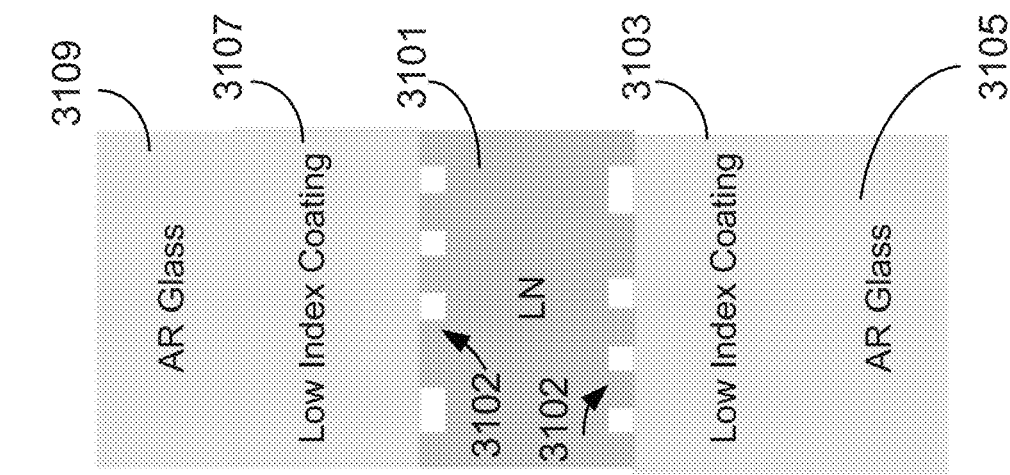
FIGS. 26A-26G are various example waveguides with one or more structural stability layers.
Figure 26B:
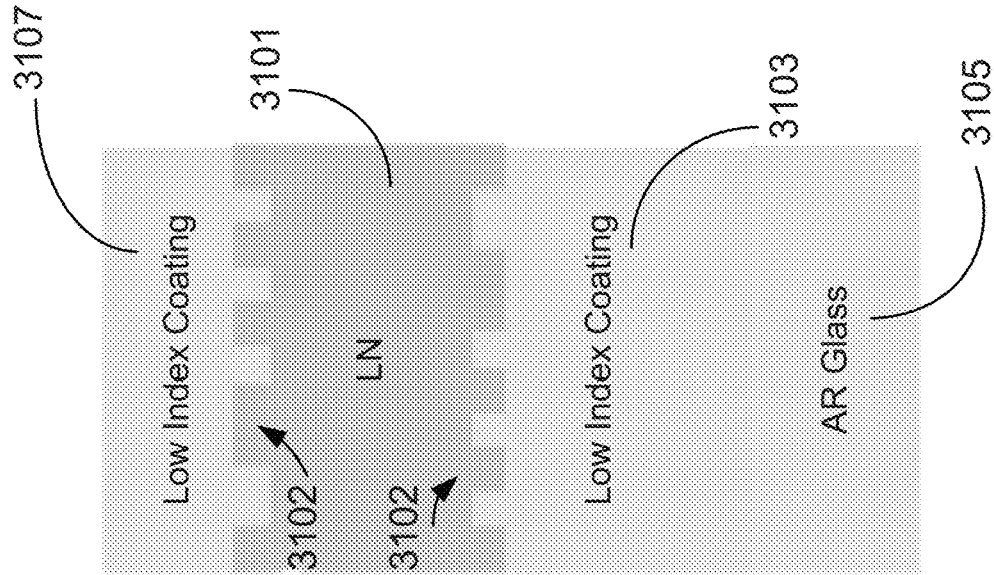

The one or more structural stability layers (e.g., structural stability layers 3103 and 3107) that are directly adjacent to the waveguide 310I can be deposited to fill in the gaps/spaces between the plurality of features 3102 as shown in FIGS. 26A-26D. However, in some embodiments, spacers (e.g., spacers 3111a, 3111b, 3113a, 3113b) can be provided between the waveguide 3101 and the one or more structural stability layers (e.g., structural stability layers 3103 and 3107) that are adjacent to the waveguide 3101 as shown in FIGS. 26E-26G. The spacers (e.g., spacers 3111a, 3111b, 3113a, 3113b) can comprise imprinted structures, pre-cut flat material and/or spherical beads (e.g., beads comprising soda lime or polystyrene (PS), etc.). The spacers can have a thickness between about 5 µm and about 50 µm. The spacers (e.g., spacers 3111a, 3111b, 3113a, 3113b) can provide for an air gap between, for example, the waveguide and a structural support layer.

Figure 26A:
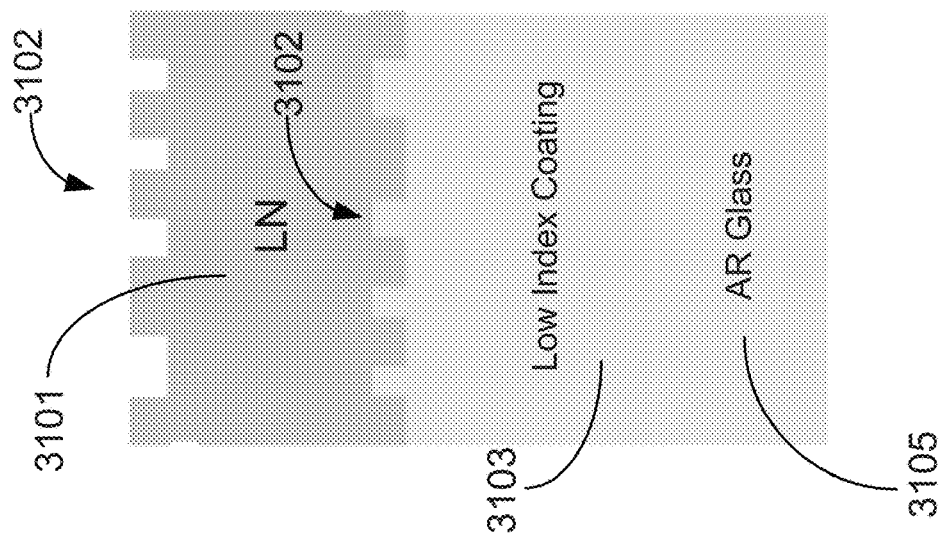
Figure 26D:
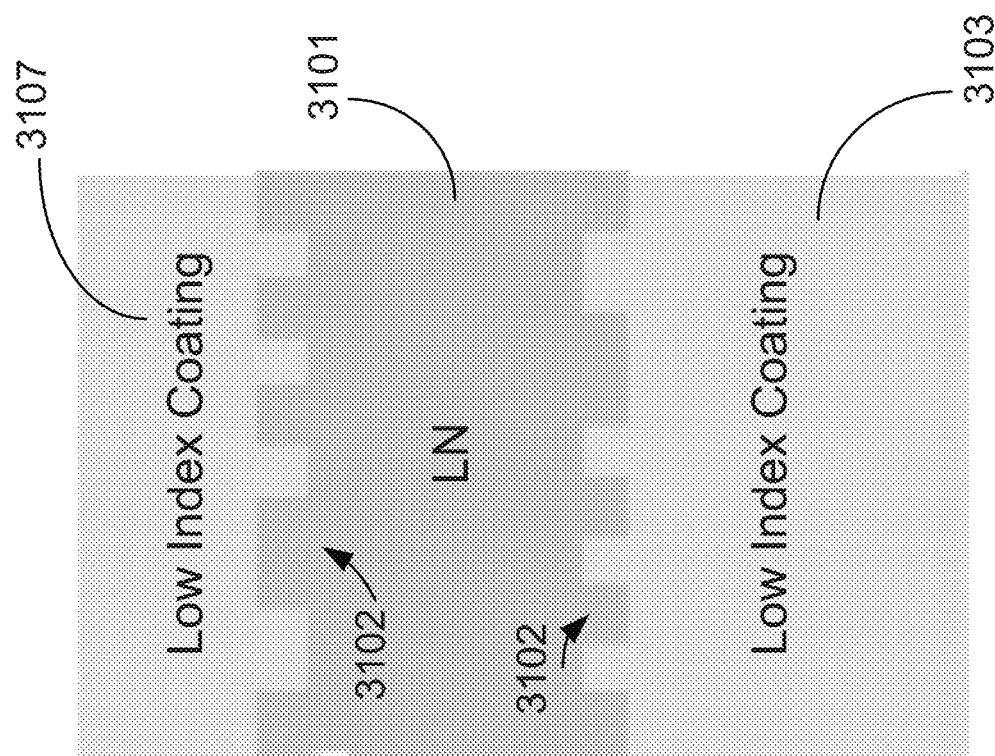
Figure 26F:
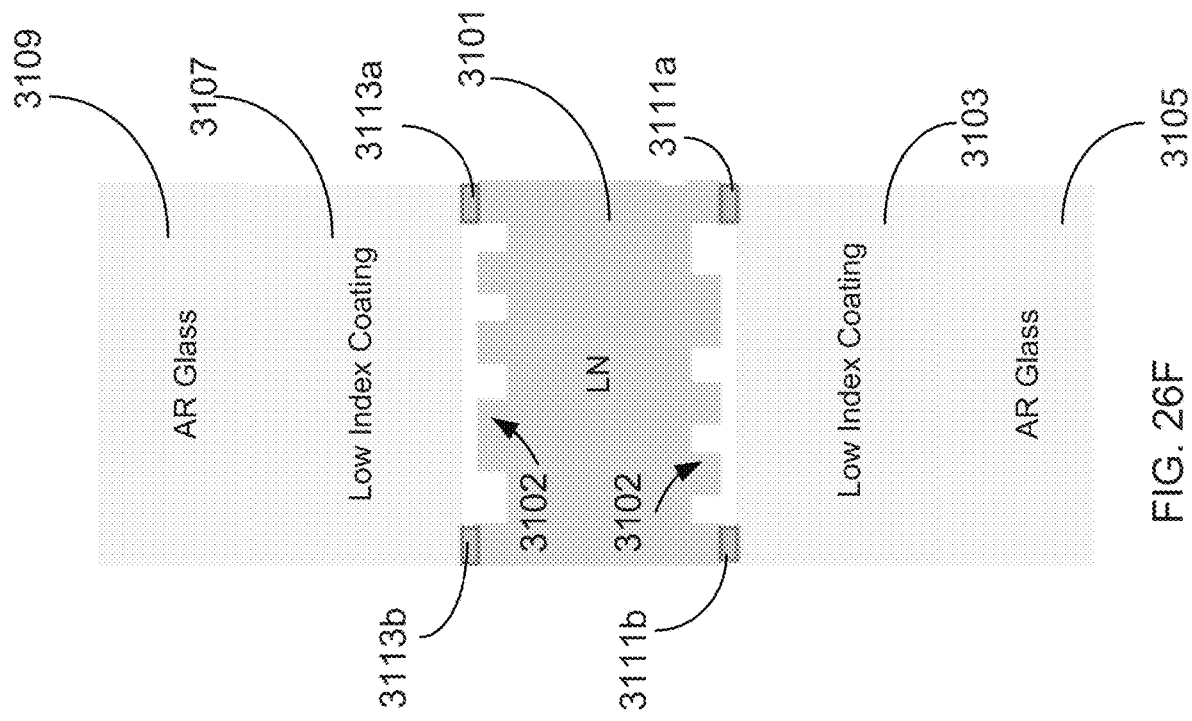
Figure 26E:
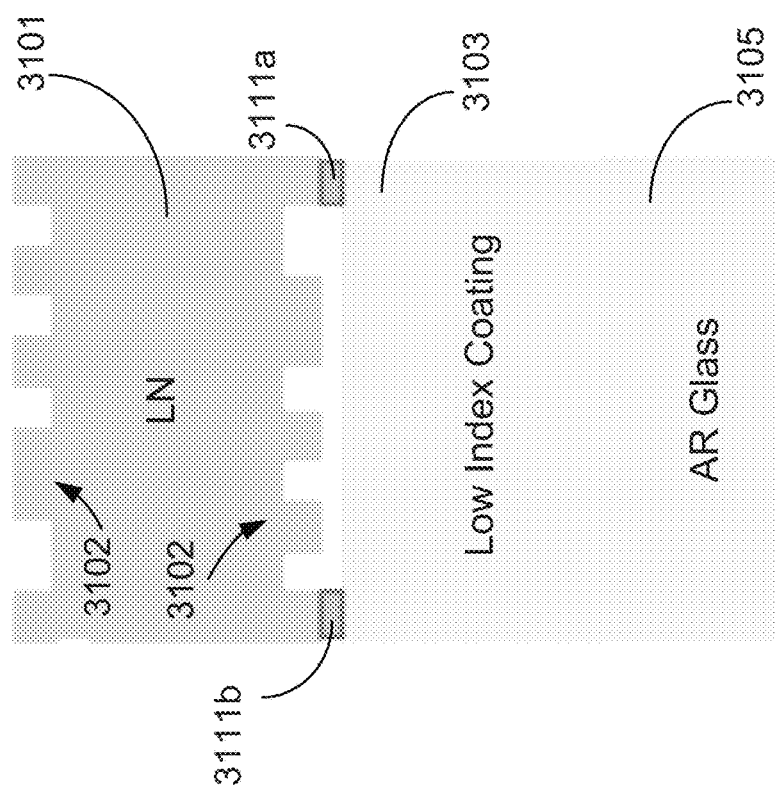
Figure 26G:
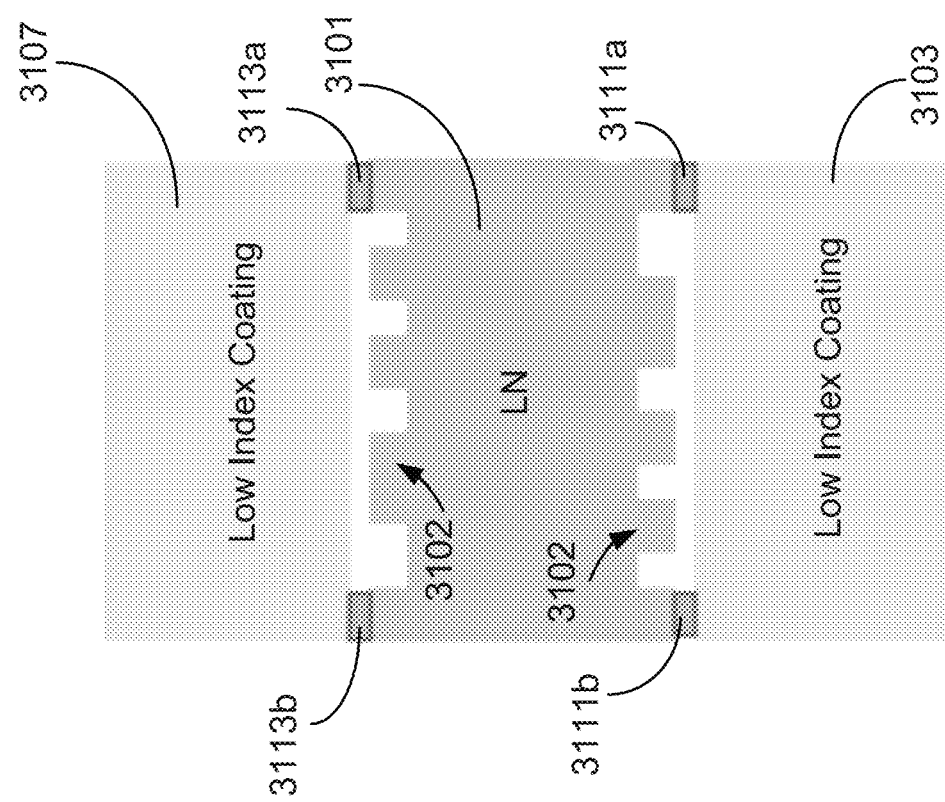

Accordingly, FIG. 26A shows a waveguide 3101 having a plurality of diffractive features 3102 therein with a first structural support layer 3105 comprising glass such as AR glass and a second structural comprising low index coating that is that is between the first structural support layer 3105 and the waveguide. The low index coating fills in between the diffractive features. FIG. 26B shows a design similar to that of FIG. 26A additionally including a third structural support layer 3107 comprising low index coating on the opposite side of the first and second structural support layers 3105, 3103. The low index coating fills in between the diffractive features. FIG. 26C shows design similar to that of FIG. 26B additionally including another structural support layer 3107 comprising glass such as AR glass on the opposite side of the waveguide as the first and second structural support layers 3105, 3103. In this implementation, air gaps are between the diffractive feature on the waveguide 3101. FIG. 26D shows a design similar to that of FIG. 26B without the additional first structural support layer 3105 comprising glass such as AR glass. The low index coating fills in between the diffractive features.

FIGS. 26E-26G show similar designs as shown in FIGS. 26A, 26C, and 26D except FIGS. 26E-26G include spacers between the waveguide and the support layers 3103, 3107 adjacent thereto. The spacers provide for air gaps between the waveguide and the support layers 3103, 3107. The air gaps shown in the embodiments illustrated in FIGS. 26E-26G can be manufactured by applying the spacers (e.g., 3111a, 3111b, 3113a and 3113b) to one or both patterned surfaces of the waveguide 3101; and disposing a polymer material that is configured to planarize the one or both patterned surfaces of the waveguide 3101. The polymer layer can be disposed using various deposition techniques such as, for example, spin-coating, slot-die coating, inkjetting, knife-edge coating, etc. The low index coatings (e.g., 3107 and 3103) can be applied via chemical vapor deposition methods or physical vapor deposition methods such as, for example, spin-coating, slot-die, inkjetting, knife-edge coating, etc. The low index coatings (e.g., 3107 and 3103) can comprise an inorganic material, such as, for example MgF$_2$, SiO$_2$ or a cross-linked low index polymer material. The polymer layer is then evaporated through a re-dox reaction catalyzed by heat to create the air gap. Without any loss of generality, the low index coatings (e.g., 3107 and 3103) can be configured to provide anti-scratch functionality as well as structural support for mechanical robustness.

B. Integrating with Optical Components

In various embodiments, optical components, such as, for example, refractive optical components (e.g., lenses), diffractive components, switches, etc. can be integrated with the patterned waveguides comprising a high refractive index material that are described in this application. FIGS. 27A-27F illustrate various embodiments of patterned waveguides 3201 that are integrated with a plano-convex lens 3207a (e.g. FIGS. 27A-27B), plano-concave lens 3207c (e.g. FIGS. 27D-27E) or Fresnel lenses 3207b and 3207d (e.g. FIGS. 27C-27F). The patterned waveguides 3201 comprise a plurality of diffractive features 3203. The plurality of features 3203 can be configured to incouple incident light into the waveguide 3201, distribute incoupled light along the waveguide 3201 or outcouple light propagating in the waveguide 3201. In some embodiments, the optical components 3207a-3207d can be disposed directly over the plurality of features 3203 as depicted in FIGS. 27A and 27D. In some other embodiments, the optical components 3207a-3207d can be disposed over a planarization and/or structural stability providing layer 3205 as shown in FIGS. 27B, 27C, 27E and 27F. In some implementations, a structural stability providing layer 3205 can have a thickness and strength to provide increased structural support. Such optical components 3207a-3207d can be integrated with patterned waveguides comprising a high refractive index material as shown in FIGS. 27A-27F. In some implementations embodiments such as illustrated in FIGS. 27A-27F can provide multiple depths of focus. For example, by providing optical power to the high index light outcouple by the waveguide can be directed into the user's eye such as if originating from an object at a particular distance. Multiple such optical components having optical power associated with different waveguides can be used to provide images appearing to originate from multiple depths.

Additional functional layers, such as, for example, anti-scratch layer, anti-fog layer, etc. can be integrated with the patterned waveguides 3201 and/or the optical components (e.g., lenses 3207a-3207d) to protect the surface of the patterned waveguides 3201 from scratches, fluctuations in environmental conditions, heat, humidity, etc. Furthermore, one or more structural stability layers described above can also be integrated with the patterned waveguides 3201 and/or the optical components (e.g., lenses 3207a-3207d) to improve mechanical, structural, thermal, and/or chemical stability and/or reliability of the waveguide devices.

IX. Example Devices with a Layer of Material Over Etched Diffractive Features

Figure 28A:
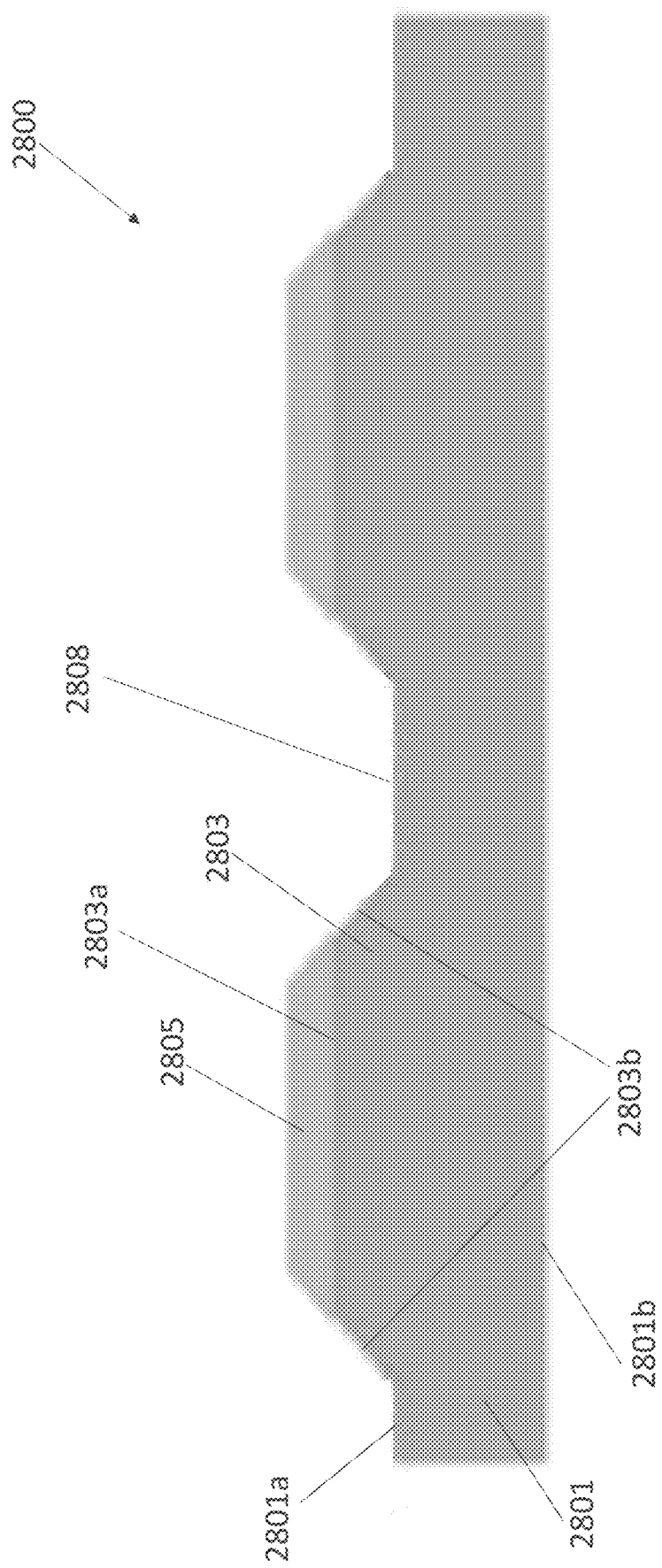

Various devices (e.g., optical devices, display devices, illuminators, integrated optical devices, etc.) can include diffractive features. In particular, as described herein waveguides employed in an eyepiece for a head mounted display can employ diffractive optical elements such as diffraction gratings comprising a plurality of diffractive features to control light. For example, diffractive optical elements or diffraction gratings can be used as incoupling optical elements, outcoupling optical elements, light distributing elements or combined pupil expander-extractors (CPEs). A CPE may operate both as a light distributing element, for example, distributing or spreading the light so as to increase the output beam of light and/or eye box, and an out-coupling grating. FIGS. 28A-28D illustrate some example devices comprising diffractive features of a diffractive optical element. In FIG. 28A, the example device 2800 includes a substrate 2801, diffractive features 2803 formed in the substrate 2801 (e.g., etched), and a layer 2805 of material disposed over the diffractive features 2803. The device 2800 can be fabricated using any of the methods described herein.

The substrate 2801 can comprise any of the waveguides described herein. The waveguide can be included in an eyepiece for a head mounted display. For example, the waveguide can be included in a stack of waveguides in an eyepiece for a head mounted display. Different waveguides in the stack may be for different colors of light and/or different depths (e.g. depth planes) as discussed above. The eyepiece can be transparent to provide the user a view of the environment in front of the user and the head mounted display. The eyepiece can be configured to receive light from an image projector and to direct at least a portion of the light to an eye of the user to direct image content to the eye of the user. The eyepiece can be mounted on a frame configured to be worn on the head of the user. The eyepiece and be positioned in front of the user to direct light from the projector into the eye to form an image in the eye. One or more incoupling optical elements associated with the waveguide in the eyepiece may receive light from the light projector can couple light into the waveguide to be guided therein by total internal reflection. In some implementations, the light may propagate within the waveguide to a light distributing element which spreads the light out and redirect the light to an out-coupling optical element to direct the light to the user's eye. In some implementations, the incoupling optical element directs the light to a combined pupil expander-extractor or CPE, which spreads the light out in two directions to increase the eyebox size and also couples light from the projector guided within the waveguide out to the user's eye. Accordingly, the incoupling grating, light distributing element, the outcoupling optical element and the pupil expander-extractors may comprise diffractive optical elements such as diffraction gratings configured to perform the functions such as redirect light to be coupled into the waveguide to be guided therein, spreading the light in one or more directions to increase the eye box, outcoupling the light guided within the waveguide out to the user to form images in the user's eye.

As illustrated in FIG. 28A, the substrate 2801 comprising the waveguide can have opposite first 2801a and second 2801b sides. When integrated in a head mounted display, the second side 2801b can be disposed closer to a wearer's eye when the head mounted display is worn than the first side 2801a. The second opposite side 2801b may be disposed closer to the environment (e.g. world) in front of the user and the head mounted display. In some implementations, the substrate 2801 can comprise a material having a refractive index greater than 2.0 (e.g., at least 2.1, at least 2.2, at least 2.3, at least 2.4, at least 2.5, at least 2.6, at least 2.7, at least 2.8, at least 2.9, at least 3.0, at least 3.1, at least 3.2, at least 3.3, at least 3.4, at least 3.5, at least 3.6, at least 3.7, at least 3.8, at least 3.9, at least 4.0, or any value in any range/subrange defined by these values). As described herein, some such implementations can advantageously enlarge the field of view and/or allow different colors or wavelengths of light to be in-coupled into a single waveguide compared to those comprising a material with a lower refractive index. Some example materials include Lithium Niobate (LiNbO$_3$), Lithium Tantalate (LiTaO$_3$), Diamond, Silicon Carbide (SiC), etc. The substrate, however, need not be limited to high index material. As described herein, the waveguide can be transparent to visible light so that the user can see through the waveguide and the eyepiece to the environment in front of the viewer. In some implementations, therefore, the eyepiece (e.g., the waveguide and or the diffractive optical elements, such as the output optical element and/or pupil expander-extractors may be configured to reduce reflection losses to facilitate such viewing. Additionally, light containing image information from the projector is to be in-coupled into the waveguide to be guided therein, distributed across the waveguide (for example in two directions), and out-coupled out of the waveguide towards a viewer.

As discussed above, the light can be in-coupled, distributed, and out-coupled using diffractive optical elements or features 2803 (e.g., in-coupling optical elements, out-coupling optical elements, exit pupil expanders, etc.). As an example, the diffractive features 2803 can be included in an in-coupling optical element disposed so as to receive light from an image source and couple the light into the substrate 2801 to be guided therein. As another example, the diffractive features 2803 can be included in an out-coupling optical element disposed so as to receive light from an image source that is guided in the substrate 2801 out of the substrate 2801 to an eye of a user wearing the head mounted display. As discussed above, the diffractive features 2803 may also be configured to spread the light over an area of the waveguide, for example, to increase the eye box and enable the eye to receive light from the eyepiece and view images from the projector when the eye is located at a variety of lateral positions with respect to the eyepiece. The diffractive features 2803 may also additionally be able to outcouple light guided within the waveguide and direct the light to the eye as well as in the case of the combined pupil expander-extractor or CPE. As shown in FIG. 28A, the diffractive features 2803 can be disposed on the first side 2801a of the substrate 2801. Alternatively or additionally, the diffractive features 2803 can be disposed on the second side 2801b of the substrate 2801. In various implementations, the diffractive features 2803 can form diffractive gratings. Accordingly, although only two diffractive features 2803 are shown in FIG. 28A more diffractive features may be included. This principle applies to the other drawings included herein. A reduced number of features may be shown for convenience, however, the structure may include more (or possibly less) features. With reference to FIG. 28A, the diffractive features 2803 can have top surfaces 2803a and sidewalls 2803b disposed about the top surfaces 2803a. In some devices, at least one or more of the diffractive features 2803 can have sloping sidewalls 2803b. In some devices, at least one or more of the diffractive features 2803 can have a trapezoidal cross-section. Other shapes are possible. The top, for example, may be slanted in some designs. In some designs the diffractive features 2803 may have two sloping sidewalls that meet.

A layer 2805 of material can be disposed over the diffractive features 2803 (e.g., on the top surfaces 2803a of the diffractive features 2803). The layer 2805 of material can have an index of refraction that is less than 1.8 (e.g., a refractive index between about 1.2-1.7). For example, the layer 2805 of material can comprise a polymer, such as a resist or a photoresist. In various implementations, the layer 2805 material comprises patternable material such as patternable material employed as a mask in patterning or etching the features 2803, for example, in the substrate. Some of the patternable material may be left after patterning or etching the diffractive features 2803. This patternable material the remains after fabricating the diffractive features 2803 may have advantages such as increasing or adding to the size, e.g., height, of the diffractive features. Additionally, in some instances, the layer 2805 of material can advantageously reduce reflection loss (e.g., provide an anti-reflective surface in some instances) from the surface of incoming light from the world and/or from other stacked eyepieces. The anti-reflective characteristic may result, in some cases, from having a transition in index of refraction from the higher index of the substrate (possible at least 1.9 or 2.0), to an intermediate index of the layer 2805 (e.g., less than 1.8, possibly 1.5 or 1.4) to air, which has an index of about 1.0. The reduced reflection loss, may for example, increase visibility of the environment in front of the user and the head mounted display and/or increase the brightness of the display.

In various implementations, the diffractive features 2803 can be separated by spaces 2808. In some instances, the spaces 2808 might not be covered by the layer 2805 of material. In some instances, the spaces 2808 can include exposed regions of the substrate 2801. As illustrated, no residual layer thickness (RLT) of the layer 2805 is present, for example, in the space 2808 between the diffractive features. Accordingly, in various implementations, no more than a negligible residual layer thickness (RLT) of the layer 2805 is present.

As discussed above, the number of diffractive features 2803 is not particularly limited. For illustrative purposes only, FIG. 28A shows two diffractive features 2803, however, the diffracting grating can include much more. In some devices, the height of the diffractive features 2803 can be substantially constant with lateral position. In some devices, the height of the diffractive features 2803 can be the same. In some devices, the layer 2805 of material can have a thickness that is substantially constant with lateral position. In some devices, the layer 2805 of material can have the same thickness over the diffractive features 2803 (e.g., on the top surface 2803a of the diffractive features 2803).

In some instances, the layer 2805 of material can advantageously provide a similar effect of etching into the substrate 2801. For example, since it may be complicated to etch into certain materials or substrates such as certain high refractive index substrates, the combination of a layer 2805 of material and a diffractive feature 2803 can provide a depth equivalent to a diffractive feature etched deeper into the substrate 2801. In some such implementations, the layer 2805 of material can help maintain a certain diffraction efficiency of a diffractive feature 2803 equivalent to a deeper etched diffractive feature without the layer 2805 of material.

Without any loss of generality, deeper diffractive features or diffractive features having increased height can have higher light extraction. Conversely shallow diffraction features or diffractive features having reduced height can have less light extraction. Accordingly, diffractive features closer to the light injection side (e.g., in proximity to the incoupling grating and/or image projector) may benefit from shallow diffractive features and reduced height (e.g., to allow a majority of light to spread across the waveguide as opposed to, for example, being immediately turned by the diffractive optical element and/or possibly coupled out of the waveguide), while diffractive features farther from the light injection side may benefit from deeper diffractive features (e.g., to extract as much remaining light as possible). FIGS. 28B-28D illustrate some example devices having different thicknesses of the layer of material and/or heights of the diffractive features.

In FIG. 28B, the example optical device 2810 includes a substrate $281_1$, diffractive features $2813_1$, $2813_2$, $2813_3$, ... $2813_n$, and layers $2815_1$, $2815_2$, $2815_3$, ... $2815_n$ of material disposed over the diffractive features. The number n of diffractive features and/or layers of material is not particularly limited. Four diffractive features and layers of material are shown for illustrative purposes only.

In FIG. 28B, a first diffractive feature $2813_1$, a second diffractive feature $2813_2$, and a third diffractive feature $2813_3$ are laterally displaced with respect to each other. The second diffractive feature $2813_2$ is disposed between the first diffractive feature $2813_1$ and the third diffractive feature $2813_3$. As illustrated in FIG. 28B, the thickness of the layers $2815_1$, $2815_2$, $2815_3$ can be graded. In this example, the diffractive features $2813_1$, $2813_2$, $2813_3$ have the same height, while the layers $2815_1$, $2815_2$, $2815_3$ of material have a different thickness over the diffractive features $2813_1$, $2813_2$, $2813_3$ (e.g., on the top surfaces of the diffractive features $2813_1$, $2813_2$, $2813_3$). The thickness of the layer $2815_3$ of material on the third diffractive feature $2813_3$ is higher (or lower in other instances) than the thickness of the layer $2815_2$ of material over the second diffractive feature $2813_2$, and thickness of the layer $2815_2$ of material over the second diffractive feature $2813_2$ is higher (or lower in other instances) than the thickness of the layer $2815_1$ of material over the first diffractive feature $2813_1$. The layers $2815_1$, $2815_2$, $2815_3$ can have a thickness that progressively increases (or decreases) with lateral position.

In FIG. 28C, the example optical device 2820 includes a substrate 2821, diffractive features $2823_1$, $2823_2$, $2823_3$, ... $2823_n$, and layers $2825_1$, $2825_2$, $2825_3$, ... $2825_n$ of material disposed over the diffractive features. In FIG. 28C, a first diffractive feature $2823_1$, a second diffractive feature $2823_2$, and a third diffractive feature $2823_3$ are laterally displaced with respect to each other. The second diffractive feature $2823_2$ is disposed between the first diffractive feature $2823_1$ and the third diffractive feature $2823_3$. As illustrated in FIG. 28C, the height of the diffractive features $2823_1$, $2823_2$, $2823_3$ can be graded. In particular, while the layers $2825_1$, $2825_2$, $2825_3$ have the same thickness over the diffractive features $2823_1$, $2823_2$, $2823_3$ (e.g., on the top surfaces of the diffractive features $2823_1$, $2823_2$, $2823_3$), the diffractive features $2823_1$, $2823_2$, $2823_3$ have a different height. In this example, the height of the third diffractive feature $2823_3$ is higher (or lower in other instances) than the height of the second diffractive feature $2823_2$, and height of the second diffractive feature $2823_2$ is higher (or lower in other instances) than the height of the first diffractive feature $2823_1$. The height of the diffractive features $2823_1$, $2823_2$, $2823_3$ can progressively increase (or decrease) with lateral position.

In FIG. 28D, the example optical device 2830 includes a substrate 2831, diffractive features $2833_1$, $2833_2$, $2833_3$, ... $2833_n$, and layers $2835_1$, $2835_2$, $2835_3$, ... $2835_n$ of material disposed over the diffractive features. In FIG. 28D, a first diffractive feature $2833_1$, a second diffractive feature $2833_2$, and a third diffractive feature $2833_3$ are laterally displaced with respect to each other. The second diffractive feature $2833_2$ is disposed between the first diffractive feature $2833_1$ and the third diffractive feature $2833_3$. As illustrated in FIG. 28D, the heights of the diffractive features $2833_1$, $2833_2$, $2833_3$ can be graded and the thickness of the layers $2835_1$, $2835_2$, $2835_3$ can be graded. In particular, in FIG. 28D, the diffractive features $2833_1$, $2833_2$, $2833_3$ have a different height, and the layers $2835_1$, $2835_2$, $2835_3$ of material also have a different thickness over the diffractive features $2833_1$, $2833_2$, $2833_3$ (e.g., on the top surfaces of the diffractive features $2833_1$, $2833_2$, $2833_3$). In this example, the height of the third diffractive feature $2833_3$ is higher (or lower in other instances) than the height of the second diffractive feature $2833_2$, and height of the second diffractive feature $2833_2$ is higher (or lower in other instances) than the height of the first diffractive feature $2833_1$. The height of the diffractive features $2833_1$, $2833_2$, $2833_3$ can progressively increase (or decrease) with lateral position. The height of the diffractive features $2833_1$, $2833_2$, $2833_3$ can be graded. Additionally, in this example, the thickness of the layer $2835_3$ of material over the third diffractive feature $2833_3$ is higher (or lower in other instances) than the thickness of the layer $2835_2$ of material over the second diffractive feature $2833_2$, and thickness of the layer $2835_2$ of material over the second diffractive feature $2833_2$ is higher (or lower in other instances) than the thickness of the layer $2835_1$ of material over the first diffractive feature $2833_1$. The layers $2835_1$, $2835_2$, $2835_3$ can have a thickness that progressively increases (or decreases) with lateral position.

In some implementations, in the examples shown in FIGS. 28B, 28C, and 28D, the devices 2810, 2820, 2830, can include a projector (not shown) disposed with respect to the substrate 2811, 2821, 2831 to direct light into the substrate 2811, 2821, 2831. The projector can be positioned closer to the first diffractive features $2813_1$, $2823_1$, $2833_1$ than the second diffractive features $2813_2$, $2823_2$, $2833_2$. For example, the projector can be positioned closer to the diffractive features with lower heights than to the diffractive features with higher heights. As another example, the projector can be positioned closer to the diffractive features where the layer of material is thinner than to the diffractive features where the layer of material is thicker. As the diffractive features act to diffract light, for example, out of the waveguide, less light is available. Accordingly, progressively increasing the diffraction efficiency by increasing the height of the diffractive features and/or the thickness of the material disposed thereon, may offset the reduced amount of available light and provide better uniformity of light output, for example, across the eyepiece.

In any of the examples shown in FIGS. 28A-28D, the thickness of the substrate 2801, 2811, 2821, 2831 can be graded (e.g., as shown in FIG. 12B-2, 12C, or 13D or graded in the opposite direction). The thickness of the substrate 2801, 2811, 2820, 2830 can progressively increase (or decrease in other instances) with lateral position.

Figure 29A:
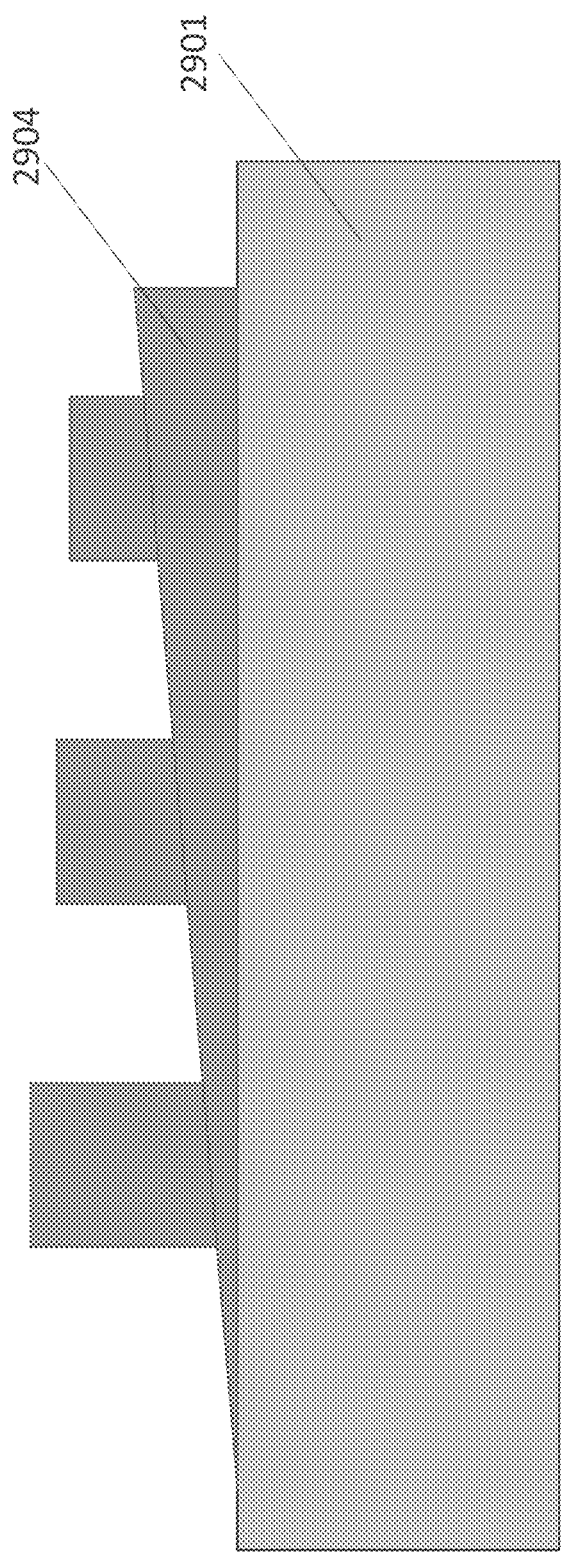
FIG. 29A is an example graded layer of patternable material.
Figure 29B:
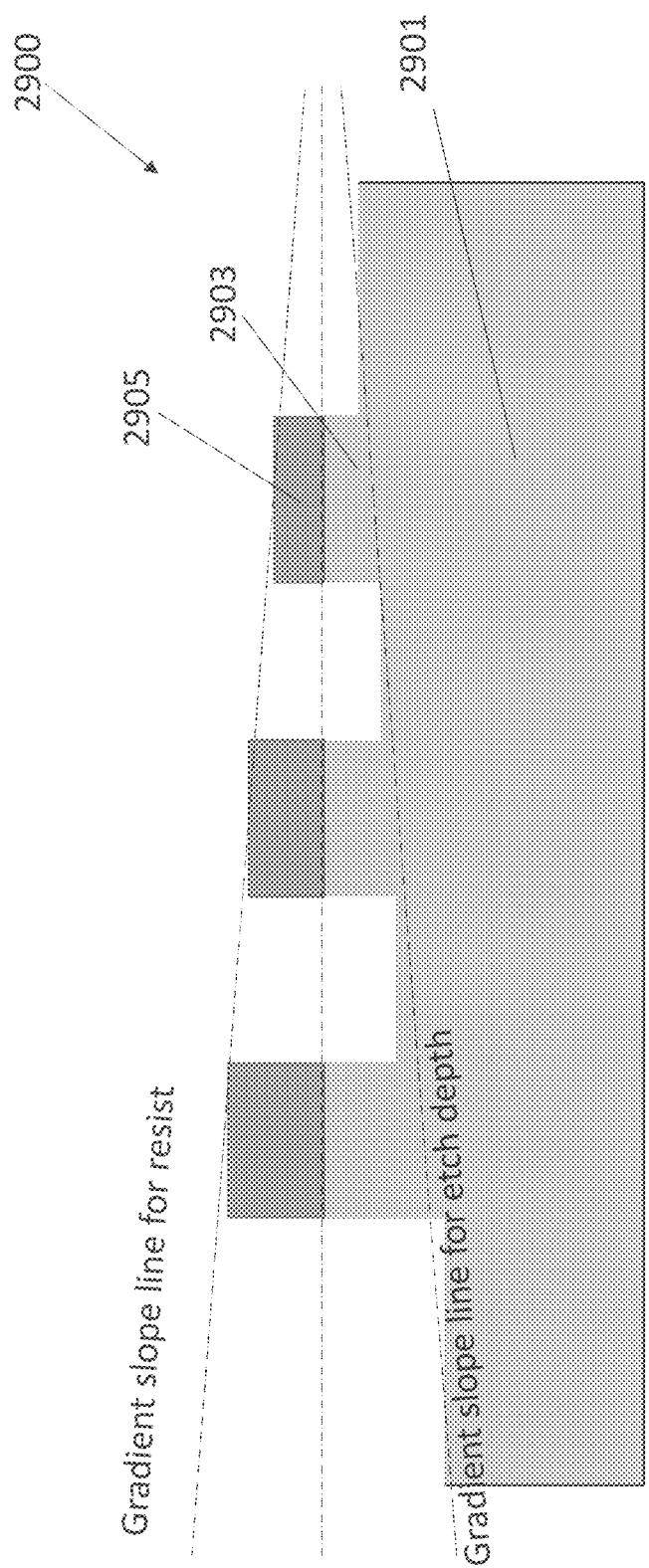
FIG. 29B is an example substrate which progressively increases with lateral position.

FIG. 29A shows an example graded layer of patternable material such as polymer or resist material 2904 (e.g., a mask) used to etch the substrate 2901 into the optical device 2900 shown in FIG. 29B. In various implementations, the patternable material is deposited, e.g., jet deposited, over the substrate and a template is used to imprint a pattern into the patternable material. The example patternable material, e.g., resist material 2904 can be used to etch the substrate 2901 into a graded substrate 2901 with graded diffractive features 2903. As shown in FIG. 29B, the substrate 2901 can progressively increase (or decrease in other instances) with lateral position. The height of the diffractive features 2903 can also progressively decrease (or increase in other instances) with lateral position. In some implementations, the patternable material 2904 is not completely removed, consumed or etched away in the process of pattering the substrate. Accordingly, some of the patternable material 2904, e.g., resist may remain. Remaining patternable material or resist material 2904 can form a layer 2905 of material over the diffractive features 2903. In other implementations, the layer 2905 of material can be added over the diffractive features 2903. The layers 2905 of material can have a thickness that progressively decreases (or increases in other instances) with lateral position. The thickness of the layers 2905 can be graded.

Figure 30A:
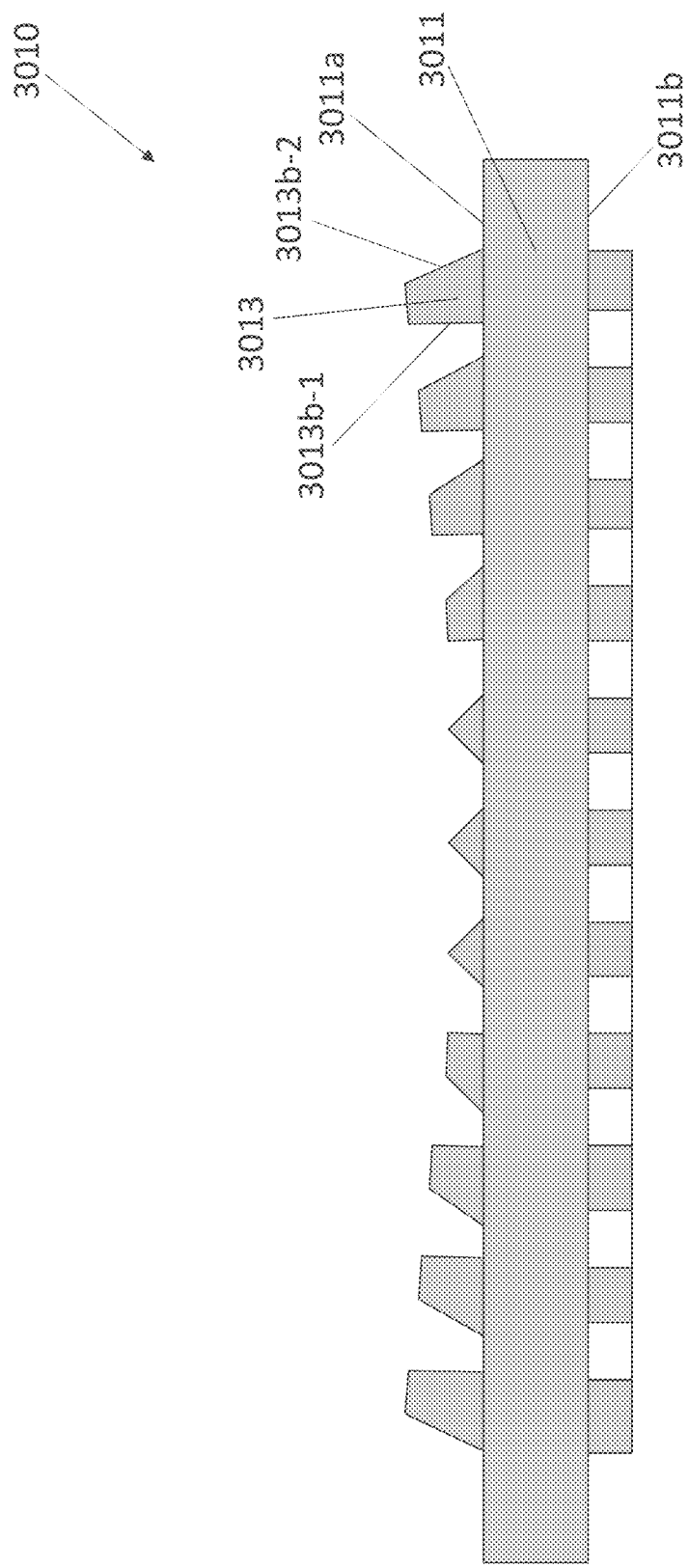
FIGS. 30A-30C are example optical devices including diffractive features.
Figure 30B:
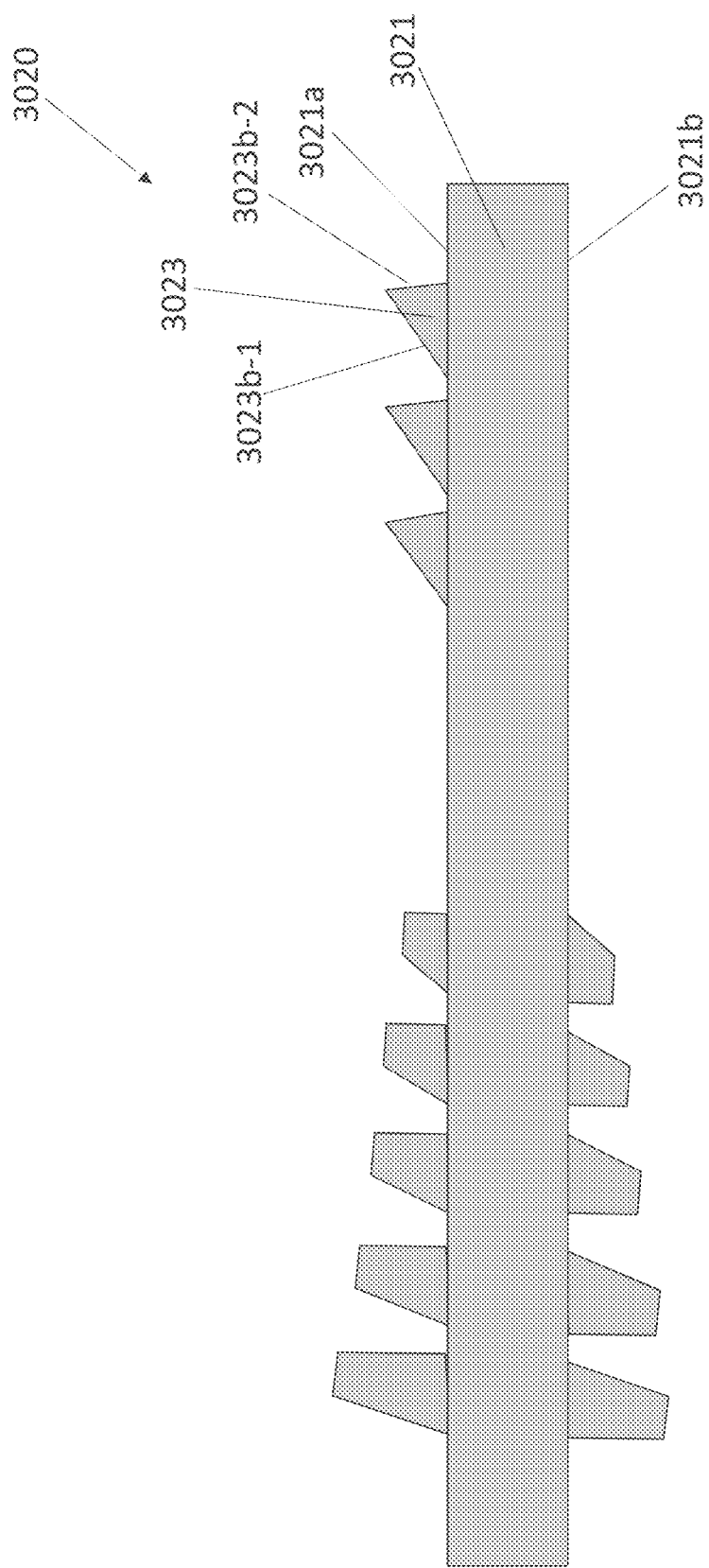
Figure 30C:
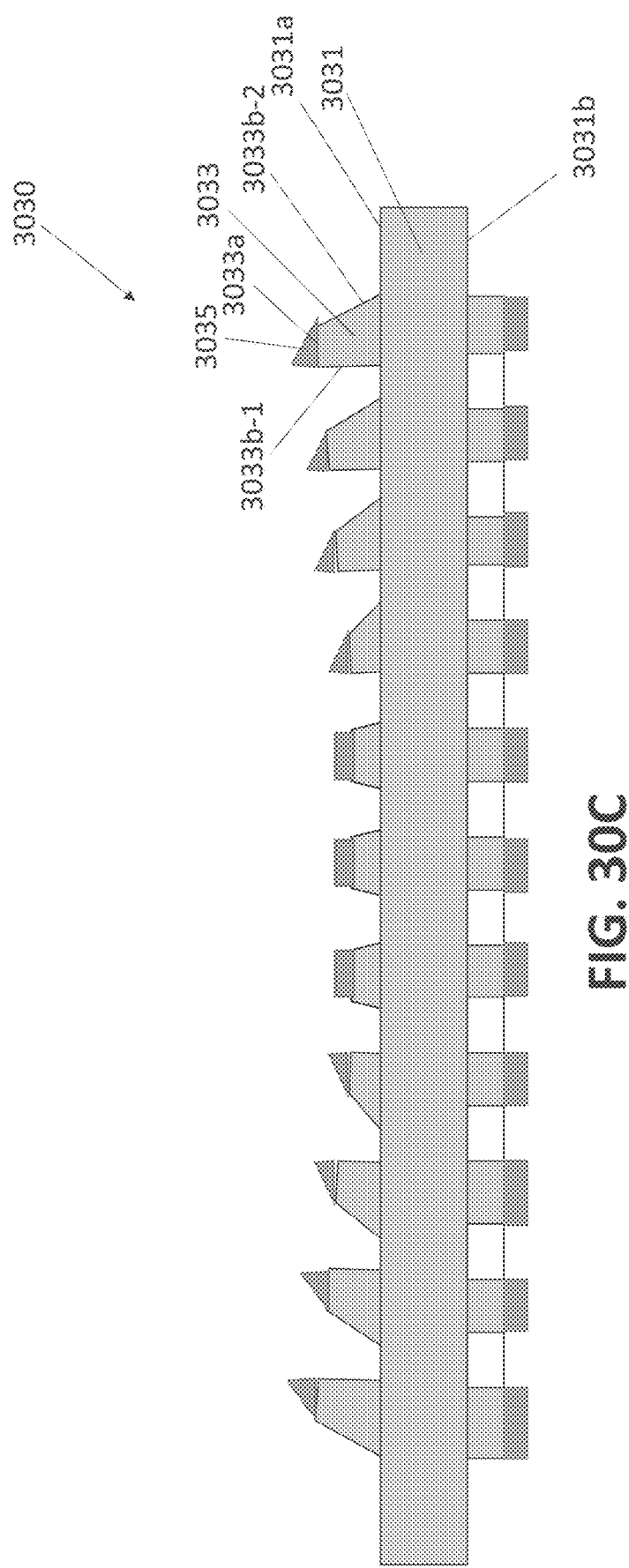

In some devices, as shown in the example device 3010 in FIG. 30A, diffractive features 3013 can be provided on one or more (possibly both) sides 3011a, 3011b of a substrate 3011. Additionally, any of the diffractive features 3013 can have an asymmetrical shape to provide a blazed diffraction grating, for example, configured to direct more light to the viewer. For example, a diffraction feature 3013 formed on side 3011a in FIG. 30A has asymmetric sidewalls 3013b-l, 3013b-2. The shape of the diffraction feature 3013 can determine the direction where the grating directs the light. In the example shown in FIG. 30A, the shape of the diffraction features on one side changes with lateral position. For example, the diffractive features at the center are symmetric with no plateau on top, while the diffractive features at the edge are asymmetric and have a plateau on top. The diffractive features at the edges are blazed and face different (e.g., opposite) directions. The size, e.g., height, of the diffractive feature also increases with distance from the center. In the example optical device 3020 in FIG. 30B, two groups of diffractive features 3023 with asymmetric sidewalls 3023b-l, 3023b-2 can be provided on two respective sides 3021a, 3021b of a substrate 3021 toward one edge. In the example shown, the size and shape of some of the diffraction features changes with lateral position. For example, for two groups of diffractive features, the size, e.g., height, of the diffractive feature increases with distance from the center. In the example shown in FIG. 30C, the size and shape of the diffraction features on one side changes with lateral position. For example, the diffractive features at the center are symmetric and shorter, while the diffractive features at the edge are asymmetric and taller. The diffractive features at the edges are blazed and face different (e.g., opposite) directions. The size, e.g., height, of the diffractive feature increases with distance from the center. FIG. 30C also shows an optical device 3030, wherein on one side 3031a of the substrate 3031, a layer 3035 of material is disposed over top surfaces 3033a of diffractive features 3033 having asymmetric sidewalls features 3033 having asymmetric sidewalls 3033b-l, 3033b-2. The shape of the patterned material comprising the layer 3035 changes with lateral position. The shape of the patterned material comprising the layer 3035 is different at the center as compared to at the edges. On the other side 3031b of the substrate 3031, a layer of material is disposed over top surfaces of diffractive features that are symmetric and have symmetric (straight) sidewalls. The width of the features as well as the width of the patternable material (e.g., resist) formed thereon increases with distance from the center. Other examples are possible.

X. Example Devices with High Index Refractive Material Over Diffractive Features As described herein, since it may be complicated to etch into certain material and substrates such as certain high refractive index substrates, a layer of material can be provided over an etched diffractive feature to provide a depth equivalent to a diffractive feature etched deeper into the substrate. In other devices, as shown in the example device 3100 in FIG. 31, a diffractive feature equivalent to a diffractive feature etched into a high index substrate can be provided by forming diffractive features 3103 on the substrate 3101 with a material having an index of refraction less than the substrate material, and providing material 3105 having a higher index than the diffractive features 3103 over (e.g., on top of) the diffractive features 3103.

In various implementations, the substrate 3101 can comprise a material having a refractive index greater than 2.0 (e.g., at least 2.1, at least 2.2, at least 2.3, at least 2.4, at least 2.5, at least 2.6, at least 2.7, at least 2.8, at least 2.9, at least 3.0, at least 3.1, at least 3.2, at least 3.3, at least 3.4, at least 3.5, at least 3.6, at least 3.7, at least 3.8, at least 3.9, at least 4.0, or any value in any range/sub-range defined by these values). Some example materials include Lithium Niobate ($LiNbO_3$), Lithium Tantalate ($LiTaO_3$), Diamond, Silicon Carbide (SiC), etc. As described herein, the substrate can comprise a waveguide and material that can be transparent to visible light.

The diffractive features 3103 can be formed by imprint technology. For example, patternable material, such as polymer, e.g., resist, may be deposited, e.g., jet deposited on the substrate. A template having a pattern therein may be pressed onto the patternable material to form an imprint and pattern in the patternable material. The patternable material may then be cured in some cases. Other processes for fabricating the diffractive features 3103 may employed. For example, other techniques such as evaporation deposition, sputtering, chemical vapor deposition may be used to deposit the patternable material onto the substrate 3101. Photolithography may also be used to pattern the patternable material.

Figure 31:
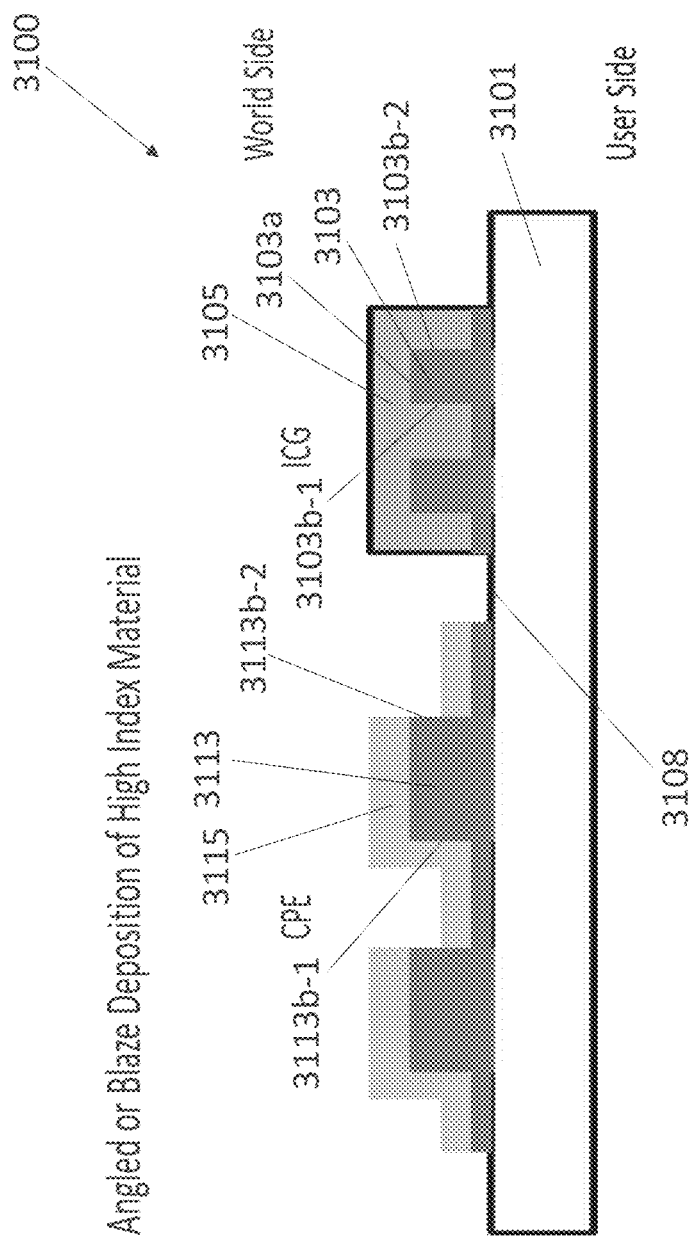
FIG. 31 is an example optical device including diffractive features.

In various implementations, the diffractive features 3103 can be formed of a material having an index of refraction less than the material of the substrate 3101. The diffractive features 3103 can, for example, have an index of refraction that is less than 1.8 (e.g., a refractive index between about 1.2-1.8, between about 1.5-1.8, between about 1.6-1.8, between about 1.7-1.8, etc.). For example, the diffractive features 3103 can comprise a polymer, such as, a resist or a photoresist. As discussed herein, in various implementations, the diffractive features 3103 can form diffractive gratings. Although only a few diffractive features 3103 are shown, more may be included to form the diffraction grating or diffractive optical elements. With reference to FIG. 31, the diffractive features 3103 can have top surfaces 3103$a$ and sidewalls 3103$b$-1, 3103$b$-2 disposed about the top surfaces 3103$a$. The diffractive features 3103 can be separated by spaces 3108.

The higher index material 3105 disposed over the diffractive features 3103 can, for example, comprise a material having a refractive index greater than 2.0 (e.g., at least 2.1, at least 2.2, at least 2.3, at least 2.4, at least 2.5, at least 2.6, at least 2.7, at least 2.8, at least 2.9, at least 3.0, at least 3.1, at least 3.2, at least 3.3, at least 3.4, at least 3.5, at least 3.6, at least 3.7, at least 3.8, at least 3.9, at least 4.0, or any value in any range/sub-range defined by these values). Some example materials include Lithium Niobate (LiNbO$_3$), Lithium Tantalate (LiTaO$_3$), Diamond, Silicon Carbide (SiC), etc.

Figure 32:
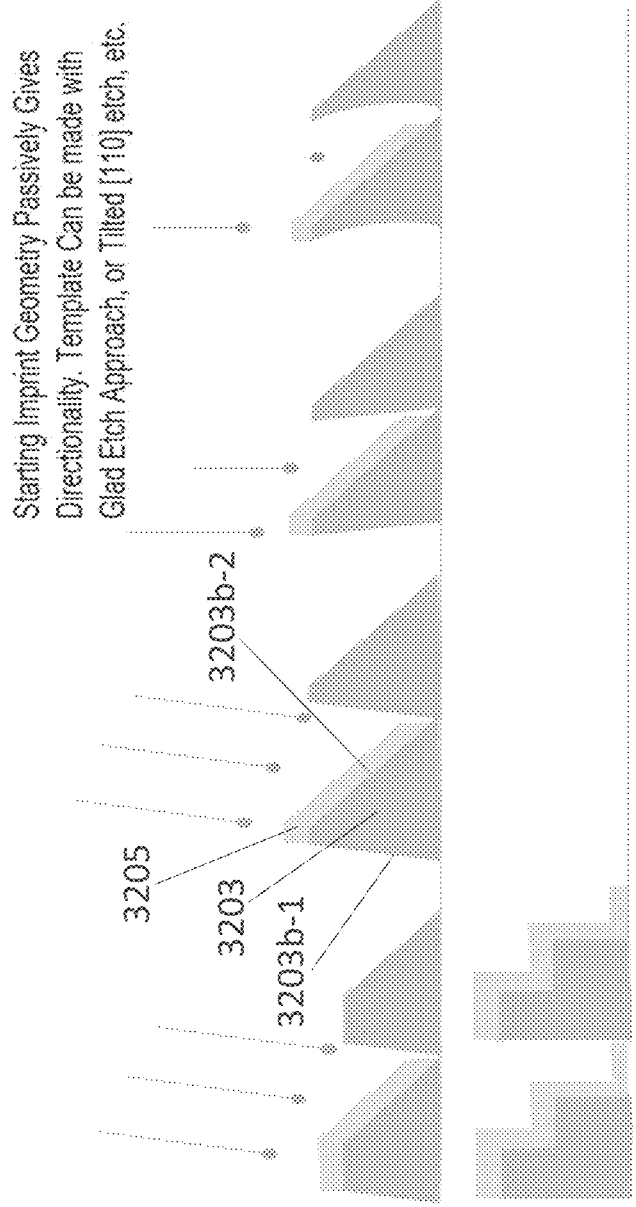
FIG. 32 is an example optical device including diffractive features.

In some devices, as also shown in FIG. 31, high index material 3115 can be provided asymmetrically on a diffraction feature 3113 to provide a blazed diffraction grating configured to preferentially direct more light in one or more directions such as to the viewer. For example, more of the high index material 3115 can be on the first side of a diffractive feature 3113 than on a second side of the diffractive feature 3113. For example, more of the high index material 3115 can be on the first sidewall 3113$b$-$l$ of a diffractive feature 3113 than on a second sidewall 3113$b$-2 of the diffractive feature 3113. In some instances, as shown in FIG. 31, at least one diffractive feature 3113 can have the high index material 3115 on a first side 3113$b$-$l$ of the diffractive feature 3113, while the second side 3113$b$-2 of the diffractive feature 3113 can be exposed or at least partially exposed. As shown in the examples in FIG. 32, high index material 3205 can also be provided asymmetrically by depositing on diffraction features 3203 with asymmetric sidewalls 3203$b$-$l$, 3203$b$-2. Directional deposition, such as glancing angle deposition (GLAD), may be employed in some implementations to preferentially coat one side of the diffracting gratings. In some implementations, diffraction features with asymmetric geometry may passively provide for directional deposition. Templates can be fabricated using ion etching, GLAD etching, tilted etching, Faraday cage etching, etc. FIG. 31 also shows conformal deposition coating the diffractive features more uniformly. See grating on right of substrate. In this example, the grating on the right comprises an incoupling optical element or incoupling grating (ICG) and the grating on the left comprises a pupil expander-extractor (CPE). The CPE may be configured with the angled or blazed deposition of the high index material to preferentially outcouple light toward the user's eye instead of the environment in front of the user and head mounted display.

XI. 2D Array of Diffractive Features

Various implementations have been illustrated as a 1D array of diffractive features. For example, FIG. 33A shows a cross-sectional side-view of an example device 3300 having a series of diffractive features 3303 arranged laterally in one direction (e.g., the horizontal direction in FIG. 33B). The diffractive feature 3303 undulate in one direction (e.g., the horizontal direction in FIG. 33B) and are thus referred to as 1D. FIG. 33B shows a top-view of the example device 3300. The diffractive features 3303 can form a series of elongate longitudinal features such as lines extending in one direction (e.g., the vertical direction in FIG. 33B). The elongate longitudinal features are arranged along one direction (e.g., the horizontal direction in FIG. 33B) and repeat in that direction.

Figure 34:
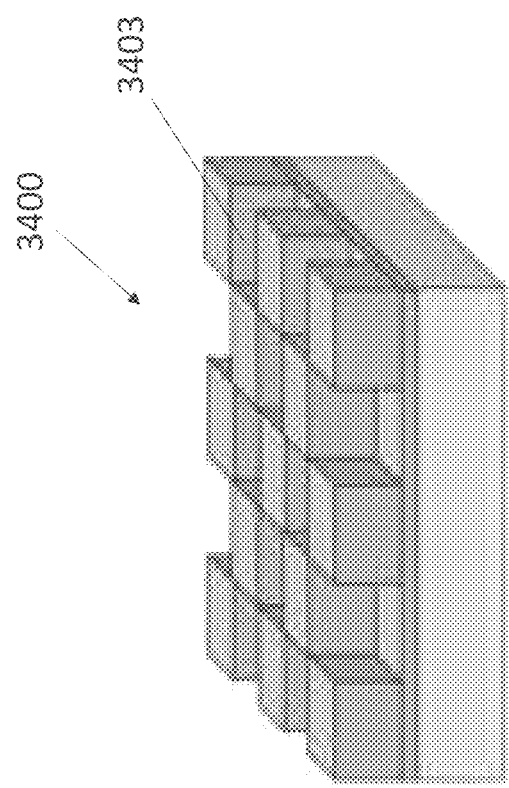
FIG. 34 is a perspective view of an example device including a 2D array of diffractive features.
Figures 35A, 35B:
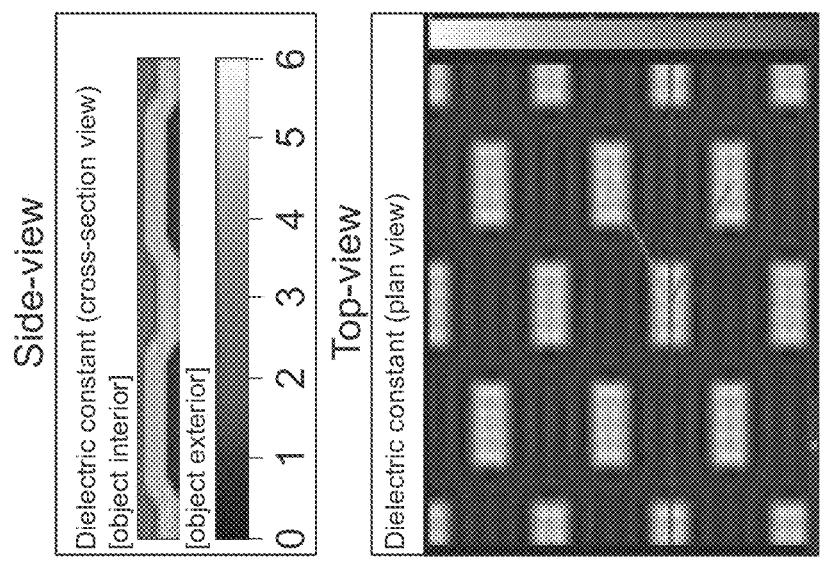
FIG. 35A is a cross-sectional side-view of an example array of symmetric diffractive features.
FIG. 35B is a top-view of the example array of FIG. 35A.

Any of the 1D array of structures described herein can also be arranged in two directions forming a 2D array of diffractive features. The 2D array of diffractive features can include a plurality of undulations in two directions. In some instances, the undulations can be periodic, while in other instances, the pitch of the undulations can vary. FIG. 34 shows an example device 3400 having a 2D array of diffractive features 3403 (e.g., diffractive features 3403 arranged laterally in two dimensions or directions). In this example, the array resembles a checkered board pattern. These features may be referred to as protrusions or in this case pillars. In this example, the diffractive features 3403 are symmetric with sidewalls that are substantially orthogonal to the horizontal axis. In other examples, the diffractive features, e.g., protrusions, can be symmetric with sidewalls that are angled or tilted. For example, FIGS. 35A and 35B show respectively a cross-sectional side-view and a top-view of an example array of symmetric diffractive features. Both left and right sidewalls tilt inward such that the diffractive feature tapers or the width gets smaller with increasing height. Accordingly, in this example the first sidewall is tilted in one direction and the second sidewall is tilted in a second opposite direction. In this example, the sidewall tilt angle is about 30 degrees relative to the horizontal axis and is symmetric on both sides.

Figure 36:
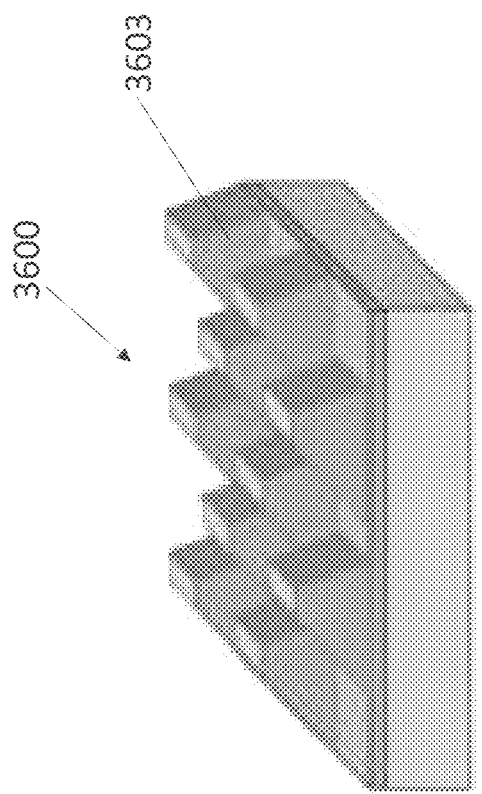
FIG. 36 is a perspective view of an example device including a 2D array of diffractive features.

FIG. 36 shows another example device 3600 having a 2D array of diffractive features 3603. The diffractive features in this example are asymmetric. FIGS. 36A and 36B show respectively a cross-sectional side-view and a top-view of an example array of asymmetric diffractive features. This 2D diffraction grating comprises a blazed diffraction grating. The diffractive features may be tapered, e.g., in thickness, with height. In the example shown in FIG. 36, the diffractive features have two sloping sidewalls or facets with one sloping more than the other while in the example shown FIGS. 36A and 36B one sidewall is sloped while the other opposite sidewall is not or any slope on the second sidewall is negligible. In both cases, the slope of one sidewall is more than that (if any) of the other such that the diffractive feature is asymmetric and blazed. As a result, the diffraction features preferentially diffract light in one direction over other directions. Such a diffraction grating may be useful, for example, as an incoupling optical element configured to diffract light received from a projector toward a light distribution element, an outcoupling optical element or a combination of a light distributing element for example, distributing the light so as to increase the output beam of light and/or eye box, and an outcoupling optical element, e.g., a CPE or combined pupil expander-extractor. Such a diffraction grating may also be useful for outcoupling light to the eye as opposed to the opposite direction to the environment or world in front of the user and head mounted display. The sidewall tilt angle is less than 30 degrees relative to the horizontal axis on one side and larger than 80 degrees (possibly 90 degrees) on the other side, in some implementations. However, other tilts and tilt angles are possible. In some instances, the diffractive features can form a 2D array of sawtooth structures such as sawtooth nanostructures.

Figure 37A:
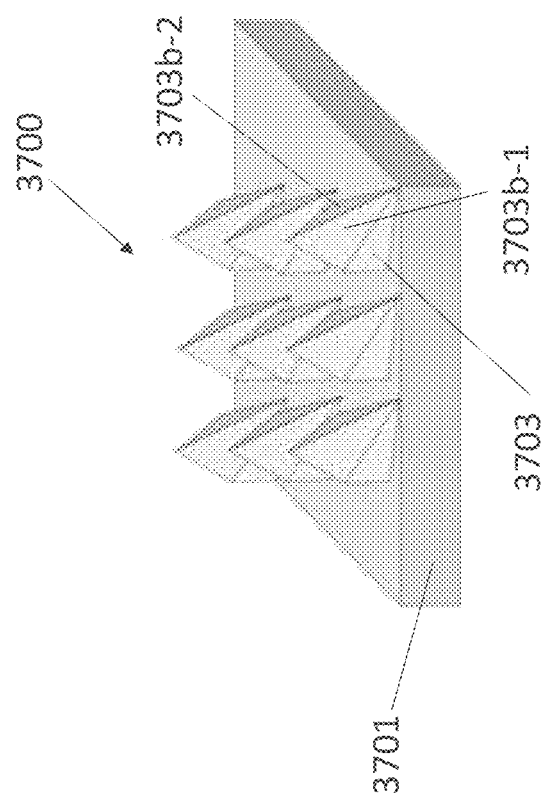
FIG. 37A is a perspective view of an example device including a 2D array of diffractive features.
Figure 37B:
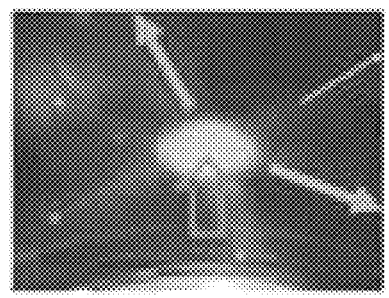
FIG. 37B illustrates an example diffractive feature directing light in two directions.

Accordingly, in various implementations, a 2D array of symmetric or asymmetric diffraction features can provide blazed diffraction gratings. As discussed above, the shape (e.g., tilt angles of sidewalls) of the diffraction grating can determine the direction the grating directs the light or preferentially directs light. For example, the gratings may direct more light toward other gratings (e.g., EPEs, OPEs, or CPEs) and/or toward the viewer. In some instances, the diffraction features can be faceted to bias the propagation of light in two or more directions (e.g., blazed in multiple directions). For example, FIG. 37A shows an example device 3700 having a 2D array of diffractive features 3703 formed in or on the substrate 3701. The diffractive feature 3703 has a first sidewall or facet 3703b-1 and a second sidewall or facet 3703b-2 that are tilted. Accordingly, the diffractive features are tapered, e.g., in thickness, with height. The diffractive feature 3703 can be configured to direct light preferentially in directions based on the tilt angles of the first and second sidewalls or facets 3703b-1, 3703b-2. FIG. 37B shows an example diffractive feature directing more light in two particular directions (as illustrated by the two thick solid arrows directed upward to the right and downward to the left). Other examples are possible.

Accordingly, any of the structures or devices described herein such as grating structures may comprise a 1D grating. Similarly, any of the structures or devices described herein such as grating structures may comprise a 2D grating. Such 2D gratings may spread the light. These gratings may also comprise blazed gratings. Such blazed gratings may preferentially direct light in certain directions. In some implementations, the 2D gratings (e.g., having one tilted facet on the diffractive features) preferentially direct light in one direction in others the 2D grating (e.g., having two tilted facets on the diffractive features differently) preferentially direct light into a plurality of directions. Likewise, any of the methods or processes described herein can be used for 1D gratings. Similarly, any of the methods or processes described herein can be used for 2D gratings. These gratings, 1D or 2D, may be included on a substrate and/or waveguide and may be included in an eyepiece and possibly integrated into a head-mounted display as disclosed herein. These gratings may be employed as input gratings or optical elements (e.g., ICGs), output gratings or optical elements (EPEs), light distributing gratings or optical elements (OPEs) or combined light distributing gratings/output gratings (e.g., CPEs) that both distributes the light, e.g., to increase the beam size and/or eye box, and couples the light out of the waveguide.

Figure 38A:
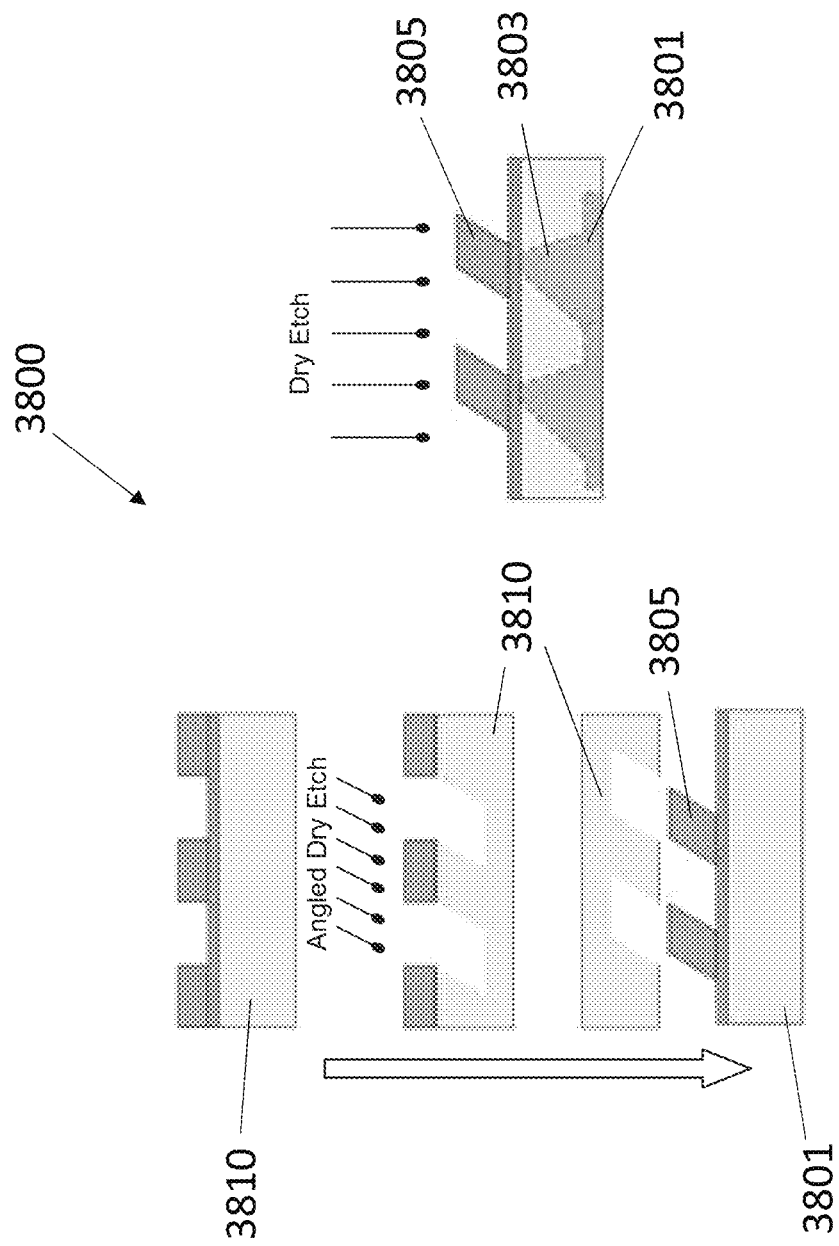
FIG. 38A illustrates an example method of forming a blazed grating.

FIG. 38A shows an example method 3800 of forming a blazed grating. The method 3800 provides a template or master 3810. If the diffractive features are to be angled, slanted, or tilted, the template 3810 can be patterned to form angled structures. Various processes, for example, etching processes, may be directional and angled to form such angled structures. Some examples of angled processes such as angled etching process include ion beam milling, angled dry etching, ion etching, GLAD etching, tilted etching, Faraday cage etching, etc. In some implementations, the selection of material employed for the template 3810 may assist in producing angled structures having angled sidewalls in the template. In this example, the angled structures comprise angled elongate protrusions (e.g., for 1D gratings) or angled pillars (e.g., for 2D gratings). These angled elongate protrusions or angled pillars may have sidewalls that are tilted in the same direction and in some cases may be substantially parallel. Once the template 3810 is fabricated, a layer of patternable material (e.g., polymer, resist, photoresist, etc.) can be deposited on a substrate 3801 and this layer can be imprinted with an imprint template 3810. The template 3810 can be imprinted into the patternable material (e.g., resist material) 3805 on a substrate 3801 to form a mask 3805 for the substrate. In other implementations, the patternable material can be deposited on the template and the substrate can be contacted to the template with the patternable material thereon. The template can be removed and the resist material 3805 and underlying substrate 3801 can be dry etched to form the diffractive features 3803 in the substrate 3801. In various implementations, dry etching is employed such as shown. The etching may be direction. In the example shown, the etching process is not angled. The resultant diffractive features 3803 formed in the substrate 3801 (or in a layer of material disposed on the substrate 3801) may have certain shapes, for example, may be blazed as a result of the angled feature in the mask 3805. In the example shown, the cross-section of the diffractive features has a trapezoidal or substantially triangular shape with two sloping sides. The sides slope in opposite directions. In the example shown, one side is sloped more than the other creating the blazed structure. This process may be used to form a 1D or 2D array of diffractive features.

Figure 38B:
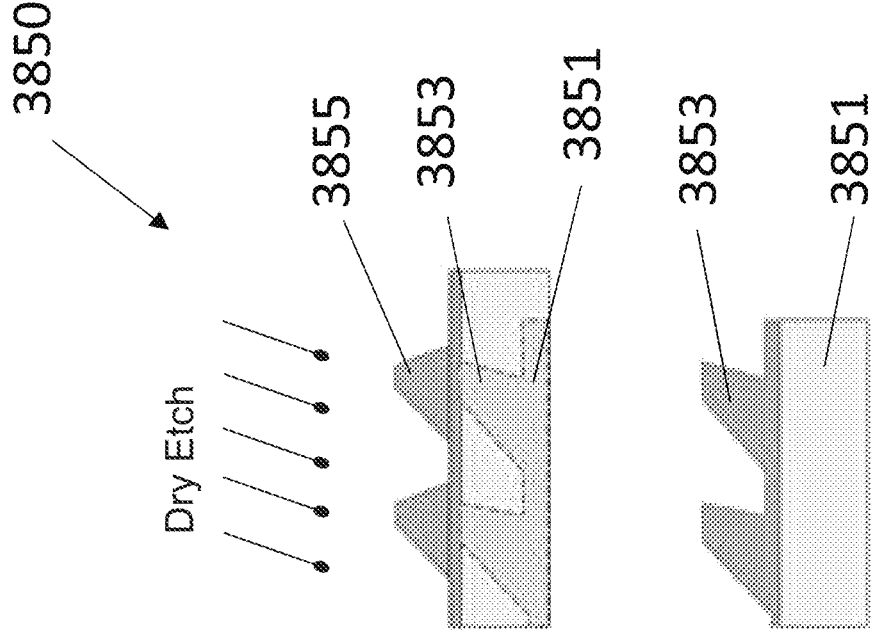
FIG. 38B illustrates an example method of forming blazed diffractive features.

FIG. 38B shows another example method 3850 of forming blazed diffractive features. The mask 3855 and underlying substrate 3851 can be etched (e.g., dry etched) at an angle to form the diffractive features 3853 in the substrate 3851 (or in a layer of material disposed on the substrate 3851). Some examples of angled directional etching processes (e.g., angled etching) include ion beam milling, angled dry etching, ion etching, GLAD etching, tilted etching, Faraday cage etching, etc. The template may comprise elongate protrusions (e.g. for 1D gratings) or tapered pillars (e.g. for 2D gratings) comprising trapezoidal or substantially triangular cross-sections. These elongate protrusions or tapered pillars may have sidewalls that are tilted in the opposite direction. One sidewall may be tilted more than the other. Applying an angled etching process to these elongate protrusions or tapered pillars may produce a blazed grating in a material, e.g., substrate or layer of material disposed on a substrate, underlying the elongate protrusions or tapered pillars. Blazed diffractive features having sides tilted in the same direction may be produced. In various implementations, one of the sides is tilted more than the other side. This process may be used to form a 1D or 2D array of diffractive features.

Figure 39:
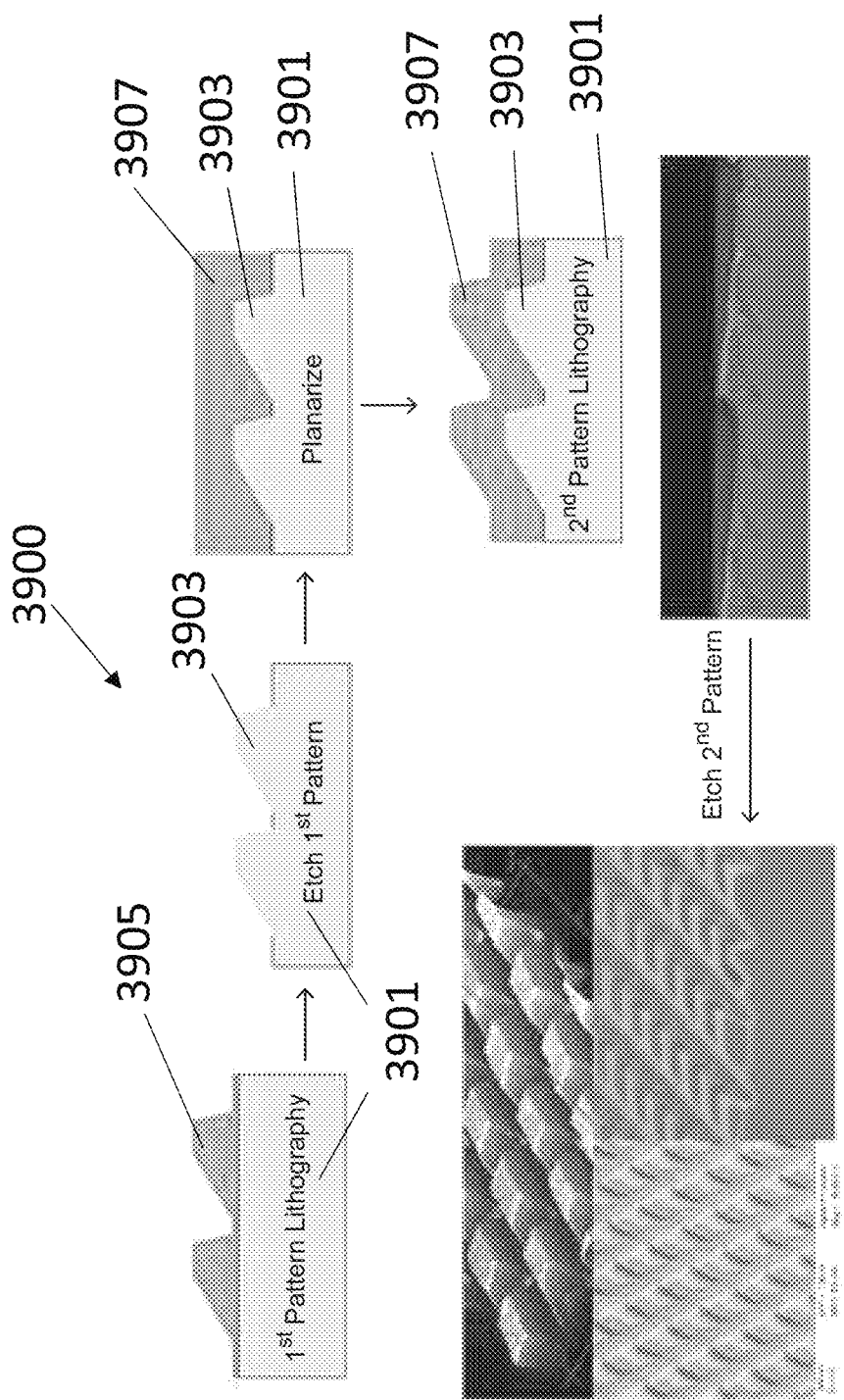
FIG. 39 illustrates an example method of forming blazed diffractive features.

In various implementations, the resultant diffractive features may be blazed in two or more directions (e.g., as shown in FIG. 37A) as a result of the angled features in the mask (e.g., as shown in FIG. 38A) and/or as a result of using an angled process (e.g., as shown in FIG. 38B). Diffractive features or gratings blazed in two or more directions may be produced by etching twice. In some implementations, for example, diffractive features or gratings blazed in two or more directions may be produced by etching with a first mask and etching again with a second different mask. In some instances, as shown in FIG. 39, the mask 3905 and substrate 3901 may be etched to form the first sidewall of the diffractive feature 3903 in the substrate 3901. Additionally, patterning may be provided to form the second sidewalls. In various implementations, a second mask having a different orientation and/or shape may be used to form the second sidewalls. The second mask (e.g., at an angle and/or different orientation with respect to the first sidewall) may for example be etched to form the second sidewall. In some implementations, after the first sidewall of the diffractive feature 3903 is formed, a planarization layer 3907 may be added to the intermediate diffractive feature 3903 and substrate 3901. The planarization layer 3907, intermediate diffractive feature 3903, and/or substrate 3901 may be patterned and etched (e.g., at an angle with respect to the first sidewall) to form the second sidewall. Although the above example is discussed in the context of patterning the substrate, in some implementations, the processes described above may be employed to pattern a layer formed on the substrate and not the substrate. Alternatively, in some implementations, the processes described above may be employed to pattern a layer formed on the substrate as well as the substrate.

Additionally, although the example methods 3800, 3850, 3900 are illustrated to form a 2D array of asymmetric diffractive features, the methods can also be used to form a 2D array of symmetric diffractive features (with or without angled sidewalls). The methods can also be used to form a 1D array of diffractive features. In some instances, the diffractive features in the 1D array can be symmetric with or without angled sidewalls. In some instances, the diffractive features in the 1D array can be asymmetric, e.g., with angled sidewalls. Accordingly, in some cases, blazed diffractive features may be formed.

A wide variety of variations on the systems, devices, and methods described herein are possible. For example, although head mounted display systems and devices are discussed as potentially providing image content as if projected from three depths, some implementations may not include such three depth planes. Variable focus lens(es) may also be used to make image content appear as if originating from different depths. Other variations are possible.

Various examples of devices (e.g., optical devices, display devices, illuminators, integrated optical devices, etc.) and systems (e.g., illumination systems) have been provided. Any of these devices and/or systems may be included in a head mounted display system to couple light (e.g., with one or more in-coupling optical elements) into a waveguide and/or eyepiece to form images. In addition, the devices and/or systems may be relatively small (e.g., less than 1 cm) such that one or more of the devices and/or systems may be included in a head mounted display system. For example, the devices and/or systems may be small with respect to the eyepiece (e.g., less than a third of the length and/or width of the eyepiece).

The systems, methods and devices disclosed herein each have several innovative aspects, no single one of which is solely responsible for the desirable attributes disclosed herein. A variety of example systems and methods are provided below.

Part I

Example 1: A method of manufacturing a diffractive optical element, the method comprising: providing a substrate comprising material having a refractive index greater than 2.0 that is transparent to visible light; disposing a patternable layer over a surface of the substrate; forming a pattern on the patternable layer, the pattern comprising a plurality of surface relief features with different heights; and etching the surface of the substrate through the patternable layer to fabricate structures on the surface of the substrate, wherein said structure comprise diffractive feature configured to diffract visible light.

Example 2: The method of Example 1, wherein the transparent material comprises at least one of $LiNbO_3$, $LiTaO_3$ or $BaTiO_3$.

Example 3: The method of Example 2, wherein the transparent material comprises an X-cut $LiNbO_3$ wafer.

Example 4: The method of any of the Example above, further comprising disposing over the substrate a layer between the substrate and the patternable layer.

Example 5: The method of Example 4, wherein the layer between the substrate and the patternable layer comprises a dielectric layer.

Example 6: The method of Example 4, wherein the layer between the substrate and the patternable layer comprises a conducting layer.

Example 7: The method of Examples 4, 5 or 6, wherein the layer between the substrate and the patternable layer comprises a transparent oxide.

Example 8: The method of Examples 4 or 6, wherein the layer between the substrate and the patternable layer comprises a conductive oxide.

Example 9: The method of Example 4, wherein the layer between the substrate and the patternable layer comprises at least one of SiC, $TiO_2$, $ZrO_2$, $Si_3N_4$, or $SiO_2$.

Example 10: The method of any of Examples 4 to 9, wherein the layer between the substrate and the patternable layer comprises a material having a refractive index between 1.45 and 3.5.

Example 11: The method of any of Examples 4 to 9, wherein the layer between the substrate and the patternable layer comprises a material having a refractive index greater than or equal to 2.0.

Example 12: The method of any of Examples 4, 6, 8, 10, or 11, wherein the layer between the substrate and the patternable layer comprises a material configured to dissipate static charge.

Example 13: The method of any of the Examples above, further comprising disposing an adhesion promoter layer over the substrate prior to disposing the patternable layer.

Example 14: The method of Example 13, wherein the adhesion promoter layer has a thickness less than or equal to 10 nm.

Example 15: The method of Examples 13 or 14, wherein the adhesion promoter layer is configured to covalently bond with the patternable layer.

Example 16: The method of Examples 13 or 14, wherein the adhesion promoter layer is configured to cross-link with the substrate.

Example 17: The method of any of the Examples above, wherein the patternable layer has a refractive index less than 2.0.

Example 18: The method of any of the Examples above, further comprising exposing the surface of the substrate to an ionizer prior to disposing the patternable layer.

Example 19: The method of Example 18, wherein the ionizer comprises bipolar clean air ionization.

Example 20: The method of Example 18, wherein the ionizer comprises positive or negative ions.

Example 21: The method of any of the Examples above, further comprising bringing a charged surface close to or in contact with the surface of the substrate thereby dissipating surface charges.

Example 22: The method of any of the Examples above, further comprising comprises mounting the substrate on an electrically grounded mount thereby dissipating surface charges.

Example 23: The method of any of the Examples above, further comprising depositing a metal layer over the substrate thereby dissipating surface charges.

Example 24: The method of Example 23, wherein the metal layer comprises iridium, chromium or nickel.

Example 25: The method of any of the Examples above, wherein depositing the patternable layer comprises jet depositing the patternable layer over the surface.

Example 26: The method of any of the Examples above, wherein the patternable layer is deposited non-uniformly across the surface, regions of surface where the patternable layer is thicker producing higher surface relief features than regions of surface where the patternable layer is thinner.

Example 27: The method of any of the Examples above, wherein etching the surface of the substrate comprises: exposing the patternable layer to a first etchant that is configured to etch the patternable layer.

Example 28: The method of Example 27, further comprising exposing the surface of the substrate to a second etchant, the second etchant configured to etch the substrate.

Example 29: The method of Example 27, further comprising exposing a layer of dielectric material disposed on the substrate to a second etchant configured to etch a layer of dielectric material.

Example 30: The method of Example 29, further comprising exposing the surface of the substrate to a third etchant configured to etch the material of the substrate.

Example 31: The method of any of the Examples above, wherein said forming a pattern on said patternable layer comprises imprinting a pattern in said patternable layer.

Example 32: The method of Example 31, wherein imprinting a pattern on the patternable layer comprises contacting the patternable layer with a patterned template.

Example 33: The method of any of the Examples above, wherein said forming a pattern on said patternable layer comprises patterning using photolithography.

Example 34: The method of any of the Examples above, wherein said substrate comprises a dielectric.

Example 35: The method of any of the Examples above, wherein said patternable layer comprise polymer.

Example 36: The method of any of the Examples above, wherein said patternable layer comprise resist.

Example 37: The method of Example 36, wherein said patternable layer comprise photoresist.

Example 38: The method of any of the Examples above, further comprising integrating the diffractive optical element in a head mounted display.

Example 39: A method of manufacturing a diffractive optical element, the method comprising: providing a substrate comprising a material having a refractive index greater than 2.0 that is an transparent to visible light; disposing different amounts of a patternable material over different regions on a surface of the substrate; and etching the surface of the substrate through the patternable material to fabricate structures having different heights on the surface of the substrate.

Example 40: The method of Example 39, wherein regions of surface having more producing higher surface relief features than regions of surface having less patternable material.

Example 41: A method of manufacturing a diffractive optical element, the method comprising: providing a substrate comprising a material having a refractive index greater than 2.0 that is transparent to visible light; disposing different compositions of a patternable material over different laterally spaced regions on a surface of the substrate, the different compositions of the patternable material having different etch rates to an etchant; and etching the surface of the substrate through the patternable material with the etchant to fabricate structures having different heights on the surface of the substrate.

Example 42: A display device comprising: a waveguide stack comprising a plurality of waveguides, at least one of the plurality of waveguides comprising a material having a refractive index greater than 2.0 that is that is transparent to visible light; wherein said at least one of the plurality of waveguides comprises a first major surface, a second major surface, and a plurality of thinner edges, wherein the first major surface comprises a plurality of diffractive features having different heights.

Example 43: The display device of Example 42, wherein the second major surface comprises a plurality of diffractive features offset from the plurality of diffractive features of the first major surface.

Example 44: The display device of any of Examples 42 or 43, wherein the transparent material comprises one or more of $LiNbO_3$, $LiTaO_3$, $SiC$, or $TiO_2$.

Example 45: The display device of any of Examples 42 to 44, further comprising: a frame configured to be supported on the head of the user; and an eyepiece comprising the waveguide stack disposed on the frame.

Example 46: The display device of Example 45 comprises a head mounted display.

Example 47: A method of manufacturing a diffractive optical element, the method comprising: providing a substrate comprising material having a refractive index greater than 1.79 that is transparent to visible light; disposing a patternable layer over a surface of the substrate; patterning the patternable layer, the pattern comprising a plurality of features; and etching the surface of the substrate through the patternable layer to fabricate structures on the surface of the substrate, wherein the structures comprise diffractive feature configured to diffract visible light.

Example 48: The method of Example 47, wherein the transparent material comprises $LiNbO_3$ or silicon carbide.

Example 49: The method of any of Examples 47 or 48, wherein patterning the patternable layer comprises imprinting the patternable layer with an imprint template comprising a plurality of features.

Example 50: The method of any of Examples 47-49, further comprising curing the patterned patternable layer.

Example 51: The method of any of Examples 47-50, wherein disposing the patternable layer over the surface of the substrate comprises jet-depositing the patternable layer over the surface of the substrate.

Example 52: The method of any of Examples 47-51, wherein the surface of the substrate is discharged prior to disposing the patternable layer by at least one of (i) exposing the surface to a plasma; (ii) using an ionizer; (iii) bringing a secondary charged surface or a grounded surface near the surface; or (iv) providing a transparent metal or other conductive coating.

Example 53: The method of any of Examples 47-52, wherein the patternable layer comprises a resist or a polymer.

Example 54: The method of any of Examples 47-53, further comprising disposing an adhesion promoter layer over the surface of the waveguide prior to disposing the patternable layer.

Example 55: The method of any of Examples 47-54, further comprising disposing a layer of a high refractive index material having a refractive index greater than 1.79 over the surface of the waveguide prior to disposing the patternable layer, the layer of the high refractive index material comprising a material different from the material of the substrate.

Example 56: The method of Example 55, wherein the layer of the high refractive index material comprises at least one of titanium dioxide, zirconium dioxide, silicon nitride or silicon carbide.

Example 57: The method of any of Examples 47-56, wherein etching the surface of the substrate comprises: etching the patterned patternable layer using a first etch process to expose the surface of the substrate between the plurality of features of the patternable layer; and etching the plurality of the features and the exposed surface of the substrate using a second etch process to fabricate a plurality of features on the surface of the substrate.

Example 58: The method of Example 57, wherein the first etch process comprises etching in the presence of at least one of Argon, Oxygen and Helium, and wherein the second etch process comprises etching in the presence of at least one of Fluorine, Bromine, Argon or methane.

Example 59: The method of any of Examples 47-58, wherein the disposing the patternable layer over the surface of the substrate comprises disposing a plurality of droplets of a patternable material over the surface of the substrate.

Example 60: The method of Example 59, wherein the volume of the plurality of droplets of the patternable material varies across the surface of the substrate.

Example 61: The method of Example 60, wherein the plurality of features of the patterned patternable layer have different heights.

Example 62: The method of Example 60, wherein a base of the cured patterned patternable layer is sloped.

Example 63: The method of Example 60, wherein a spacing between the plurality of features of the patterned patternable layer varies across the surface of the substrate.

Example 64: The method of any of Examples 59-63, wherein the plurality of features formed on the surface of the waveguide have different heights.

Example 65: The method of Example 59, wherein the volume of the plurality of droplets of the patternable material is constant.

Example 66: The method of Example 65, wherein the plurality of features of the cured patternable layer have approximately a same height.

Example 67: The method of any of Examples 65 or 66, wherein the plurality of features formed on the surface of the waveguide have approximately a constant height.

Example 68: A method of manufacturing a diffractive optical element, the method comprising: providing a substrate comprising material having a refractive index greater than 1.79 that is transparent to visible light; disposing a patternable layer over a surface of the substrate; and patterning the patternable layer, the pattern comprising a plurality of features; wherein the plurality of features of the patterned patternable layer are configured to diffract visible light into the substrate to be guided therein or to diffract visible light guided within the substrate out of the substrate.

Example 69: The method of Example 68, wherein the transparent material comprises $LiNbO_3$ or silicon carbide.

Example 70: The method of any of Examples 68 or 69, wherein patterning the patternable layer comprises using imprinting the patternable layer with an imprint template comprising a plurality of features.

Example 71: The method of any of Examples 68-71, further comprising curing the patterned patternable layer.

Example 72: The method of any of Examples 68-71, wherein disposing the patternable layer over the surface of the substrate comprises jet-depositing the patternable layer over the surface of the substrate.

Example 73: The method of any of Examples 68-72, wherein the surface of the substrate is discharged prior to disposing the patternable layer using at least one of (i) exposing the surface a plasma; (ii) an ionizer; (iii) bringing a secondary charged surface or a grounded surface near the surface; or (iv) providing a transparent metal or other conductive coating.

Example 74: The method of any of Examples 68-73, wherein the patternable layer comprises a resist or a polymer.

Example 75: The method of any of Examples 68-74, further comprising disposing an adhesion promoter layer over the surface of the substrate prior to disposing the patternable layer.

Example 76: The method of any of Examples 68-75, further comprising disposing a layer of a high refractive index material having a refractive index greater than 1.79 over the surface of the waveguide prior to disposing the patternable layer, the layer of the high refractive index material comprising a material different from the material of the substrate.

Example 77: The method of Example 76, wherein the layer of the high refractive index material comprises at least one of titanium dioxide, zirconium dioxide, silicon nitride or silicon carbide.

Example 78: The method of any of Examples 68-75, wherein the disposing the patternable layer over the surface of the substrate comprises disposing a plurality of droplets of a patternable material over the surface of the substrate.

Example 79: The method of Example 78, wherein the volume of the plurality of droplets of the patternable material varies across the surface of the substrate.

Example 80: The method of Example 79, wherein the plurality of features of the patterned patternable layer have different heights.

Example 81: The method of Example 80, wherein the base of the patterned patternable layer is sloped.

Example 82: The method of Example 80, wherein a spacing between the plurality of features of the patterned patternable layer varies across the surface of the substrate.

Example 83: The method of Example 78, wherein the volume of the plurality of droplets of the patternable material is constant.

Example 84: The method of Example 83, wherein the plurality of features of the patterned patternable layer have approximately a same height.

Example 85: A method of manufacturing a diffractive optical element, the method comprising: providing a substrate comprising material having a refractive index greater than 1.79 that is transparent to visible light; jet-depositing the patternable layer over a surface of the substrate; and patterning the patternable layer, the pattern comprising a plurality of features.

Example 86: The method of Example 85, wherein the transparent material comprises $LiNbO_3$ or silicon carbide.

Example 87: The method of any of Examples 85 or 86, wherein patterning the patternable layer comprises using imprinting the patternable layer with an imprint template comprising a plurality of features.

Example 88: The method of any of Examples 85-87, further comprising curing the patterned patternable layer.

Example 89: The method of any of Examples 85 or 88, wherein the surface of the substrate is discharged prior to disposing the patternable layer using at least one of (i) exposing the surface a plasma; (ii) an ionizer; (iii) bringing a secondary charged surface or a grounded surface near the surface; or (iv) providing a transparent metal or other conductive coating.

Example 90: The method of any of Examples 85-89, wherein the patternable layer comprises a resist or a polymer.

Example 91: The method of any of Examples 85-90, further comprising disposing an adhesion promoter layer over the surface of the substrate prior to disposing the patternable layer.

Example 92: The method of any of Examples 85-91, further comprising disposing a layer of a high refractive index material having a refractive index greater than 1.79 over the surface of the waveguide prior to disposing the patternable layer, the layer of the high refractive index material comprising a material different from the material of the substrate.

Example 93: The method of Example 92, wherein the layer of the high refractive index material comprises at least one of titanium dioxide, zirconium dioxide, silicon nitride or silicon carbide.

Example 94: The method of any of Examples 85-93, wherein the jet-depositing the patternable layer over the surface of the substrate comprises jet-depositing a plurality of droplets of a patternable material over the surface of the substrate.

Example 95: The method of Example 94, wherein the volume of the plurality of droplets of the patternable material varies across the surface of the substrate.

Example 96: The method of Example 95, wherein the plurality of features of the patterned patternable layer have different heights.

Example 97: The method of Example 95, wherein the base of the patterned patternable layer is sloped.

Example 98: The method of Example 97, wherein a spacing between the plurality of features of the patterned patternable layer varies across the surface of the substrate.

Example 99: The method of Example 94, wherein the volume of the plurality of droplets of the patternable material is constant.

Example 100: The method of Example 99, wherein the plurality of features of the cured patternable layer have approximately a same height.

Example 101: The method of Example 48, wherein the transparent material comprises $LiNbO_3$.

Example 102: The method of Example 48, wherein the transparent material comprises silicon carbide.

Example 103: The method of Example 52, wherein the surface of the substrate is discharged prior to disposing the patternable layer by exposing the surface to a plasma.

Example 104: The method of Example 52, wherein the surface of the substrate is discharged prior to disposing the patternable layer using an ionizer.

Example 105: The method of Example 52, wherein the surface of the substrate is discharged prior to disposing the patternable layer by bringing a secondary charged surface or a grounded surface near the surface.

Example 106: The method of Example 52, wherein the surface of the substrate is discharged prior to disposing the patternable layer by providing a transparent metal or other conductive coating.

Example 107: The method of Example 57, wherein the first etch process does not etch the substrate.

Example 108: The method of Example 57, wherein the first etch process etch the substrate at a lower etch rate than the second etch process.

Part II

Example 1: An optical device comprising: a substrate comprising a material having a refractive index greater than 2.0 that is a transparent to visible light, said substrate comprising a waveguide; a plurality of diffractive features formed in said substrate; and a layer of material disposed over said diffractive features.

Example 2: The optical device of Example 1, wherein said substrate material comprises lithium niobate or silicon carbide.

Example 3: The optical device of any of the Examples above, wherein said substrate material has an index of refraction that is at least 2.1.

Example 4: The optical device of any of the Examples above, wherein said substrate material has an index of refraction that is at least 2.2.

Example 5: The optical device of any of the Claims above, wherein said substrate material has an index of refraction that is at least 2.3.

Example 6: The optical device of any of the Claims above, wherein said layer of material has an index of refraction that is less than 1.8.

Example 7: The optical device of any of the Claims above, wherein said layer of material comprises photoresist.

Example 8: The optical device of any of the Claims above, wherein said diffractive features are separated by spaces and said spaces comprise exposed regions of said substrate material.

Example 9: The optical device of any of the Claims above, wherein said diffractive features are separated by spaces and said spaces between said diffractive features not covered by said layer of material.

Example 10: The optical device of any of the Claims above, wherein said diffractive features are separated by spaces and said spaces between said diffractive features comprise exposed regions of said substrate material.

Example 11: The optical device of any of the Claims above, wherein said plurality of diffractive features comprise first, second, and third diffractive features laterally displaced with respect to each other, said second diffractive feature disposed between the first and the third diffractive features.

Example 12: The optical device of Example 11, wherein said layer of material has a different thickness over each of said first, second, and third diffractive features.

Example 13: The optical device of Examples 11 or 12, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 14: The optical device of Example 11, wherein said layer of material has the same thickness over said first, second, and third diffractive features.

Example 15: The optical device of any of Examples 11-14, wherein the height of the of said third diffractive feature is higher than the height of said second diffractive feature, and the height of said second diffractive feature is higher than the height of said first diffractive feature.

Example 16: The optical device of any of the Examples above, wherein the height of the diffractive features progressively increases with lateral position.

Example 17: The optical device of any of the Examples above, wherein said layer of material has a thickness that progressively increases with lateral position.

Example 18: The optical device of any of the Examples above, wherein the thickness of said substrate is graded.

Example 19: The optical device of any of the Examples above, wherein the thickness of said layer of material is graded.

Example 20: The optical device of any of the Examples above, wherein the thickness of said substrate progressively increases with lateral position.

Example 21: The optical device of any of the Examples above, wherein the height of the diffractive features is substantially constant with lateral position.

Example 22: The optical device of any of the Examples above, wherein the height of said first, second, and third diffractive feature are the same.

Example 23: The optical device of any of the Examples above, wherein said layer of material has a thickness that is substantially constant with lateral position.

Example 24: The optical device of any of the Examples above, wherein said layer of material has the same thickness over said first, second, and third diffractive features.

Example 25: The optical device of any of the Examples above, wherein at least some of the diffractive features have sloping sidewalls.

Example 26: The optical device of any of the Examples above, wherein at least some of the diffractive features have a trapezoidal cross-section.

Example 27: The optical device of any of the Examples above, wherein said waveguide in included in an eyepiece for a head mounted display.

Example 28: The optical device of any of the Examples above, wherein said waveguide in included in a stack of waveguides in an eyepiece for a head mounted display.

Example 29: The optical device of Examples 27 or 28, wherein said eyepiece is transparent to provide the user a view of the environment in front of the user and the head mounted display.

Example 30: The optical device of any of Examples 27-29, wherein said eyepiece is configured to receive light from an image projector and to direct at least a portion of said light to an eye of the user to direct image content to said eye of the user.

Example 31: The optical device of any of Examples 27-30, wherein said eyepiece is mounted on a frame configured to be worn on the head of a user.

Example 32: The optical device of any of the Examples above, wherein said plurality of diffractive features are included in an in-coupling optical element disposed so as to receive light from an image source and couple said light into said substrate to be guided therein.

Example 33: The optical device of any of the Examples above, wherein said plurality of diffractive features are included in an out-coupling optical element disposed so as to receive light from an image source that is guided in said substrate out of said substrate to an eye of a user wearing said head mounted display.

Example 34: The optical device of any of Examples 27-33, wherein said plurality of diffractive features comprise first, second, and third diffractive features, said second diffractive feature disposed between the first and the third diffractive features.

Example 35: The optical device of Example 35, wherein the height of the of said third diffractive feature is higher than the height of said second diffractive feature, and the height of said second diffractive feature is higher than the height of said first diffractive feature.

Example 36: The optical device of Examples 34 or 35, further comprising a projector disposed with respect to the substrate to direct light into the substrate, said projector positioned closer to said first diffractive features than said second diffractive features.

Example 37: The optical device of any of the Examples above, wherein the height of the diffractive features progressively increases with lateral position.

Example 38: The optical device of Example 37, further comprising a projector disposed with respect to the substrate to direct light into the substrate, said projector positioned closer to said diffractive features with lower heights that to said diffractive features with higher heights.

Example 39: The optical device of any of Examples 34-38, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 40: The optical device of Example 39, further comprising a projector disposed with respect to the substrate to direct light into the substrate, said projector positioned closer to said first diffractive features than said second diffractive features.

Example 41: The optical device of any of the Examples above, wherein said layer of material has a thickness that progressively increases with lateral position.

Example 42: The optical device of any of the Examples above, further comprising a projector disposed with respect to the substrate to direct light into the substrate, said projector positioned closer to said diffractive features wherein said layer of material is thinner than to said diffractive features wherein said layer of material is thicker.

Example 43: The optical device of any of the Examples above, wherein said substrate comprises opposite first and second sides.

Example 44: The optical device of Example 43, wherein said optical device is integrated in a head mounted display, and said second side is disposed closer to a wearer's eye when said head mounted display is worn than said first side.

Example 45: The optical device of Examples 43 or 44, wherein said plurality of diffractive feature are disposed on said first side of said substrate.

Example 46: The optical device of any of Examples 43-45, further comprising an additional plurality of diffractive features formed in said substrate on the second opposite side of said substrate.

Example 47: The optical device of Example 46, wherein said additional plurality of diffractive features are separated by spaces, said optical device further comprising an additional layer of material disposed over said plurality of additional diffractive features.

Example 48: An optical device comprising: a substrate comprising a material having a refractive index greater than 2.0 that is transparent to visible light, said substrate comprising a waveguide; a plurality of diffractive features formed on said substrate, said diffractive features formed of a different material having an index of refraction less than the material of said substrate; and higher index material disposed over said diffractive features, said higher index material having a higher index than said material forming said diffractive features.

Example 49: The optical device of Example 48, wherein said substrate material comprises lithium niobate or silicon carbide.

Example 50: The optical device of Examples 48 or 49, wherein said material comprising said substrate has an index of refraction of at least 2.1.

Example 51: The optical device of any of the Examples 48-50, wherein said material comprising said substrate has an index of refraction of at least 2.2.

Example 52: The optical device of any of the Examples 48-50, wherein said material comprising said substrate has an index of refraction of at least 2.3.

Example 53: The optical device of any of the Examples 48-52, wherein said plurality of diffractive features comprises photoresist.

Example 54: The optical device of any of the Examples 48-53, wherein said plurality of diffractive features have an index of refraction that is less than 1.8.

Example 55: The optical device of any of the Examples 48-54, wherein said plurality of diffractive features have an index of refraction of about 1.5.

Example 56: The optical device of any of the Examples 48-55, wherein said plurality of diffractive features have an index of refraction of between 1.7 and 1.8.

Example 57: The optical device of any of the Examples 48-56, wherein said higher index material disposed over said diffractive features has an index of refraction of at least 2.1.

Example 58: The optical device of any of the Examples 48-57, wherein said higher index material disposed over said diffractive features has an index of refraction of at least 2.2.

Example 59: The optical device of any of the Examples 48-58, wherein said higher index material disposed over said diffractive features has an index of refraction of at least 2.3.

Example 60: The optical device of any of the Examples 48-59, wherein said higher index material disposed over said diffractive features comprises lithium niobate.

Example 61: The optical device of any of the Examples 48-59, wherein said higher index material disposed over said diffractive features comprises silicon carbide.

Example 62: The optical device of any of the Examples 48-61, wherein said plurality of diffractive features comprises a blazed diffractive grating.

Example 63: The optical device of any of the Examples 48-62, wherein said plurality of diffractive features are asymmetrically shaped.

Example 64: The optical device of any of the Examples 48-63, wherein more of said high index material is on a first sidewall of diffractive features than on a second sidewall of the diffractive features.

Example 65: The optical device of any of the Examples 48-64, wherein more of said high index material is on a first side of diffractive features than on a second side of the diffractive features.

Example 66: The optical device of any of the Examples 48-64, wherein at least one of said diffractive features has said high index material on a first side of diffractive features while said second side of the diffractive features are exposed.

Example 67: The optical device of any of the Examples above, wherein the diffractive features are arranged in a 1D array.

Example 68: The optical device of any of the Examples above, wherein the diffractive features are arranged in a 2D array.

Example 69: The optical device of any of Examples 1-47, wherein the diffractive features have a top surface and sidewalls disposed about said top surface, and wherein the layer of material is on said top surface of said diffractive features.

Example 70: The optical device of Example 47, wherein said additional plurality of diffractive features have a top surface and sidewalls disposed about said top surface, and wherein said additional layer of material is on said top surface of said plurality of additional diffractive features.

Example 71: The optical device of any of Examples 48-68, wherein said diffractive features have a top surface and sidewalls disposed about said top surface, and wherein said higher index material is on said top surface of said diffractive features.

Example 72: The optical device of any of Examples 48-68, wherein said waveguide in included in an eyepiece for a head mounted display.

Example 73: The optical device of any of Examples 48-68, wherein said waveguide in included in a stack of waveguides in an eyepiece for a head mounted display.

Example 74: The optical device of Examples 72 or 73, wherein said eyepiece is transparent to provide the user a view of the environment in front of the user and the head mounted display.

Example 75: The optical device of any of Examples 72-74, wherein said eyepiece is configured to receive light from an image projector and to direct at least a portion of said light to an eye of the user to direct image content to said eye of the user.

Example 76: The optical device of any of Examples 72-75, wherein said eyepiece is mounted on a frame configured to be worn on the head of a user.

Example 77: The optical device of any of the Examples above, wherein said plurality of diffractive features are included in an in-coupling optical element disposed so as to receive light from an image source and couple said light into said substrate to be guided therein.

Example 78: The optical device of any of the Examples above, wherein said plurality of diffractive features are included in an out-coupling optical element disposed so as to receive light from an image source that is guided in said substrate out of said substrate to an eye of a user wearing said head mounted display.

Example 79: The optical device of any of the Examples 1-47, wherein said layer of material comprises polymer.

Example 80: The optical device of any of the Examples 1-47, wherein said layer of material comprises resist.

Example 81: The optical device of any of the Examples 1-47, wherein said layer of material comprises at least part of an etching mask.

Example 82: The optical device of any of the Examples 1-47, wherein said layer of material reduces reflection.

Example 83: The optical device of any of the Examples above, wherein the plurality of diffractive features form a diffraction grating and said diffracting grating is a blazed grating.

Example 84: The optical device of any of the Examples above, wherein the plurality of diffractive features are asymmetrical so as to provide for a blazed grating.

Example 85: The optical device of any of the Examples above, wherein the plurality of diffractive features have material asymmetrically deposited thereon so as to provide for a blazed grating.

Example 86: The optical device of any of the Examples above, wherein said substrate includes first and second sides and only said first side of said substrate includes a diffraction grating.

Example 87: The optical device of any of the Examples above, wherein the diffractive features are arranged in a 1D array.

Example 88: The optical device of any of the Examples above, wherein the diffractive features are arranged in a 2D array.

Example 89: The optical device of Example 88, wherein the 2D array comprises a square array.

Example 90: The optical device of any of the Examples above, wherein said plurality of diffractive features are included in an in-coupling optical element disposed so as to receive light from an image source and couple said light into said substrate to be guided therein.

Example 91: The optical device of any of the Examples above, wherein said plurality of diffractive features are included in a light distributing optical element disposed so as to receive light from an image source that is guided in said substrate and direct said light to an out-coupling optical elements to be coupled out of said substrate.

Example 92: The optical device of any of the Examples above, wherein said plurality of diffractive features are included in a light distributing optical element disposed so as to receive light from an image source that is guided in said substrate and spread said light within said waveguide out to increase beam size or eye box size.

Example 93: The optical device of any of the Examples above, wherein said plurality of diffractive features are included in an out-coupling optical element disposed so as to receive light from an image source that is guided in said substrate and couple said light out of said substrate.

Example 94: The optical device of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 95: The optical device of any of the Examples above, wherein said plurality of diffractive features are included in a combined pupil expander-extractor disposed so as to receive light from an image source that is guided in said substrate, spread said light out and couple said light out of said substrate to an eye of a user wearing said head mounted display.

Example 96: The optical device of any of the Examples above, wherein said plurality of diffractive features comprise a blazed diffraction grating configured to direct light preferentially in at least two directions.

Example 97: The method of any of the Examples above, wherein said plurality of diffractive features comprise a blazed diffraction grating blazed in two directions.

Part III

Example 1: An optical device comprising: a substrate comprising a material having a refractive index greater than 2.0 that is transparent to visible light, said substrate comprising a waveguide; a plurality of diffractive features formed in or on said substrate, wherein said diffraction features are arranged in a 2-dimensional (2D) array to form a 2D diffraction grating.

Example 2: The optical device of Example 1, wherein said substrate material comprises lithium niobate or silicon carbide.

Example 3: The optical device of any of the Examples above, wherein said substrate material has an index of refraction that is at least 2.1.

Example 4: The optical device of any of the Examples above, wherein said substrate material has an index of refraction that is at least 2.2.

Example 5: The optical device of any of the Examples above, wherein said substrate material has an index of refraction that is at least 2.3.

Example 6: The optical device of any of the Examples above, wherein said layer of material has an index of refraction that is less than 1.8.

Example 7: The optical device of any of the Examples above, wherein said diffractive features comprise material different from said substrate.

Example 8: The optical device of any of the Examples above, wherein said diffractive features are separated by spaces and said spaces comprise exposed regions of said substrate material.

Example 9: The optical device of any of the Examples above, wherein said diffractive features are separated by spaces and said spaces between said diffractive features not covered by said layer of material.

Example 10: The optical device of any of the Examples above, wherein said diffractive features are separated by spaces and said spaces between said diffractive features comprise exposed regions of said substrate material.

Example 11: The optical device of any of the Examples above, wherein said plurality of diffractive features comprise first, second, and third diffractive features laterally displaced with respect to each other, said second diffractive feature disposed between the first and the third diffractive features.

Example 12: The optical device of Example 11, wherein said layer of material has a different thickness over each of said first, second, and third diffractive features.

Example 13: The optical device of Examples 11 or 12, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 14: The optical device of Example 11, wherein said layer of material has the same thickness over said first, second, and third diffractive features.

Example 15: The optical device of any of the Examples 11-14, wherein the height of the of said third diffractive feature is higher than the height of said second diffractive feature, and the height of said second diffractive feature is higher than the height of said first diffractive feature.

Example 16: The optical device of any of the Examples above, wherein the height of the diffractive features progressively increases with lateral position.

Example 17: The optical device of any of the Examples above, wherein said layer of material has a thickness that progressively increases with lateral position.

Example 18: The optical device of any of the Examples above, wherein the thickness of said substrate is graded.

Example 19: The optical device of any of the Examples above, wherein the thickness of said layer of material is graded.

Example 20: The optical device of any of the Examples above, wherein the thickness of said substrate progressively increases with lateral position.

Example 21: The optical device of any of the Examples above, wherein the height of the diffractive features is substantially constant with lateral position.

Example 22: The optical device of any of the Examples above, wherein the height of said first, second, and third diffractive feature are the same.

Example 23: The optical device of any of the Examples above, wherein said layer of material has a thickness that is substantially constant with lateral position.

Example 24: The optical device of any of the Examples above, wherein said layer of material has the same thickness over said first, second, and third diffractive features.

Example 25: The optical device of any of the Examples above, wherein at least some of the diffractive features have sloping sidewalls.

Example 26: The optical device of any of the Examples above, wherein at least some of the diffractive features have a trapezoidal cross-section.

Example 27: The optical device of any of the Examples above, wherein said waveguide in included in an eyepiece for a head mounted display.

Example 28: The optical device of any of the Examples above, wherein said waveguide in included in a stack of waveguides in an eyepiece for a head mounted display.

Example 29: The optical device of Example 27 or 28, wherein said eyepiece is transparent to provide the user a view of the environment in front of the user and the head mounted display.

Example 30: The optical device of any of Examples 27-29, wherein said eyepiece is configured to receive light from an image projector and to direct at least a portion of said light to an eye of the user to direct image content to said eye of the user.

Example 31: The optical device of any of Examples 27-30, wherein said eyepiece is mounted on a frame configured to be worn on the head of a user.

Example 32: The optical device of any of the Examples above, wherein said plurality of diffractive features are included in an in-coupling optical element disposed so as to receive light from an image source and couple said light into said substrate to be guided therein.

Example 33: The optical device of any of the Examples above, wherein said plurality of diffractive features are included in an out-coupling optical element disposed so as to receive light from an image source that is guided in said substrate and couple said light out of said substrate to an eye of a user wearing said head mounted display.

Example 34: The optical device of any of Examples 27-33, wherein said plurality of diffractive features comprise first, second, and third diffractive features, said second diffractive feature disposed between the first and the third diffractive features.

Example 35: The optical device of Example 35, wherein the height of the of said third diffractive feature is higher than the height of said second diffractive feature, and the height of said second diffractive feature is higher than the height of said first diffractive feature.

Example 36: The optical device of Examples 34 or 35, further comprising a projector disposed with respect to the substrate to direct light into the substrate, said projector positioned closer to said first diffractive features than said second diffractive features.

Example 37: The optical device of any of the Examples above, wherein the height of the diffractive features progressively increases with lateral position.

Example 38: The optical device of Examples 37, further comprising a projector disposed with respect to the substrate to direct light into the substrate, said projector positioned closer to said diffractive features with lower heights that to said diffractive features with higher heights.

Example 39: The optical device of any of Examples 34-38, wherein the thickness of said layer of material over said third diffractive feature is higher than the thickness of said layer of material over said second diffractive feature, and the thickness of said layer of material over said second diffractive feature is higher than the thickness of said layer of material over said first diffractive feature.

Example 40: The optical device of Example 39, further comprising a projector disposed with respect to the substrate to direct light into the substrate, said projector positioned closer to said first diffractive features than said second diffractive features.

Example 41: The optical device of any of the Examples above, wherein said layer of material has a thickness that progressively increases with lateral position.

Example 42: The optical device of any of the Examples above, further comprising a projector disposed with respect to the substrate to direct light into the substrate, said projector positioned closer to said diffractive features wherein said layer of material is thinner than to said diffractive features wherein said layer of material is thicker.

Example 43: The optical device of any of the Examples above, wherein said substrate comprises opposite first and second sides.

Example 44: The optical device of Example 43, wherein said optical device is integrated in a head mounted display, and said second side is disposed closer to a wearer's eye when said head mounted display is worn than said first side.

Example 45: The optical device of Examples 43 or 44, wherein said plurality of diffractive feature are disposed on said first side of said substrate.

Example 46: The optical device of any of Examples 43-45, further comprising an additional plurality of diffractive features formed in or on said substrate on the second opposite side of said substrate.

Example 47: The optical device of Example 46, wherein said additional plurality of diffractive features are separated by spaces, said optical device further comprising an additional layer of material over said plurality of additional diffractive features.

Example 48: The optical device of any of the Examples above, wherein said 2D diffracting grating comprise a blazed grating.

Example 49: The optical device of any of the Examples above, wherein the plurality of diffractive features are asymmetrical so as to provide for a blazed grating.

Example 50: The optical device of any of the Examples above, wherein the plurality of diffractive features have material asymmetrically deposited thereon so as to provide for a blazed grating.

Example 51: The optical device of any of the Examples above, wherein said substrate includes first and second sides and only said first side of said substrate includes a diffraction grating.

Example 52: The optical device of any of the Examples above, wherein the 2D array comprises a square array.

Example 53: The optical device of any of the Examples above, wherein the diffractive features are formed in said substrate.

Example 54: The optical device of any of the Examples above, wherein the diffractive features are formed on said substrate.

Example 55: The optical device of any of the Examples above, wherein said diffractive features comprise material different from said substrate.

Example 56: The optical device of any of the Examples above, wherein said diffractive features comprise resist.

Example 57: The optical device of any of the Examples above, wherein said diffractive features comprise photoresist.

Example 58: The optical device of any of the Examples above, wherein said diffractive features comprise material having an index of refraction less than that of said substrate.

Example 59: The optical device of any of the Examples above, wherein said at least part of an etching mask remains on the diffractive features.

Example 60: The optical device of any of the Examples above, wherein said plurality of diffractive features are included in an in-coupling optical element disposed so as to receive light from an image source and couple said light into said substrate to be guided therein.

Example 61: The optical device of any of the Examples above, wherein said plurality of diffractive features are included in a light distributing optical element disposed so as to receive light from an image source that is guided in said substrate and direct said light to an out-coupling optical elements to be coupled out of said substrate.

Example 62: The optical device of any of the Examples above, wherein said plurality of diffractive features are included in a light distributing optical element disposed so as to receive light from an image source that is guided in said substrate and spread said light within said waveguide out to increase beam size or eye box size.

Example 63: The optical device of any of the Examples above, wherein said plurality of diffractive features are included in an out-coupling optical element disposed so as to receive light from an image source that is guided in said substrate and couple said light out of said substrate.

Example 64: The optical device of any of the Examples above, wherein said plurality of diffractive features are included in a combined light distributing/out-coupling optical element disposed so as to receive light from an image source that is guided in said substrate, spread said light out in at least two directions and couple said light out of said substrate.

Example 65: The optical device of any of the Examples above, wherein said plurality of diffractive features are included in a combined pupil expander-extractor disposed so as to receive light from an image source that is guided in said substrate, spread said light out and couple said light out of said substrate.

Example 66: The method of any of the Examples above, wherein said 2D diffraction grating comprises a blazed diffraction grating configured to direct light preferentially in at least two directions.

Example 67: The method of any of the Examples above, wherein said 2D diffraction grating comprises a blazed diffraction grating blazed in two directions.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially exampled as such, one or more features from an example combination may in some cases be excised from the combination, and the exampled combination may be directed to a subcombination or variation of a subcombination. No single feature or group of features is necessary or indispensable to each and every embodiment.

It will be appreciated that conditional language used herein, such as, among others, "can," "could," "might," "may" "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended examples are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following examples. In some cases, the actions recited in the examples may be performed in a different order and still achieve desirable results.

Accordingly, the claims are not intended to be limited to the embodiments shown herein, but are to be accorded the widest scope consistent with this disclosure and the principles and the novel features disclosed herein.

What is claimed is:

1. An optical device comprising:
a substrate comprising a first material having a first refractive index greater than about 2.0, wherein the substrate comprises a waveguide that is transparent to visible light;
a plurality of diffractive features formed on a surface of the substrate, the diffractive features formed of a second material having a second refractive index lower than the first refractive index, wherein the surface of the substrate slopes downwards from one end of the plurality of diffractive features to an other end of the plurality of diffractive features, wherein a thickness of the substrate decreases as the surface slopes downwards; and
a third material disposed over the plurality of diffractive features, the third material having a third refractive index higher than the second refractive index.

2. The optical device of claim 1, wherein the first material comprises at least one of lithium niobate or silicon carbide.

3. The optical device of claim 1, wherein the first refractive index is at least about 2.3.

4. The optical device of claim 1, wherein the second material comprises photoresist.

5. The optical device of claim 1, wherein the second refractive index is less than about 1.8.

6. The optical device of claim 5, wherein the second refractive index is between about 1.2 and about 1.8.

7. The optical device of claim 6, wherein the second refractive index is about 1.5.

8. The optical device of claim 1, wherein the third refractive index is at least about 2.3.

9. The optical device of claim 1, wherein the third material comprises at least one of lithium niobate or silicon carbide.

10. The optical device of claim 1, wherein the plurality of diffractive features comprises a blazed diffractive grating.

11. The optical device of claim 1, wherein the plurality of diffractive features are asymmetrically shaped.

12. The optical device of claim 1, wherein more of the third material is on a first side of at least one of the diffractive features than on a second side of the at least one of the diffractive features.

13. The optical device of claim 1, wherein the plurality of diffractive features are arranged in a one-dimensional array.

14. The optical device of claim 1, wherein the plurality of diffractive features are arranged in a two-dimensional array.

15. The optical device of claim 1, wherein the plurality of diffractive features are included in an in-coupling optical element arranged to receive light and couple the light into the waveguide to be guided therein.

16. The optical device of claim 1, wherein the plurality of diffractive features are included in an out-coupling optical element arranged to couple, out of the waveguide, at least a portion of light being guided within the waveguide.

17. The optical device of claim 1, wherein a height of individual ones of the diffractive features increases as a thickness of the substrate decreases.

* * * * *